United States Patent [19]
Emerson

[11] Patent Number: 5,778,370
[45] Date of Patent: Jul. 7, 1998

[54] DATA VILLAGE SYSTEM

[76] Inventor: Mark L. Emerson, 3945 Michael Ave., Los Angeles, Calif. 90066

[21] Appl. No.: 519,347

[22] Filed: Aug. 25, 1995

[51] Int. Cl.$^6$ ................................................ G06F 17/30
[52] U.S. Cl. ........................................ 707/100; 707/201
[58] Field of Search ................................ 395/611, 612, 395/613, 614; 707/100–104, 201

[56] References Cited

U.S. PATENT DOCUMENTS

| | | | |
|---|---|---|---|
| 4,649,515 | 3/1987 | Thompson et al. | 395/61 |
| 5,019,961 | 5/1991 | Adesso et al. | 364/192 |
| 5,133,068 | 7/1992 | Crus et al. | 395/611 |
| 5,193,185 | 3/1993 | Lanter | 395/612 |

*Primary Examiner*—Thomas G. Black
*Assistant Examiner*—Maria N. Von Buhr
*Attorney, Agent, or Firm*—Robert E. Malm

[57] ABSTRACT

The data village system (DVS) comprises an interactive computer system and software that enables a user to establish a data model that defines an organizational structure for an organization's data and that enforces the user's rules as to how the organization's data is manipulated and viewed. The data model for any organization, in its simplest form, consists of tables for receiving related datums, compartments of tables for receiving associated datums, and cables which connect tables thereby indicating linkages between datums in different tables. This basic conceptual underpinning can be expanded to groupings of linked tables into rooms, groupings of linked rooms into houses, and groupings of linked houses into data villages, a data village corresponding to the organization to which the data model pertains. The DVS provides the means for a user to define a data model for an organization in terms of compartments, tables, rooms, houses, and the interconnecting cables. The DVS functions in accordance with data organization rules which require that any user-data entered into a compartment be linked to other user-data in accordance with the data model. As a result of this organizational scheme, a user may request the display of the datums in a specified compartment and be alerted to and have available for display all other datums in the organization that pertain to the datums in the specified compartment.

160 Claims, 151 Drawing Sheets

|  | FIELD 1 | FIELD 2 | FIELD 3 | FIELD 4 | FIELD 5 | ... |
|---|---|---|---|---|---|---|
| PARTIAL RECORD 1 | DATUM | DATUM | DATUM | DATUM | DATUM | ... |
| PARTIAL RECORD 2 | DATUM | DATUM | DATUM | DATUM | DATUM | ... |
| PARTIAL RECORD 3 | DATUM | DATUM | DATUM | DATUM | DATUM | ... |
| PARTIAL RECORD 4 | DATUM | DATUM | DATUM | DATUM | DATUM | ... |
| PARTIAL RECORD 5 | DATUM | DATUM | DATUM | DATUM | DATUM | ... |
| PARTIAL RECORD 6 | DATUM | DATUM | DATUM | DATUM | DATUM | ... |
| PARTIAL RECORD 7 | DATUM | DATUM | DATUM | DATUM | DATUM | ... |
| PARTIAL RECORD 8 | DATUM | DATUM | DATUM | DATUM | DATUM | ... |

FIG. 4

| RECORD ID | THE-DATE | NUM-CARRIERS | WEATHER |
|---|---|---|---|
| D1 | 4-JUNE-91 | 4 | CLOUDY |
| D2 | 5-JUNE-91 | 3 | RAIN |
| D3 | 6-JUNE-91 | 2 | CLOUDY |
| D4 | 9-JUNE-91 | 3 | SUNNY |

57

| FIELD NAME | TYPE | ORIGIN | DESCRIPTION |
|---|---|---|---|
| THE-DATE | DATE | BASAL | THE DATE (EACH PARTIAL RECORD IS ONE DATE) |
| NUM-CARRIERS | INTEGER | BASAL | NUMBER OF CARRIERS ON THE JOB THIS DATE |
| WEATHER | STRING | BASAL | WEATHER ON THAT DAY |

59

| RECORD ID | STATION-CODE | BLDG-NUM | MANAGER |
|---|---|---|---|
| S1 | X1 | A | JOHNSON, LAVONNA |
| S2 | X5 | A | UDWAIRA, RAMAN |
| S3 | Y2 | F | GOLDBERG, BRUCE |
| S4 | M3 | C1 | LEE, GEORGE |
| S5 | M4 | C1 | ALVAREZ, D.H. |

61

| FIELD NAME | TYPE | ORIGIN | DESCRIPTION |
|---|---|---|---|
| STATION-CODE | STRING | BASAL | CODE IDENTIFYING THE STATION |
| BLDG-NUM | STRING | BASAL | BUILDING NUMBER THE STATION IS IN |
| MANAGER | STRING | BASAL | PERSON IN CHARGE AT THE STATION |

| REC ID | SHIP-DATE | FROM | TO | ORDER-NUM | WGT | COST | DESCRIPTION |
|---|---|---|---|---|---|---|---|
| O1 | D1 | S1 | S2 | 235 | 2 | 0.50 | ENVELOPE |
| O2 | D1 | S1 | S2 | 416 | 5 | 0.50 | ENVELOPE |
| O3 | D1 | S1 | S2 | 432 | 24 | 1.25 | PACKAGE |
| O4 | D1 | S1 | S4 | 266 | 12 | 1.25 | MED. WIDGET |
| O5 | D1 | S2 | S1 | 333 | 66 | 2.35 | PACKAGE |
| O6 | D1 | S3 | S1 | 312 | 1 | 0.50 | ENVELOPE |
| O7 | D1 | S3 | S1 | 445 | 1 | 0.50 | ENVELOPE |
| O8 | D1 | S4 | S2 | 121 | 4 | 0.50 | ENVELOPE |
| O9 | D2 | S1 | S2 | 144 | 3 | 0.50 | BOTTLE |
| O10 | D2 | S3 | S1 | 147 | 68 | 2.35 | FLOWERS |
| O11 | D2 | S3 | S1 | 234 | 237 | 7.70 | PKG.-FRAGILE |
| O12 | D2 | S3 | S1 | 265 | 34 | 1.25 | PACKAGE |
| O13 | D2 | S3 | S1 | 274 | 2 | 0.50 | SML. WIDGET |
| O14 | D2 | S3 | S1 | 313 | 3 | 0.50 | ENVELOPE |
| O15 | D2 | S3 | S5 | 423 | 25 | 1.25 | PACKAGE |
| O16 | D3 | S2 | S5 | 321 | 21 | 1.25 | MED. WIDGET |
| O17 | D3 | S3 | S5 | 338 | 21 | 1.25 | MED. WIDGET |
| O18 | D4 | S1 | S4 | 287 | 4 | 0.50 | BOTTLE |
| O19 | D4 | S1 | S4 | 288 | 1 | 0.50 | ENVELOPE |
| O20 | D4 | S1 | S4 | 317 | 1 | 0.50 | ENVELOPE |
| O21 | D4 | S3 | S2 | 355 | 1 | 0.50 | SML. WIDGET |
| O22 | D4 | S4 | S2 | 156 | 67 | 2.35 | PKG.-FRAGILE |

| FIELD NAME | TYPE | ORIGIN | DESCRIPTION |
|---|---|---|---|
| ORDER-NUM | STRING | BASAL | IDENTIFIES THE SHIPMENT NUMERICALLY |
| WEIGHT | INTEGER | BASAL | WEIGHT IN OUNCES OF THE ITEM |
| COST | REAL | CALC. | COST IN DOLLARS BASED UPON WEIGHT |
| DESCRIPTION | STRING | BASAL | DESCRIPTION OF THE ITEM BEING SHIPPED |

FIG. 13

| BASIS SET | GALLERY NAME |
|---|---|
| {FROM, DESCRIPTION} | SOURCE DESCRIPTION GALLERY |
| {SHIP-DATE, FROM, TO} | MAXI-CABLE GALLERY |
| {WEIGHT} | WEIGHT GALLERY |
| {FROM, TO} | PATH GALLERY |
| {SHIP-DATE, TO} | DAILY DESTINATION GALLERY |
| { } | MASTER GALLERY |

FIG. 15

| FROM | DESCRIPTION | SDG-COUNT | SDG-COST |
|---|---|---|---|
| S1 | BOTTLE | 2 | 1.00 |
| S1 | ENVELOPE | 4 | 2.00 |
| S1 | MEDIUM WIDGET | 1 | 1.25 |
| S1 | PACKAGE | 1 | 1.25 |
| S2 | MEDIUM WIDGET | 1 | 1.25 |
| S2 | PACKAGE | 1 | 2.35 |
| S3 | ENVELOPE | 3 | 1.50 |
| S3 | FLOWERS | 1 | 2.35 |
| S3 | MEDIUM WIDGET | 1 | 1.25 |
| S3 | PACKAGE | 2 | 2.50 |
| S3 | PACKAGE - FRAGILE | 1 | 7.70 |
| S3 | SMALL WIDGET | 2 | 1.00 |
| S4 | ENVELOPE | 1 | 0.50 |
| S4 | PACKAGE - FRAGILE | 1 | 2.35 |

69

| FIELD NAME | TYPE | ORIGIN | DESCRIPTION |
|---|---|---|---|
| SDG-COUNT | INTEGER | CALC. | NUMBER OF SHIPMENTS BY FROM STATION AND DESCR. |
| SDG-COST | INTEGER | CALC. | SUM OF COSTS BY FROM STATION AND DESCRIPTION |

| SHIP-DATE | FROM | TO | COUNT | MXG-WEIGHT | MXG-COST |
|---|---|---|---|---|---|
| D1 | S1 | S2 | 3 | 31 | 2.25 |
| D1 | S1 | S4 | 1 | 12 | 1.25 |
| D1 | S2 | S1 | 1 | 66 | 2.35 |
| D1 | S3 | S1 | 2 | 2 | 1.00 |
| D1 | S4 | S2 | 1 | 4 | 0.50 |
| D2 | S1 | S2 | 1 | 3 | 0.50 |
| D2 | S3 | S1 | 5 | 344 | 12.30 |
| D2 | S3 | S5 | 1 | 25 | 1.25 |
| D3 | S2 | S5 | 1 | 21 | 1.25 |
| D3 | S3 | S5 | 1 | 21 | 1.25 |
| D4 | S1 | S4 | 3 | 6 | 1.50 |
| D4 | S3 | S2 | 1 | 1 | 0.50 |
| D4 | S4 | S2 | 1 | 67 | 2.35 |

| FIELD NAME | TYPE | ORIGIN | DESCRIPTION |
|---|---|---|---|
| COUNT | INTEGER | CALC. | NUMBER OF SHIPMENTS IN THE TRIPLE |
| MXG-WEIGHT | INTEGER | CALC. | SUM OF WEIGHTS IN THE TRIPLE |
| MXG-COST | REAL | CALC. | SUM OF COSTS IN THE TRIPLE |

FIG. 17

| WEIGHT | WT-COUNT |
|---|---|
| 1 | 5 |
| 2 | 2 |
| 3 | 2 |
| 4 | 2 |
| 5 | 1 |
| 12 | 1 |
| 21 | 2 |
| 24 | 1 |
| 25 | 1 |
| 34 | 1 |
| 66 | 1 |
| 67 | 1 |
| 68 | 1 |
| 237 | 1 |

77

| FIELD NAME | TYPE | ORIGIN | DESCRIPTION |
|---|---|---|---|
| WT-COUNT | INTEGER | CALC. | NUMBER OF SHIPMENTS BY WEIGHT |

| FROM | TO | PATH-COUNT | FRE-QUENCY | CUMUL-COST | RATING |
|---|---|---|---|---|---|
| S1 | S2 | 4 | 0.182 | 2.75 | AVERAGE |
| S1 | S4 | 4 | 0.182 | 2.75 | MEDIUM |
| S2 | S1 | 1 | 0.045 | 2.35 | POOR |
| S2 | S5 | 1 | 0.045 | 1.25 | OK |
| S3 | S1 | 7 | 0.318 | 13.30 | STRONG |
| S3 | S2 | 1 | 0.045 | 0.50 | POOR |
| S3 | S5 | 2 | 0.091 | 2.50 | AVERAGE |
| S4 | S2 | 2 | 0.091 | 2.85 | NO OPINION |

| FIELD NAME | TYPE | ORIGIN | DESCRIPTION |
|---|---|---|---|
| PATH-COUNT | INTEGER | CALC. | NUMBER OF SHIPMENTS SENT ALONG THE PATH |
| FREQUENCY | REAL | CALC. | PATH-COUNT ÷ NUMBER OF LIVING ROOM PARTIAL RECORDS |
| CUMUL-COST | REAL | CALC. | SUM OF COSTS FOR THE PATH |
| RATING | STRING | BASAL | SUBJECTIVE RATING ON THE PATH |

FIG. 19

| SHIP-DATE | TO | DAILY-DEST-COUNT | DAILY-DEST-WT | DAILY-DEST-COST |
|---|---|---|---|---|
| D1 | S1 | 3 | 68 | 3.35 |
| D1 | S2 | 4 | 35 | 2.75 |
| D1 | S4 | 1 | 12 | 1.25 |
| D2 | S1 | 5 | 344 | 12.30 |
| D2 | S2 | 1 | 3 | 0.50 |
| D2 | S5 | 1 | 25 | 1.25 |
| D3 | S5 | 2 | 42 | 2.50 |
| D4 | S2 | 2 | 68 | 2.85 |
| D4 | S4 | 3 | 6 | 1.50 |

| FIELD NAME | TYPE | ORIGIN | DESCRIPTION |
|---|---|---|---|
| DAILY-DEST-COUNT | INTEGER | CALC. | NUMBER OF SHIPMENTS SENT TO THE DESTINATION |
| DAILY-DEST-WT | INTEGER | CALC. | SUM OF WEIGHTS ON DATE FOR DESTINATION |
| DAILY-DEST-COST | REAL | CALC. | SUM OF COSTS ON DATE FOR THE DESTINATION |

FIG. 20

| ORDER-COUNT | TOT-WEIGHT | MAX-WEIGHT | TOT-COST |
|---|---|---|---|
| 22 | 603 | 237 | 28.25 |

| FIELD NAME | TYPE | ORIGIN | DESCRIPTION |
|---|---|---|---|
| ORDER-COUNT | INTEGER | CALC. | TOTAL NUMBER OF SHIPMENTS IN THE HOUSE |
| TOT-WEIGHT | INTEGER | CALC. | SUM OF WEIGHTS FROM ALL SHIPMENTS |
| MAX-WEIGHT | INTEGER | CALC. | HIGHEST WEIGHT AMONG ALL THE SHIPMENTS |
| TOT-COST | REAL | CALC. | SUM OF COSTS FROM ALL SHIPMENTS IN HOUSE |

FIG. 21

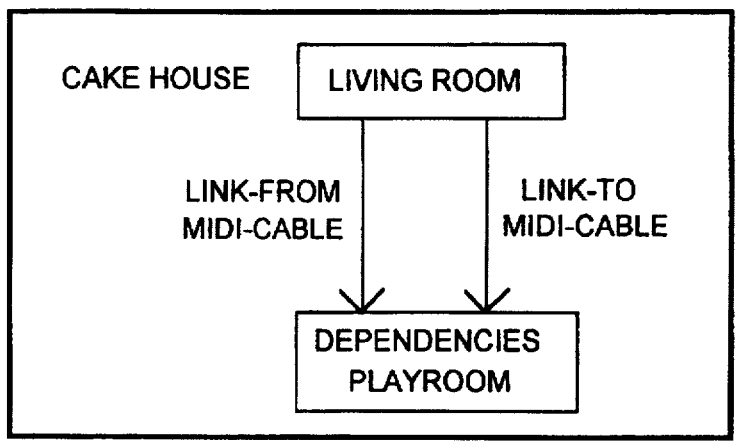

FIG. 33

| REC-ID | TASK NAME | TASK TIME |
|---|---|---|
| T1 | PURCHASE INGREDIENTS | 60 |
| T2 | MIX DRY INGREDIENTS | 5 |
| T3 | MIX WET INGREDIENTS | 8 |
| T4 | MIX FROSTING | 10 |
| T5 | BLEND WET AND DRY INGREDIENTS | 5 |
| T6 | PREPARE CAKE PANS | 6 |
| T7 | POUR MIX INTO PANS | 2 |
| T8 | BAKE | 30 |
| T9 | REMOVE FROM PANS | 5 |
| T10 | FROST CAKE | 15 |
| T11 | EAT CAKE AND ENJOY | 30 |

| FIELD NAME | TYPE | ORIGIN | DESCRIPTION |
|---|---|---|---|
| TASK NAME | STRING | BASAL | THE NAME OF THE TASK |
| TASK TIME | INTEGER | BASAL | ESTIMATED TIME TO COMPLETE IN MINUTES |

FIG. 34

| LINK-FROM | LINK-TO | DEPENDENCY NAME | MAX DELAY TIME |
|---|---|---|---|
| T1 | T2 | A | 60 |
| T1 | T3 | B | 60 |
| T1 | T4 | C | 60 |
| T2 | T5 | D | 2 |
| T3 | T5 | E | 0.01 |
| T5 | T7 | F | 0.01 |
| T6 | T7 | G | 1 |
| T7 | T8 | H | 0.01 |
| T8 | T9 | I | 0.05 |
| T9 | T10 | J | 0.05 |
| T4 | T10 | K | 0.02 |
| T10 | T11 | L | 3 |

| FIELD NAME | TYPE | ORIGIN | DESCRIPTION |
|---|---|---|---|
| DEPENDENCY NAME | STRING | BASAL | NAME OF THE DEPENDENCY LINK |
| MAX DELAY TIME | INTEGER | BASAL | MAXIMUM TIME THAT CAN LAPSE BETWEEN THE END OF THE PREVIOUS TASK AND THE BEGINNING OF THE NEXT TASK IN DAYS |

| RECORD-ID | DEPARTMENT NAME | BUILDING | |
|---|---|---|---|
| D1 | SOFTWARE DEVELOPMENT | A5 | 93 |
| D2 | SHIPPING | A2 | |

| REC-ID | LIVING ROOM REC-ID | JOB TYPE | MINIMUM EMPLOY-EES | MAXIMUM EMPLOY-EES | |
|---|---|---|---|---|---|
| H1 | D1 | MANAGER | 1 | 1 | 95 |
| H2 | D1 | PROGRAMMER | 1 | 10 | |
| H3 | D1 | SECRETARY | 0 | 2 | |
| H4 | D2 | MANAGER | 1 | 1 | |
| H5 | D2 | SHIPPING CLERK | 3 | 12 | |
| H6 | D2 | DRIVER | 0 | 2 | |
| H7 | D2 | SECRETARY | 0 | 1 | |

| RECORD-ID | DEPT JOB | EMPLOYEE NAME |
|---|---|---|
| E1 | H2 | BLINN, KENNETH |
| E2 | H7 | CONTRERAS, MELECIO |
| E3 | H5 | HASHEMI, KAMYAB |
| E4 | H4 | HOFFMAN, SYLVIA |
| E5 | H1 | KANEKO, HIROSHI |
| E6 | H6 | MARTINELLI, DAVID |
| E7 | H2 | MORENO, SANDRA |
| E8 | H3 | RAMANUJAN, JAYASHREE |
| E9 | H5 | SANDERS, JACK |
| E10 | H2 | SOSA, CARLOS |
| E11 | H5 | WHITE, AMBER |
| E12 | H5 | WHITE, SAM |

| RECORD-ID | PART NAME |
|---|---|
| P1 | OP AMP |
| P2 | CAPACITOR |
| P3 | RESISTOR |
| P4 | VOLTAGE REFERENCE |
| P5 | VOLTAGE WAVE SOURCE |

| RECORD-ID | PIN TYPE NAME |
|---|---|
| T1 | NEGATIVE PIN |
| T2 | POSITIVE PIN |
| T3 | OUTPUT PIN |
| T4 | ONLY PIN |
| T5 | PIN 1 |
| T6 | PIN 2 |

FIG. 45

| RECORD-ID | ELECTRONIC PART TYPE | PIN TYPE |
|---|---|---|
| J1 | P1 | T1 |
| J2 | P1 | T2 |
| J3 | P1 | T3 |
| J4 | P2 | T5 |
| J5 | P2 | T6 |
| J6 | P3 | T5 |
| J7 | P3 | T6 |
| J8 | P4 | T4 |
| J9 | P5 | T5 |
| J10 | P5 | T6 |

FIG. 46

| RECORD-ID | ELECTRONIC PART TYPE | PART DESIGNATOR | FUNCTION |
|---|---|---|---|
| C1 | P1 | OP AMP | THE OPERATIONAL AMPLIFIER ITSELF |
| C2 | P2 | C L | CAPACITANCE OF THE LOAD |
| C3 | P3 | R SET | RESISTANCE TO SET THE OP AMP VOLTAGE |
| C4 | P3 | R L | RESISTANCE OF THE LOAD |
| C5 | P4 | GROUND | |
| C6 | P4 | V+ | POSITIVE VOLTAGE REFERENCE |
| C7 | P4 | V– | NEGATIVE VOLTAGE REFERENCE |
| C8 | P5 | V IN | THE SIGNAL TO BE AMPLIFIED |

FIG. 47

| RECORD-ID | LIVING ROOM RECORD | PIN TYPE |
|---|---|---|
| G1 | C1 | T1 |
| G2 | C1 | T2 |
| G3 | C1 | T3 |
| G4 | C2 | T5 |
| G5 | C2 | T6 |
| G6 | C3 | T5 |
| G7 | C3 | T6 |
| G8 | C4 | T5 |
| G9 | C4 | T6 |
| G10 | C5 | T4 |
| G11 | C6 | T4 |
| G12 | C7 | T4 |
| G13 | C8 | T5 |
| G14 | C8 | T6 |

FIG. 48

| RECORD-ID | LINK-FROM GUEST ROOM RECORD | LINK-TO GUEST ROOM RECORD |
|---|---|---|
| N1 | G1 | G6 |
| N2 | G1 | G11 |
| N3 | G2 | G12 |
| N4 | G2 | G13 |
| N5 | G3 | G4 |
| N6 | G3 | G7 |
| N7 | G3 | G8 |
| N8 | G5 | G10 |
| N9 | G9 | G10 |
| N10 | G10 | G14 |

| RECORD ID | STATE NAME KEY | STATEHOOD NON-KEY |
|---|---|---|
| S1 | CALIFORNIA | 1850 |
| S2 | IOWA | 1846 |
| S3 | NEBRASKA | 1867 |
| S4 | CONNECTICUT | 1788 |

| RECORD ID | SCHOOLS CODE KEY | DESCRIPTION NON-KEY |
|---|---|---|
| T1 | U | UNIFIED SCHOOL DISTRICT WITHIN CITY |
| T2 | S | SEPARATE ELEMENTARY AND SECONDARY SCHOOL DISTRICTS WITHIN CITY |
| T3 | O | SCHOOL SERVICES PROVIDED FROM ANOTHER CITY OR FROM COUNTY |

FIG. 52

| RECORD ID | IN-STATE KEY | CITY SCHOOLS NON-KEY | CITY NAME KEY | ZIP CODE NON-KEY |
|---|---|---|---|---|
| C1 | S1 | T2 | FAIRFIELD | 94533 |
| C2 | S1 | T3 | LINCOLN | 95648 |
| C3 | S1 | T1 | SAN FRANCISCO | 941** |
| C4 | S2 | T2 | MASON CITY | 50401 |
| C2 | S2 | T3 | FAIRFIELD | 52556 |
| C3 | S3 | T1 | LINCOLN | 685** |
| C4 | S4 | T2 | FAIRFIELD | 06430 |

FIG. 53

HEAD TABLE

| REC ID | TITLE | AUTHOR | BOOK TYPE (FORMAT FIELD) |
|---|---|---|---|
| R1 | ROMEO AND JULIET | SHAKESPEARE. | FICTION |
| R2 | FORMAL LOGIC | KALISH & MONTAGUE | NON-FICTION |
| R3 | THE GRAPES OF WRATH | STEINBECK | FICTION |
| R4 | THE CAT IN THE HAT | SEUSS | FICTION |
| R5 | 7 HABITS OF HIGHLY SUCCESSFUL PEOPLE | COVEY | NON-FICTION |

NON-FICTION      FICTION

NON-FICTION TABLE

| REC ID | SUBJECT | INDEX? |
|---|---|---|
| R2 | MATH | YES |
| R5 | PSYCH | NO |

FICTION TABLE

| REC ID | TIME PERIOD | PLACE | ENDING |
|---|---|---|---|
| R1 | MEDIEVAL | ENGLAND | TRAGIC |
| R3 | 1930S | AMERICA | SAD |
| R4 | 1950S | FANTASY | HAPPY |

FIG. 54

| RECORD-ID | BLDG-NUM | BLDG TYPE | MAX-OCCUP | AIR-COND? |
|---|---|---|---|---|
| U1 | B1 | CABIN | 6 | NO |
| U2 | B2 | CABIN | 4 | YES |
| U3 | B3 | CABIN | 6 | NO |
| U4 | B4 | MULTI-UNIT | 3 | YES |
| U5 | B4 | MULTI-UNIT | 2 | YES |
| U6 | B4 | MULTI-UNIT | 3 | YES |
| U7 | B5 | CABIN | 3 | YES |
| U8 | B6 | MULTI-UNIT | 3 | NO |
| U9 | B6 | MULTI-UNIT | 3 | NO |
| U10 | B6 | MULTI-UNIT | 4 | NO |
| U11 | B6 | MULTI-UNIT | 2 | NO |

| RECORD-ID | DISH STYLE | FP CLEANING |
|---|---|---|
| U1 | MODERN PLASTIC | 1989 |
| U2 | HEAVY CERAMIC | 1989 |
| U3 | MODERN PLASTIC | 1990 |
| U7 | MODERN PLASTIC | 1987 |

| RECORD-ID | SUITE-NUM | TV TYPE |
|---|---|---|
| U4 | S1 | RCA |
| U5 | S2 | SONY |
| U6 | S3 | RCA |
| U8 | S1 | PANASONIC |
| U9 | S2 | SONY |
| U10 | S3 | SONY |
| U11 | S4 | RCA |

FIG. 58

| RECORD ID | STATION-CODE | BLDG-NUM | MANAGER |
|---|---|---|---|
| S4 | M3 | C1 | LEE, GEORGE |
| S5 | M4 | C1 | ALVAREZ, D.H. |
| S1 | X1 | A | JOHNSON, LAVONNA |
| S2 | X5 | A | UDWAIRA, RAMAN |
| S3 | Y2 | F | GOLDBERG, BRUCE |

FIG. 59

| RECORD ID | STATION-CODE | BLDG-NUM | MANAGER |
|---|---|---|---|
| S1 | X1 | A | JOHNSON, LAVONNA |
| S2 | X5 | A | UDWAIRA, RAMAN |
| S4 | M3 | C1 | LEE, GEORGE |
| S5 | M4 | C1 | ALVAREZ, D.H. |
| S3 | Y2 | F | GOLDBERG, BRUCE |

FIG. 60

| RECORD ID | STATION-CODE | BLDG-NUM | MANAGER |
|---|---|---|---|
| S5 | M4 | C1 | ALVAREZ, D.H. |
| S3 | Y2 | F | GOLDBERG, BRUCE |
| S1 | X1 | A | JOHNSON, LAVONNA |
| S4 | M3 | C1 | LEE, GEORGE |
| S2 | X5 | A | UDWAIRA, RAMAN |

FIG. 61

| RECORD ID | THE-DATE | CARRIERS-ON-DUTY |
|---|---|---|
| D1 | 4-JUNE-91 | 4 |
| D2 | 5-JUNE-91 | 3 |
| D3 | 6-JUNE-91 | 2 |
| D4 | 9-JUNE-91 | 3 |

FIG. 62

| RECORD ID | THE-DATE | CARRIERS-ON-DUTY |
|---|---|---|
| D3 | 6-JUNE-91 | 2 |
| D2 | 5-JUNE-91 | 3 |
| D4 | 9-JUNE-91 | 3 |
| D1 | 4-JUNE-91 | 4 |

FIG. 63

| REC-ID | SHIP-DATE | FROM | TO | ORDER-NUM | WEIGHT | COST | DESCRIPTION |
|---|---|---|---|---|---|---|---|
| O19 | D4 | S1 | S4 | 288 | 1 | 0.50 | ENVELOPE |
| O6 | D1 | S3 | S1 | 312 | 1 | 0.50 | ENVELOPE |
| O20 | D4 | S1 | S4 | 317 | 1 | 0.50 | ENVELOPE |
| O21 | D4 | S3 | S2 | 355 | 1 | 0.50 | SML. WIDGET |
| O7 | D1 | S3 | S1 | 445 | 1 | 0.50 | ENVELOPE |
| O1 | D1 | S1 | S2 | 235 | 2 | 0.50 | ENVELOPE |
| O13 | D2 | S3 | S1 | 274 | 2 | 0.50 | SML. WIDGET |
| O9 | D2 | S1 | S2 | 144 | 3 | 0.50 | BOTTLE |
| O14 | D2 | S3 | S1 | 313 | 3 | 0.50 | ENVELOPE |
| O8 | D1 | S4 | S2 | 121 | 4 | 0.50 | ENVELOPE |
| O18 | D4 | S1 | S4 | 287 | 4 | 0.50 | BOTTLE |
| O2 | D1 | S1 | S2 | 416 | 5 | 0.50 | ENVELOPE |
| O4 | D1 | S1 | S4 | 266 | 12 | 1.25 | MED. WIDGET |
| O16 | D3 | S2 | S5 | 321 | 21 | 1.25 | MED. WIDGET |
| O17 | D3 | S3 | S5 | 338 | 21 | 1.25 | MED. WIDGET |
| O3 | D1 | S1 | S2 | 432 | 24 | 1.25 | PACKAGE |
| O15 | D2 | S3 | S5 | 423 | 25 | 1.25 | PACKAGE |
| O12 | D2 | S3 | S1 | 265 | 34 | 1.25 | PACKAGE |
| O5 | D1 | S2 | S1 | 333 | 66 | 2.35 | PACKAGE |
| O22 | D4 | S4 | S2 | 156 | 67 | 2.35 | PKG.-FRAGILE |
| O10 | D2 | S3 | S1 | 147 | 68 | 2.35 | FLOWERS |
| O11 | D2 | S3 | S1 | 234 | 237 | 7.70 | PKG.-FRAGILE |

FIG. 64

| SHIP-DATE | TO | DAILY-DEST-COUNT | DAILY-DEST-WT | DAILY-DEST-COST |
|---|---|---|---|---|
| D2 | S2 | 1 | 3 | 0.50 |
| D1 | S4 | 1 | 12 | 1.25 |
| D2 | S5 | 1 | 25 | 1.25 |
| D3 | S5 | 2 | 42 | 2.50 |
| D4 | S2 | 2 | 68 | 2.85 |
| D4 | S4 | 3 | 6 | 1.50 |
| D1 | S1 | 3 | 68 | 3.35 |
| D1 | S2 | 4 | 35 | 2.75 |
| D2 | S1 | 5 | 344 | 12.30 |

FIG. 65

| FROM | TO | PATH-COUNT | FREQUENCY | CUMUL-COST | RATING |
|---|---|---|---|---|---|
| S3 | S2 | 1 | 0.045 | 0.50 | POOR |
| S2 | S5 | 1 | 0.045 | 1.25 | OK |
| S2 | S1 | 1 | 0.045 | 2.35 | POOR |
| S3 | S5 | 2 | 0.091 | 2.50 | AVERAGE |
| S4 | S2 | 2 | 0.091 | 2.85 | NO OPINION |
| S1 | S2 | 4 | 0.182 | 2.75 | AVERAGE |
| S1 | S4 | 4 | 0.182 | 2.75 | MEDIUM |
| S3 | S1 | 7 | 0.318 | 13.30 | STRONG |

FIG. 66

| REC-ID | TASK NAME | TASK TIME |
|---|---|---|
| T7 | POUR MIX INTO PANS | 2 |
| T5 | BLEND WET AND DRY INGREDIENTS | 5 |
| T2 | MIX DRY INGREDIENTS | 5 |
| T9 | REMOVE FROM PANS | 5 |
| T6 | PREPARE CAKE PANS | 6 |
| T3 | MIX WET INGREDIENTS | 8 |
| T4 | MIX FROSTING | 10 |
| T10 | FROST CAKE | 15 |
| T8 | BAKE | 30 |
| T11 | EAT AND ENJOY | 30 |
| T1 | PURCHASE INGREDIENTS | 60 |

FIG. 67

| RECORD ID | SHIP-DATE | FROM | TO | ORDER-NUM | WGT | COST | DESCRIPTION |
|---|---|---|---|---|---|---|---|
| O17 | D3 | S3 | S5 | 338 | 21 | 1.25 | MED. WIDGET |
| O16 | D3 | S2 | S5 | 321 | 21 | 1.25 | MED. WIDGET |
| O15 | D2 | S3 | S5 | 423 | 25 | 1.25 | PACKAGE |
| O7 | D1 | S3 | S1 | 445 | 1 | 0.50 | ENVELOPE |
| O6 | D1 | S3 | S1 | 312 | 1 | 0.50 | ENVELOPE |
| O13 | D2 | S3 | S1 | 274 | 2 | 0.50 | SML. WIDGET |
| O14 | D2 | S3 | S1 | 313 | 3 | 0.50 | ENVELOPE |
| O12 | D2 | S3 | S1 | 265 | 34 | 1.25 | PACKAGE |
| O5 | D1 | S2 | S1 | 333 | 66 | 2.35 | PACKAGE |
| O10 | D2 | S3 | S1 | 147 | 68 | 2.35 | FLOWERS |
| O11 | D2 | S3 | S1 | 234 | 237 | 7.70 | PKG.-FRAGILE |
| O20 | D4 | S1 | S4 | 317 | 1 | 0.50 | ENVELOPE |
| O19 | D4 | S1 | S4 | 288 | 1 | 0.50 | ENVELOPE |
| O18 | D4 | S1 | S4 | 287 | 4 | 0.50 | BOTTLE |
| O4 | D1 | S1 | S4 | 266 | 12 | 1.25 | MED. WIDGET |
| O21 | D4 | S3 | S2 | 355 | 1 | 0.50 | SML. WIDGET |
| O1 | D1 | S1 | S2 | 235 | 2 | 0.50 | ENVELOPE |
| O9 | D2 | S1 | S2 | 144 | 3 | 0.50 | BOTTLE |
| O8 | D1 | S4 | S2 | 121 | 4 | 0.50 | ENVELOPE |
| O2 | D1 | S1 | S2 | 416 | 5 | 0.50 | ENVELOPE |
| O3 | D1 | S1 | S2 | 432 | 24 | 1.25 | PACKAGE |
| O22 | D4 | S4 | S2 | 156 | 67 | 2.35 | PKG.-FRAGILE |

FIG. 68

| REC ID | SHIP-DATE | FROM | TO | ORDER-NUM | WGT | COST | DESCRIPTION |
|---|---|---|---|---|---|---|---|
| O18 | D4 | S1 | S4 | 287 | 4 | 0.50 | BOTTLE |
| O19 | D4 | S1 | S4 | 288 | 1 | 0.50 | ENVELOPE |
| O20 | D4 | S1 | S4 | 317 | 1 | 0.50 | ENVELOPE |
| O4 | D1 | S1 | S4 | 266 | 12 | 1.25 | MED. WIDGET |
| O16 | D3 | S2 | S5 | 321 | 21 | 1.25 | MED. WIDGET |
| O17 | D3 | S3 | S5 | 338 | 21 | 1.25 | MED. WIDGET |
| O15 | D2 | S3 | S5 | 423 | 25 | 1.25 | PACKAGE |
| O10 | D2 | S3 | S1 | 147 | 68 | 2.35 | FLOWERS |
| O11 | D2 | S3 | S1 | 234 | 237 | 7.70 | PKG.-FRAGILE |
| O12 | D2 | S3 | S1 | 265 | 34 | 1.25 | PACKAGE |
| O13 | D2 | S3 | S1 | 274 | 2 | 0.50 | SML. WIDGET |
| O14 | D2 | S3 | S1 | 313 | 3 | 0.50 | ENVELOPE |
| O6 | D1 | S3 | S1 | 312 | 1 | 0.50 | ENVELOPE |
| O5 | D1 | S2 | S1 | 333 | 66 | 2.35 | PACKAGE |
| O7 | D1 | S3 | S1 | 445 | 1 | 0.50 | ENVELOPE |
| O9 | D2 | S1 | S2 | 144 | 3 | 0.50 | BOTTLE |
| O22 | D4 | S4 | S2 | 156 | 67 | 2.35 | PKG.-FRAGILE |
| O21 | D4 | S3 | S2 | 355 | 1 | 0.50 | SML. WIDGET |
| O8 | D1 | S4 | S2 | 121 | 4 | 0.50 | ENVELOPE |
| O1 | D1 | S1 | S2 | 235 | 2 | 0.50 | ENVELOPE |
| O2 | D1 | S1 | S2 | 416 | 5 | 0.50 | ENVELOPE |
| O3 | D1 | S1 | S2 | 432 | 24 | 1.25 | PACKAGE |

FIG. 69

| LINK-FROM | LINK-TO | DEPENDENCY NAME | MAX DELAY TIME |
|---|---|---|---|
| T5 | T7 | F | 0.01 |
| T6 | T7 | G | 1 |
| T3 | T5 | E | 0.01 |
| T2 | T5 | D | 2 |
| T1 | T2 | A | 60 |
| T8 | T9 | I | 0.05 |
| T1 | T3 | B | 60 |
| T1 | T4 | C | 60 |
| T4 | T10 | K | 0.02 |
| T9 | T10 | J | 0.05 |
| T7 | T8 | H | 0.01 |
| T10 | T11 | L | 3 |

FIG. 70

| REC ID | SHIP-DATE | FROM | TO | ORDER-NUM | WGT | COST | DESCRIPTION |
|---|---|---|---|---|---|---|---|
| O21 | D4 | S3 | S2 | 355 | 1 | 0.50 | SML. WIDGET |
| O16 | D3 | S2 | S5 | 321 | 21 | 1.25 | MED. WIDGET |
| O5 | D1 | S2 | S1 | 333 | 66 | 2.35 | PACKAGE |
| O17 | D3 | S3 | S5 | 338 | 21 | 1.25 | MED. WIDGET |
| O15 | D2 | S3 | S5 | 423 | 25 | 1.25 | PACKAGE |
| O22 | D4 | S4 | S2 | 156 | 67 | 2.35 | PKG.-FRAGILE |
| O8 | D1 | S4 | S2 | 121 | 4 | 0.50 | ENVELOPE |
| O9 | D2 | S1 | S2 | 144 | 3 | 0.50 | BOTTLE |
| O1 | D1 | S1 | S2 | 235 | 2 | 0.50 | ENVELOPE |
| O2 | D1 | S1 | S2 | 416 | 5 | 0.50 | ENVELOPE |
| O3 | D1 | S1 | S2 | 432 | 24 | 1.25 | PACKAGE |
| O18 | D4 | S1 | S4 | 287 | 4 | 0.50 | BOTTLE |
| O19 | D4 | S1 | S4 | 288 | 1 | 0.50 | ENVELOPE |
| O20 | D4 | S1 | S4 | 317 | 1 | 0.50 | ENVELOPE |
| O4 | D1 | S1 | S4 | 266 | 12 | 1.25 | MED. WIDGET |
| O10 | D2 | S3 | S1 | 147 | 68 | 2.35 | FLOWERS |
| O11 | D2 | S3 | S1 | 234 | 237 | 7.70 | PKG.-FRAGILE |
| O12 | D2 | S3 | S1 | 265 | 34 | 1.25 | PACKAGE |
| O13 | D2 | S3 | S1 | 274 | 2 | 0.50 | SML. WIDGET |
| O14 | D2 | S3 | S1 | 313 | 3 | 0.50 | ENVELOPE |
| O6 | D1 | S3 | S1 | 312 | 1 | 0.50 | ENVELOPE |
| O7 | D1 | S3 | S1 | 445 | 1 | 0.50 | ENVELOPE |

FIG. 71

| SHIP-DATE | TO | DAILY-DEST-COUNT | DAILY-DEST-WT | DAILY-DEST-COST |
|---|---|---|---|---|
| D3 | S5 | 2 | 42 | 2.50 |
| D2 | S2 | 1 | 3 | 0.50 |
| D2 | S5 | 1 | 25 | 1.25 |
| D2 | S1 | 5 | 344 | 12.30 |
| D4 | S4 | 3 | 6 | 1.50 |
| D4 | S2 | 2 | 68 | 2.85 |
| D1 | S4 | 1 | 12 | 1.25 |
| D1 | S2 | 4 | 35 | 2.75 |
| D1 | S1 | 3 | 68 | 3.35 |

FIG. 72

| FROM | DESCRIPTION | SD-COUNT | SD-COST |
|---|---|---|---|
| S1 | BOTTLE | 2 | 1.00 |
| S4 | ENVELOPE | 1 | 0.50 |
| S3 | ENVELOPE | 3 | 1.50 |
| S1 | ENVELOPE | 4 | 2.00 |
| S3 | FLOWERS | 1 | 2.35 |
| S3 | MED. WIDGET | 1 | 1.25 |
| S1 | MED. WIDGET | 1 | 1.25 |
| S2 | MED. WIDGET | 1 | 1.25 |
| S1 | PACKAGE | 1 | 1.25 |
| S2 | PACKAGE | 1 | 2.35 |
| S3 | PACKAGE | 2 | 2.50 |
| S4 | PKG.-FRAGILE | 1 | 2.35 |
| S3 | PKG.-FRAGILE | 1 | 7.70 |
| S3 | SML. WIDGET | 2 | 1.00 |

FIG. 73

| REC ID | STATION-CODE | BLDG-NUM | MANAGER | ⊕ ALPHA |
|---|---|---|---|---|
| S1 | X1 | A | JOHNSON, LAVONNA | TRUE |
| S2 | X5 | A | UDWAIRA, RAMAN | TRUE |
| S3 | Y2 | F | GOLDBERG, BRUCE | TRUE |
| S4 | M3 | C1 | LEE, GEORGE | FALSE |
| S5 | M4 | C1 | ALVAREZ, D.H. | FALSE |

FIG. 74

| REC ID | STATION-CODE | BLDG-NUM | MANAGER |
|---|---|---|---|
| S1 | X1 | A | JOHNSON, LAVONNA |
| S2 | X5 | A | UDWAIRA, RAMAN |
| S3 | Y2 | F | GOLDBERG, BRUCE |

FIG. 75

| FROM | TO | PATH-COUNT | FRE-QUENCY | CUMUL-COST | RATING | ⊕ BETA |
|---|---|---|---|---|---|---|
| S3 | S2 | 1 | 0.045 | 0.50 | POOR | FALSE |
| S2 | S5 | 1 | 0.045 | 1.25 | OK | FALSE |
| S2 | S1 | 1 | 0.045 | 2.35 | POOR | TRUE |
| S3 | S5 | 2 | 0.091 | 2.50 | AVERAGE | FALSE |
| S4 | S2 | 2 | 0.091 | 2.85 | NO OPINION | TRUE |
| S1 | S2 | 4 | 0.182 | 2.75 | MEDIUM | TRUE |
| S1 | S4 | 4 | 0.182 | 2.75 | AVERAGE | FALSE |
| S3 | S1 | 7 | 0.318 | 13.30 | STRONG | TRUE |

FIG. 76

| FROM | TO | PATH-COUNT | FREQUENCY | CUMUL-COST | RATING |
|------|-----|------------|-----------|------------|------------|
| S2 | S1 | 1 | 0.045 | 2.35 | POOR |
| S4 | S2 | 2 | 0.091 | 2.85 | NO OPINION |
| S1 | S2 | 4 | 0.182 | 2.75 | MEDIUM |
| S3 | S1 | 7 | 0.318 | 13.30 | STRONG |

FIG. 77

| FROM | TO | PATH-COUNT | FREQUENCY | CUMUL-COST | RATING |
|------|-----|------------|-----------|------------|------------|
| S3 | S2 | 1 | 0.045 | 0.50 | POOR |
| S2 | S5 | 1 | 0.045 | 1.25 | OK |
| S2 | S1 | 1 | 0.045 | 2.35 | POOR |
| S3 | S5 | 2 | 0.091 | 2.50 | AVERAGE |
| S4 | S2 | 2 | 0.091 | 2.85 | NO OPINION |
| S1 | S2 | 4 | 0.182 | 2.75 | MEDIUM |
| S1 | S4 | 4 | 0.182 | 2.75 | AVERAGE |
| S3 | S1 | 7 | 0.318 | 13.30 | STRONG |

FIG. 78

| REC ID | SHIP-DATE | FROM | TO | ORDER-NUM | WGT | COST | DESCRIPTION | ⊕ GAMMA |
|---|---|---|---|---|---|---|---|---|
| O1 | D1 | S1 | S2 | 235 | 2 | 0.50 | ENVELOPE | TRUE |
| O2 | D1 | S1 | S2 | 416 | 5 | 0.50 | ENVELOPE | TRUE |
| O3 | D1 | S1 | S2 | 432 | 24 | 1.25 | PACKAGE | TRUE |
| O4 | D1 | S1 | S4 | 266 | 12 | 1.25 | MED. WIDGET | FALSE |
| O5 | D1 | S2 | S1 | 333 | 66 | 2.35 | PACKAGE | FALSE |
| O6 | D1 | S3 | S1 | 312 | 1 | 0.50 | ENVELOPE | TRUE |
| O7 | D1 | S3 | S1 | 445 | 1 | 0.50 | ENVELOPE | TRUE |
| O8 | D1 | S4 | S2 | 121 | 4 | 0.50 | ENVELOPE | TRUE |
| O9 | D2 | S1 | S2 | 144 | 3 | 0.50 | BOTTLE | TRUE |
| O10 | D2 | S3 | S1 | 147 | 68 | 2.35 | FLOWERS | FALSE |
| O11 | D2 | S3 | S1 | 234 | 237 | 7.70 | PGK.-FRAGILE | TRUE |
| O12 | D2 | S3 | S1 | 265 | 34 | 1.25 | PACKAGE | TRUE |
| O13 | D2 | S3 | S1 | 274 | 2 | 0.50 | SML. WIDGET | TRUE |
| O14 | D2 | S3 | S1 | 313 | 3 | 0.50 | ENVELOPE | TRUE |
| O15 | D2 | S3 | S5 | 423 | 25 | 1.25 | PACKAGE | FALSE |
| O16 | D3 | S2 | S5 | 321 | 21 | 1.25 | MED. WIDGET | TRUE |
| O17 | D3 | S3 | S5 | 338 | 21 | 1.25 | MED. WIDGET | TRUE |
| O18 | D4 | S1 | S4 | 287 | 4 | 0.50 | BOTTLE | FALSE |
| O19 | D4 | S1 | S4 | 288 | 1 | 0.50 | ENVELOPE | FALSE |
| O20 | D4 | S1 | S4 | 317 | 1 | 0.50 | ENVELOPE | FALSE |
| O21 | D4 | S3 | S2 | 355 | 1 | 0.50 | SML. WIDGET | FALSE |
| O22 | D4 | S4 | S2 | 156 | 67 | 2.35 | PKG.-FRAGILE | FALSE |

FIG. 79

| RECORD ID | THE-DATE | NUM-CARRIERS | ⊕ DELTA |
|---|---|---|---|
| D1 | 4-JUNE-91 | 4 | TRUE |
| D2 | 5-JUNE-91 | 3 | TRUE |
| D3 | 6-JUNE-91 | 2 | FALSE |
| D4 | 9-JUNE-91 | 3 | FALSE |

FIG. 80

SHIPMENTS
LIVING ROOM
DOORWAY #1

DATE: 5-JUNE-91 CARRIERS ON DUTY: 3
FROM STATION: Y2 MANAGER: GOLDBERG, BRUCE
TO STATION: X1 MANAGER: JOHNSON, LAVONNA
DAILY DEST COST: $12.30

| ORDER-NUM | WEIGHT | COST | DESCRIPTION |
|---|---|---|---|
| 432 | 24 | 1.25 | PACKAGE |
| 266 | 12 | 1.25 | MED. WIDGET |
| 333 | 66 | 2.35 | PACKAGE |
| 312 | 1 | 0.50 | ENVELOPE |
| 445 | 1 | 0.50 | ENVELOPE |
| 121 | 4 | 0.50 | ENVELOPE |
| 144 | 3 | 0.50 | BOTTLE |
| → 147 | 68 | 2.35 | FLOWERS |
| 234 | 237 | 7.70 | PKG.-FRAGILE |
| 265 | 34 | 1.25 | PACKAGE |
| 274 | 2 | 0.50 | SML. WIDGET |
| 313 | 3 | 0.50 | ENVELOPE |
| 423 | 25 | 1.25 | PACKAGE |

FIG. 81

| DAYS LIVING ROOM DOORWAY # 1 ||
|---|---|
| THE-DATE | NUM-CARRIERS |
| 4-JUNE-91 | 4 |
| → 5-JUNE-91 | 3 |
| 6-JUNE-91 | 2 |
| 9-JUNE-91 | 3 |

SHIPMENTS
LIVING ROOM
DOORWAY # 3

FROM STATION: Y2     MANAGER: GOLDBERG, BRUCE
TO STATION: X1     MANAGER: JOHNSON, LAVONNA
DAILY DEST COST: $12.30

| ORDER-NUM | WEIGHT | COST | DESCRIPTION |
|---|---|---|---|
| 432 | 24 | 1.25 | PACKAGE |
| 266 | 12 | 1.25 | MED. WIDGET |
| 274 | 2 | 0.50 | SML. WIDGET |
| 313 | 3 | 0.50 | ENVELOPE |
| 121 | 4 | 0.50 | ENVELOPE |
| 144 | 3 | 0.50 | BOTTLE |
| 312 | 1 | 0.50 | ENVELOPE |
| → 147 | 68 | 2.35 | FLOWERS |
| 234 | 237 | 7.70 | PKG.-FRAGILE |
| 333 | 66 | 2.35 | PACKAGE |
| 445 | 1 | 0.50 | ENVELOPE |
| 423 | 25 | 1.25 | PACKAGE |

FIG. 83

DAYS
LIVING ROOM
DOORWAY # 1

| THE-DATE | NUM-CARRIERS |
|---|---|
| 4-JUNE-91 | 4 |
| → 5-JUNE-91 | 3 |
| 6-JUNE-91 | 2 |
| 9-JUNE-91 | 3 |

SHIPMENTS
LIVING ROOM
DOORWAY # 3

FROM STATION: Y2　　MANAGER: GOLDBERG, BRUCE
TO STATION: X1　　MANAGER: JOHNSON, LAVONNA
DAILY DEST COST: $12.30

| ORDER-NUM | WEIGHT | COST | DESCRIPTION |
|---|---|---|---|
| 432 | 24 | 1.25 | PACKAGE |
| 266 | 12 | 1.25 | MED. WIDGET |
| → 274 | 2 | 0.50 | SML. WIDGET |
| 313 | 3 | 0.50 | ENVELOPE |
| 121 | 4 | 0.50 | ENVELOPE |
| 144 | 3 | 0.50 | BOTTLE |
| 312 | 1 | 0.50 | ENVELOPE |
| 147 | 68 | 2.35 | FLOWERS |
| 234 | 237 | 7.70 | PKG.-FRAGILE |
| 333 | 66 | 2.35 | PACKAGE |
| 445 | 1 | 0.50 | ENVELOPE |
| 423 | 25 | 1.25 | PACKAGE |

FIG. 84

SHIPMENTS
LIVING ROOM
DOORWAY #2

CARRIER ON DUTY: 3
FROM STATION: Y2    MANAGER: GOLDBERG, BRUCE
TO STATION: X1      MANAGER: JOHNSON, LAVONNA
DAILY DEST COST: $12.30

| ORDER-NUM | DATE | WEIGHT | COST | DESCRIPTION |
|---|---|---|---|---|
| 432 | 4-JUNE-91 | 24 | 1.25 | PACKAGE |
| 266 | 4-JUNE-91 | 12 | 1.25 | MED. WIDGET |
| 333 | 4-JUNE-91 | 66 | 2.35 | PACKAGE |
| 312 | 4-JUNE-91 | 1 | 0.50 | ENVELOPE |
| 445 | 4-JUNE-91 | 1 | 0.50 | ENVELOPE |
| 121 | 4-JUNE-91 | 4 | 0.50 | ENVELOPE |
| 144 | 5-JUNE-91 | 3 | 0.50 | BOTTLE |
| → 147 | 5-JUNE-91 | 68 | 2.35 | FLOWERS |
| 234 | 5-JUNE-91 | 237 | 7.70 | PKG.-FRAGILE |
| 265 | 5-JUNE-91 | 34 | 1.25 | PACKAGE |
| 274 | 5-JUNE-91 | 2 | 0.50 | SML. WIDGET |
| 313 | 5-JUNE-91 | 3 | 0.50 | ENVELOPE |
| 423 | 5-JUNE-91 | 25 | 1.25 | PACKAGE |

FIG. 85

SHIPMENTS
LIVING ROOM
DOORWAY # 4

| DATE: | 5-JUN-91 | | |
|---|---|---|---|
| FROM STATION: | Y2 | MANAGER: | GOLDBERG, BRUCE |
| TO STATION: | X1 | MANAGER: | JOHNSON, LAVONNA |
| DAILY DEST COST: | $12.30 | COST: 0.50 | |

| ORDER-NUM | DESCRIPTION | WEIGHT |
|---|---|---|
| 432 | PACKAGE | 24 |
| 266 | MED. WIDGET | 12 |
| → 274 | SML. WIDGET | 2 |
| 313 | ENVELOPE | 3 |
| 121 | ENVELOPE | 4 |
| 144 | BOTTLE | 3 |
| 312 | ENVELOPE | 1 |
| 147 | FLOWERS | 68 |
| 234 | PKG.-FRAGILE | 237 |
| 333 | PACKAGE | 66 |
| 445 | ENVELOPE | 1 |
| 423 | PACKAGE | 25 |

FIG. 86

```
                    SHIPMENTS
                    LIVING ROOM
                    DOORWAY #5

DATE:              5-JUNE-91    CARRIER ON DUTY: 3
FROM STATION:      Y2           MANAGER: GOLDBERG, BRUCE
TO STATION:        X1           MANAGER: JOHNSON, LAVONNA
DAILY DEST COST:   $12.30

ORDER NUM:         147
WEIGHT:            68
COST:              2.45
DESCRIPTION:       FLOWERS
```

FIG. 87

| FOREST UNITS<br>LIVING ROOM<br>DOORWAY #1 ||||||||
|---|---|---|---|---|---|---|
| HEAD TABLE ||| SUITE TABLE || CABIN TABLE ||
| BLDG-NUM | BLDG TYPE | AIR-COND? | SUITE NUM | TV TYPE | DISH STYLE | FP-CLEAN-ING |
| B1 | CABIN | NO | | | MODERN PLASTIC | 1989 |
| B2 | CABIN | YES | | | HEAVY CERAMIC | 1989 |
| B3 | CABIN | NO | | | MODERN PLASTIC | 1990 |
| B4 | MULTI-UNIT | YES | S1 | RCA | | |
| B4 | MULTI-UNIT | YES | S2 | SONY | | |
| ➔B4 | MULTI-UNIT | YES | S3 | RCA | | |
| B5 | CABIN | YES | | | MODERN PLASTIC | 1987 |
| B6 | MULTI-UNIT | NO | S1 | PANASONIC | | |
| B6 | MULTI-UNIT | NO | S2 | SONY | | |
| B6 | MULTI-UNIT | NO | S3 | SONY | | |
| B6 | MULTI-UNIT | NO | S4 | RCA | | |

FIG. 88

FOREST UNITS
LIVING ROOM
DOORWAY #2

| BLDG-NUM | BLDG TYPE | AIR-COND? |
|---|---|---|
| B1 | CABIN | NO |
| B2 | CABIN | YES |
| B3 | CABIN | NO |
| B4 | MULTI-UNIT | YES |
| B4 | MULTI-UNIT | YES |
| → B4 | MULTI-UNIT | YES |
| B5 | CABIN | YES |
| B6 | MULTI-UNIT | NO |
| B6 | MULTI-UNIT | NO |
| B6 | MULTI-UNIT | NO |
| B6 | MULTI-UNIT | NO |

SUITE NUM: S3
TV TYPE: RCA

FIG. 89

| FOREST UNITS LIVING ROOM DOORWAY #2 |||
|---|---|---|
| BLDG-NUM | BLDG TYPE | AIR-COND? |
| B1 | CABIN | NO |
| B2 | CABIN | YES |
| B3 | CABIN | NO |
| B4 | MULTI-UNIT | YES |
| B4 | MULTI-UNIT | YES |
| B4 | MULTI-UNIT | YES |
| → B5 | CABIN | YES |
| B6 | MULTI-UNIT | NO |
| B6 | MULTI-UNIT | NO |
| B6 | MULTI-UNIT | NO |
| B6 | MULTI-UNIT | NO |

DISH STYLE: MODERN PLASTIC
FP CLEANING: 1987

FIG. 90

```
                    CUSTOMER
                   LIVING ROOM
                   DOORWAY #1

LAST NAME:           LEONARD      FIRST NAME:
    SARAH
    ADDRESS:  266 PACES PL. NW
    CITY:     ATLANTA
    STATE:    GA              ZIP:         30327
    PHONE:    404-557-8922
```

|   | INTERESTS    |   | CON CTS   |          |
|---|--------------|---|-----------|----------|
|   |              |   | DATE      | SALESMAN |
| → | NEEDLEPOINT  |   | 2-JAN-94  | RENEE    |
|   | POTTERY      | →| 18-OCT-93 | RENEE    |
|   | ROMANCE      |   | 1-AUG-93  | KIM      |
|   | SWIMMING     |   | 5-MAY-93  | RENEE    |

CUSTOMER
LIVING ROOM
DOORWAY #2

| LAST NAME | FIRST NAME | PHONE |
|---|---|---|
| LANDON | JAMES | 515-668-9344 |
| LEDDER | PEGGY | 415-330-3435 |
| ➔ LEONARD | SARAH | 404-557-8922 |
| LESSING | FRED | 213-245-8899 |

ADDRESS: 266 PACES PL. NW
CITY: ATLANTA
STATE: GA          ZIP: 30327

| INTERESTS |
|---|
| ➔ NEEDLEPOINT |
| POTTERY |
| ROMANCE |
| SWIMMING |

| CON CTS ||
|---|---|
| DATE | SALESMAN |
| 2-JAN-94 | RENEE |
| ➔ 18-OCT-93 | RENEE |
| 1-AUG-93 | KIM |
| 5-MAY-93 | RENEE |

FIG. 93

```
┌─────────────────────────────────────────────────────────┐
│                          CAKE                           │
│                    HOUSE DOORWAY #1                     │
│                                                         │
│                                                         │
│                                     │
│                                                         │
│                                                         │
├─────────────────────────────────────────────────────────┤
│ MARKED NODE (LIVING ROOM):                              │
│                                                         │
│    TASK NAME:           MIX DRY INGREDIENTS             │
│    TASK TIME (MINUTES): 5                               │
│    NOTES:               2C SUGAR, 3C FLOUR, 1T BAKING POWDER │
├─────────────────────────────────────────────────────────┤
│ MARKED LINK (DEPENDENCIES PLAYROOM)                     │
│                                                         │
│    DEPENDENCY NAME:     H                               │
│    MAX DELAY TIME (DAYS) 0.01                           │
└─────────────────────────────────────────────────────────┘
```

FIG. 95

```
┌─────────────────────────────────────────────────────────┐
│                         CAKE                            │
│                   HOUSE DOORWAY #3                      │
│                                                         │
│      PURCHASE INGREDIENTS (HOME)                        │
│   →  MIX DRY INGREDIENTS (HOME)                         │
│         BLEND WET AND DRY INGREDIENTS (HOME)            │
│          POUR MIX INTO PANS (HOME)                      │
│             BAKE (HOME)                                 │
│                REMOVE FROM PANS (HOME)                  │
│                   FROST CAKE (HOME)                     │
│                       EAT AND ENJOY (HOME)              │
│      MIX WET INGREDIENTS (HOME)                         │
│         BLEND WET AND DRY INGREDIENTS (AWAY)            │
│      MIX FROSTING (HOME)                                │
│        FROST CAKE (AWAY)                                │
│     PREPARE CAKE PANS (HOME)                            │
│      POUR MIX INTO PANS (AWAY)                          │
├─────────────────────────────────────────────────────────┤
│ MARKED NODE (LIVING ROOM):                              │
│     TASK NAME:    MIX DRY INGREDIENTS                   │
│     TASK TIME (MINUTES):     5                          │
│     NOTES:       2C SUGAR, 3C FLOUR, 1T BAKING POWDER   │
└─────────────────────────────────────────────────────────┘
```

FIG. 97

```
                        CAKE
                  HOUSE DOORWAY #3

EAT AND ENJOY (HOME)
      FROST CAKE (HOME)
            MIX FROSTING (HOME)
                  PURCHASE INGREDIENTS (HOME)
            REMOVE FROM PANS (HOME)
                  BAKE (HOME)
                        POUR MIX INTO PANS (HOME)
                              PREPARE CAKE PANS (HOME)
                              BLEND WET AND DRY INGREDIENTS (HOME)
                                    MIX WET INGREDIENTS (HOME)
                                          PURCHASE INGREDIENTS (AWAY)
                              → MIX DRY INGREDIENTS (HOME)
                                          PURCHASE INGREDIENTS (AWAY)
```

| MARKED NODE (LIVING ROOM): |
|---|
| TASK NAME:   MIX DRY INGREDIENTS |
| TASK TIME (MINUTES):   5 |
| NOTES:   2C SUGAR, 3C FLOUR, 1T BAKING POWDER |

FIG. 98

| REC ID | CITY NAME |
|---|---|
| C1 | LOS ANGELES |
| C2 | NEW YORK |
| C3 | SAN FRANCISCO |
| C4 | WASHINGTON DC |

| REC ID | HOME | PLAYER NAME |
|---|---|---|
| P1 | C2 | CLARK |
| P2 | C3 | JIN |
| P3 | C3 | LANDY |
| P4 | C1 | NELLIS |
| P5 | C3 | WATSON |

| REC ID | EARNER | YEAR | AMOUNT EARNED |
|---|---|---|---|
| E1 | P1 | 1992 | 10,000 |
| E2 | P1 | 1993 | 26,000 |
| E3 | P2 | 1991 | 24,000 |
| E4 | P2 | 1992 | 56,000 |
| E5 | P2 | 1993 | 79,000 |
| E6 | P4 | 1992 | 500 |
| E7 | P4 | 1993 | 7,000 |
| E8 | P5 | 1990 | 4,000 |

FIG. 105

| REC ID | MATCH LOCATION | WHITE | BLACK | DATE | WINNER |
|---|---|---|---|---|---|
| M1 | C1 | P1 | P2 | 23-FEB-93 | BLACK |
| M2 | C1 | P2 | P1 | 24-FEB-93 | WHITE |
| M3 | C1 | P1 | P5 | 24-FEB-93 | WHITE |
| M4 | C3 | P5 | P3 | 25-FEB-93 | DRAW |
| M2 | C3 | P4 | P1 | 25-FEB-93 | BLACK |
| M3 | C4 | P4 | P2 | 2-MAR-93 | BLACK |
| M4 | C4 | P1 | P3 | 2-MAR-93 | WHITE |
| M2 | C4 | P3 | P4 | 3-MAR-93 | BLACK |
| M3 | C4 | P4 | P3 | 4-MAR-93 | DRAW |
| M4 | C4 | P2 | P5 | 4-MAR-93 | WHITE |
| M5 | C1 | P3 | P2 | 15-MAR-93 | BLACK |

FIG. 106

| CITY HLRD #1 |
|---|
| CITY NAME |
| LOS ANGELES |
| NEW YORK |
| →SAN FRANCISCO |
| WASHINGTON DC |

| PLAYER HLRD #1 |
|---|
| PLAYER NAME |
| CLARK |
| →JIN |
| LANDY |
| NELLIS |
| WATSON |

| EARNINGS | HLRD #1 |
|---|---|
| YEAR | AMOUNT EARNED |
| 1992 | 500 |
| 1990 | 4,000 |
| 1993 | 7,000 |
| 1992 | 10,000 |
| → 1991 | 24,000 |
| 1993 | 26,000 |
| 1992 | 56,000 |
| 1993 | 79,000 |

| CITY HLRD #1 |
|---|
| CITY NAME |
| → LOS ANGELES |
| NEW YORK |
| SAN FRANCISCO |
| WASHINGTON DC |

| PLAYER HLRD #1 |
|---|
| PLAYER NAME |
| CLARK |
| JIN |
| LANDY |
| → NELLIS |
| WATSON |

| EARNINGS HLRD #1 | |
|---|---|
| YEAR | AMOUNT EARNED |
| → 1992 | 500 |
| 1990 | 4,000 |
| 1993 | 7,000 |
| 1992 | 10,000 |
| 1991 | 24,000 |
| 1993 | 26,000 |
| 1992 | 56,000 |
| 1993 | 79,000 |

FIG. 109

| PLAYER WHITE | HLRD #2 |
|---|---|
| HOME | PLAYER NAME |
| → NEW YORK | CLARK |
| SAN FRANCISCO | JIN |
| SAN FRANCISCO | LANDY |
| LOS ANGELES | NELLIS |
| SAN FRANCISCO | WATSON |

| PLAYER HLRD #3 BLACK HOME: SAN FRANCISCO |
|---|
| PLAYER NAME |
| CLARK |
| JIN |
| LANDY |
| NELLIS |
| → WATSON |

| MATCH LOCATION: | HLRD #1 LOS ANGELES |
|---|---|
| DATE | WINNER |
| 23-FEB-93 | BLACK |
| 24-FEB-93 | WHITE |
| → 24-FEB-93 | WHITE |
| 25-FEB-93 | DRAW |
| 25-FEB-93 | BLACK |
| 2-MAR-93 | BLACK |
| 2-MAR-93 | WHITE |
| 3-MAR-93 | BLACK |
| 4-MAR-93 | DRAW |
| 4-MAR-93 | WHITE |
| 15-MAR-93 | BLACK |

| PLAYER WHITE | HLRD #2 |
|---|---|
| HOME | PLAYER NAME |
| NEW YORK | CLARK |
| SAN FRANCISCO | JIN |
| SAN FRANCISCO | LANDY |
| → LOS ANGELES | NELLIS |
| SAN FRANCISCO | WATSON |

PLAYER HLRD #3
BLACK
HOME: NEW YORK

| PLAYER NAME |
|---|
| → CLARK |
| JIN |
| LANDY |
| NELLIS |
| WATSON |

| MATCH | HLRD #1 |
|---|---|
| LOCATION: | SAN FRANCISCO |
| DATE | WINNER |
| 23-FEB-93 | BLACK |
| 24-FEB-93 | WHITE |
| 24-FEB-93 | WHITE |
| 25-FEB-93 | DRAW |
| → 25-FEB-93 | BLACK |
| 2-MAR-93 | BLACK |
| 2-MAR-93 | WHITE |
| 3-MAR-93 | BLACK |
| 4-MAR-93 | DRAW |
| 4-MAR-93 | WHITE |
| 15-MAR-93 | BLACK |

FIG. 112

| PLAYER | HLRD #2 |
| WHITE | |
| HOME | PLAYER NAME |
| NEW YORK | CLARK |
| SAN FRANCISCO | JIN |
| → SAN FRANCISCO | LANDY |
| LOS ANGELES | NELLIS |
| SAN FRANCISCO | WATSON |

PLAYER HLRD #3
BLACK
HOME: LOS ANGELES

| PLAYER NAME |
| --- |
| CLARK |
| JIN |
| LANDY |
| → NELLIS |
| WATSON |

| MATCH | HLRD #1 |
| LOCATION: | WASHINGTON DC |
| DATE | WINNER |
| 23-FEB-93 | BLACK |
| 24-FEB-93 | WHITE |
| 24-FEB-93 | WHITE |
| 25-FEB-93 | DRAW |
| 25-FEB-93 | BLACK |
| 2-MAR-93 | BLACK |
| 2-MAR-93 | WHITE |
| → 3-MAR-93 | BLACK |
| 4-MAR-93 | DRAW |
| 4-MAR-93 | WHITE |
| 15-MAR-93 | BLACK |

FIG. 113

| CITY HLRD #2 |
|---|
| CITY NAME |
| LOS ANGELES |
| NEW YORK |
| SAN FRANCISCO |
| → WASHINGTON DC |

| CITY HLRD #3 |
|---|
| CITY NAME |
| → LOS ANGELES |
| NEW YORK |
| SAN FRANCISCO |
| WASHINGTON DC |

| CITY HLRD #4 |
|---|
| CITY NAME |
| LOS ANGELES |
| → NEW YORK |
| SAN FRANCISCO |
| WASHINGTON DC |

| MATCH HLRD #2 | | | |
|---|---|---|---|
| WHITE PLAYER NAME | BLACK PLAYER NAME | DATE | WINNER |
| CLARK | JIN | 23-FEB-93 | BLACK |
| JIN | CLARK | 24-FEB-93 | WHITE |
| CLARK | WATSON | 24-FEB-93 | WHITE |
| WATSON | LANDY | 25-FEB-93 | DRAW |
| NELLIS | CLARK | 25-FEB-93 | BLACK |
| → NELLIS | JIN | 2-MAR-93 | BLACK |
| CLARK | LANDY | 2-MAR-93 | WHITE |
| LANDY | NELLIS | 3-MAR-93 | BLACK |
| NELLIS | LANDY | 4-MAR-93 | DRAW |
| JIN | WATSON | 4-MAR-93 | WHITE |
| LANDY | JIN | 15-MAR-93 | BLACK |

FIG. 115

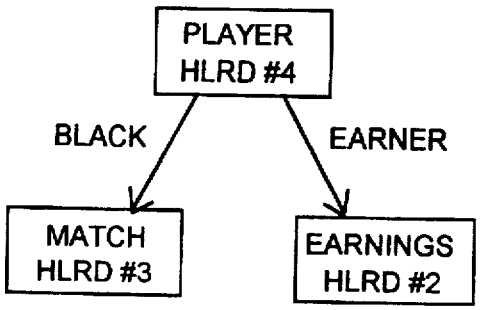

FIG. 116

| PLAYER | HLRD #4 |
|---|---|
| HOME | PLAYER NAME |
| →NEW YORK | CLARK |
| SAN FRANCISCO | JIN |
| SAN FRANCISCO | LANDY |
| LOS ANGELES | NELLIS |
| SAN FRANCISCO | WATSON |

| MATCH | HLRD #3 | | |
|---|---|---|---|
| WHITE PLAYER | HOME: | LOS ANGELES | |
| MATCH LOCATION | WHITE PLAYER NAME | DATE | WINNER |
| LOS ANGELES | CLARK | 23-FEB-93 | BLACK |
| LOS ANGELES | JIN | 24-FEB-93 | WHITE |
| LOS ANGELES | CLARK | 24-FEB-93 | WHITE |
| SAN FRANCISCO | WATSON | 25-FEB-93 | DRAW |
| → SAN FRANCISCO | NELLIS | 25-FEB-93 | BLACK |
| WASHINGTON DC | NELLIS | 2-MAR-93 | BLACK |
| WASHINGTON DC | CLARK | 2-MAR-93 | WHITE |
| WASHINGTON DC | LANDY | 3-MAR-93 | BLACK |
| WASHINGTON DC | NELLIS | 4-MAR-93 | DRAW |
| WASHINGTON DC | JIN | 4-MAR-93 | WHITE |
| LOS ANGELES | LANDY | 15-MAR-93 | BLACK |

FIG. 117

| EARNINGS | HLRD #2 |
|---|---|
| YEAR | AMOUNT EARNED |
| 1992 | 500 |
| 1990 | 4,000 |
| 1993 | 7,000 |
| → 1992 | 10,000 |
| 1991 | 24,000 |
| 1993 | 26,000 |
| 1992 | 56,000 |
| 1993 | 79,000 |

FIG. 117 (CONTINUED)

| PLAYER | HLRD #4 |
|---|---|
| HOME | PLAYER NAME |
| NEW YORK | CLARK |
| SAN FRANCISCO | JIN |
| → SAN FRANCISCO | LANDY |
| LOS ANGELES | NELLIS |
| SAN FRANCISCO | WATSON |

FIG. 118

| MATCH | HLRD #3 | | |
|---|---|---|---|
| WHITE PLAYER | HOME: | SAN FRANCISCO | |
| MATCH LOCATION | WHITE PLAYER NAME | DATE | WINNER |
| LOS ANGELES | CLARK | 23-FEB-93 | BLACK |
| LOS ANGELES | JIN | 24-FEB-93 | WHITE |
| LOS ANGELES | CLARK | 24-FEB-93 | WHITE |
| → SAN FRANCISCO | WATSON | 25-FEB-93 | DRAW |
| SAN FRANCISCO | NELLIS | 25-FEB-93 | BLACK |
| WASHINGTON DC | NELLIS | 2-MAR-93 | BLACK |
| WASHINGTON DC | CLARK | 2-MAR-93 | WHITE |
| WASHINGTON DC | LANDY | 3-MAR-93 | BLACK |
| WASHINGTON DC | NELLIS | 4-MAR-93 | DRAW |
| WASHINGTON DC | JIN | 4-MAR-93 | WHITE |
| LOS ANGELES | LANDY | 15-MAR-93 | BLACK |

| EARNINGS | HLRD #2 |
|---|---|
| YEAR | AMOUNT EARNED |
| 1992 | 500 |
| 1990 | 4,000 |
| 1993 | 7,000 |
| 1992 | 10,000 |
| 1991 | 24,000 |
| 1993 | 26,000 |
| 1992 | 56,000 |
| 1993 | 79,000 |

FIG. 118 (CONTINUED)

| PLAYER | HLRD #5 |
|---|---|
| HOME | PLAYER NAME |
| NEW YORK | CLARK |
| ➔ SAN FRANCISCO | JIN |
| SAN FRANCISCO | LANDY |
| LOS ANGELES | NELLIS |
| SAN FRANCISCO | WATSON |

| EARNINGS | HLRD #3 |
|---|---|
| YEAR | AMOUNT EARNED |
| 1992 | 500 |
| 1990 | 4,000 |
| 1993 | 7,000 |
| 1992 | 10,000 |
| 1991 | 24,000 |
| 1993 | 26,000 |
| ➔ 1992 | 56,000 |
| 1993 | 79,000 |

| EARNINGS | HLRD #4 |
|---|---|
| YEAR | AMOUNT EARNED |
| ➔ 1993 | 79,000 |
| 1992 | 56,000 |
| 1993 | 26,000 |
| 1991 | 24,000 |
| 1992 | 10,000 |
| 1993 | 7,000 |
| 1990 | 4,000 |
| 1992 | 500 |

CITY HLRD #5

| CITY NAME |
|---|
| LOS ANGELES |
| NEW YORK |
| →SAN FRANCISCO |
| WASHINGTON DC |

PLAYER HLRD #6

| PLAYER NAME |
|---|
| CLARK |
| → JIN |
| LANDY |
| NELLIS |
| WATSON |

MATCH HLRD #4

| WHITE PLAYER NAME | BLACK PLAYER NAME | DATE | WINNER |
|---|---|---|---|
| CLARK | JIN | 23-FEB-93 | BLACK |
| JIN | CLARK | 24-FEB-93 | WHITE |
| CLARK | WATSON | 24-FEB-93 | WHITE |
| →WATSON | LANDY | 25-FEB-93 | DRAW |
| NELLIS | CLARK | 25-FEB-93 | BLACK |
| NELLIS | JIN | 2-MAR-93 | BLACK |
| CLARK | LANDY | 2-MAR-93 | WHITE |
| LANDY | NELLIS | 3-MAR-93 | BLACK |
| NELLIS | LANDY | 4-MAR-93 | DRAW |
| JIN | WATSON | 4-MAR-93 | WHITE |
| LANDY | JIN | 15-MAR-93 | BLACK |

FIG. 122

| MATCH | HLRD #5 | | |
|---|---|---|---|
| MATCH LOCATION | BLACK PLAYER NAME | DATE | WINNER |
| LOS ANGELES | JIN | 23-FEB-93 | BLACK |
| →LOS ANGELES | CLARK | 24-FEB-93 | WHITE |
| LOS ANGELES | WATSON | 24-FEB-93 | WHITE |
| SAN FRANCISCO | LANDY | 25-FEB-93 | DRAW |
| SAN FRANCISCO | CLARK | 25-FEB-93 | BLACK |
| WASHINGTON DC | JIN | 2-MAR-93 | BLACK |
| WASHINGTON DC | LANDY | 2-MAR-93 | WHITE |
| WASHINGTON DC | NELLIS | 3-MAR-93 | BLACK |
| WASHINGTON DC | LANDY | 4-MAR-93 | DRAW |
| WASHINGTON DC | WATSON | 4-MAR-93 | WHITE |
| LOS ANGELES | JIN | 15-MAR-93 | BLACK |

| MATCH | HLRD #6 | | |
|---|---|---|---|
| MATCH LOCATION | WHITE PLAYER NAME | DATE | WINNER |
| →LOS ANGELES | CLARK | 23-FEB-93 | BLACK |
| LOS ANGELES | JIN | 24-FEB-93 | WHITE |
| LOS ANGELES | CLARK | 24-FEB-93 | WHITE |
| SAN FRANCISCO | WATSON | 25-FEB-93 | DRAW |
| SAN FRANCISCO | NELLIS | 25-FEB-93 | BLACK |
| WASHINGTON DC | NELLIS | 2-MAR-93 | BLACK |
| WASHINGTON DC | CLARK | 2-MAR-93 | WHITE |
| WASHINGTON DC | LANDY | 3-MAR-93 | BLACK |
| WASHINGTON DC | NELLIS | 4-MAR-93 | DRAW |
| WASHINGTON DC | JIN | 4-MAR-93 | WHITE |
| LOS ANGELES | LANDY | 15-MAR-93 | BLACK |

FIG. 123

| CITY HLRD #5 |
|---|
| CITY NAME |
| LOS ANGELES |
| NEW YORK |
| → SAN FRANCISCO |
| WASHINGTON DC |

| PLAYER HLRD #6 |
|---|
| PLAYER NAME |
| CLARK |
| JIN |
| → LANDY |
| NELLIS |
| WATSON |

| MATCH HLRD #4 ||||
|---|---|---|---|
| WHITE PLAYER NAME | BLACK PLAYER NAME | DATE | WINNER |
| CLARK | JIN | 23-FEB-93 | BLACK |
| JIN | CLARK | 24-FEB-93 | WHITE |
| CLARK | WATSON | 24-FEB-93 | WHITE |
| → WATSON | LANDY | 25-FEB-93 | DRAW |
| NELLIS | CLARK | 25-FEB-93 | BLACK |
| NELLIS | JIN | 2-MAR-93 | BLACK |
| CLARK | LANDY | 2-MAR-93 | WHITE |
| LANDY | NELLIS | 3-MAR-93 | BLACK |
| NELLIS | LANDY | 4-MAR-93 | DRAW |
| JIN | WATSON | 4-MAR-93 | WHITE |
| LANDY | JIN | 15-MAR-93 | BLACK |

FIG. 124

| MATCH HLRD #5 | | | |
|---|---|---|---|
| MATCH LOCATION | BLACK PLAYER NAME | DATE | WINNER |
| LOS ANGELES | JIN | 23-FEB-93 | BLACK |
| LOS ANGELES | CLARK | 24-FEB-93 | WHITE |
| LOS ANGELES | WATSON | 24-FEB-93 | WHITE |
| SAN FRANCISCO | LANDY | 25-FEB-93 | DRAW |
| SAN FRANCISCO | CLARK | 25-FEB-93 | BLACK |
| WASHINGTON DC | JIN | 2-MAR-93 | BLACK |
| WASHINGTON DC | LANDY | 2-MAR-93 | WHITE |
| → WASHINGTON DC | NELLIS | 3-MAR-93 | BLACK |
| WASHINGTON DC | LANDY | 4-MAR-93 | DRAW |
| WASHINGTON DC | WATSON | 4-MAR-93 | WHITE |
| LOS ANGELES | JIN | 15-MAR-93 | BLACK |

| MATCH HLRD #6 | | | |
|---|---|---|---|
| MATCH LOCATION | WHITE PLAYER NAME | DATE | WINNER |
| LOS ANGELES | CLARK | 23-FEB-93 | BLACK |
| LOS ANGELES | JIN | 24-FEB-93 | WHITE |
| LOS ANGELES | CLARK | 24-FEB-93 | WHITE |
| →SAN FRANCISCO | WATSON | 25-FEB-93 | DRAW |
| SAN FRANCISCO | NELLIS | 25-FEB-93 | BLACK |
| WASHINGTON DC | NELLIS | 2-MAR-93 | BLACK |
| WASHINGTON DC | CLARK | 2-MAR-93 | WHITE |
| WASHINGTON DC | LANDY | 3-MAR-93 | BLACK |
| WASHINGTON DC | NELLIS | 4-MAR-93 | DRAW |
| WASHINGTON DC | JIN | 4-MAR-93 | WHITE |
| LOS ANGELES | LANDY | 15-MAR-93 | BLACK |

FIG. 125

| CABLE TYPE | PARENT TABLE | CHILD TABLE |
|---|---|---|
| KEY MAXI-CABLE | ANY NON-GALLERY TABLE | ANY NON-GALLERY TABLE |
| NON-KEY MAXI-CABLE | ANY NON-GALLERY TABLE | ANY TABLE |
| PLAYROOM MIDI-CABLE | ANY LIVING ROOM OR GUEST ROOM TABLE | HEAD TABLE OF THE MIDI-CABLE'S PLAYROOM |
| GUEST ROOM MIDI-CABLE | ANY LIVING ROOM TABLE | HEAD TABLE OF THE MIDI-CABLE'S GUEST ROOM |
| GALLERY MIDI-CABLE | HEAD TABLE OF THE MIDI-CABLE'S GALLERY (ITS ONLY TABLE) | ANY TABLE |
| FORMAT FIELD MINI-CABLE | ANY TABLE | ANY NON-HEAD TABLE |
| AUTOMATIC MINI-CABLE | ANY NON-HEAD TABLE | ANY NON-HEAD TABLE |

FIG. 129

| PROJECT-STATUS | OPTIONALITY FUNCTION FOR COMPLETE DATE MAXI-CABLE |
|---|---|
| IN PROCESS, COMPLETE DATE UNKNOWN | PARENT RECORD NOT ALLOWED |
| IN PROCESS, COMPLETE DATE PROJECTED | PARENT RECORD OPTIONAL |
| COMPLETED | PARENT RECORD REQUIRED |
| CANCELED | PARENT RECORD NOT ALLOWED |

FIG. 133

| RECORD ID | NAME | AGE | INCOME |
|---|---|---|---|
| R1 | COE, PHYLLIS | 34 | 43,200 |
| R2 | DUONG, THOA | 56 | 58,450 |
| R3 | HANSEN, JAMES | 27 | 32,980 |
| R4 | LIEBON, STAN | 34 | 31,600 |
| R5 | MILLER, YOLANDA | 60 | 41,700 |
| R6 | OSEJO, CYNTHIA | 47 | 53,440 |
| R7 | SHANKARA, RAMAN | 25 | 35,800 |
| R8 | SLACK, JEANIE | 43 | 51,210 |
| R9 | SMITH, TOM | 40 | 45,370 |
| R10 | TSE, NIE | 39 | 54,980 |
| R11 | TURKAUSKY, DON | 62 | 75,440 |
| R12 | WATTS, PERTIS | 55 | 77,850 |
| R13 | WEINTRAUB, BILL | 36 | 56,740 |

FIG. 134

| RECORD ID | NAME | AGE | AGE-BAND | INCOME |
|---|---|---|---|---|
| R1 | COE, PHYLLIS | 34 | 34 TO 38 | 43,200 |
| R2 | DUONG, THOA | 56 | 55 UP | 58,450 |
| R3 | HANSEN, JAMES | 27 | 16 TO 33 | 32,980 |
| R4 | LIEBON, STAN | 34 | 34 TO 38 | 31,600 |
| R5 | MILLER, YOLANDA | 60 | 55 UP | 41,700 |
| R6 | OSEJO, CYNTHIA | 47 | 39 TO 55 | 53,440 |
| R7 | SHANKARA, RAMAN | 25 | 16 TO 33 | 35,800 |
| R8 | SLACK, JEANIE | 43 | 39 TO 55 | 51,210 |
| R9 | SMITH, TOM | 40 | 39 TO 55 | 45,370 |
| R10 | TSE, NIE | 39 | 39 TO 55 | 54,980 |
| R11 | TURKAUSKY, DON | 62 | 55 UP | 75,440 |
| R12 | WATTS, PERTIS | 55 | 55 UP | 77,850 |
| R13 | WEINTRAUB, BILL | 36 | 34 TO 38 | 56,740 |

FIG. 135

| AGE-BAND | COUNT | LOW INCOME | HIGH INCOME | AVERAGE INCOME |
|---|---|---|---|---|
| 16 TO 33 | 2 | 32,980 | 35,800 | 34,390 |
| 34 TO 38 | 3 | 31,600 | 56,740 | 43,847 |
| 39 TO 55 | 4 | 45,370 | 54,980 | 51,250 |
| 55 UP | 4 | 41,700 | 77,850 | 63,360 |

FIG. 136

| | LIVING ROOM | PLAYROOM | GUEST ROOM | GALLERY |
|---|---|---|---|---|
| COMPONENT SET | ALL INCOMING MAXI-CABLES. ALL FIELDS. | 2 INCOMING PLAYROOM MIDI-CABLES. ALL INCOMING MAXI-CABLES. ALL FIELDS. | 1 INCOMING GUEST ROOM MIDI-CABLE. ALL INCOMING MAXI-CABLES. ALL FIELDS. | BASIS SET. NON-KEY INCOMING MAXI-CABLES. ALL FIELDS. |
| KEY SET | ALL INCOMING KEY MAXI-CABLES. ALL KEY FIELDS. | 2 INCOMING PLAYROOM MIDI-CABLES. ALL INCOMING KEY MAXI-CABLES. ALL KEY FIELDS. | 1 INCOMING GUEST ROOM MIDI-CABLE. ALL INCOMING KEY MAXI-CABLES. ALL KEY FIELDS. | (NOT APPLICABLE) |
| BASIS SET | (NOT APPLICABLE) | (NOT APPLICABLE) | (NOT APPLICABLE) | PROPER SUBSET OF THE COMPONENT SET OF THE GALLERY'S BASE TABLE. |
| DEPENDENCY SET | ALL INCOMING MAXI-CABLES. | 2 INCOMING PLAYROOM MIDI-CABLES. ALL INCOMING MAXI-CABLES. | 1 INCOMING GUEST ROOM MIDI-CABLE. ALL INCOMING MAXI-CABLES. | BASIS SET. NON-KEY INCOMING MAXI-CABLES. |

FIG. 137

| TV TYPE | NUM UNITS W TV TYPE | TOTAL OCCUP CAPACITY |
|---|---|---|
| RCA | 3 | 8 |
| SONY | 3 | 9 |
| PANASONIC | 1 | 3 |

FIG. 138

| RECORD ID | STYLE | INK COLOR | CASE COLOR | INVENTORY |
|---|---|---|---|---|
| R1 | ROLLING LINE | BLACK | SILVER | 34 |
| R2 | ROLLING LINE | BLACK | BLACK | 23 |
| R3 | ROLLING LINE | BLACK | GOLD | 25 |
| R4 | ROLLING LINE | RED | SILVER | 4 |
| R5 | ROLLING LINE | RED | RED | 31 |
| R6 | ROLLING LINE | BLUE | SILVER | 26 |
| R7 | ROLLING LINE | GREEN | BLACK | 22 |
| R8 | PERFECT POINT | BLACK | SILVER | 14 |
| R9 | PERFECT POINT | BLACK | BLACK | 9 |
| R10 | PERFECT POINT | BLACK | BROWN | 16 |
| R11 | PERFECT POINT | BLACK | BLUE | 28 |
| R12 | PERFECT POINT | BLUE | BLUE | 24 |
| R13 | PERFECT POINT | BLUE | SILVER | 38 |
| R14 | QUICK DRAW | BLACK | SILVER | 30 |
| R15 | QUICK DRAW | BLACK | BROWN | 27 |
| R16 | QUICK DRAW | RED | RED | 21 |
| R17 | QUICK DRAW | GREEN | GREEN | 5 |

FIG. 139

| STYLE | INK COLOR | STYLE-INK PEN-TYPE COUNT | STYLE-INK INVENTORY | STYLE-INK INVENTORY BAND |
|---|---|---|---|---|
| ROLLING LINE | BLACK | 3 | 82 | 60 TO 100 |
| ROLLING LINE | RED | 2 | 35 | 30 TO 59 |
| ROLLING LINE | BLUE | 1 | 26 | 0 TO 29 |
| ROLLING LINE | GREEN | 1 | 22 | 0 TO 29 |
| PERFECT POINT | BLACK | 4 | 67 | 60 TO 100 |
| PERFECT POINT | BLUE | 2 | 62 | 60 TO 100 |
| QUICK DRAW | BLACK | 2 | 57 | 30 TO 59 |
| QUICK DRAW | RED | 1 | 21 | 0 TO 29 |
| QUICK DRAW | GREEN | 1 | 5 | 0 TO 29 |

FIG. 140

| STYLE-INK INVENTORY BAND | STYLE-INK COMBINATION COUNT | STYLE-INK BAND PEN TYPE COUNT | STYLE-INK BAND INVENTORY |
|---|---|---|---|
| 0 TO 29 | 4 | 4 | 74 |
| 30 TO 59 | 2 | 4 | 92 |
| 60 TO 100 | 3 | 9 | 211 |

FIG. 141

| INK COLOR | INK COUNT | INK INVENTORY |
|---|---|---|
| BLACK | 9 | 206 |
| RED | 3 | 56 |
| BLUE | 3 | 88 |
| GREEN | 2 | 27 |

FIG. 142

| STYLE | CASE COLOR | STYLE-CASE COUNT | STYLE-CASE INVENTORY |
|---|---|---|---|
| ROLLING LINE | SILVER | 3 | 64 |
| ROLLING LINE | BLACK | 2 | 45 |
| ROLLING LINE | GOLD | 1 | 25 |
| ROLLING LINE | RED | 1 | 31 |
| PERFECT POINT | SILVER | 2 | 52 |
| PERFECT POINT | BLACK | 1 | 9 |
| PERFECT POINT | BROWN | 1 | 16 |
| PERFECT POINT | BLUE | 2 | 52 |
| QUICK DRAW | SILVER | 1 | 30 |
| QUICK DRAW | BROWN | 1 | 27 |
| QUICK DRAW | RED | 1 | 21 |
| QUICK DRAW | GREEN | 1 | 5 |

| NAVIGATIONAL MOVE | FROM SINGLE FRAGMENT | FROM FRAGMENT SET |
|---|---|---|
| UP REQUIRED MAXI | SINGLE FRAGMENT | FRAGMENT SET |
| UP OPTIONAL MAXI | BINARY FRAGMENT SET | FRAGMENT SET |
| DOWN MAXI | FRAGMENT SET | FRAGMENT SET |
| UP MIDI | SINGLE FRAGMENT | FRAGMENT SET |
| DOWN MIDI | FRAGMENT SET | FRAGMENT SET |
| UP EXCLUSIVE MINI | SINGLE FRAGMENT | FRAGMENT SET |
| UP NON-EXCLUSIVE MINI | BINARY FRAGMENT SET | FRAGMENT SET |
| DOWN AUTOMATIC MINI | SINGLE FRAGMENT | FRAGMENT SET |
| DOWN FORMAT FIELD MINI | BINARY FRAGMENT SET | FRAGMENT SET |

FIG. 146

| FROM | IT IS LEGAL TO CONVERT TO: |
|---|---|
| A SINGLE RECORD | A PARTIAL RECORD IN HEAD TABLE |
| A SINGLE RECORD | A DATUM IN HEAD TABLE |
| A SINGLE RECORD | A BINARY PARTIAL RECORD SET IN NON-HEAD TABLE |
| A SINGLE PARTIAL RECORD | A RECORD |
| A SINGLE PARTIAL RECORD | A DATUM IN ITS TABLE |
| A SINGLE DATUM | A RECORD |
| A SINGLE DATUM | A PARTIAL RECORD IN ITS TABLE |
| A RECORD SET | A PARTIAL RECORD SET |
| A RECORD SET | A DATUM SET |
| A PARTIAL RECORD SET | A RECORD SET |
| A PARTIAL RECORD SET | A DATUM SET |
| A DATUM SET | A RECORD SET |
| A DATUM SET | A PARTIAL RECORD SET |

FIG. 147

ABS-VALUE-BAR
ADDITIVE-OPERATOR
AND-COMMAND-TOKEN
AND-TOKEN
ASSIGNMENT-OPERATOR
BICONDITIONAL-TOKEN
BINARY-SET-FUNCTION
CABLE
CASE-INTRO-TOKEN
CATALOG
CATALOG-BINARY-FUNCTION
CATALOG-FUNCTION
CATALOG-INTRO-TOKEN
CATALOG-TOKEN
COLON
COMMA
CURRENT-TOKEN
DELETE-RECORD-TOKEN
DENOMINATOR-END-TOKEN
DO-TOKEN
DOUBLE-PERIOD
DOWN-ARROW
ELSE-COMMAND-TOKEN
ELSE-TOKEN
ELSEIF-COMMAND-TOKEN
ELSEIF-TOKEN
END-CASE-TOKEN
EQUALS-SIGN
EXPONENT-END-TOKEN
EXPONENT-START-TOKEN

FAILURE-DATUM-TOKEN
FIELD
FOR-EACH-TOKEN
FRACTION-TOKEN
GALLERY-DOWN-ARROW
IF-COMMAND-TOKEN
IF-TOKEN
IN-CASE-TOKEN
IN-TOKEN
INFIX-PREDICATE
INSERT-RECORD-TOKEN
IT-HOLDS-THAT-TOKEN
LEFT-ANGLE-BRACKET
LEFT-BRACE
LEFT-PAREN
MULTIPLICATIVE-OPERATOR
NEGATIVE-OPERATOR
NOT-TOKEN
NUMERATOR-START-TOKEN
OPTIONAL-CABLE
OR-TOKEN
OTHERWISE-TOKEN
PERIOD
PHANTOM
PLAYROOM
POSTFIX-PREDICATE
PREFIX-PREDICATE
RADICAL-END-TOKEN

RADICAL-INDEX-TOKEN
RADICAL-START-TOKEN
REQUIRED-CABLE
REQUIRED-UP-PATH
RIGHT-ANGLE-BRACKET
RIGHT-BRACE
RIGHT-PAREN
SEMICOLON
SET-COMPLEMENT-OPERATOR
SET-CREATION-FUNCTION
SET-INTERSECTION-OPERATOR
SET-UNION-OPERATOR
STANDARD-FUNCTION
SUMMARY-FUNCTION
SYSTEM-DATUM
TABLE
THEN-COMMAND-TOKEN
THEN-TOKEN
THERE-EXISTS-A-TOKEN
TOPOLOGICAL-BINARY-
 FUNCTION
TOPOLOGICAL-FUNCTION
UNSIGNED-LITERAL-CONSTANT
UP-ARROW
UPON-TOKEN
VARIABLE
WARNING-UPON-TOKEN
WHERE-TOKEN

FIG. 149

```
SYNTAX-FACTOR              = PRIMATIVE-SYNTAX-ELEMENT |
                             DEFINED-SYNTAX-ELEMENT |
                             "[" SYNTAX-TERM "]" |
                             "{" SYNTAX-TERM "}".

SYNTAX-TERM                = SYNTAX-FACTOR {SYNTAX-FACTOR}.
SYNTAX-ELEMENT-DEFINITION  = DEFINED-SYNTAX-ELEMENT "=" SYNTAX-TERM {"|" SYNTAX-TERM} "".
```

FIG. 150

AUTOMATIC-EDIT = UPON-TOKEN SENTENCE DO-TOKEN COMMAND-LIST PERIOD.
GALLERY-BASIS-SET = LEFT-BRACE [BASIS-ITEM {COMMA BASIS-ITEM}] RIGHT-BRACE.
CALCULATED-FIELD-FORMULA = FORMULA-ASSIGNMENT PERIOD.
INTEGRITY-RULE = SENTENCE PERIOD.
SORT-ITEM = FIELD |
 UP-PATH FOREIGN-CATALOG |
 BASIS-ITEM FOREIGN-CATALOG.
WARNING-RULE = WARNING-UPON-TOKEN COLON SENTENCE PERIOD.

FIG. 151

ASSIGNMENT = DATUM ASSIGNMENT-OPERATOR PHRASE |
             CABLE ASSIGNMENT-OPERATOR PARTIAL-RECORD.

BASE = FIELD |
       UNSIGNED-LITERAL-CONSTANT |
       LEFT-PAREN PHRASE RIGHT-PAREN |
       ABS-VALUE-BAR PHRASE ABS-VALUE-BAR |
       [RADICAL-INDEX-TOKEN PHRASE] RADICAL-START-TOKEN PHRASE
          RADICAL-END-TOKEN.

BASIS-ITEM = GALLERY-DOWN-PATH PERIOD FIELD |
             GALLERY-DOWN-PATH SIMPLE-UP-PATH.

CABLE = REQUIRED-CABLE | OPTIONAL-CABLE.

CASE = IN-CASE-TOKEN SENTENCE COLON COMMAND-LIST.

CLAUSE = SIMPLE-CLAUSE {AND-TOKEN SIMPLE-CLAUSE} |
         SIMPLE-CLAUSE {OR-TOKEN SIMPLE-CLAUSE}.

COMMAND = SIMPLE-COMMAND |
          IF-COMMAND-TOKEN CLAUSE
             THEN-COMMAND-TOKEN COMMAND-LIST
             [ELSEIF-COMMAND-TOKEN CLAUSE
                THEN-TOKEN COMMAND-LIST ]
             [ELSE-COMMAND-TOKEN COMMAND-LIST ] |
          FOR-EACH-COMMAND-TOKEN
             [VARIABLE IN-TOKEN] PARTIAL-RECORD-SET
             [WHERE-TOKEN IT-HOLDS-THAT-TOKEN SENTENCE]
             DO-TOKEN LEFT-PAREN COMMAND-LIST RIGHT-PAREN |
          CASE-INTRO-TOKEN CASE {SEMICOLON CASE}
             [OTHERWISE-TOKEN COLON COMMAND-LIST]
             END-CASE TOKEN.

FIG. 152

COMMAND-LIST = COMMAND {SEMICOLON AND-COMMAND-TOKEN COMMAND}.

DATUM = FIELD |
PARTIAL-RECORD PERIOD FIELD |
GALLERY-DOWN-PATH PERIOD FIELD (*MUST BE A BASIS FIELD*) |
SYSTEM-DATUM.

DATUM-BINARY-SET = SIMPLE-DATUM-BINARY-SET {SET-INTERSECTION-OPERATOR SIMPLE-DATUM-BINARY-SET} |
SIMPLE-DATUM-BINARY-SET {SET-UNION-OPERATOR SIMPLE-DATUM-BINARY-SET}.

DATUM-SET = SIMPLE-DATUM-SET {SET-INTERSECTION-OPERATOR SIMPLE-DATUM-SET} |
SIMPLE-DATUM-SET {SET-UNION-OPERATOR SIMPLE-DATUM-SET}.

ELEMENT = PHRASE [DOUBLE-PERIOD PHRASE].

EXPRESSION = PHRASE |
SENTENCE.

FIG. 153

FACTOR = BASE |
　　　　　DATUM |
　　　　　BASE EXPONENT-START-TOKEN PHASE EXPONENT-END-TOKEN |
　　　　　BASE LEFT-BRACKET PHRASE RIGHT-BRACKET |
　　　　　NEGATIVE-OPERATOR FACTOR |
　　　　　LEFT-BRACE [ELEMENT] {COMMA ELEMENT} RIGHT-BRACE |
　　　　　NUMERATOR-START-TOKEN PHRASE FRACTION-TOKEN PHRASE
　　　　　　DENOMINATOR-END-TOKEN |
　　　　　STANDARD-FUNCTION [LEFT-PAREN EXPRESSION RIGHT-PAREN] |
　　　　　BINARY-SET-FUNCTION LEFT-PAREN DATUM-BINARY-SET
　　　　　　[FAILURE-DATUM-TOKEN PHRASE] RIGHT-PAREN |
　　　　　SUMMARY-FUNCTION LEFT-PAREN DATUM-SET
　　　　　　[FAILURE-DATUM-TOKEN PHRASE] RIGHT-PAREN |
　　　　　SET-CREATION-FUNCTION LEFT-PAREN DATUM-SET RIGHT-PAREN.

FOREIGN-CATALOG = CATALOG-INTRO-TOKEN CATALOG CATALOG-TOKEN.

FORMULA-ASSIGNMENT = FIELD ASSIGNMENT-OPERATOR PHRASE.

FORMULA-CASE = IN-CASE-TOKEN SENTENCE COLON FORMULA-COMMAND.

FORMULA-COMMAND = FORMULA-ASSIGNMENT |
　　　　　IF-COMMAND-TOKEN CLAUSE
　　　　　　THEN-COMMAND-TOKEN FORMULA-COMMAND
　　　　　　[ELSEIF-COMMAND-TOKEN CLAUSE
　　　　　　　THEN-COMMAND-TOKEN FORMULA-COMMAND]
　　　　　　[ELSE-COMMAND-TOKEN FORMULA-COMMAND] |
　　　　　CASE-INTRO-TOKEN FORMULA-CASE {SEMICOLON FORMULA-CASE}
　　　　　　[OTHERWISE-TOKEN COLON FORMULA-COMMAND]
　　　　　　END-CASE-TOKEN.

FIG. 154

```
GALLERY-DOWN-PATH          = GALLERY-DOWN-ARROW [CABLE]
                             {GALLERY-DOWN-ARROW [CABLE]}.

PARTIAL-RECORD             = CURRENT-TOKEN |
                             VARIABLE |
                             REQUIRED-UP-PATH |
                             GALLERY-DOWN-PATH SIMPLE-UP-PATH (MUST BE UP A BASIS
                             CABLE).

PARTIAL-RECORD-BINARY-SET  = SIMPLE-PARTIAL-REC-BINARY-SET {SET-INTERSECTION-OPERATOR
                             SIMPLE-PARTIAL-REC-BINARY-SET} |
                             SIMPLE-PARTIAL-REC-BINARY-SET {SET-UNION-OPERATOR
                             SIMPLE-PARTIAL-REC-BINARY-SET}.

PARTIAL-RECORD-SET         = SIMPLE-PARTIAL-RECORD-SET {SET-INTERSECTION-OPERATOR
                             SIMPLE-PARTIAL-RECORD-SET} |
                             SIMPLE-PARTIAL-RECORD-SET {SET-UNION-OPERATOR
                             SIMPLE-PARTIAL-RECORD-SET}.

PATH                       = SIMPLE-PATH {SIMPLE-PATH}.
PHRASE                     = TERM {ADDITIVE-OPERATOR TERM}.
REQUIRED-UP-PATH           = SIMPLE-REQUIRED-UP-PATH {SIMPLE-REQUIRED-UP-PATH}.
```

FIG. 155

SENTENCE = CLAUSE |
IF-TOKEN CLAUSE
THEN-TOKEN CLAUSE
[ELSEIF-TOKEN CLAUSE THEN-TOKEN CLAUSE]
[ELSE-TOKEN CLAUSE] |
CLAUSE BICONDITIONAL-TOKEN CLAUSE
{BICONDITIONAL-TOKEN CLAUSE}.

SIMPLE-CLAUSE = PHRASE (MUST BE BOOLEAN) |
NOT-TOKEN SIMPLE-CLAUSE |
THERE-EXISTS-A-TOKEN [VARIABLE IN-TOKEN]
PARTIAL-RECORD-SET WHERE-TOKEN SENTENCE [] |
FOR-EACH-TOKEN [VARIABLE IN-TOKEN]
PARTIAL-RECORD-SET IT-HOLDS-THAT-TOKEN SENTENCE |
LEFT-PAREN SENTENCE RIGHT-PAREN |
PREFIX-PREDICATE LEFT-PAREN PHRASE {COMMA PHRASE}
RIGHT-PAREN |
PHRASE INFIX-PREDICATE PHRASE |
PHRASE POSTFIX-PREDICATE.

SIMPLE-COMMAND = ASSIGNMENT |
INSERT-RECORD-TOKEN LEFT-PAREN [TABLE COMMA]
ASSIGNMENT {SEMICOLON ASSIGNMENT} RIGHT-PAREN |
DELETE-RECORD-TOKEN [TABLE].

FIG. 156

```
SIMPLE-DATUM-BINARY-SET    = DATUM |
                             PARTIAL-RECORD-BINARY-SET PERIOD FIELD |
                             SET-COMPLEMENT-OPERATOR SIMPLE-DATUM-BINARY-SET |
                             LEFT-PAREN DATUM-BINARY-SET RIGHT-PAREN.

SIMPLE-DATUM-SET           = DATUM-BINARY-SET |
                             PARTIAL-RECORD-SET PERIOD FIELD |
                             SET-COMPLEMENT-OPERATOR SIMPLE-DATUM-SET |
                             LEFT-PAREN DATUM-SET RIGHT-PAREN.

SIMPLE-DOWN-PATH           = DOWN-ARROW CABLE |
                             GALLERY-DOWN-PATH.

SIMPLE-PARTIAL-REC-BINARY-SET = PARTIAL-RECORD |
                             PHANTOM |
                             UP-PATH |
                             PARTIAL-RECORD UP-PATH |
                             CATALOG-BINARY-FUNCTION LEFT-PAREN PARTIAL-RECORD-SET
                                COMMA CATALOG RIGHT-PAREN |
                             TOPOLOGICAL-BINARY-FUNCTION LEFT-PAREN PARTIAL-RECORD-SET
                                COMMA PLAYROOM RIGHT-PAREN |
                             SET-COMPLEMENT-OPERATOR SIMPLE-PARTIAL-REC-BINARY-SET |
                             LEFT-PAREN PARTIAL-RECORD-BINARY-SET RIGHT-PAREN.
```

FIG. 157

```
SIMPLE-PARTIAL-RECORD-SET  = PARTIAL-RECORD-BINARY-SET |
                             PATH |
                             PARTIAL-RECORD PATH |
                             TABLE |
                             CATALOG-FUNCTION LEFT-PAREN PARTIAL-RECORD-SET
                               COMMA CATALOG RIGHT-PAREN |
                             TOPOLOGICAL-FUNCTION LEFT-PAREN PARTIAL-RECORD-SET
                               COMMA PLAYROOM RIGHT-PAREN |
                             LEFT-ANGLE-BRACKET [PARTIAL-RECORD-SET COMMA]
                               SENTENCE RIGHT-ANGLE-BRACKET |
                             SET-COMPLEMENT-OPERATOR SIMPLE-PARTIAL-RECORD-SET |
                             LEFT-PAREN PARTIAL-RECORD-SET RIGHT-PAREN.

SIMPLE-PATH              = SIMPLE-UP-PATH | SIMPLE-DOWN-PATH.
SIMPLE-REQUIRED-UP-PATH  = UP-ARROW REQUIRED-CABLE.
SIMPLE-UP-PATH           = UP-ARROW CABLE.
TERM                     = FACTOR {MULTIPLICATIVE-OPERATOR FACTOR}.
UP-PATH                  = SIMPLE-UP-PATH {SIMPLE-UP-PATH}.
```

FIG. 158

PARTY HOUSE LIVING ROOM

HEAD TABLE

*PERSON/ORGANIZATION          ENUMERATION (FORMAT FIELD) WITH VALUES:
                              PERSON, ORGANIZATION.

PARTY-NAME                    CALCULATED VIRTUAL: STRING
    FORMULA:
        CASE PERSON/ORGANIZATION= PERSON: PARTY-NAME= UNIQUE-NAME
        CASE PERSON/ORGANIZATION= ORGANIZATION: PARTY-NAME= ORG-NAME.

PARTY-ID                      STRING
CUSTOMER?                     BOOLEAN (FORMAT FIELD)
VENDOR?                       BOOLEAN (FORMAT FIELD)
SHAREHOLDER?                  BOOLEAN (FORMAT FIELD)

PERSON TABLE

*LAST-NAME                    STRING
*MIDDLE-NAME/S                STRING
*FIRST-NAME                   STRING
NAME-PREFIX                   ENUMERATION WITH VALUES: MR., MS., MRS., MISS., DR., HON.,
                              SIR, GEN., ......
*NAME-SUFFIX                  ENUMERATION WITH VALUES: NONE, SR., JR., III, IV, ...

FIG. 165

PARTY HOUSE LIVING ROOM (CONTINUED)

PERSON TABLE (CONTINUED)

| | |
|---|---|
| FULL-NAME | CALCULATED VIRTUAL: STRING<br>FORMULA: FULL-NAME := NAME-PREFIX + FIRST-NAME + MIDDLE-NAME/S [1] + LAST-NAME + NAME-SUFFIX. |
| UNIQUE-NAME | CALCULATED VIRTUAL: STRING<br>FORMULA: FULL-NAME := LAST-NAME + FIRST-NAME + MIDDLE-NAME/S + NAME-SUFFIX + SEX + DUPLICATE-RESOLUTION. |
| *SEX | ENUMERATION WITH VALUES: FEMALE, MALE |
| *DUPLICATE-RESOLUTION | INTEGER (DEFAULTS TO 0; USED TO RESOLVE IDENTICAL NAMES) |
| NICKNAME | STRING |
| ALIVE? | BOOLEAN |
| WORK-STATUS | ENUMERATION (FORMAT FIELD) WITH VALUES: CURRENT-EMPLOYEE, EMPLOYEE-TURNED-CONTRACT-WORKER, FORMER-EMPLOYEE, CONTRACT-WORKER, FORMER-CONTRACT-WORKER, OUTSIDER. |
| BIRTH-DATE | DATE |
| SOCIAL-SECURITY-# | STRING |
| DRIVERS-LICENSE-# | STRING |
| MARITAL-STATUS | ENUMERATION WITH VALUES: SINGLE, MARRIED, LEGALLY-SEPARATED |

FIG. 165 (CONTINUED)

PARTY HOUSE LIVING ROOM (CONTINUED)

PERSON TABLE (CONTINUED)

| | |
|---|---|
| ETHNICITY | ENUMERATION WITH VALUES: CAUCASION, BLACK, ASIAN, HISPANIC, NATIVE-AMERICAN, UNSPECIFIED. |
| REMARK | TEXT |

ORGANIZATION TABLE

| | |
|---|---|
| *ORG-NAME | STRING |
| ENTITY-TYPE | ENUMERATION WITH VALUES: NOT-A-LEGAL-ENTITY, CORPORATION, PARTNERSHIP, SOLE-PROPRIETORSHIP, LIMITED-PARTNERSHIP, TRUST, GOVERNMENT, INFORMAL-ENTITY |
| EXISTENCE-STATUS | ENUMERATION WITH VALUES: PLANNED, IN-EXISTENCE, DEFUNCT-WITH-SUCCESSOR/S, TOTALLY-DEFUNCT. |
| FEDERAL-EMPLOYER-ID | STRING |
| STATE-RESALE-NUMBER | STRING |
| INTERNAL-ORG? | BOOLEAN (FORMAT FIELD) |
| FINANCIAL-INSTITUTION? | BOOLEAN (FORMAT FIELD) |
| GOVERNMENT-AGENCY? | BOOLEAN (FORMAT FIELD) |
| DESCRIPTION | TEXT |

FIG. 166

PARTY HOUSE LIVING ROOM (CONTINUED)

EMPLOYEE TABLE

| | |
|---|---|
| EMPLOYEE-ID | STRING |
| HIRE-DATE | DATE |
| TERMINATION-DATE | DATE |
| EEO-CODE | ENUMERATION WITH VALUES: (YET TO BE DETERMINED) |
| UNION-CODE | ENUMERATION WITH VALUES: (YET TO BE DETERMINED) |
| MILITARY-STATUS-CODE | ENUMERATION WITH VALUES: (YET TO BE DETERMINED) |
| HEALTH-ALERT-STATUS | ENUMERATION WITH VALUES: (YET TO BE DETERMINED) |

WORKER TABLE

| | |
|---|---|
| ACTIVE-WORKER? | CALCULATED BOOLEAN<br>FORMULA: ACTIVE-WORKER? = WORK-STATUS IN {CURRENT-EMPLOYEE, EMPLOYEE-TURNED-CONTRACT-WORKER, CONTRACT-WORKER}. |

CUSTOMER TABLE

| | |
|---|---|
| CREDIT-CARD-NUMBER | STRING |
| CREDIT-CARD-TYPE | ENUMERATION WITH VALUES: MASTERCARD, VISA, .... |
| CUSTOMER-CLASS | ENUMERATION WITH VALUES: (YET TO BE DETERMINED) |

FIG. 166 (CONTINUED)

PARTY HOUSE LIVING ROOM (CONTINUED)

VENDOR TABLE

VENDOR-CLASS                ENUMERATION WITH VALUES: (YET TO BE DETERMINED)
   1099-VENDOR                 BOOLEAN

CUSTOMER/VENDOR TABLE

DEFAULT-FOB                 ENUMERATION WITH VALUES: (YET TO BE DETERMINED)
   DEFAULT-FREIGHT-CODE      ENUMERATION WITH VALUES: (YET TO BE DETERMINED)

INTERNAL-ORG TABLE (NO FIELDS—USED FOR CABLE LINKAGES ONLY)

FINANCIAL-INSTITUTION TABLE

FINANCIAL-INST-TYPE       ENUMERATION (FORMAT FIELD) WITH VALUES: COMMERCIAL-
                                                  BANK, SAVINGS-AND-LOAN, THRIFT, INVESTMENT-BANK, ...
   ABA-NUMBER                  STRING

PARTY-NAME CATALOG

SORT ITEM 1: PARTY-NAME
   SORT-ITEM 2: PERSON/ORGANIZATION

FIG. 167

PARTY HOUSE ORGANIZATION-MEMBERSHIP PLAYROOM

HEAD TABLE

RELATIONSHIP    ENUMERATION WITH VALUES: STAFF-MEMBER, AFFILIATED-PERSON, SUB-ORG, SUCCESSOR-ORG, AFFILIATED-ORGANIZATION.

PARTY HOUSE EMPLOYEE-FAMILY/CONTACT PLAYROOM

HEAD TABLE

RELATIONSHIP    ENUMERATION WITH VALUES: HUSBAND, WIFE, SON, DAUGHTER, MOTHER, FATHER, GRANDMOTHER, GRANDFATHER, GRANDSON, GRANDDAUGHTER, UNCLE, AUNT, NEPHEW, NIECE, HEALTH-CARE-PROVIDER, FRIEND, BUSINESS-ASSOCIATE

EMERGENCY-CONTACT?    BOOLEAN

FIG. 167 (CONTINUED)

LEDGER HOUSE LIVING ROOM

NOTE: EACH BUSINESS UNIT HAS A SINGLE *BUSINESS UNIT LEDGER*. IF THE BUSINESS UNIT HAS SUBORDINATE BUSINESS UNITS, THEN ITS BUSINESS UNIT LEDGER MAY HAVE CORRESPONDING SUBORDINATE BUSINESS UNIT LEDGERS. ALSO, ANY BUSINESS UNIT LEDGER MAY HAVE MULTIPLE, SUBORDINATE *AUXILLIARY LEDGERS*. AUXILLIARY LEDGERS CAN ALSO HAVE SUBORDINATE LEDGERS, BUT SUCH SUBORDINATES *MUST* BE AUXILLIARY LEDGERS. SOME AUXILLIARY LEDGERS MAY EXIST WHICH HAVE NO ANCESTRAL BUSINESS UNIT LEDGER (FOR REPORTING NON-STANDARD FINANCIAL VIEWS).

A DISTINCTION IS MADE BETWEEN BEING "OWNED" BY A LEDGER, AND APPEARING AS A "LINE ITEM" IN THAT LEDGER. EACH UNITARY ACCOUNT IS OWNED BY SOME BUSINESS UNIT LEDGER. SUMMARY ACCOUNTS HAVE NO SUCH OWNERSHIP. ANY ACCOUNT CAN APPEAR AS A LINE ITEM ON A LEDGER. THE SYSTEM GUARANTEES THAT A BUSINESS UNIT LEDGER (IN CONJUNCTION WITH ITS SUBORDINATE LEDGERS) CONTAINS PRECISELY THE SUMMARY OF ALL THE UNITARY ACCOUNTS IT OWNS (NOTHING MORE, NOTHING LESS). NO UNITARY ACCOUNT'S BALANCE CAN FALL INTO A CRACK.

HEAD TABLE

| | |
|---|---|
| *LEDGER-NAME | STRING |
| LEDGER-TYPE | ENUMERATION (FORMAT FIELD) WITH VALUES: BUSINESS-UNIT-LEDGER, AUXILLIARY-LEDGER |
| DESCRIPTION | TEXT |

FIG. 168

LEDGER HOUSE LIVING ROOM (CONTINUED)

HEAD TABLE (CONTINUED)

BUSINESS-UNIT-NAME    CALCULATED: STRING
  FORMULA:
    CASE LEDGER-TYPE = BUSINESS-UNIT-LEDGER:
      BUSINESS-UNIT-NAME = ↑ BU/LEDGER.ORG-NAME;
    CASE EXISTS-ANCESTOR-INCL-SELF (SUB-LEDGER-PLAYROOM,
         LEDGER-TYPE = BUSINESS-UNIT-LEDGER, VAR BU):
      BUSINESS-UNIT-NAME = BU.BUSINESS-UNIT-NAME;
    ELSE BUSINESS-UNIT-NAME := NULL.

BU-LEDGER TABLE (NO FIELDS—USED FOR CABLE LINKAGES ONLY)

LEDGER-NAME CATALOG

SORT ITEM 1: LEDGER-NAME

LEDGER HOUSE SUB-LEDGER PLAYROOM

HEAD TABLE (NO FIELDS—USED FOR CABLE LINKAGES ONLY)

FIG. 169

ACCOUNT HOUSE LIVING ROOM

HEAD TABLE

| | |
|---|---|
| *ACCOUNT-TYPE | ENUMERATION WITH VALUES: UNITARY, SUMMARY |
| *ACCOUNT-NAME | STRING |
| LEDGER-SEQUENCE | INTEGER |
| DESCRIPTION | TEXT |
| ORIENTATION | ENUMERATION WITH VALUES: BAL-ON-LEFT, BAL-ON-RIGHT |
| DURATION | ENUMERATION WITH VALUES: CONTINUOUS (REMAIN ON THE BALANCE SHEET), CYCLIC (REMAIN ON PERIODIC STATEMENTS: EARNINGS, CASH, ETC) |
| STATUS | ENUMERATION OPEN, LOCKED, CLOSED |
| DATE-CLOSED | AUTOMATIC BASAL: DATE |

FIG. 170

ACCOUNT HOUSE LIVING ROOM (CONTINUED)

HEAD TABLE (CONTINUED)

BALANCE            CALCULATED: REAL WITH MONEY UNITS
  FORMULA:
    CASE: ACCT-TYPE = UNITARY AND DURATION = CYCLIC:
      BALANCE :=
        SUM ( 〈 ➔ ACCT/DB/CR,
        MONTH (SYS-DATE) = MONTH (TRANSACTION-DATE) 〉.AMOUNT);
    CASE: ACCT-TYPE = UNITARY AND DURATION = CONTINUOUS:
      BALANCE :=
        LAST-REC (〈 ➔ ACCT/HIST 〉.MONTHLY-BALANCE,
        ACCT-PERIOD CATALOG) +
        SUM (〈 ➔ ACCT/DB/CR,
        MONTH (SYS-DATE) = MONTH (TRANSACTION-DATE) 〉.AMOUNT) +
        SUM (CHILDREN (CYCLIC-CROSSFLOW-PLAYROOM).BALANCE);
    CASE: ACCT-TYPE = SUMMARY:
      BALANCE := SUM (CHILDREN (SUMMARY-UPFLOW-PLAYROOM).BALANCE).

DISPLAYED-BALANCE            CALCULATED VIRTUAL: REAL WITH MONEY UNITS
  FORMULA:
    CASE ORIENTATION = BALANCE-ON-LEFT: DISPLAYED-BALANCE = –BALANCE
    CASE ORIENTATION = BALANCE-ON-RIGHT: DISPLAYED-BALANCE = BALANCE.

FIG. 170 (CONTINUED)

ACCOUNT HOUSE LIVING ROOM (CONTINUED)

UNITARY-ACCT TABLE

UNITARY-ACCOUNT-CLASS    ENUMERATION WITH VALUES: DEPOSITORY, RECEIVABLE, PAYABLE, ..., OTHER.

DEPOSITORY-ACCOUNT TABLE

DEPOSIT-ACCT-TYPE    ENUMERATION (FORMAT FIELD) WITH VALUES: CHECKING, SAVINGS, CERTIFICATE-OF-DEPOSIT, TREASURY-BILL, ...

INTEREST-TERMS    TEXT

CHECKING-ACCOUNT TABLE

NOTE: VECTOR FIELDS DESCRIBE THE CHECK FORM TO BE PRINTED ON FOR AUTOMATIC CHECKS. EACH VECTOR IS OF THE FORM (TOP-LEFT-X, TOP-LEFT-Y, BOTTOM-RIGHT-X, BOTTOM-RIGHT-Y). FOR MANUAL CHECKS, ONLY THE NEXT CHECK NUMBER IS INCLUDED.

NEXT-MANUAL-CK-NUM    INTEGER

NEXT-AUTOMATIC-CK-NUM    CALCULATED: INTEGER
        FORMULA: NEXT-AUTOMATIC-CK-NUM =
            MAXIMUM ((↓ ACCT/DB/CR,
            DB/CR-TYPE = CKG-ACCT-DB/CR,
            CKG-ACCT-DB/CR-TYPE = CHECK,
            AUTO/MANUAL-CHECK = AUTO-CHECK ).CHECK-NUMBER) + 1

FIG. 171

ACCOUNT HOUSE LIVING ROOM (CONTINUED)

CHECKING-ACCOUNT TABLE (CONTINUED)

| | |
|---|---|
| CHECK-NUMBER-POSITION | VECTOR (INTEGER, INTEGER) |
| DATE-POSITION | VECTOR (INTEGER, INTEGER) |
| PAYEE-POSITION | VECTOR (INTEGER, INTEGER) |
| AMOUNT-NUMERIC-POS | VECTOR (INTEGER, INTEGER) |
| AMOUNT-ALPHA-POSITION | VECTOR (INTEGER, INTEGER) |
| MEMO-POSITION | VECTOR (INTEGER, INTEGER) |
| STUB-POSITION | VECTOR (INTEGER, INTEGER) |
| STUB-LINES | INTEGER |
| ALIGNMENT-CKS-NEEDED | INTEGER |

ACCOUNT-RECEIVABLE TABLE

| | |
|---|---|
| DATE-LAST-STMT-SENT | DATE |
| CREDIT-RATING | (YET TO BE DETERMINED) |

ACCOUNT-PAYABLE TABLE

| | |
|---|---|
| NUM-OF-OUTSTD-INVOICES | INTEGER |
| STANDARD-DISCOUNT | REAL |

FIG. 171 (CONTINUED)

ACCOUNT HOUSE LIVING ROOM (CONTINUED)

ACCT-TYPE/NAME CATALOG

SORT ITEM 1: ACCOUNT-TYPE
SORT ITEM 2: ACCOUNT-NAME

LEDGER-SEQUENCE CATALOG

SORT ITEM 1: ↑ LEDGER-LINE-ITEM | LEDGER-NAME-CATALOG
SORT ITEM 2: LEDGER-SEQUENCE

ACCOUNT HOUSE SUMMARY-UPFLOW PLAYROOM

HEAD TABLE

NOTE: THIS DEFINES A SUMMARY LINKAGE BETWEEN A PAIR OF ACTUAL ACCOUNTS. THE PARENT MUST BE A SUMMARY ACCOUNT, AND SUMS EACH CHILD ACCOUNT. SUMMARIZATION LEAVES THE CHILD BALANCE UNAFFECTED. A CHILD CAN SUM TO MULTIPLE PARENTS, EACH SUCH PARENT RECEIVING ITS FULL VALUE. SINCE THE TOPOLOGY IS A *BI-DIRECTIONAL TREE*, NO SUMMARY ACCOUNT CAN RECEIVE A DESCENDENT VALUE MORE THAN ONCE.

(NO FIELDS—USED FOR CABLE LINKAGES ONLY)

FIG. 172

ACCOUNT HOUSE CYCLIC-CROSSFLOW PLAYROOM

HEAD TABLE

NOTE: THIS DEFINES A CYCLIC-CROSSFLOW LINKAGE BETWEEN A PAIR OF ACTUAL ACCOUNTS. THE PARENT MUST BE A CONTINUOUS ACCOUNT AND THE CHILD MUST BE CYCLIC. THE CYCLIC CHILD CONTRIBUTES ITS ENTIRE BALANCE TO THE CONTINUOUS PARENT, WITH BOTH BALANCES SHOWING UNTIL THE END OF THE ACCOUNTING CYCLE, AT WHICH TIME THE CHILD ACCOUNT IS SET TO ZERO.

(NO FIELDS—USED FOR CABLE LINKAGES ONLY)

FIG. 172 (CONTINUED)

TRANSACTION HOUSE LIVING ROOM

HEAD TABLE

| | | |
|---|---|---|
| *TRANSACTION-DATE | AUTOMATIC BASAL: DATE | |
| *SEQUENCE-NUMBER | AUTOMATIC BASAL: INTEGER | |
| DESCRIPTION | TEXT | |
| TRANSACTION-AMOUNT | CALCULATED: REAL WITH MONEY UNITS | |
| | FORMULA: TRANSACTION-AMOUNT = | |
| | SUM ((↘ TRANS/DB/CR.PARITY = CREDIT).AMOUNT). | |

TRANSACTION-SEQUENCE CATALOG

SORT ITEM 1: TRANSACTION-DATE
SORT ITEM 2: SEQUENCE-NUMBER

TRANSACTION HOUSE DEBIT/CREDIT GUEST ROOM

HEAD TABLE

| | |
|---|---|
| PARITY | ENUMERATION WITH VALUES: DEBIT, CREDIT |
| AMOUNT | REAL IN MONEY UNITS |
| DISPLAYED-AMOUNT | CALCULATED VIRTUAL: REAL IN MONEY UNITS |
| FORMULA: | |
| CASE PARITY= DEBIT: | DISPLAYED-AMOUNT= –AMOUNT |
| CASE PARITY= CREDIT: | DISPLAYED-AMOUNT= AMOUNT. |
| DB/CR-TYPE | ENUMERATION WITH VALUES: CKG-ACCT-DB/CR, INCOMING-CHECK-DB, OTHER-DB/CR |

FIG. 173

TRANSACTION HOUSE DEBIT/CREDIT GUEST ROOM (CONTINUED)

CHECKING-ACCT-DB/CR TABLE

| | |
|---|---|
| CKG-ACCT-DB/CR-TYPE | ENUMERATION WITH VALUES: DEPOSIT, CHECK, NON-CHECK-WITHDRAWAL |
| BANK-STMT-DATE | DATE (DATE OF BANK STATEMENT UPON WHICH THE ITEM APPEARS AND IS THEREFORE RECONCILED) |

OUTGOING-CHECK TABLE

| | |
|---|---|
| CHECK-NUMBER | INTEGER |
| PRINTED? | BOOLEAN |
| VOID? | BOOLEAN |
| SIGNED? | BOOLEAN; |
| AUTO/MANUAL-CHECK | ENUMERATION WITH VALUES: AUTOMATIC-CHECK, MANUAL-CHECK |

INCOMING-CHECK TABLE

| | |
|---|---|
| IN-CHECK-NUMBER | INTEGER |
| IN-CHECK-ABA-NUMBER | STRING |
| IN-CHECK-ACCT-NUMBER | STRING |
| IN-CHECK-DATE | DATE |

FIG. 173 (CONTINUED)

TRANSACTION HOUSE INTER-BUSINESS-UNIT PLAYROOM

HEAD TABLE

IBU-DESCRIPTION    TEXT

TRANSACTION HOUSE RECONCILIATION-1 GALLERY

BASIS SET = {✦ ↑ ACCT/DB/CR, ✦ BANK-STMT-DATE}

NOTE: THIS GALLERY PROVIDES, FOR A GIVEN CHECKING ACCOUNT, AND A GIVEN BANK STATEMENT DATE, THE NET SUM OF ALL TRANSACTIONS APPEARING ON THAT STATEMENT. THIS SHOULD MATCH THE NET CHANGE IN THE ACCOUNT BALANCE SHOWN ON THE BANK STATEMENT.

HEAD TABLE

NET-CHANGE    CALCULATED: REAL WITH MONEY UNITS
                                FORMULA: NET-CHANGE:= SUM (✦.AMOUNT)

FIG. 174

TRANSACTION HOUSE RECONCILIATION-2 GALLERY

BASIS SET = {✱ ↑ ACCT/DB/CR, ✱ BANK-STMT-DATE, ✱ CKG-ACCT-DB/CR-TYPE}

NOTE: THIS GALLERY PROVIDES, FOR A GIVEN CHECKING ACCOUNT, AND A GIVEN BANK STATEMENT DATE, AND A GIVEN TYPE OF ACCOUNT TRANSACTION (I.E. CHECKS, DEPOSITS, WITHDRAWALS), THE NET AMOUNT OF AND NUMBER OF ALL SUCH TRANSACTIONS APPEARING ON THAT STATEMENT. THIS SHOULD MATCH SUCH DATA AS SHOWN ON THE BANK STATEMENT.

HEAD TABLE

COUNT-OF-TYPE          CALCULATED: REAL WITH MONEY UNITS
                       FORMULA: COUNT-OF-TYPE:= COUNT (✱)

NET-CHANGE-FOR-TYPE    CALCULATED: REAL WITH MONEY UNITS
                       FORMULA: NET-CHANGE-FOR-TYPE:= SUM (✱.AMOUNT)

FIG. 174 (CONTINUED)

BALANCE-HISTORY HOUSE LIVING ROOM

HEAD TABLE

*YEAR                AUTOMATIC BASAL: PARTIAL-DATE (YEAR ONLY)
QUARTER              CALCULATED: PARTIAL-DATE (QUARTER).
                     FORMULA: QUARTER := QUARTER-OF-MONTH (MONTH).
*MONTH               AUTOMATIC BASAL: PARTIAL-DATE (MONTH ONLY).
MONTHLY-BALANCE      AUTOMATIC BASAL: REAL WITH MONEY UNITS

YR/MONTH-ACCT CATALOG

SORT ITEM 1: YEAR
SORT ITEM 2: MONTH
SORT ITEM 3: ↑ ACCT-HIST | ACCT-TYPE/NAME CATALOG

ACCT-YR/MONTH CATALOG

SORT ITEM 1: ↑ ACCT-HIST | ACCT-TYPE/NAME CATALOG
SORT ITEM 2: YEAR
SORT ITEM 3: MONTH

FIG. 175

BALANCE-HISTORY HOUSE QUARTERLY-BALANCE GALLERY
BASIS SET = {♣.YEAR, ♣.QUARTER, ♣ ↑ ACCT-HIST}

HEAD TABLE

QUARTERLY-BALANCE   CALCULATED: REAL WITH MONEY UNITS
  FORMULA: BALANCE := SUM (♣.MONTHLY-BALANCE)

YR/QUARTER-ACCT CATALOG

SORT ITEM 1: ♣.YEAR
SORT ITEM 2: ♣.QUARTER
SORT ITEM 3: ♣ ↑ ACCT-HIST | ACCT-TYPE/NAME CATALOG

ACCT-YR/QUARTERCATALOG

SORT ITEM 1: ♣ ↑ ACCT-HIST | ACCT-TYPE/NAME CATALOG
SORT ITEM 2: ♣.YEAR
SORT ITEM 3: ♣.QUARTER

BALANCE-HISTORY HOUSE ANNUAL-BALANCE GALLERY
BASIS SET = {♣ ♣.YEAR, ♣ ♣ ↑ ACCT-HIST}

HEAD TABLE

ANNUAL-BALANCE   CALCULATED: REAL WITH MONEY UNITS
  FORMULA: BALANCE := SUM (♣.QUARTERLY-BALANCE)

FIG. 176

BALANCE-HISTORY HOUSE ANNUAL-BALANCE GALLERY (CONTINUED)

YR-ACCT CATALOG
      SORT ITEM 1: ✢.YEAR
      SORT ITEM 2: ✢.↑ACCT-HIST | ACCT-TYPE/NAME CATALOG

ACCT-YR CATALOG
      SORT ITEM 1: ✢.↑ACCT-HIST | ACCT-TYPE/NAME CATALOG
      SORT ITEM 2: ✢.YEAR

BALANCE-HISTORY HOUSE YEAR/MONTH GALLERY
   BASIS SET = {✢.YEAR, ✢.MONTH}

HEAD TABLE
   (NO FIELDS—USED FOR CABLE LINKAGES ONLY)

YR/MONTH CATALOG
      SORT ITEM 1: ✢.YEAR
      SORT ITEM 2: ✢.MONTH

FIG. 177

BALANCE-HISTORY HOUSE YEAR/QUARTER GALLERY
BASIS SET = {♣♣.YEAR, ♣♣.QUARTER}

HEAD TABLE (NO FIELDS—USED FOR CABLE LINKAGES ONLY)

YR/QUARTER CATALOG

SORT ITEM 1: ♣♣.YEAR
SORT ITEM 2: ♣♣.QUARTER

BALANCE-HISTORY HOUSE YEAR GALLERY
BASIS SET = {♣♣.YEAR}

HEAD TABLE (NO FIELDS—USED FOR CABLE LINKAGES ONLY)

YR CATALOG

SORT ITEM 1: ♣♣.YEAR

FIG. 177 (CONTINUED)

P1. IF NAME-PREFIX ∈ {MS., MRS., MISS.} THEN SEX = FEMALE.
ERROR MESSAGE: MS., MRS., MISS. CAN ONLY BE USED WITH FEMALES.

P2. IF NAME-PREFIX = MR. THEN SEX = MALE.
ERROR MESSAGE: MR. CAN ONLY BE USED WITH MALES.

P3. IF LAST-NAME [1] ∉ CAPITALS (ASCII), THEN USER-WARNING.
WARNING MESSAGE: THE FIRST LETTER OF THE LAST-NAME IS NOT A CAPITAL.

P4. IF ALIVE? = FALSE, THEN EDITING (DATUM) = DISALLOWED.
ERROR MESSAGE: ONCE DEAD, A PERSON CANNOT BE MADE ALIVE AGAIN.

P5. BIRTH-DATE ∈ {1-JAN-1900 .. SYS-DATE}
ERROR MESSAGE: BIRTH-DATE MUST BE AFTER 1-JAN-1900 AND BEFORE THE PRESENT DATE].

P6. PRIOR-VALUE (EXISTENCE-STATUS) ≤ EXISTENCE-STATUS.
ERROR MESSAGE: THE EXISTENCE-STATUS CANNOT RETREAT ALONG ITS VALUE SEQUENCE: PLANNED, IN-EXISTENCE, DEFUNCT-WITH-SUCCESSOR/S, TOTALLY-DEFUNCT.

FIG. 178

P7. IF ORGANIZATION.EXISTENCE-STATUS = DEFUNCT-WITH-SUCCESSOR/S,
THEN COUNT((→ ORGANIZATION-MEMBERSHIP-FROM,
RELATIONSHIP = SUCCESSOR-ORG)) > 0 AND

IF ORGANIZATION-MEMBERSHIP | HT.RELATIONSHIP = SUCCESSOR-ORG,
THEN ← ORGANIZATION-MEMBERSHIP-FROM.EXISTENCE-STATUS = DEFUNCT-WITH-SUCCESSOR/S.

ERROR MESSAGE: AN ORGANIZATION MAY ONLY BE MADE DEFUNCT-WITH-SUCCESSOR/S IN THE SAME DATABASE TRANSACTION THAT SUCH SUCCESSOR IS DEFINED IN THE ORGANIZATION-MEMBERSHIP PLAYROOM (WITH RELATIONSHIP = SUCCESSOR-ORG). LIKEWISE, A SUCCESSOR-ORG RELATIONSHIP CAN ONLY BE DEFINED IN THAT PLAYROOM IF IT IS FROM AN ORGANIZATION WHOSE EXISTENCE-STATUS IS SET TO DEFUNCT-WITH-SUCCESSOR/S IN THE SAME DATABASE TRANSACTION.

P8. HIRE-DATE ∈ {12-NOV-89 .. SYS-DATE}.

ERROR MESSAGE: BIRTH-DATE MUST BE AFTER 12-NOV-89 AND BEFORE THE PRESENT DATE.

P9. IF TERMINATION-DATE ≠ NULL, THEN TERMINATION-DATE ∈ [HIRE-DATE .. SYS-DATE].

ERROR MESSAGE: THE TERMINATION DATE CANNOT BE BEFORE THE HIRE DATE OR AFTER THE PRESENT DATE.

P10. IF RELATIONSHIP ∈ {STAFF-MEMBER, AFFILIATED-PERSON},
THEN ↑ TO.PERSON/ORGANIZATION = PERSON
ELSE ↑ TO.PERSON/ORGANIZATION = ORGANIZATION

ERROR MESSAGE: IF A RELATIONSHIP IS TO A STAFF-MEMBER OR AFFILIATED-PERSON, THEN IT MUST BE TO A PERSON, OTHERWISE IT MUST BE TO AN ORGANIZATION.

FIG. 178 (CONTINUED)

L1. NOT COMMON-DESC-INCL-SELF-EXISTS-IN-SOME-DESC-PAIR (SUMMARY-UPFLOW-PLAYROOM, LEAF-CHILDREN (SUBLEDGER-PLAYROOM, CURRENT) → LEDGER-LINE-ITEM).

ERROR MESSAGE: NO ACCOUNT CAN ROLL UP TWICE INTO A LEDGER.

L2. IF ↑ FROM.LEDGER-TYPE = AUXILLIARY-LEDGER, THEN ↑ TO.LEDGER-TYPE = AUXILLIARY-LEDGER

ERROR MESSAGE: A CHILD OF AN AUXILLIARY LEDGER MUST ALSO BE AN AUXILLIARY-LEDGER.

L3. ↑.LEDGER-TYPE = BUSINESS-UNIT-LEDGER.

ERROR MESSAGE: A UNITARY ACCOUNT MUST BE OWNED BY A BUSINESS-UNIT-LEDGER.

FIG. 179

A1. IF ↑ LEDGER-LINE-ITEM EXISTS,
THEN (↑ LEDGER-LINE-ITEM, LEDGER-SEQUENCE) IS-UNIQUE.
ERROR MESSAGE: IF AN ACCOUNT IS USED AS THE LINE ITEM OF A LEDGER (BY A WIRE IN THE LEDGER-LINE-ITEM CABLE), THEN THE LEDGER-SEQUENCE MUST BE UNIQUE WITHIN THAT LEDGER.

A2. IF ↑ LEDGER-LINE-ITEM DOES-NOT-EXIST, THEN LEDGER-SEQUENCE = NULL.
ERROR MESSAGE: IF AN ACCOUNT IS NOT USED AS THE LINE ITEM OF A LEDGER (BY A WIRE IN THE LEDGER-LINE-ITEM CABLE), THEN THE LEDGER-SEQUENCE MUST BE NULL.

A3. MODIFYING-FIELD (ORIENTATION) = DISALLOWED.
ERROR MESSAGE: ONCE AN ACCOUNT IS CREATED, ITS ORIENTATION CANNOT LATER BE CHANGED.

A4. MODIFYING-FIELD (DURATION) = DISALLOWED.
ERROR MESSAGE: ONCE AN ACCOUNT IS CREATED, ITS DURATION CANNOT LATER BE CHANGED.

A5. IF PRIOR-VALUE (STATUS) = CLOSED, THEN EDITING-FIELD (STATUS) = DISALLOWED.
ERROR MESSAGE: ONCE AN ACCOUNT IS CLOSED, IT CANNOT BE RE-OPENED.

A6. IF STATUS = CLOSED THEN BALANCE = 0.
ERROR MESSAGE: AN ACCOUNT CANNOT BE CLOSED UNLESS ITS BALANCE IS 0.

A6. UPON STATUS := CLOSED: DATE-CLOSED := SYS-DATE.
DESCRIPTION: AUTOMATIC EDIT TO SET DATE-CLOSED IN THE TRANSACTION WHICH CLOSES THE ACCOUNT.

FIG. 180

A8. ↑ OWNER-LEDGER ∈ ANCESTORS-INCL-SELF (SUBLEDGER-PLAYROOM,
ANCESTORS-INCL-SELF (SUMMARY-UPFLOW-PLAYROOM,
CURRENT) ↑ LEDGER-LINE-ITEM).

ERROR MESSAGE: A UNITARY ACCOUNT ROLL UP INTO SOME LINE ITEM OF ITS OWNER LEDGER. DETAILS: SUPPOSE UA IS A UNITARY ACCOUNT WHICH BELONGS TO SOME BUSINESS UNIT, BU, AND HENCE THAT BUSINESS UNIT'S LEDGER IS ITS OWNER LEDGER. CONSIDER ALL THE ACCOUNTS THAT UA SUMS UP TO (INCLUDING ITSELF). NOW ONE SUCH ACCOUNT MUST APPEAR AS A LINE ITEM IN BU.

A9. ↑ TO.DURATION = ↑ FROM.DURATION.

ERROR MESSAGE: CYCLIC ACCOUNTS CAN ONLY SUM UP TO CYCLIC ACCOUNTS, AND CONTINUOUS ACCOUNTS CAN ONLY SUM UP TO CONTINUOUS ACCOUNTS.

A10. ↑ .ACCT-TYPE = SUMMARY.

ERROR MESSAGE: ONLY SUMMARY ACCOUNTS MAY BE PARENTS IN THE SUMMARY UPFLOW PLAYROOM.

A11. ↑ .ACCT-TYPE = UNITARY AND ↑ .DURATION = CONTINUOUS.

ERROR MESSAGE: PARENTS IN THE CYCLIC UPFLOW PLAYROOM MUST BE UNITARY, CONTINUOUS ACCOUNTS.

A12. ↑ .ACCT-TYPE = UNITARY AND ↑ .DURATION = CYCLIC.

ERROR MESSAGE: CHILDREN IN THE CYCLIC UPFLOW PLAYROOM MUST BE UNITARY, CYCLIC ACCOUNTS.

FIG. 180 (CONTINUED)

T1. UPON RECORD-INSERTION: TRANSACTION-DATE := SYS-DATE

DESCRIPTION: THE TRANSACTION DATE IS AUTOMATICALLY SET TO THE SYSTEM DATE.

T2. UPON RECORD-INSERTION: SEQUENCE-NUMBER :=
LAST (TRANSACTION-SEQUENCE-CATALOG).SEQUENCE-NUMBER + 1.

DESCRIPTION: THE SEQUENCE-NUMBER IS SET TO THE NEXT HIGHER ONE FOR THE DATE.

T3. UPON RECORD-INSERTION: ↑ PARTY/TRANS := SYS-USER..

DESCRIPTION: THE ACCOUNTING TRANSACTION RECORD IS AUTOMATICALLY WIRED TO THE USER VIA THE PARTY/TRANS CABLE.

T4. MODIFICATION (CURRENT) = DISALLOWED AND DELETION (CURRENT) = DISALLOWED

ERROR MESSAGE: ONCE COMMITTED, TRANSACTIONS CANNOT BE MODIFIED OR DELETED.

T5. AMOUNT ≠ 0.

ERROR MESSAGE: DEBITS AND CREDITS OF 0 ARE NOT ALLOWED.

T6. AMOUNT ≥ 0 IFF PARITY = CREDIT.

ERROR MESSAGE: DEBIT AMOUNTS ARE NEGATIVE AND CREDIT AMOUNTS ARE POSITIVE.

T7. IF DB/CR-TYPE = CKG-ACCT-DB/CR
THEN ↑ (ACCT/DB/CR.UNITARY-ACCOUNT-CLASS = DEPOSITORY AND
DEPOSIT-ACCT-TYPE = CHECKING).

ERROR MESSAGE: A CKG-ACCT DEBIT/CREDIT MUST BE AGAINST A CHECKING ACCOUNT.

T8. COUNT (↓ TRANS/DB/CR.PARITY = DEBIT) ≥ 1 AND COUNT (↓ .PARITY = CREDIT) ≥ 1.

ERROR MESSAGE: A TRANSACTION MUST DEBIT AT LEAST ONE ACCOUNT AND CREDIT AT LEAST ONE ACCOUNT.

FIG. 181

T9. SUM (↓ TRANS/DB/CR.AMOUNT) = 0.

ERROR MESSAGE: THE SUM OF THE DEBITS MUST EQUAL THE SUM OF THE CREDITS.

T10. ALL-ARE-IDENTICAL (↓ TRANS/DB/CR ↑ ACCT/DB/CR ↑ OWNER-LEDGER).

ERROR MESSAGE: ALL ACCOUNTS IN THE TRANSACTION MUST BE OWNED BY THE SAME BUSINESS UNIT LEDGER.

T11. ↑ TO.TRANSACTION-AMOUNT = ↑ FROM.TRANSACTION-AMOUNT.

ERROR MESSAGE: WHEN TWO TRANSACTIONS ARE PAIRED FOR INTER-BUSINESS UNIT TRANSACTIONS, THE AMOUNTS IN EACH TRANSACTION MUST BE EQUAL.

T12. IF VOID? OR SIGNED? THEN PRINTED?.

ERROR MESSAGE: .

T13. IF BANK-STMT-DATE EXISTS AND CKG-ACCT-DB/CR-TYPE = CHECK THEN PRINTED? AND NOT VOID? AND SIGNED?.

ERROR MESSAGE: IF A CHECK APPEARS ON A BANK STATEMENT, THEN IT MUST HAVE BEEN PRINTED, MUST NOT BE VOID, AND MUST HAVE BEEN SIGNED.

T14. MODIFICATION (CURRENT) = DISALLOWED AND DELETION (CURRENT) = DISALLOWED

ERROR MESSAGE: ONCE COMMITTED, DEBITS AND CREDITS IN ACCOUNTING TRANSACTIONS CANNOT BE MODIFIED OR DELETED.

T15. UPON RECORD-INSERTION: ↑ ACCT/DB/CR.STATUS = OPEN.

ERROR MESSAGE: ONLY OPEN ACCOUNTS MAY BE ACCESSED FOR DEBITS AND CREDITS.

FIG. 181 (CONTINUED)

B1. UPON END-OF-MONTH(SYSDATE): FOR-ALL (↑ ACCT-HIST.STATUS ≠ CLOSED)
    INSERT (YEAR = YEAR (SYSDATE),
    MONTH = MONTH (SYSDATE),
    MONTHLY-BALANCE = ↑ ACCT-HIST.BALANCE).

DESCRIPTION: A NEW RECORD IS INSERTED AT THE END OF EACH MONTH, AND ITS MONTHLY-BALANCE IS INITIALIZED WITH THE CURRENT (MONTH-END) BALANCE OF THE ACCOUNT.

B2. MANUAL-EDITING (TABLE) = DISALLOWED.

DESCRIPTION: BALANCE HISTORIES CANNOT BE EDITED.

FIG. 182

ACCOUNT MASTER
ACCOUNT HOUSE LIVING ROOM DOORWAY #1

| ACCOUNT | ACCOUNT TYPE | STATUS | CURRENT BALANCE |
|---|---|---|---|
| CALIFORNIA SALES | SUMMARY | OPEN | 136,796 |
| LOS ANGELES SALES | SUMMARY | OPEN | 68,632 |
| ASHTON, PEGGY SALES | UNITARY | OPEN | 22,400 |
| HUNT, TOM SALES | UNITARY | OPEN | 11,450 |
| JONES, BOB SALES | UNITARY | OPEN | 34,782 |
| SAN FRANCISCO SALES | SUMMARY | OPEN | 49,277 |
| → EMERY, JAMIE SALES | UNITARY | OPEN | 40,188 |
| JACKSON, SUSAN SALES | UNITARY | CLOSED | 0 |
| THOMPSON, RON SALES | UNITARY | OPEN | 9,089 |
| SAN DIEGO SALES | SUMMARY | OPEN | 18,887 |
| LARSON, ANN SALES | UNITARY | OPEN | 18,887 |

MARKED ACCOUNT:

ACCOUNT NAME:    EMERY, JAMIE SALES

DESCRIPTION:
        MONTHLY SALES OF SYNERGY PRODUCTS IN THE SAN FRANCISCO DISTRICT BY JAMIE EMERY

ORIENTATION:    BAL-ON-RIGHT

DURATION:    CYCLIC

CROSSFLOW TO:    RETAINED EARNINGS

UPFLOW TO:    SAN FRANCISCO SALES

DATE-CLOSED:    (NULL)    UA-CLASS:    OTHER

FIG. 183

GENERAL LEDGER TRANSACTION
TRANSACTION HOUSE LIVING ROOM DOORWAY #1

TRANSACTION DATE:  3-MAR-94

SEQUENCE NUMBER:  537

DESCRIPTION:
  AUTHORIZE ABC PRODUCTS INVOICE #25674, SOLD FOR
  RESALE BUT WILL NOT BE RESOLD.

ENTERED BY:  JUDY FRANKLIN

| ACCOUNT | DEBIT | CREDIT |
|---|---|---|
| OFFICE FURNITURE EXPENSE | 2,359.50 | |
| FRANCHISE TAX BOARD PAYABLE | | 153.37 |
| ➔SAN DIEGO CITY TAX PAYABLE | | 28.31 |
| FREIGHT EXPENSE | 89.95 | |
| ABC PRODUCTS PAYABLE | | 2,267.77 |
| | | |
| | | |
| MATCHING TOTALS | 2,449.45 | 2,449.45 |

FIG. 184

QUARTERLY ACCOUNT BALANCES

BALANCE HISTORY    QUARTERLY BALANCE GALLERY    DOORWAY #1

LEDGER: SYNERGY PRODUCTS SALES    QUARTERLY-BALANCE (× $1000)
BUSINESS UNIT: CUSTOM SYSTEMS DIVISION

| ACCOUNT | Q1 92 | Q2 92 | Q3 92 | Q4 92 | Q1 93 | Q2 93 | Q3 93 | Q4 93 | Q1 94 |
|---|---|---|---|---|---|---|---|---|---|
| CALIFORNIA SALES | | | | | | | | | |
| LOS ANGELES SALES | | | | | | | | | |
|   ASHTON, PEGGY SALES | 46 | 55 | 41 | 58 | 62 | 44 | 21 | 59 | 35 |
| →HUNT, TOM SALES | 9 | 12 | 15 | 11 | 21 | 8 | 19 | 17 | 23 |
|   JONES, BOB SALES | 32 | 35 | 8 | 32 | 46 | 38 | 55 | 43 | 56 |
| TOTAL LOS ANGELES SALES | 87 | 102 | 59 | 101 | 129 | 90 | 95 | 119 | 114 |
| SAN FRANCISCO SALES | | | | | | | | | |
|   EMERY, JAMIE SALES | 78 | 83 | 75 | 86 | 89 | 93 | 74 | 95 | 85 |
|   THOMPSON, RON SALES | 0 | 0 | 3 | 9 | 5 | 8 | 12 | 13 | 21 |
| TOTAL SAN FRANCISCO SALES | 78 | 83 | 78 | 95 | 94 | 101 | 86 | 108 | 106 |
| SAN DIEGO SALES | | | | | | | | | |
|   LARSON, ANN SALES | 23 | 25 | 23 | 21 | 30 | 28 | 33 | 25 | 36 |

FIG. 185

DATA VILLAGE SYSTEM

BACKGROUND OF THE INVENTION

This invention relates generally to database management systems by means of which computers organize, store, manipulate and retrieve information.

There are at this time four types of database management systems (DMSs): (1) hierarchical (HDMS) (exemplified by IMS), (2) network (NDMS) (exemplified by IDMS), (3) relational (RDMS) (exemplified by DB2, Oracle, Sybase, DBase and Paradox), (4) object (ODMS) (exemplified by Object Store and Versant). The present invention represents the first example of a fifth type of DMS called a Data Village System (DVS).

DMSs are generally used for the purpose of developing and running application systems. An application system satisfies the specific and detailed computing needs of an enterprise. Application systems are typically built on top of an underlying DMS. This is a practical approach, since all application systems have a common need for the organization, storage, manipulation and retrieval of data. A good feature of both HDMSs and NDMSs is that they clearly define a "data model" involving parent-child relationships between tables. The intent in these systems is that the referential integrity required by the relationships be automatically enforced. HDMSs succeed at this, but have the shortcoming that a table cannot have more than one parent. NDMSs allow multiple parents but do not always enforce referential integrity. Both HDMSs and NDMSs require that application systems be built in a tedious and code-intensive process typically using the COBOL language.

RDMSs began a move toward simplicity and mathematical elegance by replacing the data model concept with a set of independent tables and most of the COBOL coding with simpler SQL coding. However, it eventually became clear that the parent-child relationships still needed to be defined and managed, and it proved to be bad practice to design an application system on a RDMS without tending to the discipline of data modeling. Thus, in recent years, so-called Computer Aided Software Engineering (CASE) tools have evolved to allow data modeling and process modeling to be done graphically and to translate the information into an application system running on a RDMS. This CASE-RDMS approach is very popular at the present time. Many old mainframe-based HDMS and NDMS application systems are now being downsized to client/server based CASE-RDMS application systems. Unfortunately, these downsized systems often perform more slowly than their HDMS or NDMS predecessors due to the clumsy manner in which SQL processes data.

Application systems running on HDMSs, NDMSs, and RDMSs are all developed using traditional (non-object-oriented) software development techniques. The emergence of object-oriented programming (OOP) via languages like C++ and Smalltalk has dramatically changed the software development landscape.

The first object-oriented programming environments provided for classes and objects to exist in RAM only, without persistence. Data stored on disk by the early OOP systems was stored via custom-written storage methods rather than by a DMS. Natural evolution led to the ODMS which provides persistent database storage and management of classes and objects as a service accessible to the OOP language. Application systems began to emerge that were written in an OOP language running on top of an ODMS. Although ODMSs provide no concept of a data model with which to do analysis (like an RDMS without CASE), this considerable disadvantage is more than offset by the enormous programming advantages of OOP made possible by virtual procedures, late binding, and the evolution of powerful class libraries. Furthermore, the resulting systems dramatically outperform RDMS and even HDMS and NDMS application systems, primarily due to superior design, better normalization, and object linking.

The traditional data model concept presumes that all data is stored in two-dimensional tables, and that those tables are linked together in parent-child relationships. Unfortunately, this data model concept precludes any efficient representation of many common forms of data, particularly topological graph structures (a.k.a. network structures) and structures of irregular composition. Since ODMSs do not recognize any particular data model construct, and indeed, can support whatever structure the programmer creates, ODMSs are finding application in areas such as map making and artificial intelligence, previously only supported by specialized systems. The ODMS approach suggests that the limitations of the traditional data model concept and the advantages of OOP clearly justify the loss of the data model.

Application systems running on current DMSs are generally designed with the primary focus on process. They are "process driven". Processes are implemented as a set of "screens". When an employee needs to perform a transaction in a particular process, he or she pulls up the appropriate screen and performs the transaction. People are trained to perform transactions in particular processes. In a process-driven system, the processes become frozen with the release of the software. If an employee discovers a better way to perform a process that requires an associated change in the information system, then the only recourse is to go through another software development cycle, which often involves considerable time and cost.

Process-driven systems typically focus much more attention on processes than on data. Data modeling is done primarily to support the process model. Each process is only concerned with the data that are its inputs and outputs. Awareness of data on the part of each user is generally restricted to the "tunnel vision" imposed by the screens associated with the processes that he or she performs. As a general rule, current systems, including ODMSs, hide from the user the deeper underlying structure of the data, including the manner in which the data relates to the enterprise as a whole. This is consistent with the soon-to-be-old-fashioned notion of each employee having his or her own specialized niche in the enterprise, and of only a few people (if indeed any) having a global awareness of what is going on in the enterprise.

In existing application systems, the structure of the data and the rules which the data must obey reside in a combination of five places: (1) the data model (if one exists), (2) in the structure of the screens, (3) in the software, (4) in notes on paper, and (5) in the minds of the programmers. The data structure and data rules, which must reflect the business policy of the enterprise, are thus buried within the overall system. They are hidden from both users and managers. They are implicit rather than explicit.

Existing application systems are static, which means that the programming of the application system and the running of the application system occur in separate time domains. After an application system is programmed, then it is placed into production for use by regular users. While in use, the basic nature of the system cannot be changed, because that is fixed in the programming. The application system is static.

When changes need to be made, a new "version" of the system is separately programmed and then, during a time when nobody can use the system (such as over a weekend) the new version is rolled into production, thereby replacing the old system. However, the newly revised application system is just as static as its forerunner.

SUMMARY OF THE INVENTION

The Data Village System (DVS) comprises an interactive computer system and software that enables a user to establish a data model that defines a formal structure and rules for an enterprise's data. The DVS automatically enforces the data organization rules as to how the enterprise's data is to be manipulated and viewed with respect to the data model. A metaphor is used to facilitate understanding of the data model.

In a DVS, the structure of the data and the rules which the data must obey are explicit rather than implicit. They reside entirely in the data model which is called the "data village". The data village is always available to the user in an easy to understand graphical form. Application systems can thus be developed simply by declaring the data structures and associated rules in this explicit format. All the declared rules are automatically enforced by the underlying DVS.

The DVS creates dynamic application systems. This is because all the structures and rules which govern the user-data (i.e. the data manipulated by ordinary users of the system) are themselves also data, called meta-data. A system is typically constructed by beginning with an "empty system" that contains no meta-data and no user-data. Meta-data is then added, creating structures and rules for the user-data. At any time during this process, user-data can also be added or changed or deleted. And mixed in with user-data changes, additional meta-data can be added or existing meta-data can be changed or deleted. Thus, there is no distinction between the programming time domain and the running time domain. There is no need for rollovers when the system needs to change, it can simply be changed at the same time the ordinary users are conducting business in the system.

In its simplified form, a DVS consists of a set of "tables" containing related "datums" that are grouped into "compartments" of associated datums. Tables are interconnected by cables which link datums in one table to those in another table.

In the standard (non-simplified) form of a DVS, the compartments are renamed "partial records", and the tables also contain "fields". Each partial record has a datum in each field of the table. Tables are grouped into "rooms" which contain "records". A record consists of one or more partial records taken from tables in the same room. Records may thus vary in their field structure. Rooms are grouped into "houses". A house represents a category of data. There are three types of data in a house pertaining to its category: (1) basic data, contained in a "living room"; (2) summary data, contained in "galleries"; and (3) topological graph linkages among the basic data, contained in "playrooms" and "guest rooms".

A cable contains "wires" that connect the partial records in one table to those in another. Cables connecting tables in different houses are called "maxi-cables" and contain linkages of datums in different categories. Cables connecting two tables in the same house but in different rooms are called "midi-cables" and contain linkages that define summarizations and topological graphs. Cables connecting two tables in the same room are called "mini-cables" and contain linkages of partial records to their records. All the houses and cables, taken together, comprise the data village. There are any number of "doorways" into any room. Within any room, there is also any number of "catalogs", "filters", and "paintings". Doorways provide users with a powerful and flexible means for accessing the records in a room with complete assurance that the underlying structure of the data will be automatically maintained in accordance with all the data rules. Users can control the order of the records displayed (via catalogs), the layout of the display (via paintings), the subset of the records in the room that are displayed or highlighted (via filters), and they may explore contextual connections between data in one room and another.

The data in the DVS is of three kinds: (1) "user-data", comprising datums, wires, partial records and records; (2) "access meta-data" comprising doorways, catalogs, paintings, filters, tags, markers, doorway networks, and any other structures that influence the way that user-data is accessed but have no influence on the values of the user-data; and (3) "structural meta-data" comprising the data village, houses, rooms, tables, fields, maxi-cables, midi-cables, mini-cables, dynamic data organization rules, and any other structures that influence the values of the user-data.

The DVS contains a set of "static data organization rules" which are fixed, unchangeable, and apply to all application systems created. The static data organization rules include all constraints on meta-data. The DVS automatically ensures that all meta-data conforms to the static data organization rules. Any attempt to change meta-data which is in violation of the static data organization rules is automatically rejected by the DVS and the user is informed of the reason.

Some static data organization rules apply to user-data. But user-data is primarily governed by the meta-data, which includes dynamic data organization rules. Dynamic data organization rules are user-definable and changeable and they apply only to user-data. Thus, by interactively manipulating meta-data, all structures and rules governing user-data can be dynamically defined and changed. The DVS automatically ensures that all user-data conforms to the meta-data and the static data organization rules. Any attempt to change user-data which is in violation of the meta-data and/or the static data organization rules is automatically rejected by the DVS and the user is informed of the reason. Thus data integrity is assured.

BRIEF DESCRIPTION OF THE DRAWINGS

FIG. 4 shows a table and how it is organized into fields, partial records and datums.

FIG. 12 shows the records in the head table of the Stations-House Living Room.

FIG. 13 shows the records in the head table of the Shipments-House Living Room.

FIG. 15 contains the definitions of six galleries in the Shipments House.

FIG. 16 shows the records in the Shipments-House Source-Description Gallery.

FIG. 17 shows the records in the Shipments-House Maxi-Cable Gallery.

FIG. 18 shows the records in the Shipments-House Weight Gallery.

FIG. 19 shows the records in the Shipments-House Path Gallery.

FIG. 20 shows the records in the Shipments-House Daily-Destination Gallery.

FIG. 21 shows the record in the Shipments-House Master Gallery.

FIG. 33 shows the cabling in the Cake House.

FIG. 34 shows the records in the Cake-House Living Room.

FIG. 45 shows the records in the Pin-Type-House Living Room.

FIG. 46 shows the records in the Part-Pin-House Living Room.

FIG. 47 shows the records in the Circuit-House Living Room.

FIG. 48 shows the records in the Circuit-House Guest Room.

FIG. 52 shows the records in the School-System-Type-House Living Room.

FIG. 53 shows the records in the City-House Living Room.

FIG. 54 shows the linking of partial records in the Fiction Table and the Non-Fiction Table to the Head Table in the Books-House Living Room by means of a format field.

FIG. 58 shows the partial records in the Head Table, the Cabin Table, and the Suite Table in the Forest-Units-House Living Room.

FIG. 59 shows the records in the Stations-House Living Room ordered according to the Station-Code Catalog.

FIG. 60 shows the records in the Stations-House Living Room ordered according to the Bldg-Num Catalog.

FIG. 61 shows the records in the Stations-House Living Room ordered according to the Manager Catalog.

FIG. 62 shows the records in the Days-House Living Room ordered according to the Date Catalog.

FIG. 63 shows the records in the Days-House Living Room ordered according to the Carriers Catalog.

FIG. 64 shows the records in the Shipments-House Living Room ordered according to the Weight Catalog.

FIG. 65 shows the records in the Shipments-House Daily-Destination Gallery ordered according to the Count Catalog.

FIG. 66 shows the records in the Shipments-House Path Gallery ordered according to the Frequency Catalog.

FIG. 67 shows the records in the Cake-House Living Room ordered according to the Task-Time Catalog.

FIG. 68 shows the records in the Shipments-House Living Room ordered according to the To-Manager-Weight Catalog.

FIG. 69 shows the records in the Shipments-House Living Room ordered according to the To-Bldg-Date-Carriers Catalog.

FIG. 70 shows the records in the Cake-House Dependencies Playroom ordered according to the Extended-Delay Catalog.

FIG. 71 shows the records in the Shipments-House Living Room ordered according to the Path-Gallery-Frequency Catalog.

FIG. 72 shows the records in the Shipments-House Daily-Destination Gallery ordered according to the Carrier-Weight Catalog.

FIG. 73 shows the records in the Shipments-House Source-Description Gallery ordered according to the Descr-Cost Catalog.

FIG. 74 shows the Alpha Filter as a field in the records of the Shipments-House Living Room.

FIG. 75 shows how the records in the Shipments-House Living Room would be displayed when the Alpha Filter is turned on.

FIG. 76 shows the Beta Filter as a field in the records of the Shipments-House Path Gallery.

FIG. 77 shows how the records in the Shipments-House Path Gallery would be displayed when the Beta Filter is turned on.

FIG. 78 shows another way of displaying the records in the Shipments-House Path Gallery when the Beta Filter is turned on.

FIG. 79 shows the Gamma Filter as a field in the records of the Shipments-House Living Room.

FIG. 80 shows the Delta Filter as a field in the records of the Days-House Living Room.

FIG. 81 shows Doorway #1 of the Shipments-House Living Room.

FIG. 83 shows the linking of a record in the Days-House Living Room to a record in the Shipments-House Living Room.

FIG. 84 shows the linking of a record in the Days-House Living Room to a selection subset of records in the Shipments-House Living Room.

FIG. 85 shows Doorway #2 of the Shipments-House Living Room.

FIG. 86 shows Doorway #4 of the Shipments House Living Room.

FIG. 87 shows Doorway #5 of the Shipments-House Living Room.

FIG. 88 shows Doorway #1 of the Forest Units House Living Room.

FIG. 89 shows a first view of Doorway #2 of the Forest Units House Living Room.

FIG. 90 shows a second view of Doorway #2 of the Forest Units House Living Room.

FIG. 93 shows Doorway #2 of the Customer House Living Room.

FIG. 95 shows a second view of Doorway #1 of the Cake House.

FIG. 97 shows a first view of Doorway #3 of the Cake House.

FIG. 98 shows a second view of Doorway #3 of the Cake House.

FIG. 105 shows the records in the Earnings-House Living-Room Head Table.

FIG. 106 shows the records in the Match-House Living-Room Head Table.

FIG. 109 shows another example of the records on display in each of the doorways of FIG. 107.

FIG. 112 shows another example of the records on display in each of the doorways of FIG. 110.

FIG. 1 13 shows still another example of the records on display in each of the doorways of FIG. 110.

FIG. 1 15 shows an example of the records on display in each of the doorways of FIG. 114.

FIG. 116 shows the Chess Doorway Network DN-D consisting of the Player-House Living-Room Doorway #4, the Match-House Living-Room Doorway #3, and the Earnings-House Living-Room Doorway #2.

FIG. 117 shows one example of the records on display in each of the doorways of FIG. 116.

FIG. 118 shows another example of the records on display in each of the doorways of FIG. 116.

FIG. 120 shows one example of the records on display in each of the doorways of FIG. 119.

FIG. 121 shows the Chess Doorway Network DN-F consisting of the City-House Living-Room Doorway #5, the Match-House Living-Room Doorway #4, the Player-House Living-Room Doorway #6, the Match-House Living-Room Doorway #5, and the Match-House Living-Room Doorway #6.

FIG. 122 shows the records on display in the first, second, and third of the five doorways of FIG. 121 as part of a first example.

FIG. 123 shows the records on display in the fourth and fifth of the five doorways of FIG. 121 as part of the same example as FIG. 122.

FIG. 124 shows the records on display in the first, second, and third of the five doorways of FIG. 121 as part of a second example.

Figure 121:
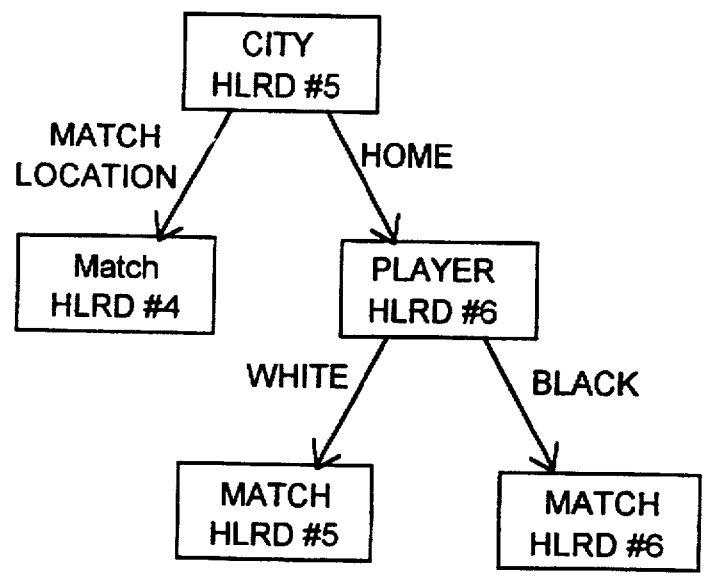

PIG. 125 shows the records on display in the fourth and fifth of the five doorways of FIG. 121 as part of the same example as FIG. 124.

Figure 126:
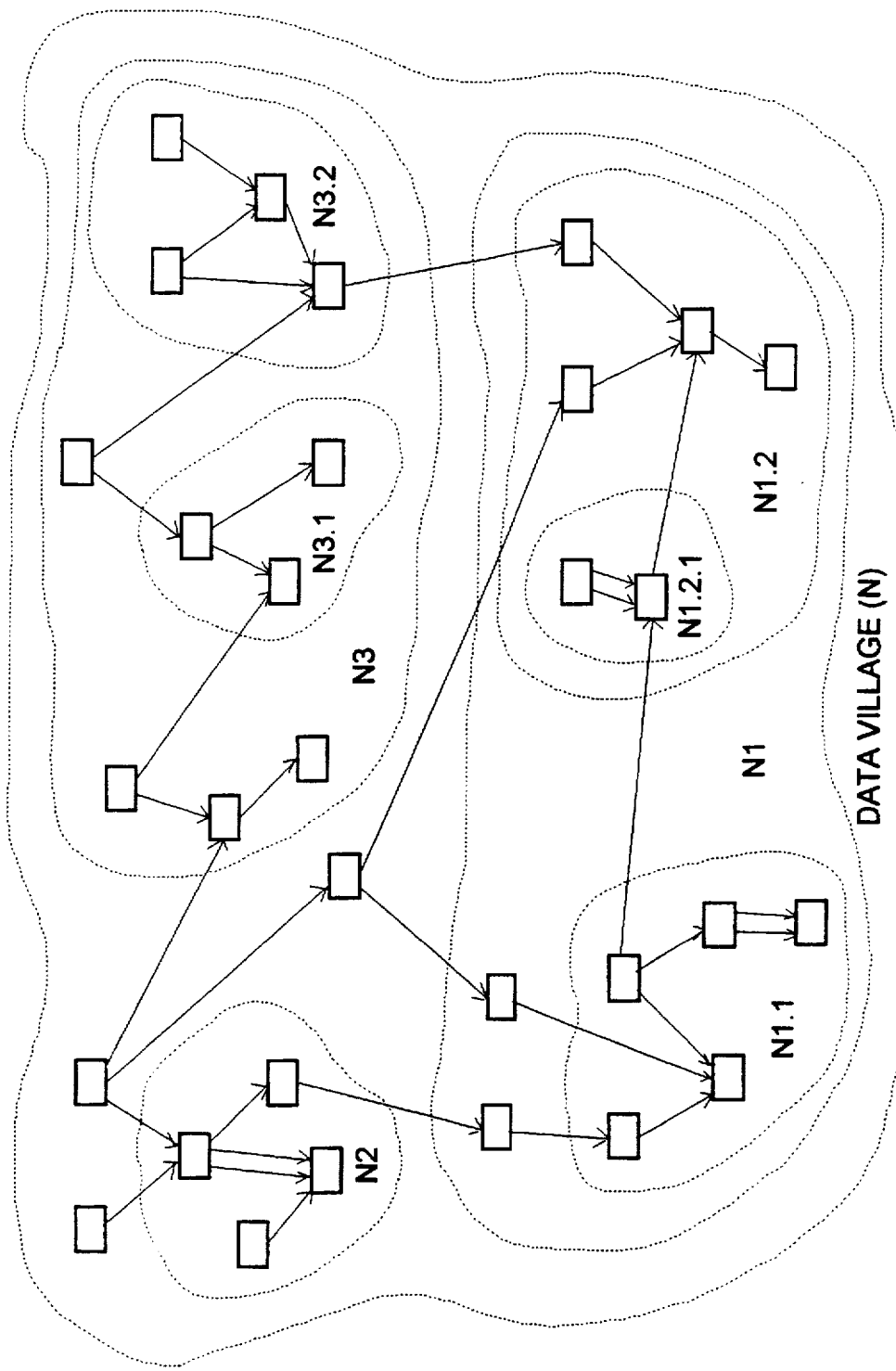

FIG. 126 shows a data village subdivided into neighborhoods.

Figure 127:
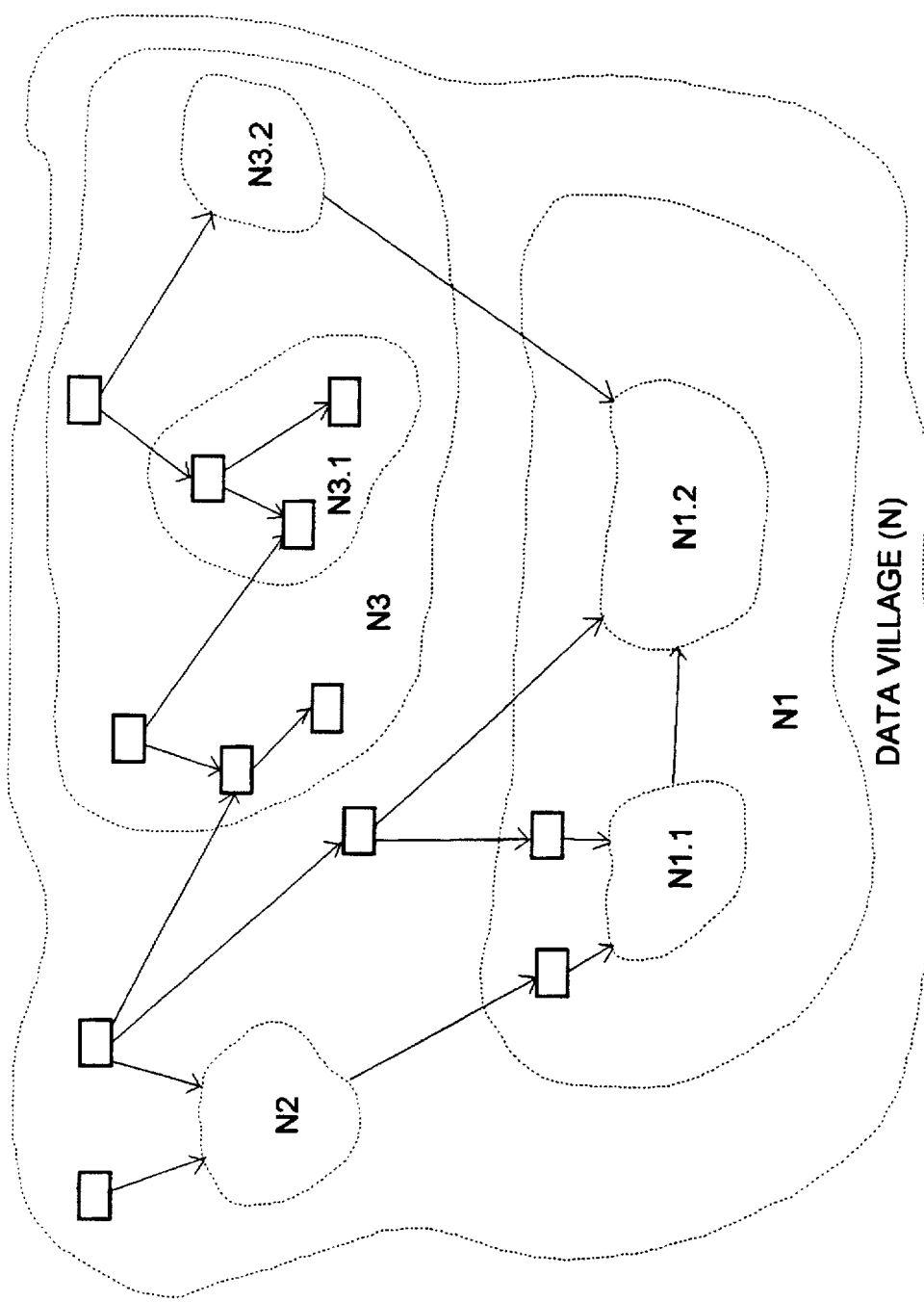

FIG. 127 shows the data village of FIG. 126 with the houses in certain neighborhoods masked.

Figure 128:
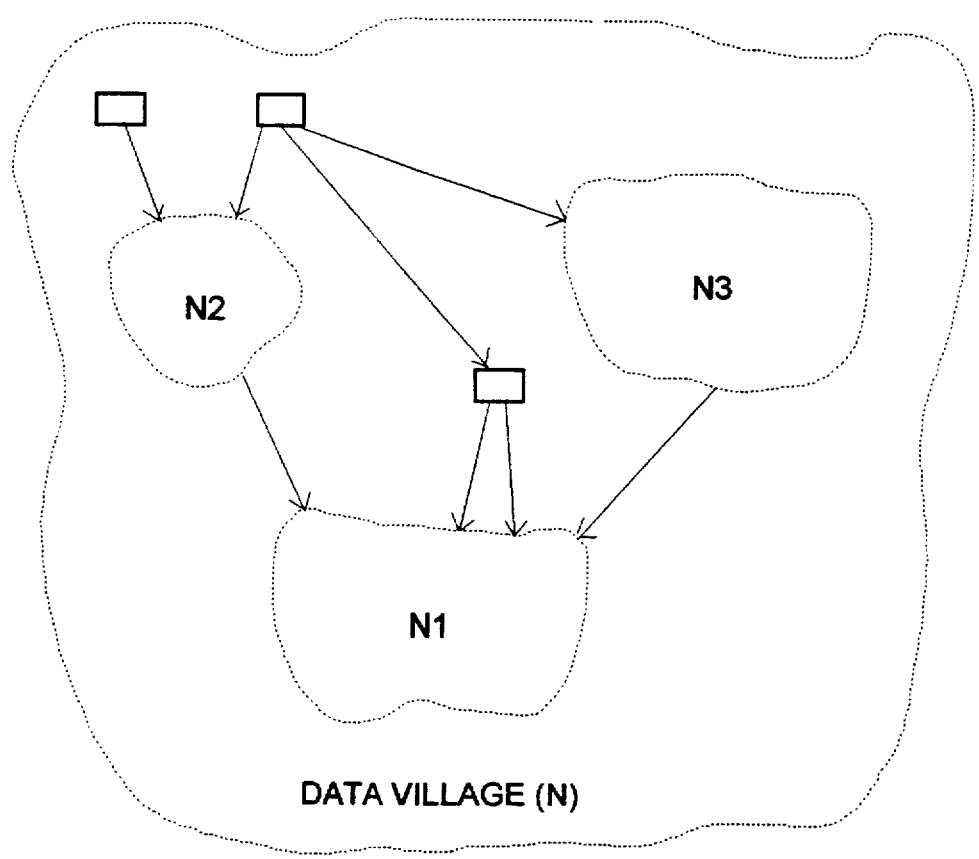

FIG. 128 shows the data village of FIG. 126 with only the members of the outermost neighborhood displayed and all houses and neighborhoods internal to the outermost neighborhood members masked.

FIG. 129 shows all of the possibilities for attaching cables to tables.

Figure 130:
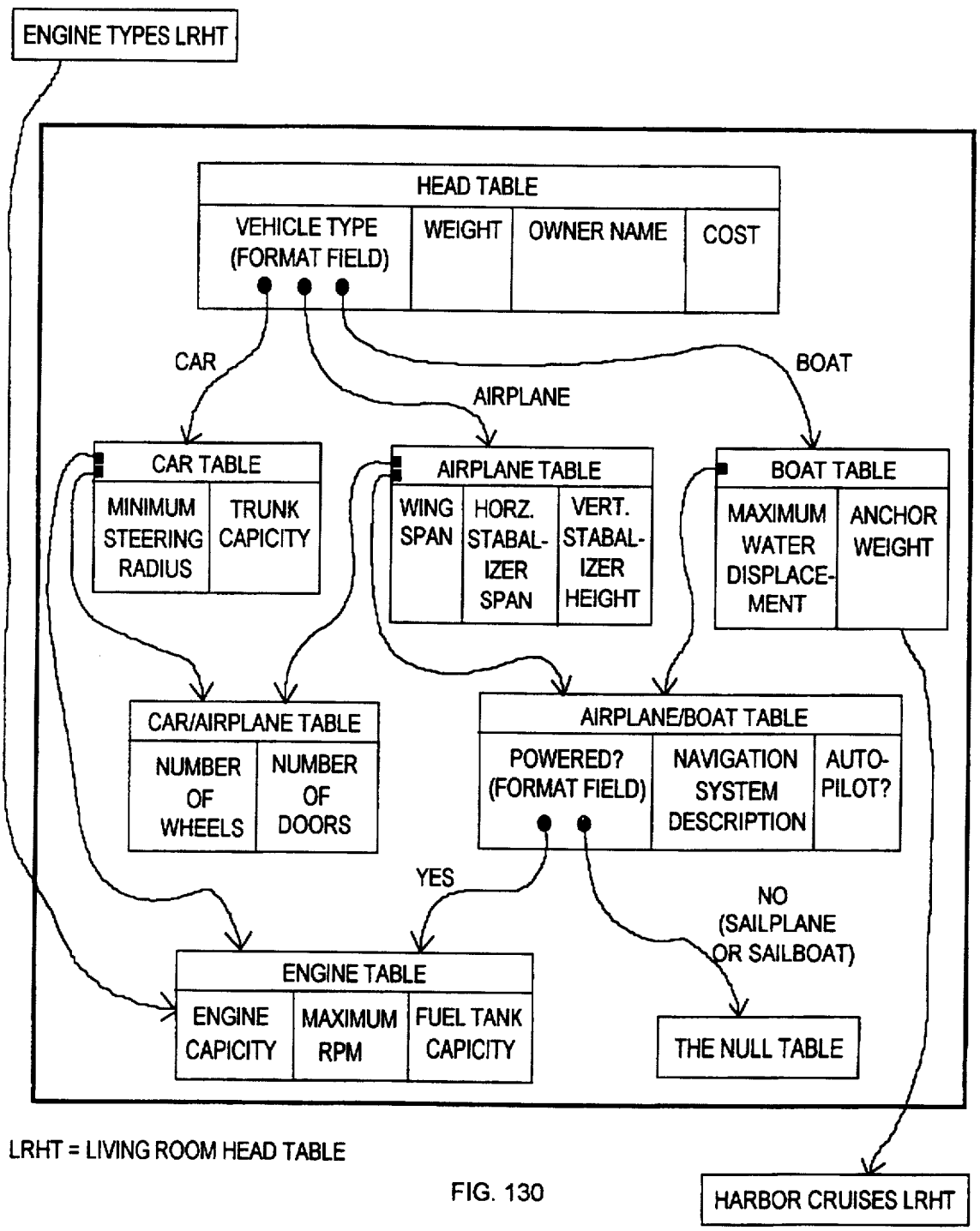

FIG. 130 shows the map of a village comprising a Vehicles House, an Engine-Types House, and a Harbor-Cruises House.

Figure 131:
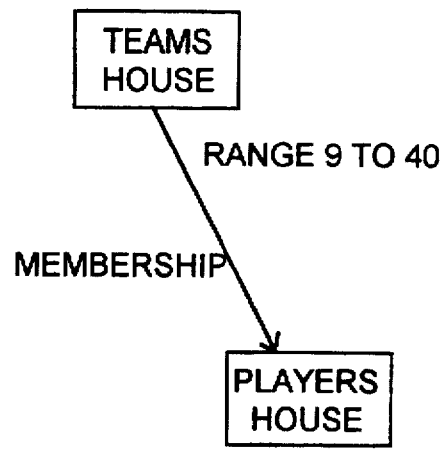

FIG. 131 shows the map of a village comprising a Teams House and a Players House.

Figure 132:
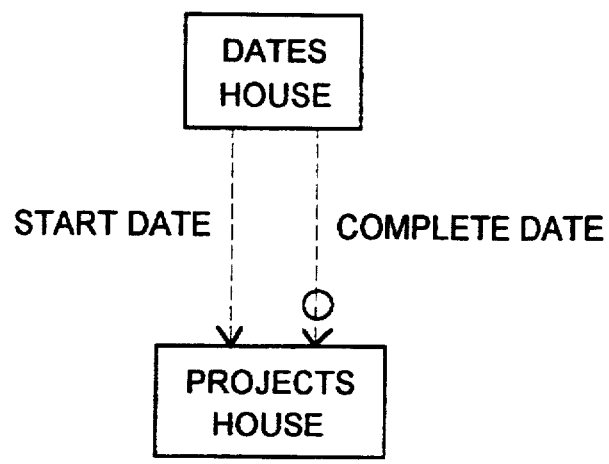

FIG. 132 shows the map of a village comprising a Dates House and a Projects House.

FIG. 133 provides a definition of an optionality function for the Complete-Date Maxi-Cable that connects the Dates House and the Projects House.

FIG. 134 shows the records in the People-House Living Room.

FIG. 135 shows the records in the People-House Living Room that include a field called Age-Band.

FIG. 136 shows the records in the People-House Age-Band Gallery.

FIG. 137 provides definitions of component sets, key sets, basis sets, and dependency sets.

FIG. 138 shows the records in the Forest-Units-House TV Gallery.

FIG. 139 shows the records in the Pens-House Living Room.

FIG. 140 shows the records in the Pens-House Style-Ink Gallery.

FIG. 141 shows the records in the Pens-House Style-Ink-Band Gallery.

FIG. 142 shows the records in the Pens-House Ink Gallery.

Figures 143, 144:
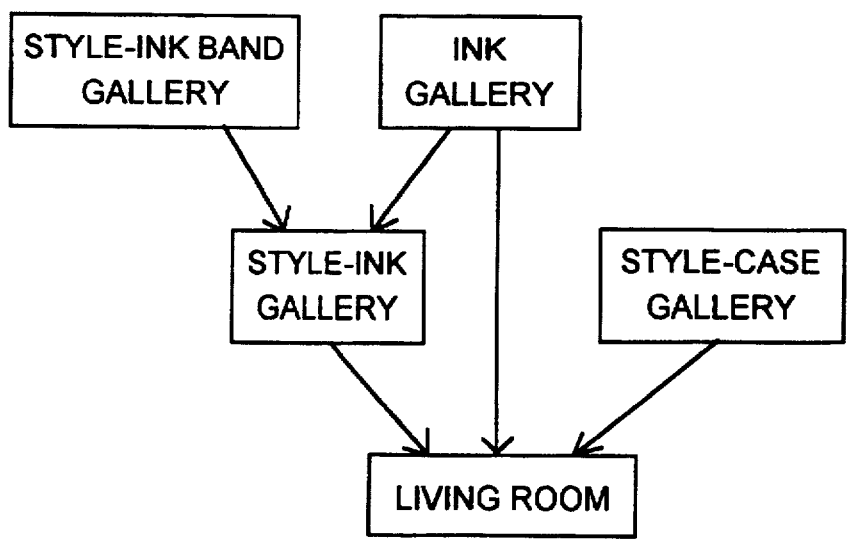

FIG. 143 shows the records in the Pens-House Style-Case Gallery.

FIG. 144 shows the map of the Pens House.

Figure 145:
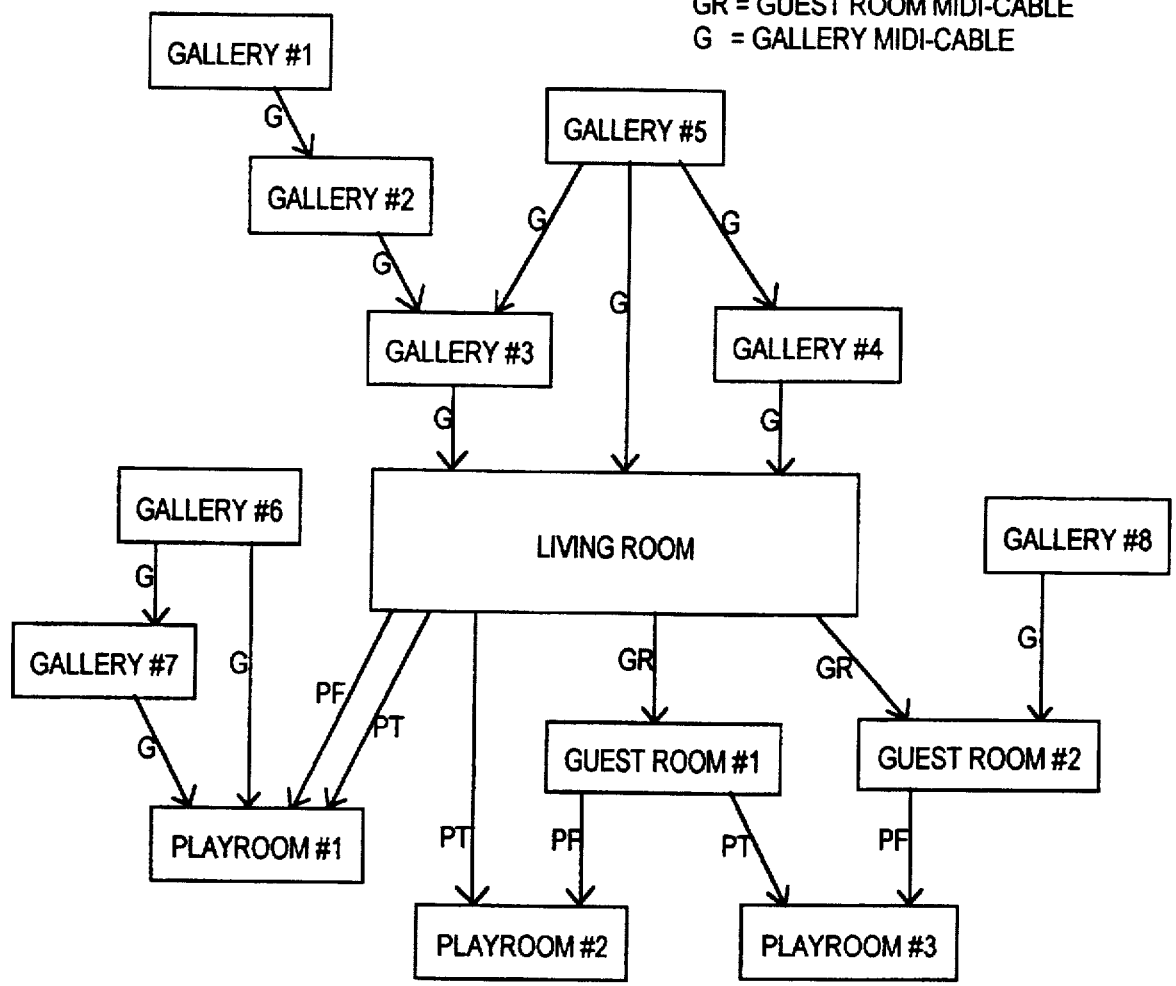

FIG. 145 shows an example of a complex house map.

FIG. 146 shows the results of the various navigational moves from a single fragment and from a fragment set.

FIG. 147 shows examples of lateral navigation moves.

Figure 148:
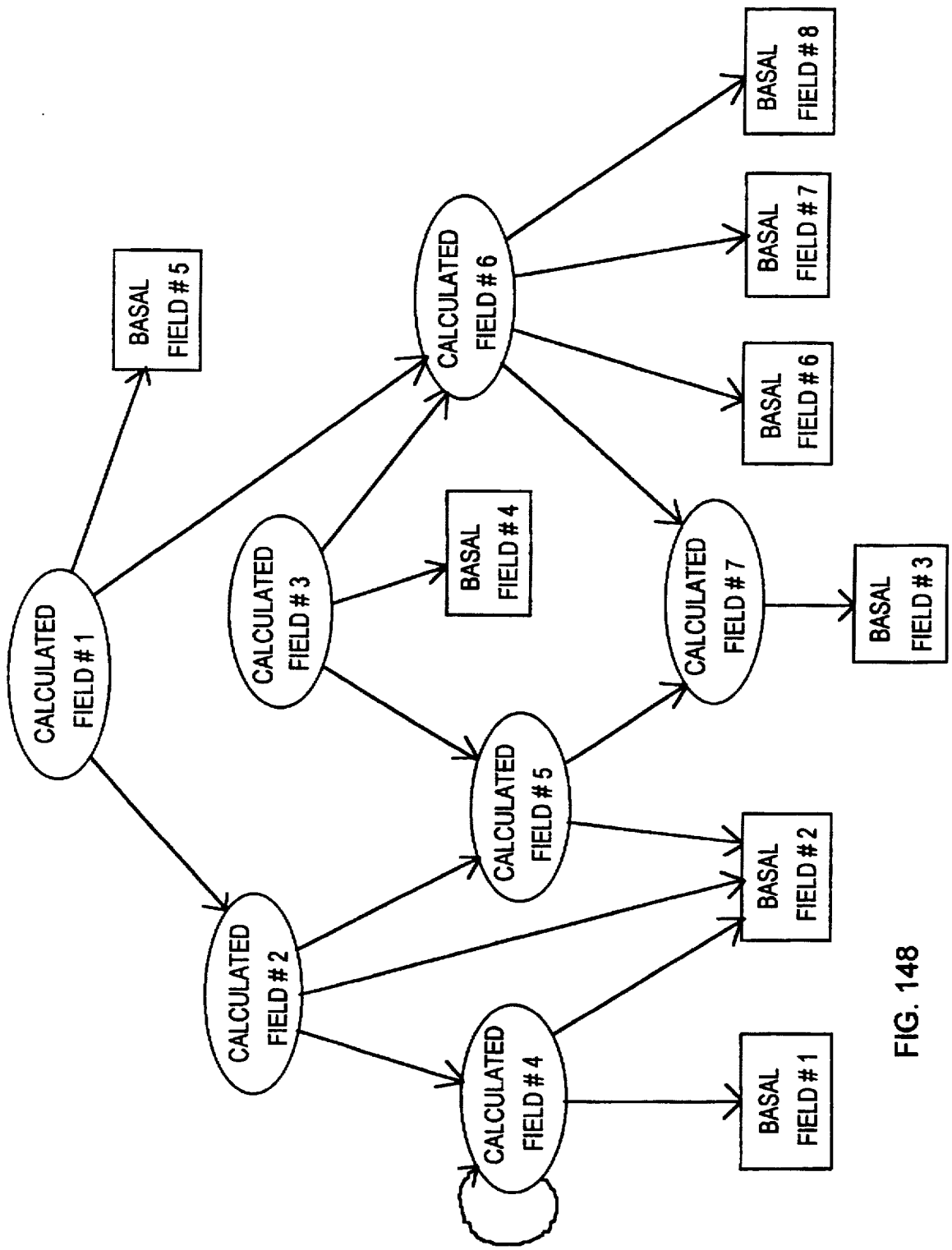

FIG. 148 shows an example of a parameter network.

FIG. 149 shows all the primitive-syntax-elements of the Syntax Definition Language (SDL).

FIG. 150 shows the meta-syntax of the SDL.

FIG. 151 shows the syntax definitions for the top-level defined-syntax-elements of the SDL.

FIG. 152 shows the first group of syntax definitions for the subordinate-level defined-syntax-elements of the SDL.

FIG. 153 shows the second group of syntax definitions for the subordinate-level defined-syntax-elements of the SDL.

FIG. 154 shows the third group of syntax definitions for the subordinate-level defined-syntax-elements of the SDL.

FIG. 155 shows the fourth group of syntax definitions for the subordinate-level defined-syntax-elements of the SDL.

FIG. 156 shows the fifth group of syntax definitions for the subordinate-level defined-syntax-elements of the SDL.

FIG. 157 shows the sixth group of syntax definitions for the subordinate-level defined-syntax-elements of the SDL.

FIG. 158 shows the seventh group of syntax definitions for the subordinate-level defined-syntax-elements of the SDL.

Figure 159:
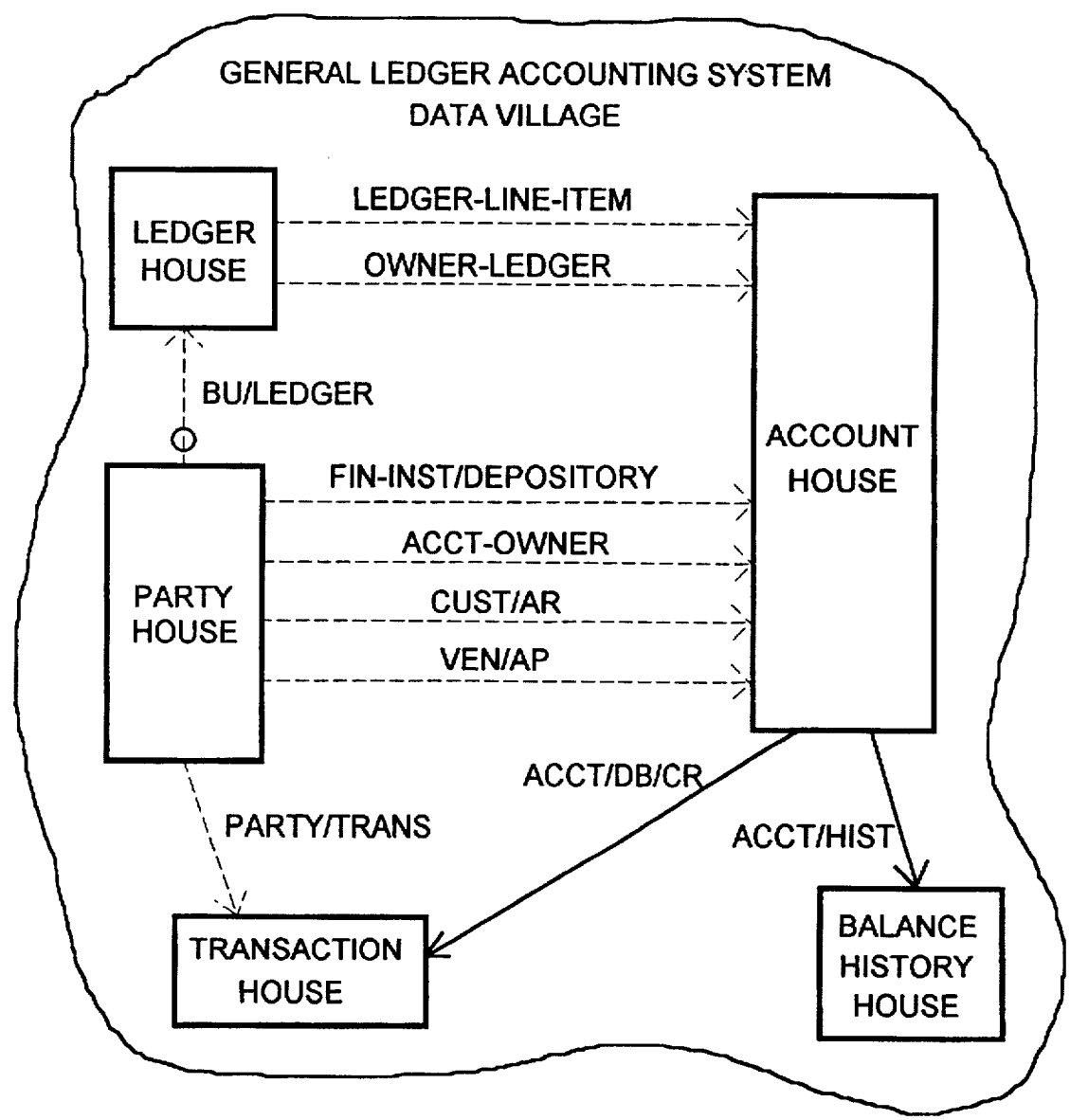

FIG. 159 shows the data village map of the General Ledger Accounting System.

Figure 160:
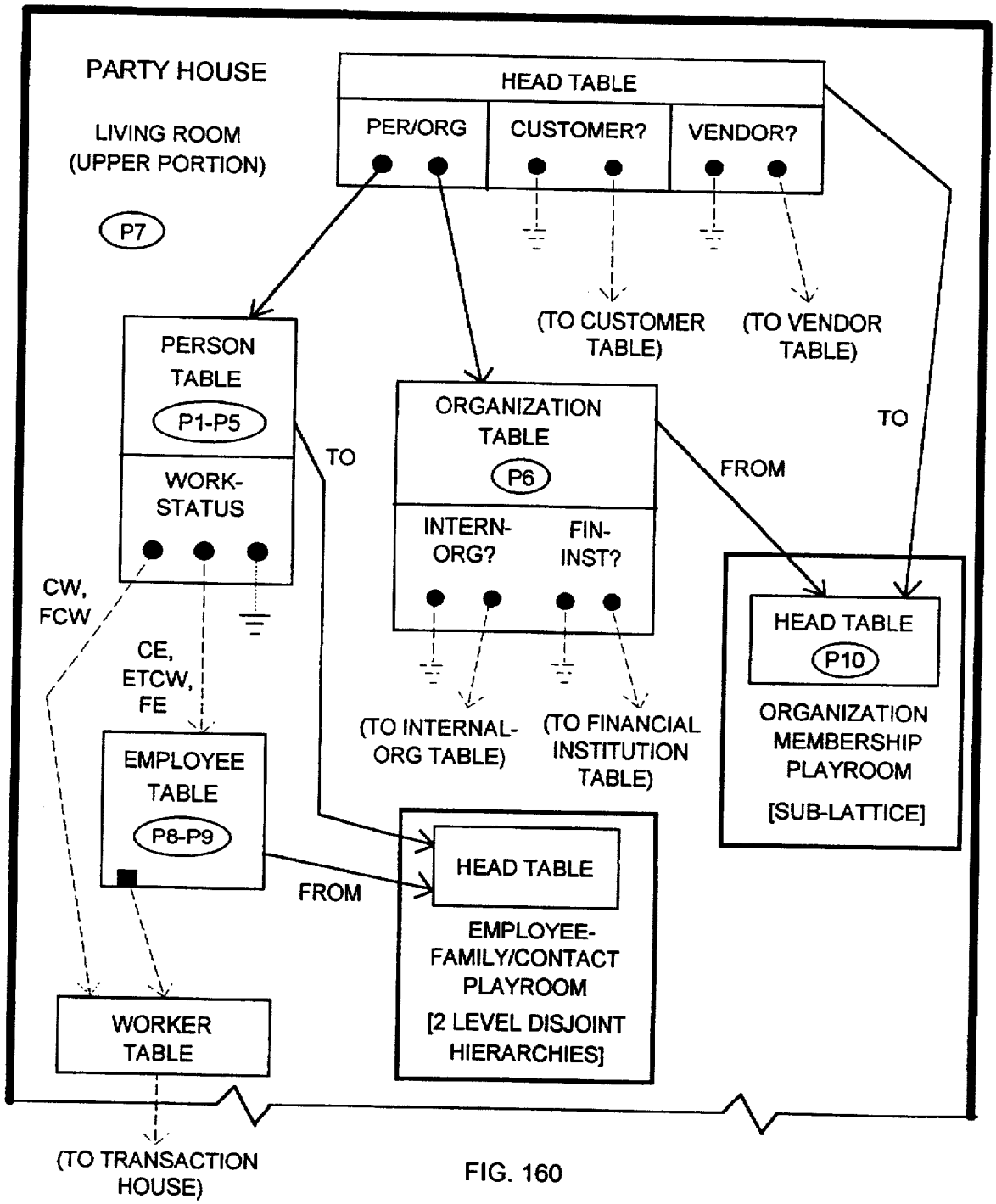
Figure 160:
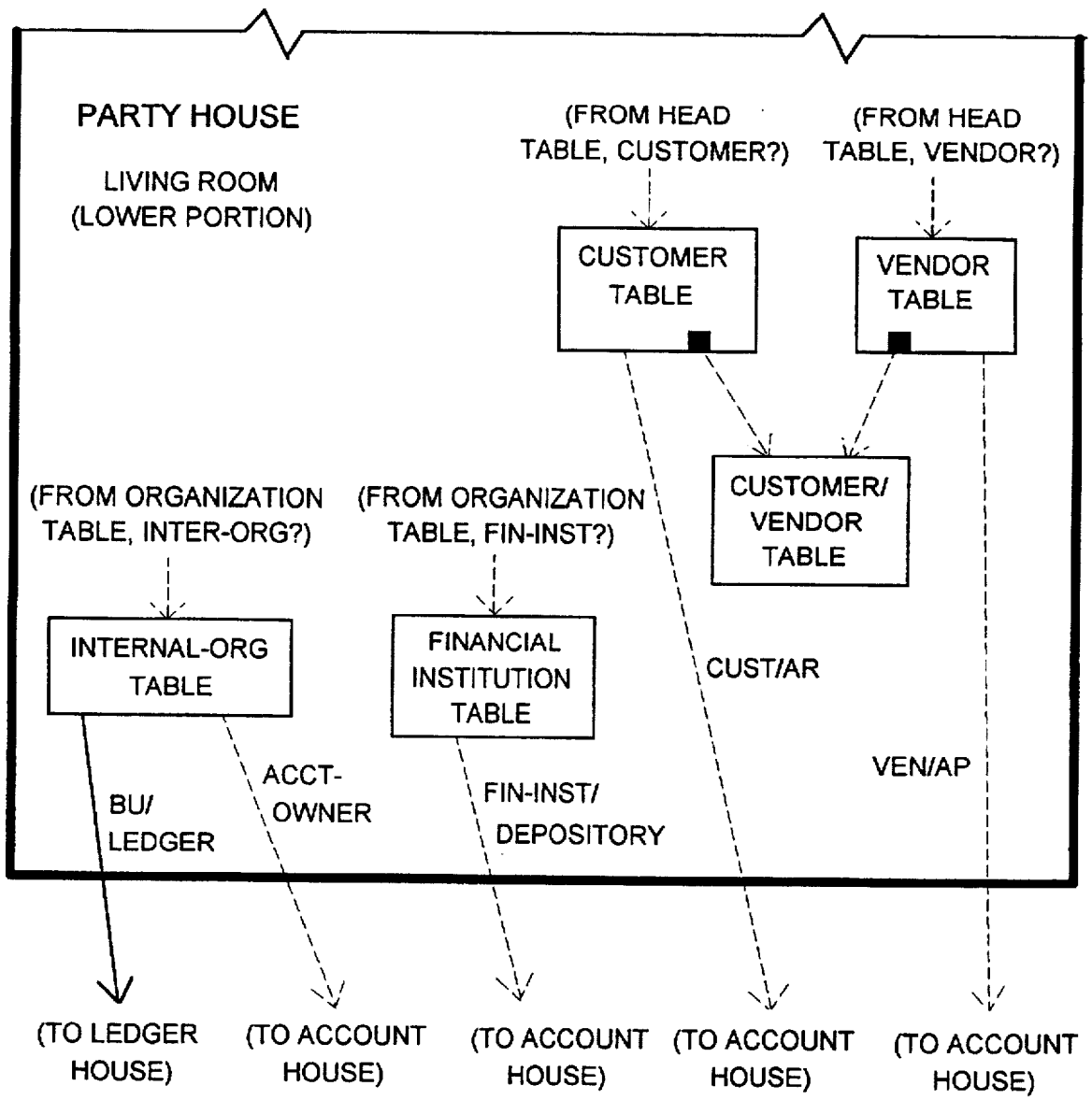

FIG. 160 shows the house/room map of the Party House.

Figure 161:
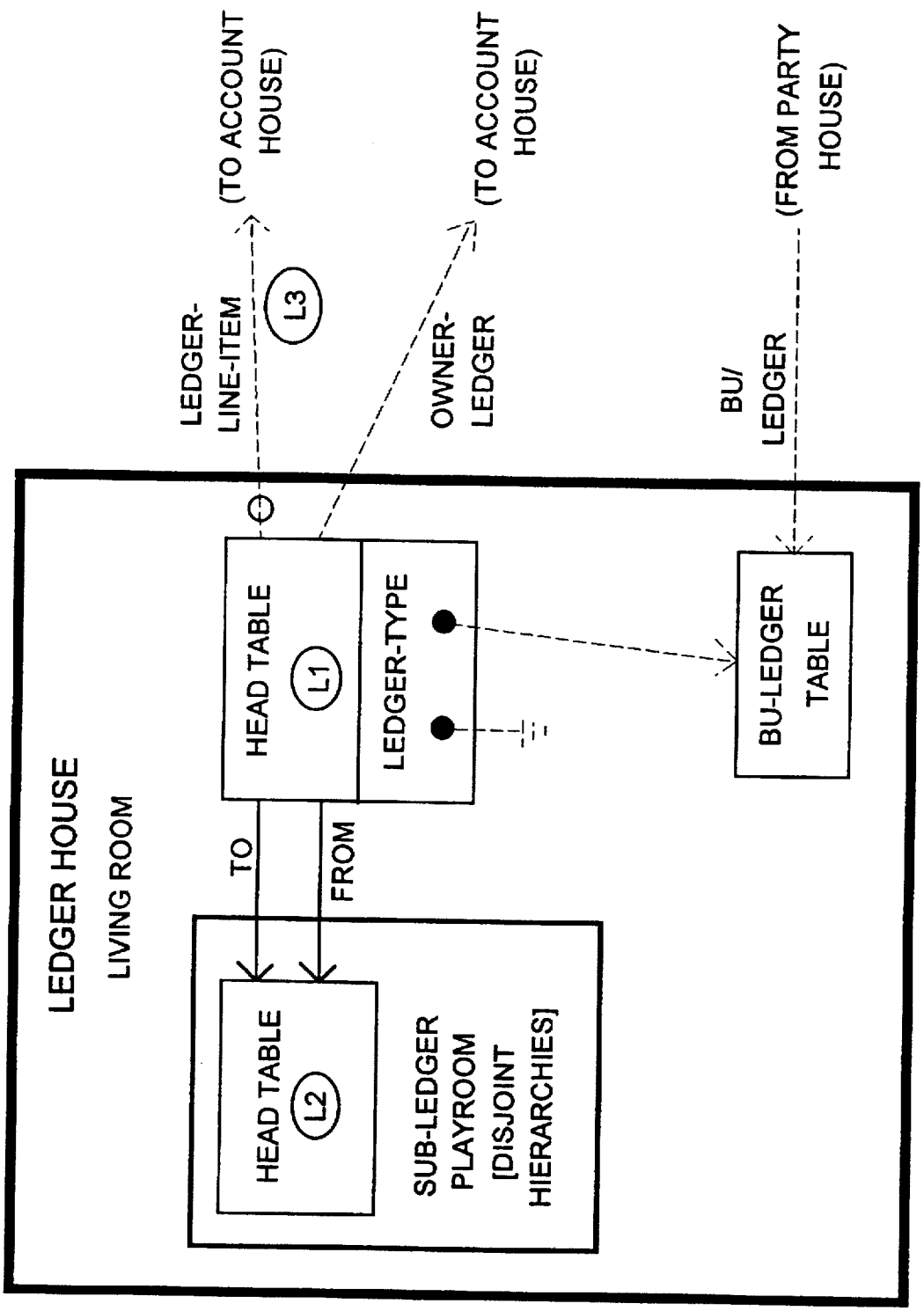

FIG. 161 shows the house/room map of the Ledger House.

Figure 162:
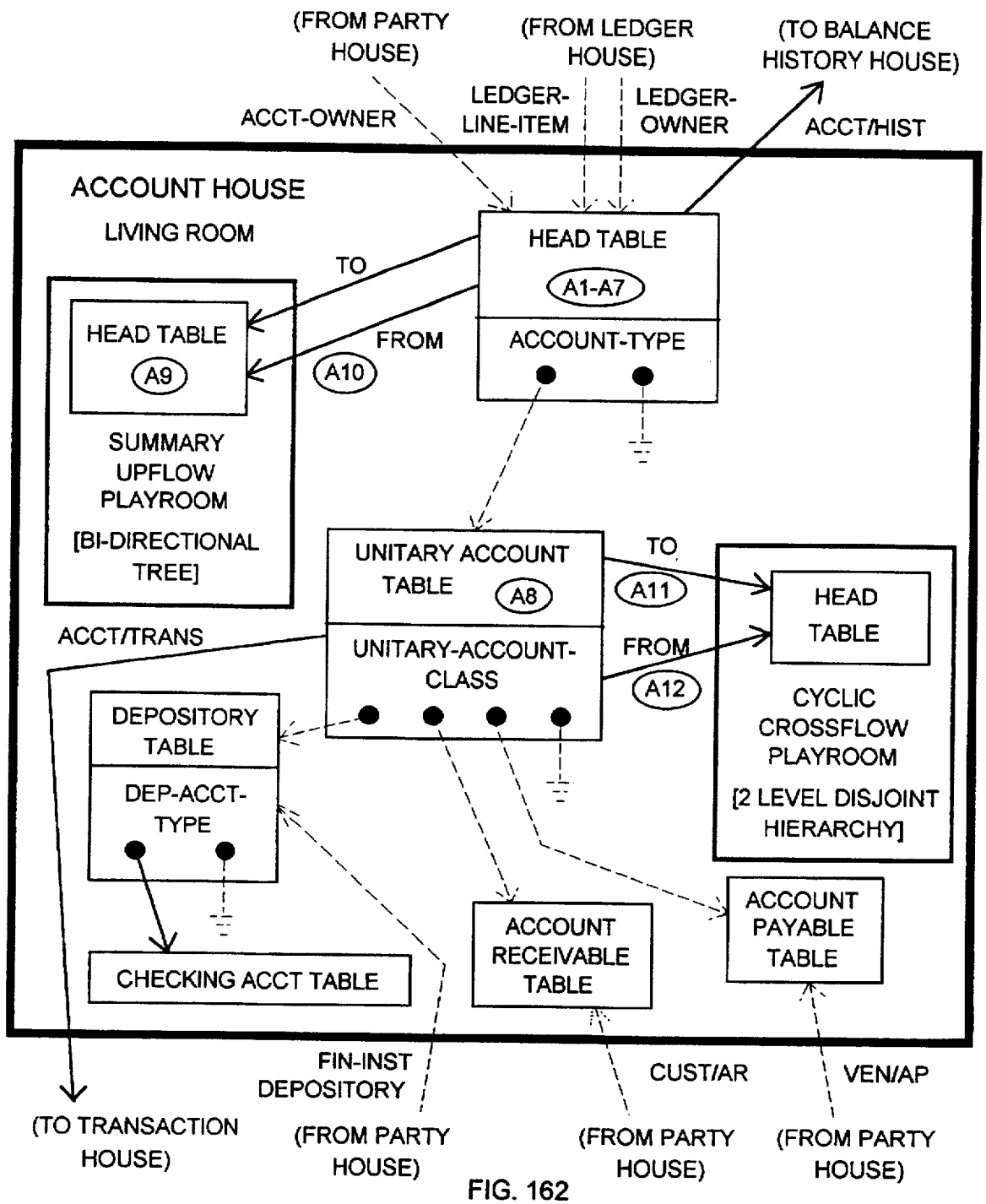

FIG. 162 shows the house/room map of the Account House.

Figure 163:
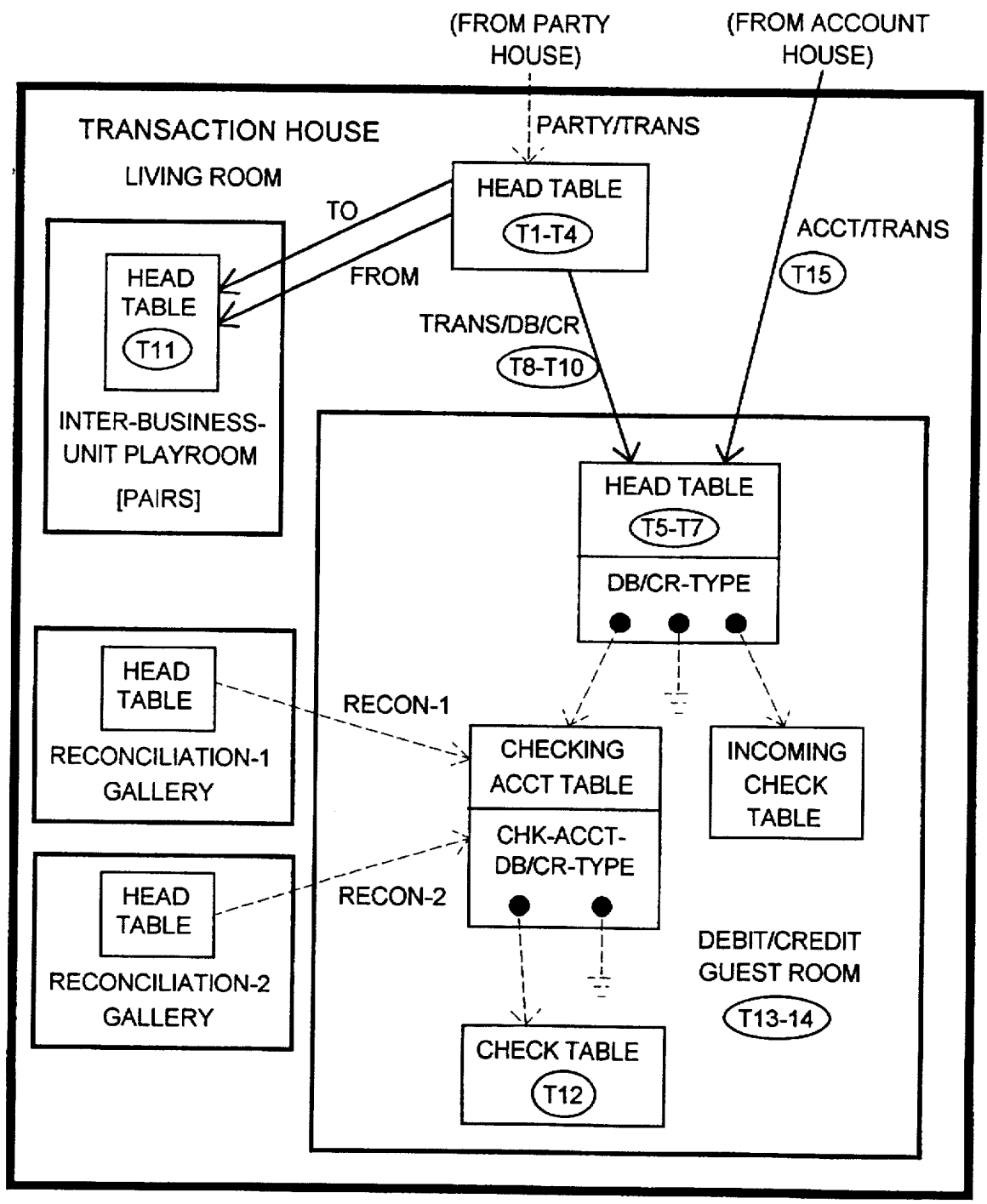

FIG. 163 shows the house/room map of the Transaction House.

Figure 164:
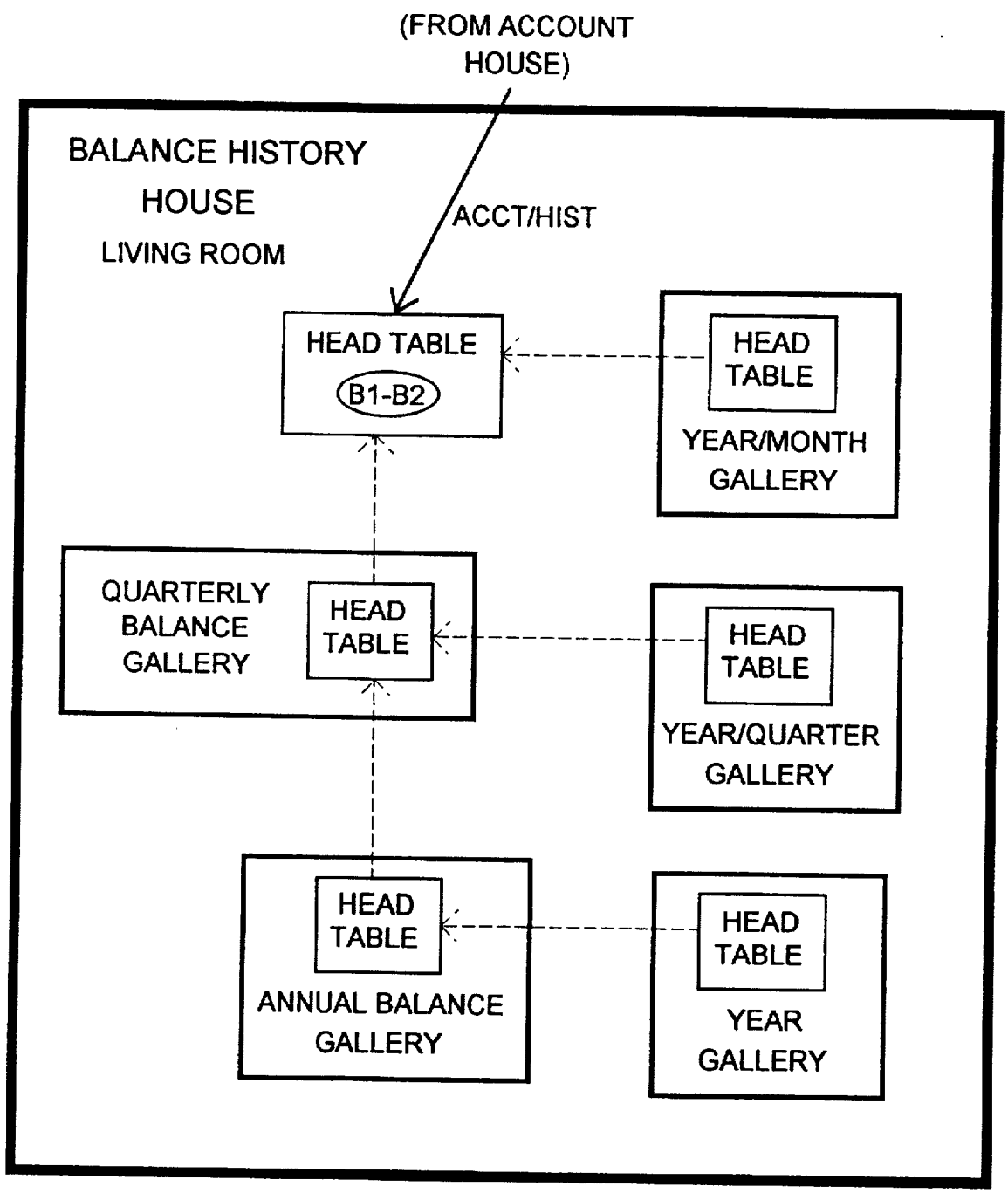

FIG. 164 shows the house/room map of the Balance History House.

FIG. 165 shows the first part of the room definitions of the General Ledger Accounting System.

FIG. 166 shows the second part of the room definitions of the General Ledger Accounting System.

FIG. 167 shows the third part of the room definitions of the General Ledger Accounting System.

FIG. 168 shows the fourth part of the room definitions of the General Ledger Accounting System.

FIG. 169 shows the fifth part of the room definitions of the General Ledger Accounting System.

FIG. 170 shows the sixth part of the room definitions of the General Ledger Accounting System.

FIG. 171 shows the seventh part of the room definitions of the General Ledger Accounting System.

FIG. 172 shows the eighth part of the room definitions of the General Ledger Accounting System.

FIG. 173 shows the ninth part of the room definitions of the General Ledger Accounting System.

FIG. 174 shows the tenth part of the room definitions of the General Ledger Accounting System.

FIG. 175 shows the eleventh part of the room definitions of the General Ledger Accounting System.

FIG. 176 shows the twelfth part of the room definitions of the General Ledger Accounting System.

FIG. 177 shows the thirteenth part of the room definitions of the General Ledger Accounting System.

FIG. 178 shows the first part of the data integrity rule, automatic edit, and warning rule definitions of the General Ledger Accounting System.

FIG. 179 shows the second part of the data integrity rule, automatic edit, and warning rule definitions of the General Ledger Accounting System.

FIG. 180 shows the third part of the data integrity rule, automatic edit, and warning rule definitions of the General Ledger Accounting System.

FIG. 181 shows the fourth part of the data integrity rule, automatic edit, and warning rule definitions of the General Ledger Accounting System.

FIG. 182 shows the fifth part of the data integrity rule, automatic edit, and warning rule definitions of the General Ledger Accounting System.

FIG. 183 shows the Account Master doorway (Doorway #1 of the Account House Living Room).

FIG. 184 shows the General Ledger Transaction doorway (Doorway #1 of the Transaction House Living Room).

FIG. 185 shows the Quarterly Account Balances doorway (Doorway #1 of the Balance History House Quarterly Balance Gallery).

Figure 1:
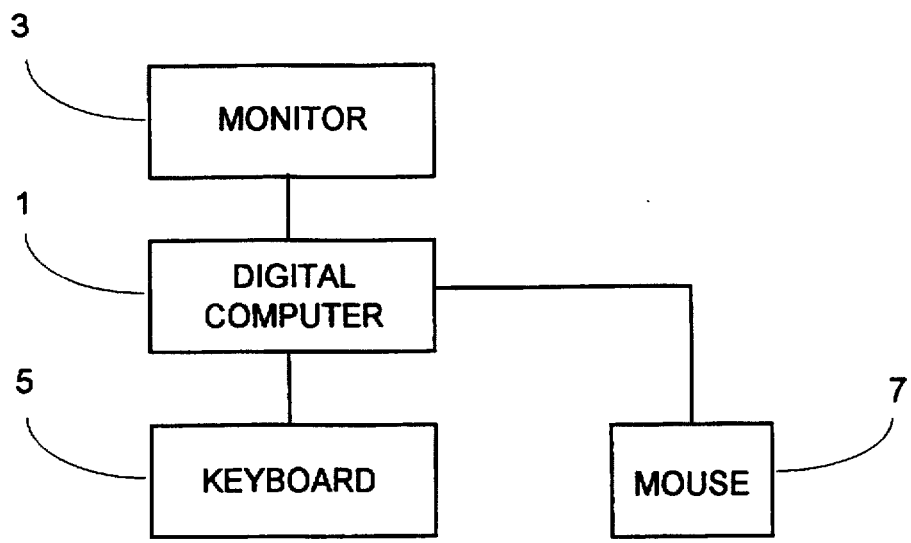
FIG. 1 shows the computer system which provides the means by which a user exercises the functions made available by the Data Village System (DVS).
Figure 186:
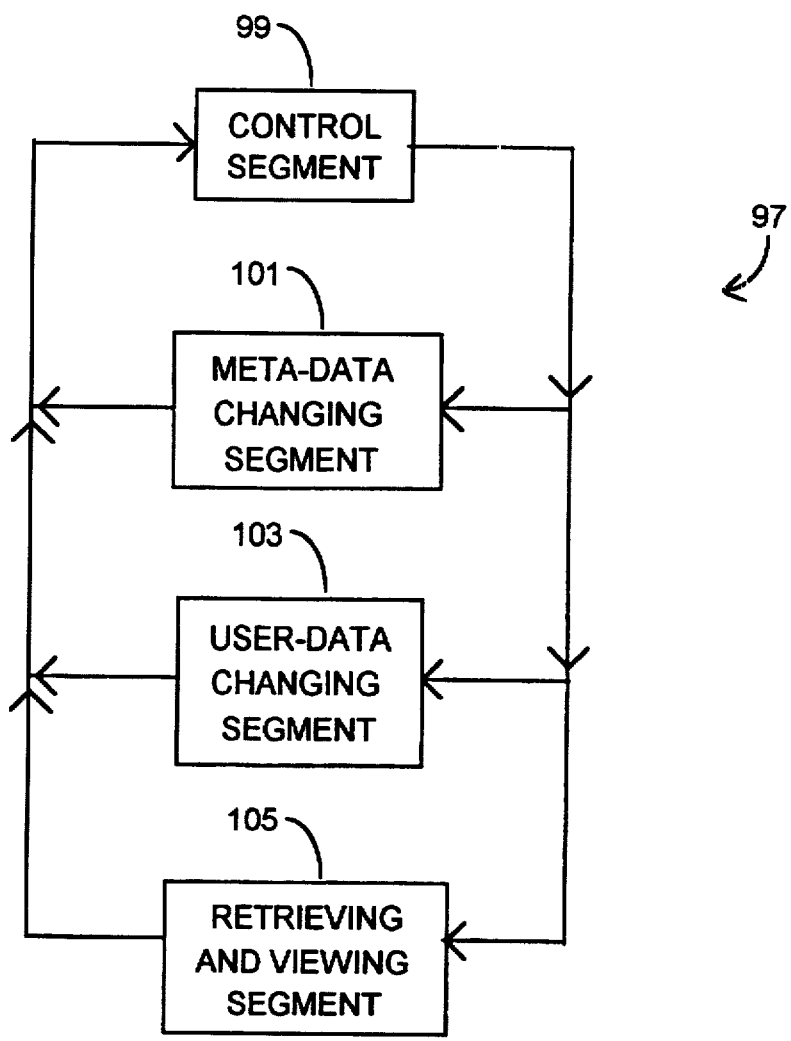

FIG. 186 shows the software which controls the operations of the computer system shown in FIG. 1.

DESCRIPTION OF THE PREFERRED EMBODIMENT

The present invention is a new type of database management system (DMS) called a Data Village System (DVS). The DVS simplifies the application system development process thereby resulting in lower cost, shorter development time, and higher quality application systems. The DVS increases the power that end users have over data thereby enabling them to clearly see interconnections between contextually-related data, to readily explore data, to answer questions about data that have not been pre-defined, to understand the global-enterprise view of data, and to make changes in their processes by modifying and evolving the way that screens work without any risk of changing the underlying structure of the data.

In a DVS, the structure of the data and the rules which the data must obey are explicit rather than implicit. They reside entirely in the data model which is called the "data village". The data village model is always available to the user in an easy to understand graphical form. Application systems can thus be developed simply by declaring the data structures and associated rules in this explicit format. All the declared rules, called dynamic data organization rules, are automatically enforced by the underlying DVS.

In order to achieve this, the DVS provides a rich set of tools for data modeling that go beyond the traditional data model concept of tables and relationships between tables. The DVS readily supports topological graph structures and structures of irregular composition. The DVS supports extremely broad definitions of rules with respect to the data with the philosophy that such rules are a part of the data model itself.

The DVS focuses primary attention on data rather than process. DVSs are "data-driven". Users explicitly see the data structures and rules for the entire enterprise. This fosters "global data awareness".

The DVS makes a clear distinction between two classes of users: Class-1 users who are authorized to alter the data structures and data rules and Class-2 users who are not. Class-2 users may make ordinary use of the system, just as the everyday users of traditional application systems do, but they are not allowed to change the system itself. Class-1 users can additionally change the behavior of the application system by modifying its underlying data structures and rules. Class-1 users must have appropriate high-level authority.

The DVS provides Class-2 users greater power over their data than they would have in a traditional system. These users are permitted to make alterations in the manner in which their data is accessed. However such alterations are automatically kept in total conformity with the underlying data structure and data rules defined by class-1 users. In this way, when an ordinary (class-2) user wishes to explore data in a new way that goes beyond the capability of the existing screens in the application system, he or she is empowered to do it by creating new screens. If an employee discovers a better way to perform a process that requires an associated change in the information system, then he or she can go ahead and make the change, assuming it does not require changing the data structures or rules. And if it does, then the cooperation of a class 1 user is required.

The means by which a user exercises the functions made available by the DVS is the computer system shown in FIG. 1. The computer system comprises a digital computer 1, a monitor 3, and either a keyboard 5 or a mouse 7 or both as a means by which the user interacts with the computer system. The DVS is the software component of the computer system which instructs the digital computer in the performance of the desired functions in accordance with the external inputs supplied by the user.

The data in the DVS is of three kinds: (1) structural "meta-data", (2) access "meta-data", and (3) "user-data". Structural meta-data defines the structures and dynamic data organization rules within which user-data must exist (i.e. the data model), and it resides in the data village. Access meta-data defines the manner in which user-data may be accessed or viewed, and it resides in "doorways". An individual "doorway" is a particular package of access meta-data which gives the user access to viewing, inserting, modifying and deleting user-data. User-data is ordinary data. The creation and management of user-data is the ultimate purpose of the application system.

Only Class-1 users can create, modify or delete the structural meta-data in the data village. Class-2 users may insert, modify and delete user-data. In the event that the user attempts a database trasaction that would result in the user-data violating the structure defined by the structural meta-data, the DVS will reject the transaction and give the detailed reason (or reasons) for the rejection to the user. Data integrity is thus ensured.

Class-2 users are given an additional power however. They may make modifications to the doorways themselves (i.e. the access meta-data, as opposed to user-data). The DVS ensures that such modifications will never have any effect on the underlying structural meta-data in data village. Nor will they corrupt any user-data. Thus, Class-2 users are permitted to create, modify and delete their own doorways.

The structural and access meta-data is organized by the DVS in such a manner that it is possible to make a formal definition of context which will be described later. The DVS ensures that in any doorway, the data is displayed in its proper context.

Figure 2:
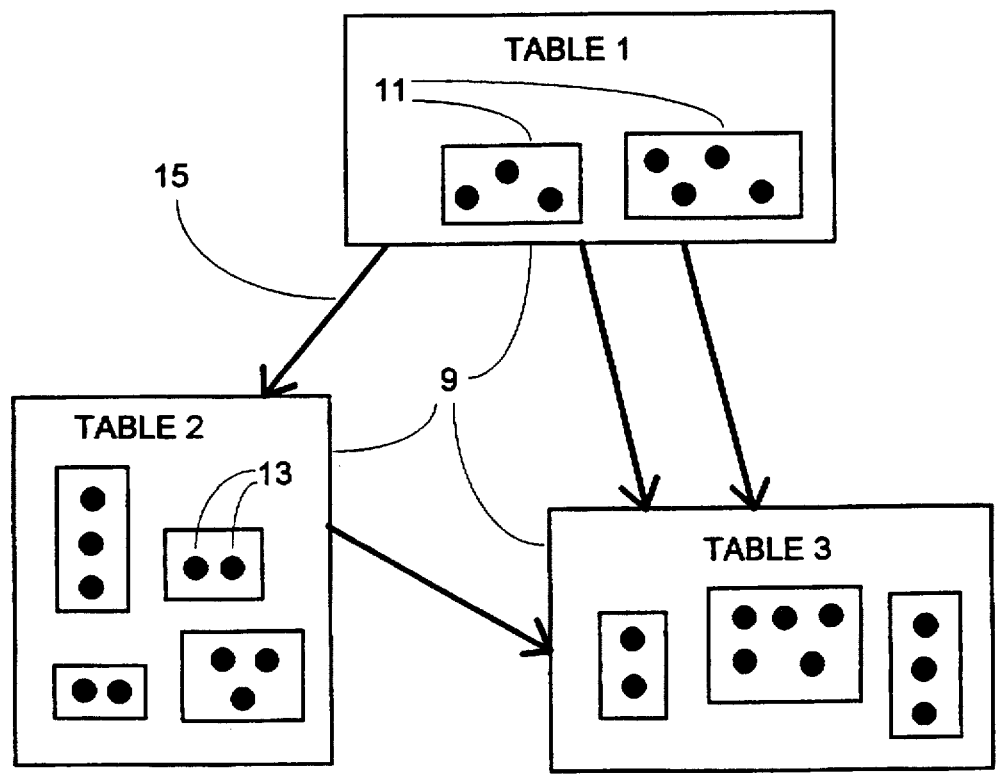
FIG. 2 shows a Data Village System in its simplest form consisting of tables, compartments within tables, datums within compartments, and cables interconnecting tables.

The DVS data organization is illustrated in FIG. 2. It consists of a set of "tables" 9 which are subdivided into "compartments" 11. The "datums" 13 which comprise the user-data are placed in the compartments 11. The datums in a compartment are "associated" with each other. The datums in a table are "related" to each other. Tables are interconnected by cables 15. A cable represents a manner of "linking" datums in a compartment of one table to those in a compartment of another table. A compartment which is subdivided into "fields" is called a "partial record".

It is convenient to use a metaphor in describing the DVS data organizational structure. The metaphor begins with the "data village" 17 shown in FIG. 3 which includes all of the data that pertains to an enterprise. In the data village, there are "houses" 19. A house contains all the data in a particular category. For example, a house called "People" might contain data pertaining to the people associated with the enterprise.

Inside the houses there are "rooms" representing different aspects of the data in the house category. Rooms are of four types: "living rooms" 21 which contain the basic data in the house, "galleries" 23 which contain summary data, "playrooms" 25 which contain topological graph data indicating linkages among the basic data, and "guest rooms" 27 which contain additional data which will be described later. Every house contains exactly one living room. The other rooms are optional and may occur in any number in any house. For example, the living room of the People house might contain the names, ages, addresses, phone numbers, and incomes of people. A playroom might define relationships between people, such as who is the boss of whom and who is a customer of whom. A gallery might group the people into different age bands and summarize the total income within each age band. Additional playrooms and galleries might also be defined in the house.

Data in rooms are organized in "records" containing pluralities of datums. The datums in records are organized in "fields". In the simplest case, all the records in the room share the same fields. In this simple case, there is a single table in the room called the head table 29. The data in a typical table 31 is organized in columns called fields 33 and rows called "partial records" 35 as shown in FIG. 4. Each partial record contains one datum 37 for each field in the table. For example, in the People House living-room head table, the fields might be called Name, Age, Address, City, State, Zip-code, Phone, and Income. Each partial record in a table has a datum in each field. For a particular partial record in the People House living-room head table, the datums might be: "Brown, John", "45", "12345 Wilshire Bl.", "Los Angeles", "CA", "90024", "310-472-0789", and "$67,900". In the simple case of a room containing only a single table, the terms "record" and "partial record" are used interchangeably.

Figure 3:
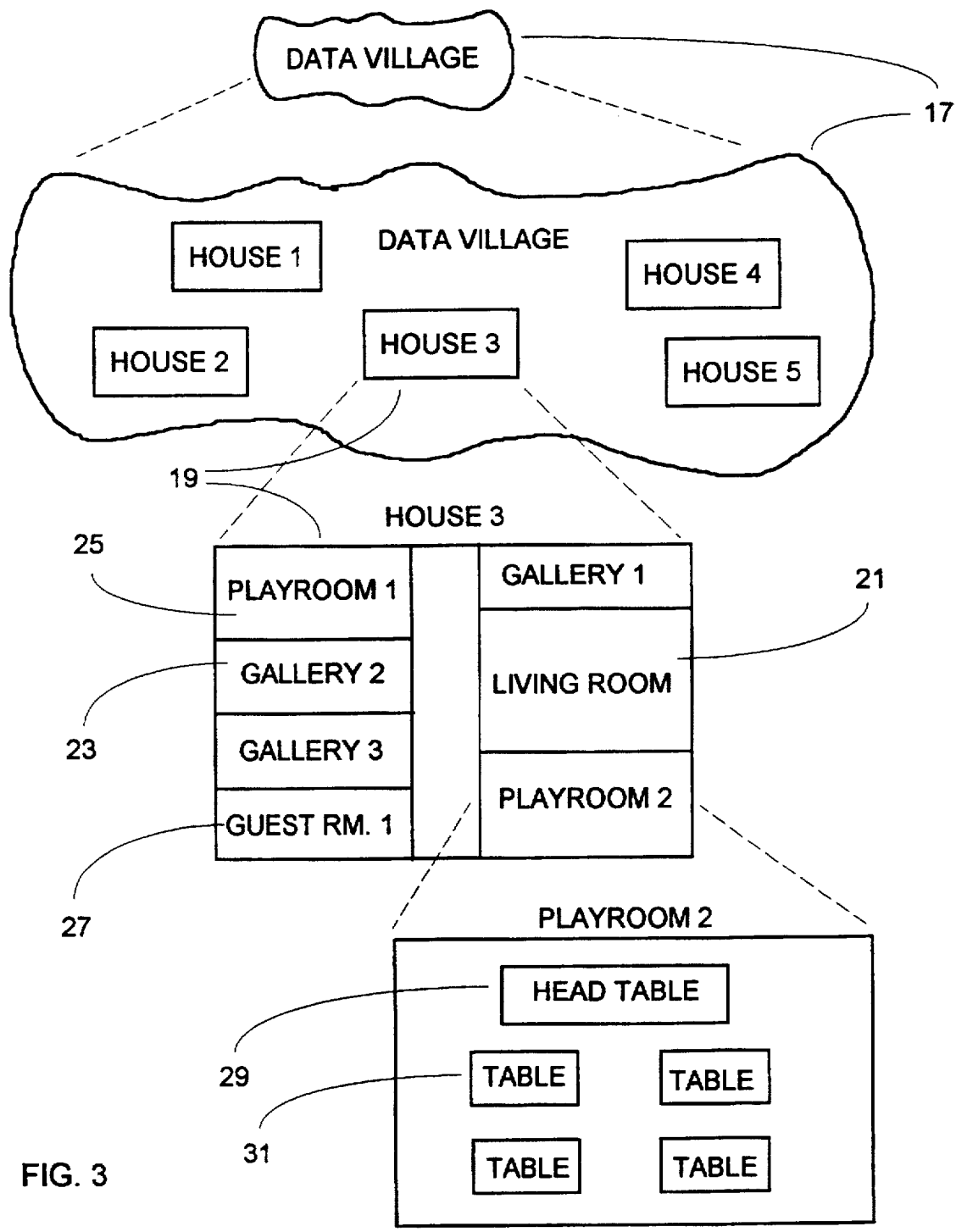
FIG. 3 shows a data village and how it is broken down into houses, how the houses are broken down into rooms, and how the rooms contain tables.

However, it is often desirable for records to vary in their field structure, in that the fields in one record may be different than those in another. This is achieved by placing multiple tables in the room, only one of which is the head table 29, the other tables being "non-head tables" 31 as shown in FIG. 3. The head table 29 contains fields that are common to all the records in the room. The other tables 31 contain fields utilized only by some of the records. For example, in the People House living room it would be useful to distinguish people who are employees from people who are customers. In addition to the Head Table, there would be an Employee Table with fields such as social-security-number, hire-date, and job-title, and there would be a Customer Table with fields such as credit-card-number, last-order-date, and total-purchases. The Head Table must additionally contain a field indicating whether or not the person is an employee, and a field indicating whether or not the person is a customer. A person could thus be an employee, a customer, both or neither, with only the appropriate fields existing in the person's record. So, for example, if a record represents an employee (but not a customer), it would consist of two partial records: one from the Head Table, and one from the Employee Table.

The number of partial records in a table will usually be very large while the number of fields will be relatively small. The number of partial records will usually change quite regularly, while the number of fields will change infrequently. Inserting or deleting a partial record entails inserting or deleting all of the datums in its assigned row while inserting or deleting a field (done much less often) entails inserting or deleting all of the datums in its assigned column.

Figure 5:
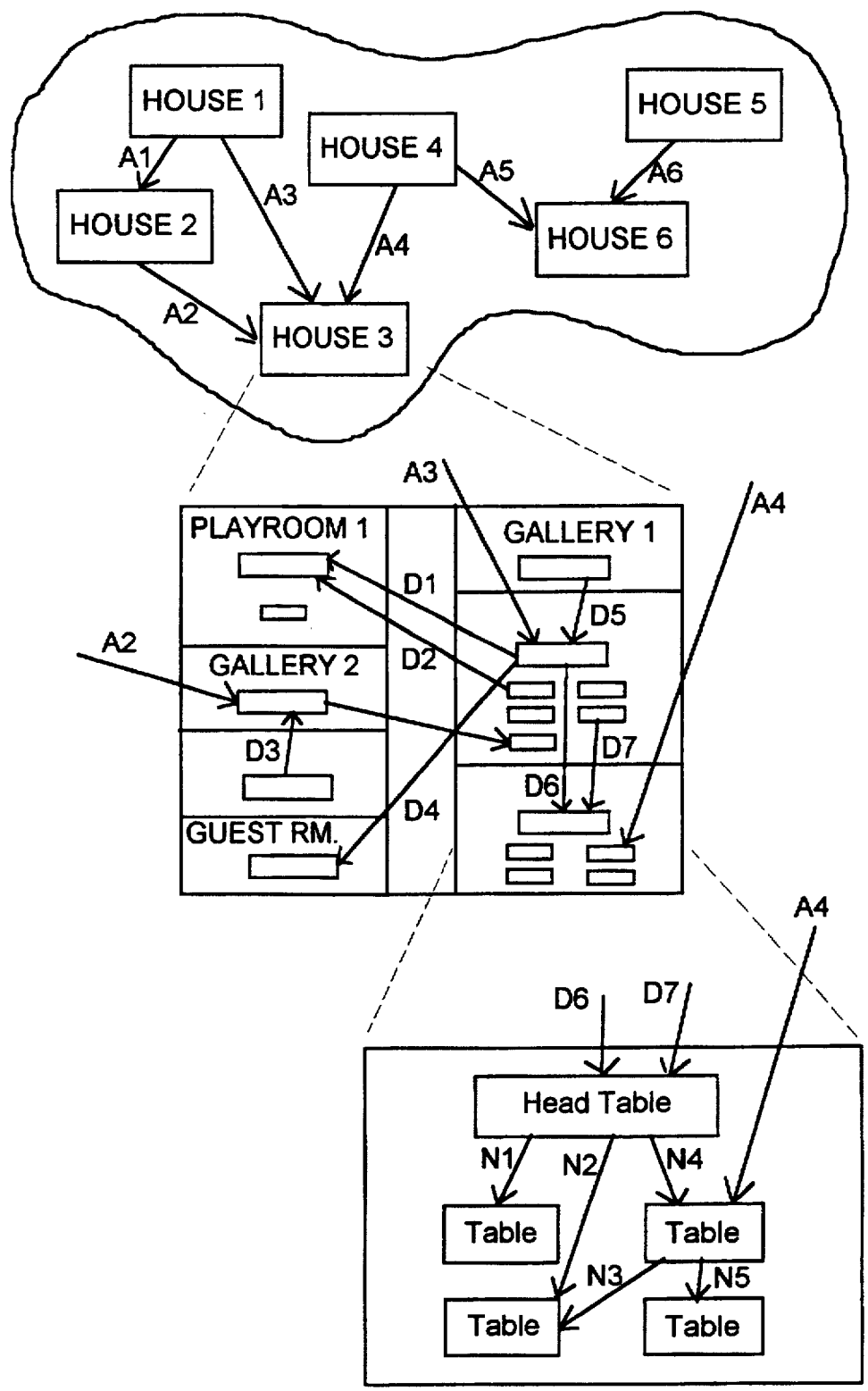
FIG. 5 shows a portion of FIG. 3 but with maxi-cables, midi-cables, and mini-cables added.

Tables may be connected together by cables a1, a2, ..., a6 as shown in FIG. 5. Each cable connects one table, called its parent table to another table, called its child table. A cable is denoted by an arrow pointing from its parent table to its child table. Cables are of three types: maxi-cables, midi-cables, and mini-cables. A cable connecting two tables in different houses is a maxi-cable as for example cables a1, a2, ... a6. A cable connecting two tables in the same house but in different rooms is a midi-cable as for example cables d1, d2, ..., d7. Any cable connecting two tables in the same room is a mini-cable as for example cables n1, ..., n5. When a table is the child table of a cable, the cable is said to be an incoming cable to the child table. When a table is the parent table of a cable, the cable is said to be an outgoing cable from the parent table.

Figure 6:
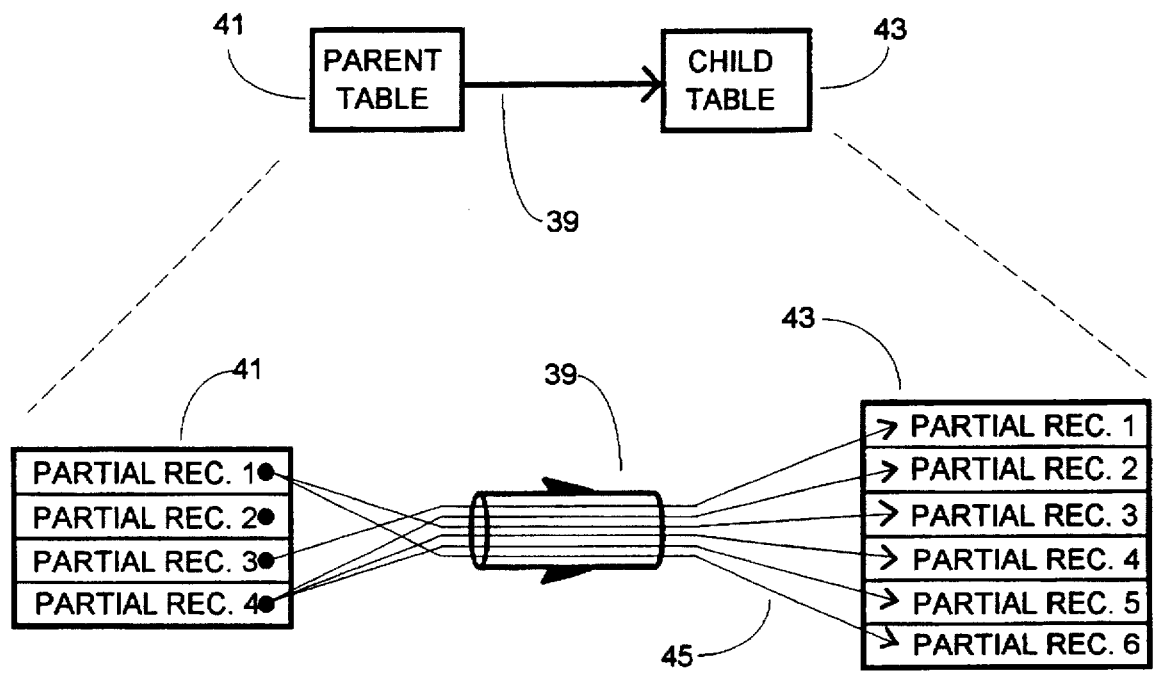
FIG. 6 shows a parent table and a child table interconnected by a cable and how the cable contains wires connecting the partial records in the parent table to the partial records in the child table.

In FIG. 6, a single cable 39 is shown linking a parent table 41 to a child table 43. The view is expanded to show the partial records in the parent table 41 linked to the partial records in the child table 43 by wires 45 in the cable 39. Each wire connects a partial record in its cable's parent table to a partial record in its cable's child table. Cables provide pathways for the connection of partial records in different tables. Wires make the specific connections between pairs of partial records. Rules for wiring partial records vary according to the type of cable, but it is always the case that a partial record in the child table of any cable can have at most one wire connection in that cable, thus establishing a one to many relationship from parent to child. No partial record may be deleted from the parent table of any cable if it is connected to any wires in that cable.

A cable can be optional or required. Referential integrity is assured by requiring that the insertion of a partial record into a child table of any required cable is preceded by the selection of a parent-table partial record that is to be wired to the child-table partial record.

Wires in maxi-cables represent interconnections of data between the different house categories. Wires in midi-cables represent interconnections of data used to define topological graph and summary structures. Wires in mini-cables, are used to define which partial records belong to each record in a room.

Figure 7:
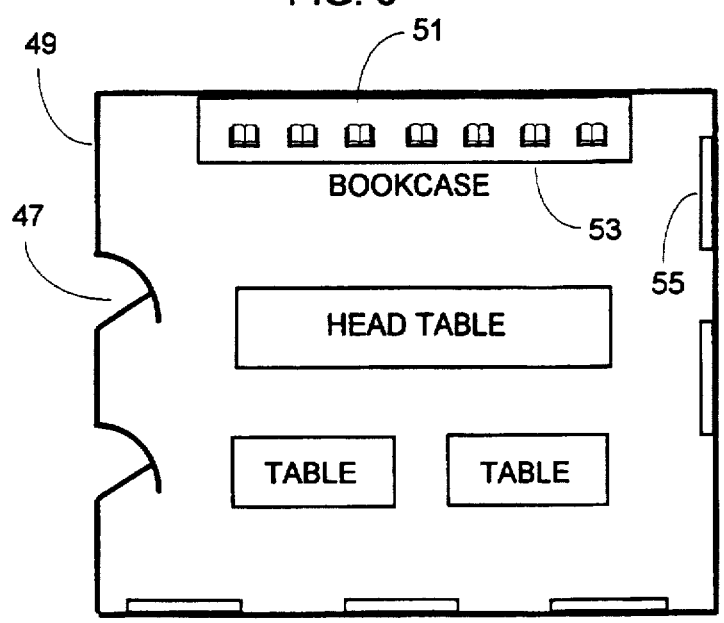
FIG. 7 shows a room and how the room contains (in addition to tables) a bookcase with catalogs, doorways, and paintings.

There can be any number of doorways 47 into a room 49 as illustrated in FIG. 7. As we have already mentioned, a room contains a head table and any number of other tables (except that a gallery can only have a head table). Within a room, there can be any number of "catalogs" 51 in a "bookcase" 53, and there can be any number of "paintings" 55 on the room's walls. Doorways provide users with a powerful and flexible means for accessing the records in a room with complete assurance that the underlying structure of the data will be automatically maintained in accordance with all the data organization rules. Users can control the order of the records displayed (via catalogs), the layout of a display (via paintings), the subset of the records in the room that are displayed or highlighted (via "filters" and "tags", to be described later), and they may explore contextual connections between data in one room and another (via "markers" and "doorway networks", also to be described later).

User-data comprises datums, wires, partial records and records. Access meta-data comprises doorways, catalogs, paintings, filters, tags, markers, doorway networks, and any other structures that influence the way that user-data is accessed but have no influence on the values of the user-data. Structural meta-data comprises the data village, houses, rooms, tables, fields, maxi-cables, midi-cables, mini-cables, and any other meta-data structures that influence the values of the user-data.

Each room contains a single "desk." The desk is a storage place for a "room map" and a set of "dossiers." The room map shows how the tables in the room relate to one another. The dossiers hold formulas for specifying calculations involving the room's data.

Some fields contain datums that can be input by the user. The datums in other fields cannot be input or changed directly by the user because their values are calculated from other existing datums. For example, the datums in a field called "cost" might be calculated by multiplying the datums in a field called "quantity" times the datums in a field called "unit price". Such a calculation is defined in a dossier. A dossier shows how the datums in one field are calculated from datums in other fields (in the same or other tables). Thus, a dossier establishes an interrelationship between the datums in the fields involved.

Figure 8:
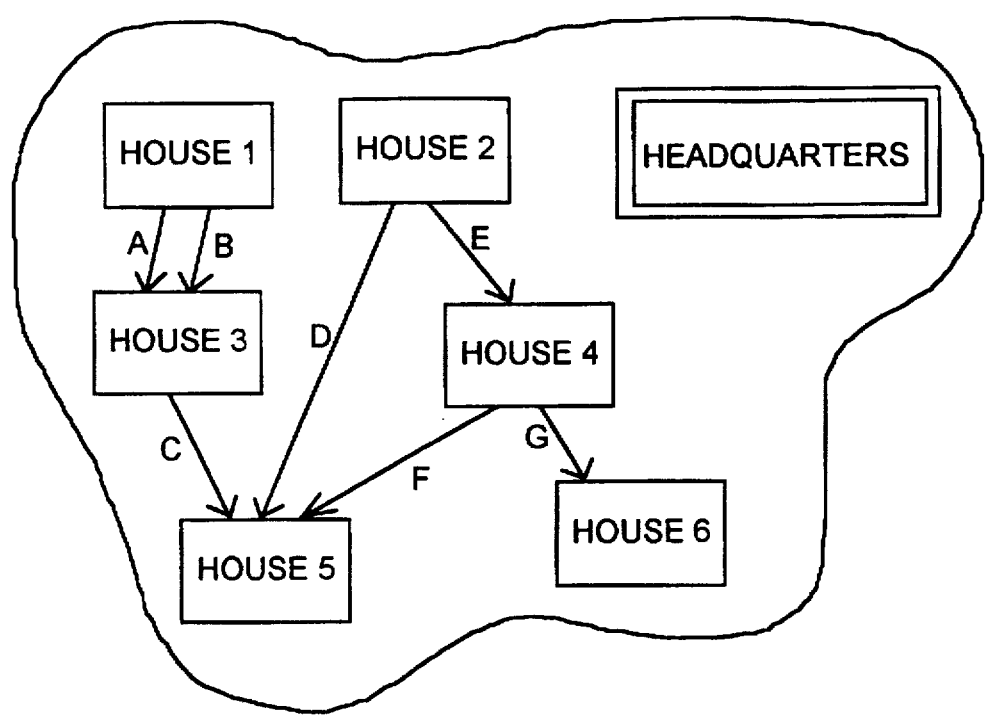
FIG. 8 is an example of a village map.

As indicated above, houses in the data village are interconnected by maxi-cables. The "village map" shows the houses (without detailing the rooms or tables inside the houses) and the maxi-cables interconnecting the houses (without detailing what rooms or tables the maxi-cables connect to), as shown in FIG. 8. Each house and each maxi-cable are given a unique name on the village map.

The village map is actually a topological graph of nodes (houses) and links (maxi-cables). No directed loops are allowed in the village map (i.e. it is not possible to traverse a sequence of maxi-cables in the proper directions, from house to house to house, and return to the starting point.

The village map, together with other information to be discussed later, is stored in the headquarters building. Although the headquarters building is present in all data villages, it will not be shown in the village maps that will subsequently be discussed.

Figure 9:
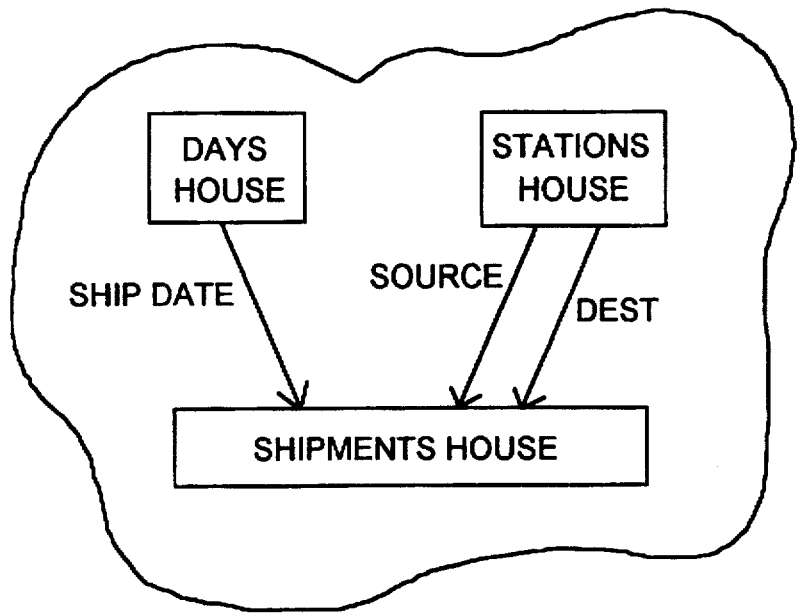
FIG. 9 is the village map for the Transportation Services Organization.

As an example of a simple data village, consider a Transportation Services organization within a large plant that is responsible for the transport of goods between various places in the plant called "stations." A "shipment" represents the movement of an individual package from one station to another. A log is kept of each business "day" that the Transportation Services organization is active. There are three houses in the data village: the Stations House, a Shipments House, and a Days House, as shown in FIG. 9.

The Stations House contains data on each of the stations within the plant: its station number, building number, and manager. The Shipments House contains data for each individual shipment of a single package: the order number, the weight of the package, the cost of the shipment, and a description of the package. The Days House contains the date, number of carriers on duty, and the weather for each day that the Transportation Services Organization is active.

Note that the Shipments House does not contain the day of the shipment, nor does it contain either the station from which it is to move or the station to which it is to move. This information is brought into the shipment via its incoming maxi-cables.

There are three maxi-cables. The Ship-Date Maxi-Cable runs from the Days House to the Shipments House. The From Maxi-Cable and the To Maxi-Cable run from the Stations House to the Shipments House. A wire in the Ship-Date cable indicates the day on which a shipment is to be shipped. A wire in the From cable indicates the source station from which the shipment is to be shipped. A wire in the To cable indicates the destination station to which the shipment is to be shipped.

The Days House and the Stations House are both independent of the other houses because they have no incoming maxi-cables. This means that their data makes sense by itself. The Shipments House, on the other hand, is dependent upon the data in the houses to which it is connected by incoming maxi-cables. This means that the shipment data does not make any sense without the context of the maxi-cables from the other two houses.

Before proceeding with this example, we need to describe how data is structured into a table.

Each datum is characterized by a "datum type" which determines the nature and size (in bits) of the datum. Datum types may be constructed from the following datum type families by specifying certain parameters to define a particular datum type which is a member of the family. The following datum-type families are included in the DVS:

"integer"—a datum type family where the values of the datums are integers and where each member datum type has a particular number of storage bits and a signed flag;

"rational real"—a datum type family where the values of the datums are real numbers (that are accessible via standard binary numeric representations) and where each member datum type has a particular number of storage bits (total), an exponent size (in bits), and signed flags for both the mantissa and exponent;

"rational complex"—a datum type family where the values of the datums are complex numbers with real and imaginary components and where each member datum type has a particular number of storage bits broken down as a pair of reals;

"character"—a datum type family where the values of the datums are textual characters and where each member datum type has a particular number of storage bytes (usually one), and an associated character set (e.g. ASCII);

"enumeration"—a datum type family where the values of the datums are particular words or phrases and where each member datum type has a particular number of storage bits and an associated list enumerating the allowed words or phrases in a particular order;

"Boolean"—a datum type family where the values of the datums are Booleans (true/false);

"subtype"—a datum type family where each member datum type is associated with some ordinal datum type and defines a subrange of that type by specifying a lower bound and an upper bound;

"band"—a datum type family where each member datum type is associated with a particular band function and stores as its values the values of that band function;

"set"—a datum type family where each member datum type is associated with some ordinal datum type and where the values of the datums are sets whose members can only be values of that associated datum type;

"array"—a datum type family where each member datum type is associated with two other datum types (one of which must be an integral subtype) and defines an array, indexed on that subtype, with values in each element of the array having the other associated datum type;

"string"—a datum type family where each member datum type is associated with some character datum type and where the values of the datums are character strings defined on that character type and whose maximum length is specified;

"date"—a datum type family where the values of the datums are dates and or times and where each member datum type specifies a granularity (i.e. millisecond, minute, day, week) and lower and upper bounds.

An ordinal datum type is a datum type which has a standard order to its datum values. Datum type derived from the datum type families integer, real, character, enumeration, Boolean, and date are all ordinal datum types.

An integral datum type is a datum type which is in one-to-one correspondence with a subset of the integers. Datum types derived from the datum type families integer, character, enumeration, and Boolean are all integral datum types.

Each datum also is characterized by "datum origin". A datum origin can be either "basal" or "calculated." Basal data is original source data which can be entered and changed by users. Calculated data is data that is automatically calculated by the system from basal data and from other calculated data and which cannot be entered or changed by users.

Within any field all of the datums must have the same datum type and datum origin. The field is thereby characterized by the same two terms.

Figures 10, 11:
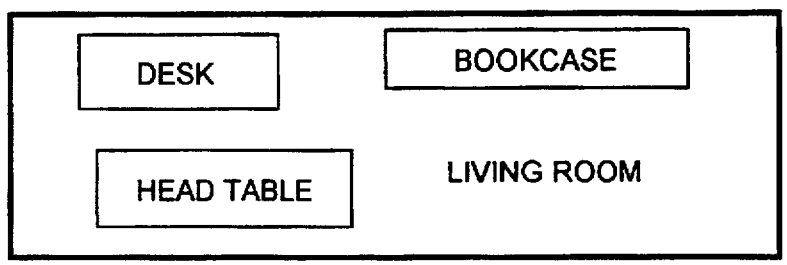
FIG. 10 shows the living room of the Days House and the Stations House for the Transportation Services Organization.
FIG. 11 shows the records in the head table of the Days-House Living Room.

Each of the living rooms in the Transportation Services example has a single table (the head table), a desk, and a bookcase, as shown in FIG. 10. As previously stated, when there is only a single table in a room, the terms "partial record" and "record" are interchangeable. We will assume that all rooms have only a single table until the subject of multi-table rooms is discussed later. Until that time, the word "record" will be used rather than "partial record".

The head table 57 of the Days-House Living Room together with meta-data 59 characterizing the individual fields are shown in FIG. 11. The table's fields are shown to the right of the double line. The Record-ID column, shown to the left of the double line, is not a field. Its purpose will be explained later.

The head table 61 of the Stations-House Living Room and field-characterizing meta-data 63 are shown in FIG. 12.

The head table 65 of the Shipments-House Living Room and field-characterizing meta-data 67 are shown in FIG. 13. This living room has three incoming maxi-cables (see FIG. 9). The head table 65 is divided into three sections by two vertical double-lines. As before, the leftmost section contains the Record ID and the rightmost section contains the fields. The middle section contains a column for each of the three incoming maxi-cables. In each maxi-cable column we show the Record ID of the parent record to which the child record is wired. The need to relate parent records to child records is the reason for including the Record-ID columns in the head tables of the Days House and the Stations House.

The Record IDs of the table 65 in the Shipments-House Living Room would appear in the middle section of any child houses if the Shipments House happened to have any outgoing cables.

Wires in a maxi-cable may be created, modified, or deleted by the user, and in so doing, the user defines the context of the records in the child room.

The context of a record is its lineage of ancestral records upward along all maxi-cable wires. Each record in the Shipments-House Living Room has a context due to its incoming maxi-cables. For example, consider the lineage of order number 274 (Record ID o13) listed in FIG. 13. This record represents a 2-ounce small widget which cost 50 cents to ship. Its lineage shows the following relevant information about the shipment which is not in the Shipments House:

it was to be shipped on the ship-date corresponding to d2 which is 5 Jun. 1991 (on which day there were three carriers on duty and it rained) (see FIG. 11);

it is to be shipped from the station corresponding to s3 which has station-code Y2 (in building F and managed by Bruce Goldberg) (see FIG. 12);

it is to be shipped to the station corresponding to s1 which has station-code X1 (in building A and managed by Lavonna Johnson) (see FIG. 12).

As mentioned previously, a midi-cable connects a table in a room of a house to a table in a different room in the same house. There are three kinds of midi-cables: gallery midi-cables, playroom midi-cables, and guest room midi-cables.

Each table has a set of components comprising the table's incoming maxi-cables, incoming midicables, and fields. The components of a gallery table also include members of the gallery's basis set, a basis set being a proper subset of the component set of the gallery's base table (defined below).

Every gallery has at least one gallery midi-cable coming out of it and going into a "base table" in another room. The gallery is always the parent room of its gallery midicable. Galleries are used for summarizing the data contained in the records of the base table. The room containing the base table is called the gallery's "base room".

A gallery has the power to summarize its base table because each record in the base table is automatically wired to a single record in the gallery on the basis of the gallery's basis set.

However, a gallery may, in certain cases, also be able to summarize other tables besides its base table. Such other tables must lie in other galleries. When a gallery can summarize multiple tables, then it has multiple outgoing gallery midi-cables, one for each such table. Thus, a gallery G has an outgoing gallery midi-cable to each table T where either of the following hold: (1) T is the base table of G, or (2) T is in a gallery G1 and the basis set of G is a subset of the basis set of G1.

A gallery is defined by declaring the following two items:
a "base table" in the living room, a playroom, a guest room or a previously defined gallery in the same house;
a "basis set" which is a proper subset of the component set of the base table.

Figure 14:
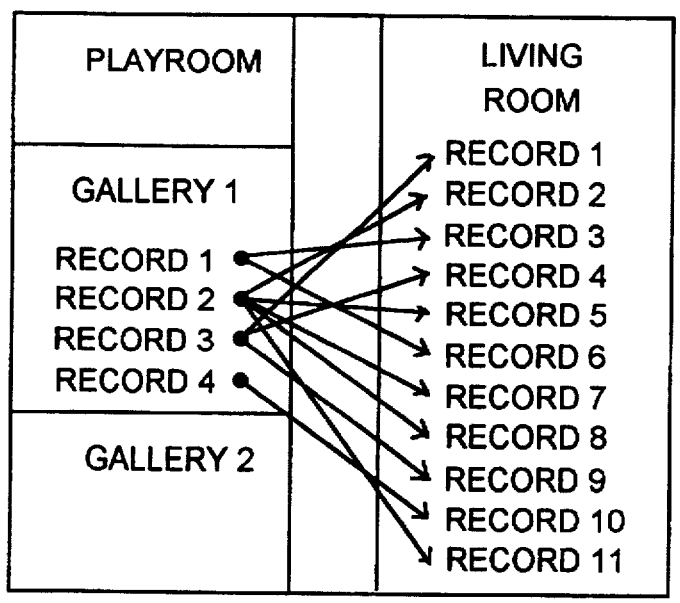
FIG. 14 shows the midi-cable wiring from a gallery to a living room.

An example of the wiring in the midi-cable from gallery 1 to the living room is given in FIG. 14. Record 3 in gallery 1 is wired to records 1, 4, and 9 in the living room. The data in record 3 summarizes data in records 1, 4, and 9 in the living room.

Whereas, in the case of maxi-cables, the user decides the record wiring, in the case of gallery midi-cables, the wiring of the gallery records to the base-room records is done automatically by the DVS. It does so on the basis of the way that the gallery is defined. The user only has indirect control of the gallery midi-cable wiring by controlling the way that the gallery is defined.

The component set of a living room is the set containing all of its incoming maxi-cables and all of its fields. For example, the component set of the Shipments-House Living Room Head Table (see FIG. 13) is:

{Ship-Date Maxi-Cable, From Maxi-Cable, To Maxi-Cable, Order-Num field, Weight field, Cost field, and Description field}

Tables in playrooms, guest rooms, and galleries also can have incoming maxi-cable components and field components. They also can have other types of components as indicated later.

A gallery is defined by a basis set which must be a proper subset of the component set of its base table. A distinct gallery may be defined by each subset of a table's component set. For example, there are seven elements in the Shipments-House Living-Room head-table component set given above, and therefore, there are $2^7-1=127$ proper subsets of this component set, each of which can be a basis set for a gallery.

The components in a basis set taken in an order comprise a "basis meta-vector". The DVS automatically creates a basis meta-vector for each gallery.

In FIG. 15, six galleries associated with the Shipments-House Living Room are defined, each with a living-room head-table component subset as its basis set. The standard name for a gallery defined on the empty set is the Master Gallery and that defined on the set containing all of the maxi-cables and no fields is the Maxi-Cable Gallery. A gallery which has exactly one component in it subset is called a singleton gallery. The Weight Gallery is a singleton gallery.

For a given record in a living room, a value exists for each component of the gallery's basis set. These values form a "basis vector" which specifies the single record in the gallery which is associated with the given record in the living room. The basis vector has the same number of elements as the basis set. Each element of a basis vector is a value for its corresponding component in the basis meta-vector. Vectors are notated with angle brackets. Whereas the basis set and basis meta-vector of a gallery apply to the entire gallery, a basis vector represents only a single record in the gallery.

The basis set of the Source Description Gallery is denoted by {from,description} and some examples of basis vectors are <s1.envelope>, <s1.package>, <s2.envelope>, and <s3.medium widget> (see FIG. 13).

The basis set of the Maxi-Cable Gallery is denoted by {ship-date,from,to} and some examples of basis vectors are <d1,s1,s2>, <d1,s3,s1>, <d3,s3,s5>, and <d4,s1,s4> (see FIG. 13).

The basis set of the Weight Gallery is denoted by {weight} and some examples of basis vectors are <12> and <67> (see FIG. 13).

In the case of the empty component subset { }, the one for the Master Gallery, the only basis vector is the empty vector < >.

The data 69 in the Source Description Gallery having the basis set {from,description} and field characterizing meta-data 71 are shown in FIG. 16. Each column to the left of the vertical double line represents a component in the basis set: one column for From and one column for Description. Each record represents one of the basis vectors whose values are shown in the first two columns. The seventh record has the basis vector <s3,envelope>.

The records in FIG. 16 are summaries of the data given in FIG. 13. For example, three shipments o6, o7, and o14 have the basis vector <s3,envelope> for this gallery. Thus, the three living room records o6, 07, and o14 are wired to the single (seventh) gallery record which has their basis vector to the left of the double line. The gallery record summarizes the information in the three living room records. The SDG-Cost field contains the sum of the cost fields in 06, o7, and o14 (all three happen to be 0.50). The SDG-Count field contains a 3, the number of living room records with this basis vector to which the gallery record is wired. The term SDG is an abbreviation of Source Description Gallery.

The data 73 in the Maxi-Cable Gallery having the basis set {ship-date,from,to} and field characterizing meta-data 75 are shown in FIG. 17. Living room records o10, o11, o12, o13, and o14 (five records) all have the basis vector <d2,s3,s1> (see FIG. 13). There is only one record (seventh one) with this same basis vector in the Maxi-Cable Gallery (FIG. 17). This single gallery record is wired to and summarizes the data in those five living room records.

The Weight field datums in these five living room records are 68, 237, 34, 2, and 3 respectively. The MXG-Weight field in the Maxi-Cable Gallery (FIG. 17) for the basis vector <d2,s3,s1> is 344 which is the sum of the five living room weights. Similarly, the MXG-Cost field gives the sum of the costs of the five living room costs. The term MXG stands for Maxi-Cable Gallery. The Count field in the Maxi-Cable Gallery (FIG. 17) indicates how many records in the living room have this basis vector.

The data 77 in the Weight Gallery having the basis set {weight} and field characterizing meta-data 79 are shown in FIG. 18. It shows how many shipments have occurred at each weight.

The data 81 in the Path Gallery having the basis set {from,to} and field characterizing meta-data 83 are shown in FIG. 19. This gallery summarizes data for each directed path which represents a particular source station paired with a particular destination station.

The Frequency field is calculated as the path count divided by the total number of records in the living room (22). Hence, for <s3,s1> the frequency is 7/22=0.318.

The Rating field is an example of a basal field in a gallery. (Basal data is original source data which can be entered and changed by users.) In this particular field, the user can place a subjective rating of the path.

The data 85 in the Daily Destination Gallery having the basis set {ship-date,to} and field characterizing meta-data 87 are shown in FIG. 20. This gallery summarizes data for each Date-Destination station pair.

The data 89 in the Master Gallery having the basis set { } and field characterizing meta-data 91 are shown in FIG. 21. There is only a single basis vector in the Master Gallery: the empty vector < >. Thus, the Master Gallery summarizes all of the records in the living room.

Records are automatically inserted and deleted in a gallery in such a way that, with respect to the gallery's basis set, there is always exactly one gallery record for each distinct basis vector that exists in the base table. A gallery record is wired via its gallery midi-cable to and only to those base table records which share its basis vector, and it summarizes those base table records. The user may not insert or delete gallery records. However, the user may insert and delete fields in a gallery and may modify basal datums in existing gallery records.

The user has the power to insert and delete records in the living room (as well as in playrooms and guest rooms) but not in a gallery. Records in a gallery are inserted and deleted automatically by the DVS—the user can only look at the results (hence the name gallery). If a record is added to the living room that has a new basis vector, then a new record is automatically added to the gallery for it. If the last record in the living room for a particular basis vector is deleted, then the corresponding gallery record is automatically deleted.

The reason that galleries may not have outgoing maxi-cables is that gallery records are not reliable things for a child record to refer back to since they may disappear at any time.

Every playroom has exactly two playroom midi-cables coming into its head table, each of which comes either from a table in the living room or from a table in a guest room. They are called the playroom Link-From Midi-Cable and the playroom Link-To Midi-Cable. Thus, each playroom record is wired to a pair of living/guest room records, one through each of the midi-cables. Living/guest room records are not required to be wired to any playroom record.

A playroom defines a topological graph on the records in the living/guest rooms. The topological graph consists of nodes and links between the nodes. A link always connects two nodes. In a topological graph, each living room record is a node, and each playroom record is a link. Guest room records will be discussed later.

Figure 22:
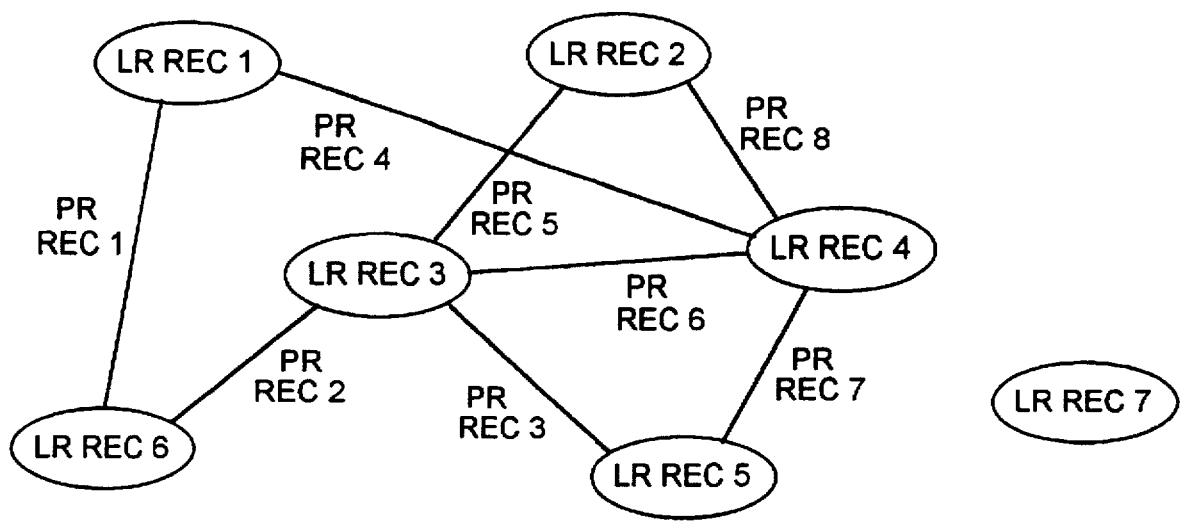
FIG. 22 shows an example of a topological graph.

An example of a topological graph is shown in FIG. 22. The term LR stands for living room and the term PR stands for playroom. Since a link is a record in the playroom, any amount of information pertaining to the link may be stored.

Each record in the playroom is wired to exactly two living room/guest room records, forming a link from one of those records to the other. It is not necessary for all living/guest room records to be connected to the playroom, and a single living/guest room record may be wired to an unlimited number of playroom records.

Figure 23:
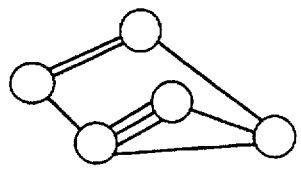
FIG. 23 shows an example of a topological graph with an undirected free graph topology.
Figure 26:
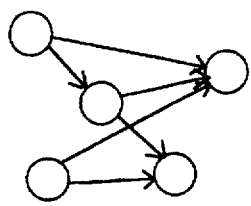
FIG. 26 shows an example of a topological graph with an sub-lattice topology.
Figure 29:
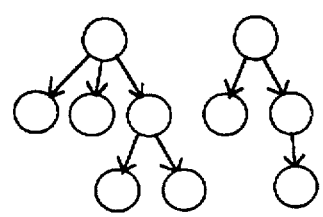
FIG. 29 shows an example of a topological graph with an disjoint hierarchies topology.
Figure 24:
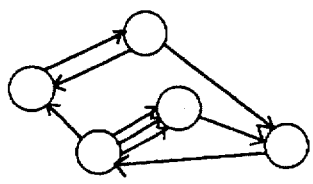
FIG. 24 shows an example of a topological graph with an directed free graph topology.
Figure 27:
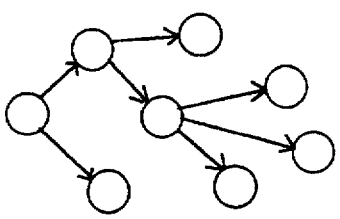
FIG. 27 shows an example of a topological graph with an hierarchy topology.
Figure 30:
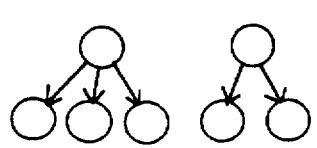
FIG. 30 shows an example of a topological graph with an 2-level disjoint hierarchies topology.
Figure 25:
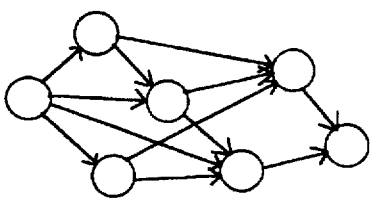
FIG. 25 shows an example of a topological graph with an lattice topology.
Figure 28:
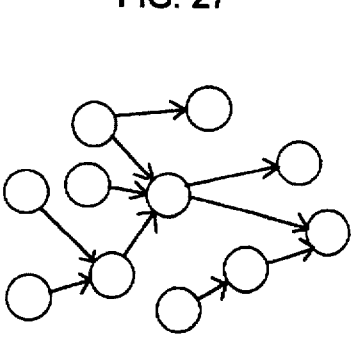
FIG. 28 shows an example of a topological graph with an bi-directional tree topology.
Figure 31:
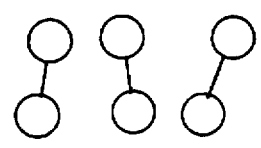
FIG. 31 shows an example of a topological graph with an pairs topology.

Each playroom has a "topology" which is a set of rules about what kinds of connections are permitted in the topological graph. The DVS provides a library of topologies including the following:

"undirected free graph"—a graph topology where the links have no direction (i.e. direction has no significance) and there are no rules about connections, any connection is legal (illustrated by FIG. 23);

"directed free graph"—a graph topology with directional links, but beyond that, there are no rules about connections, any connection is legal (illustrated by FIG. 24);

"lattice"—a graph topology with directional links and no directed loops where there is a single node which is ancestral to all other nodes, and where there is a single node which is descendent from all other nodes (illustrated by FIG. 25);

"sub-lattice" (also know as "bill of materials structure")—any subset of a lattice obtained by eliminating any number of nodes and links (illustrated by FIG. 26);

"hierarchy" (unidirectional tree)—a graph topology with directional links and no loops where each node, except for one (which is at the top of the hierarchy), has exactly one parent, and the node at the top of the hierarchy has no parent (illustrated by FIG. 27);

"bi-directional tree"—a graph topology with directional links and no loops (illustrated by FIG. 28);

"disjoint hierarchies"—a graph topology comprised of a plurality of hierarchies that do not connect (illustrated by FIG. 29);

"two-level disjoint hierarchies"—a disjoint hierarchies graph topology where each hierarchy consists of exactly two levels (illustrated by FIG. 30);

"pairs"—a graph topology with undirected links between pairs of nodes where no node can be linked to more than a single other node (illustrated by FIG. 31).

The playroom will automatically enforce its topology, blocking any attempt to create or delete a link connection which results in the violation of the topology.

Figure 32:
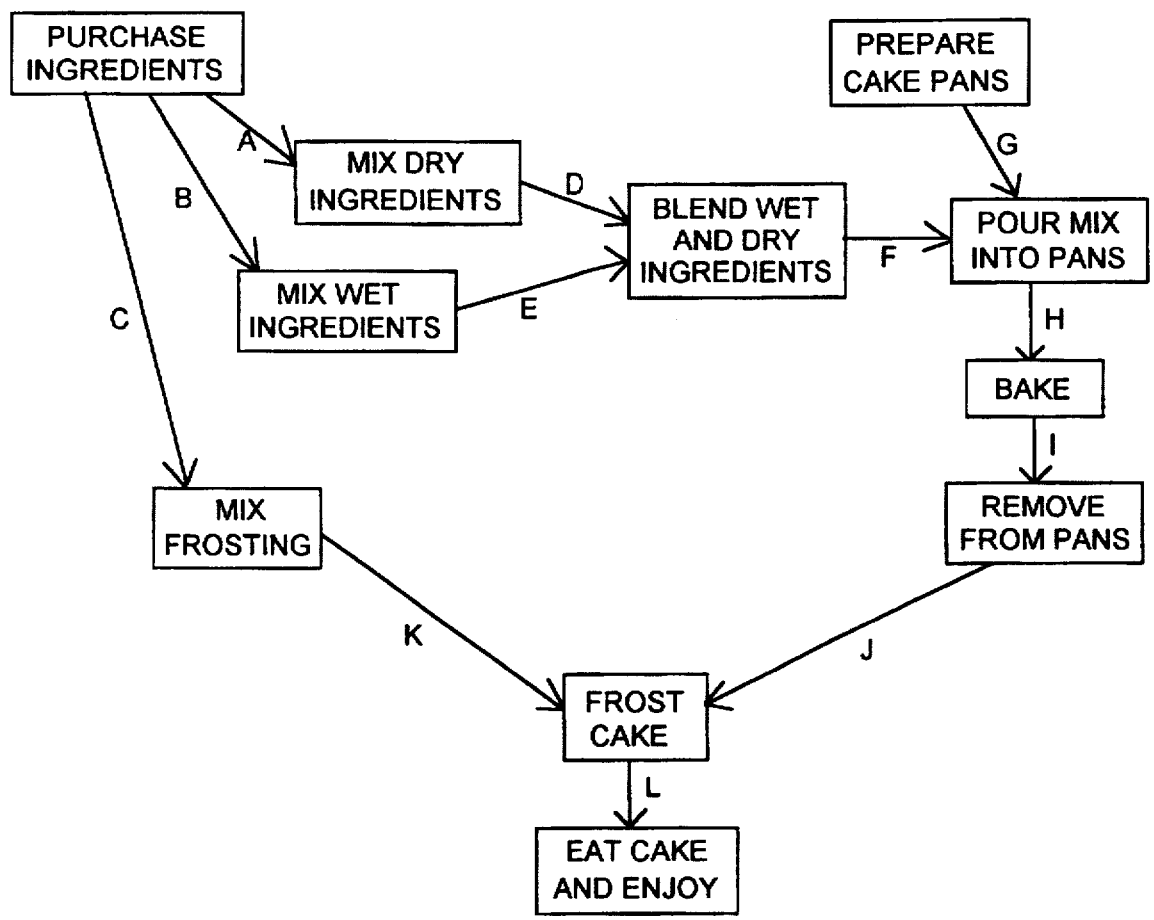
FIG. 32 shows the network associated with the Cake-House Playroom.

In FIG. 32 is shown an example of a topological graph wherein baking a cake is broken down into a set of tasks and the interdependencies among the tasks is described in the manner of a PERT chart. The entire structure is stored in the Cake House with a single playroom. The inside of the Cake House is diagrammed as shown in FIG. 33.

Figures 35, 36:
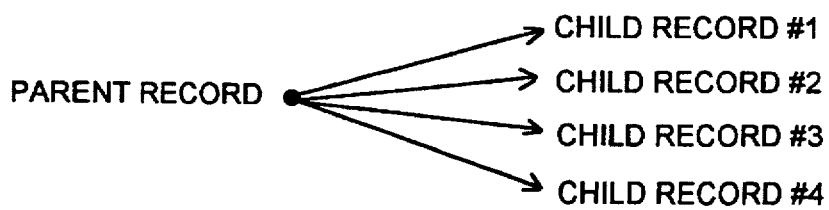
FIG. 35 shows the records in the Cake-House Dependencies Playroom.
FIG. 36 shows how child records are wired to a parent record using one hitch pin.

Each rectangle is a task which is a record in the living room, as indicated in FIG. 34. Each arrow is a dependency showing that one task must be completed before another is started. Each dependency is a record in the playroom, as shown in FIG. 35. The "link-from" and "link-to" columns to the left of the vertical double line show the wiring across the playroom midi-cables which establish the linkage structure represented by the playroom's topological graph.

The linkages that characterize a topological graph may be created, modified, or deleted by the user by creating, modifying, or deleting records in the playroom which defines the graph.

Up until now, when a parent record had several child records across a maxi-cable, all of the child records were wired with the parent record in the same manner, as illustrated in FIG. 36. The black dot can be thought of as a hitch pin at the parent record to which the wires to the child records are connected.

Figure 37:
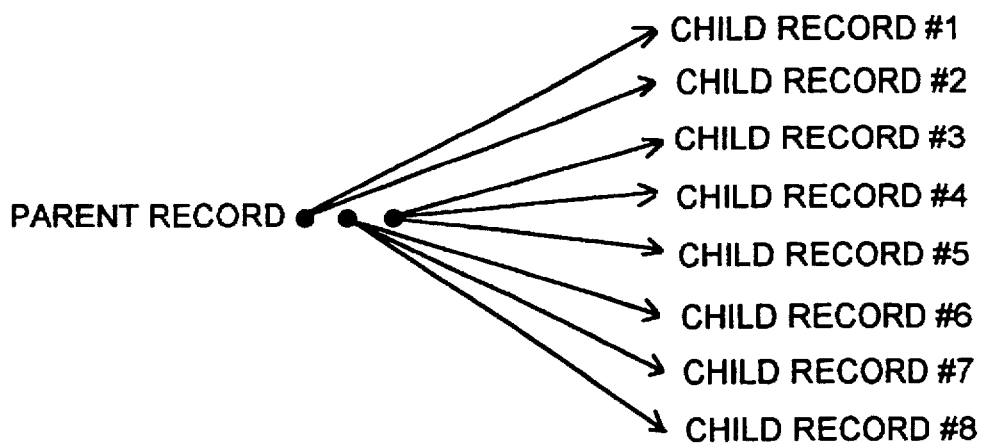
FIG. 37 shows how child records are wired to a parent record using multiple hitch pins.

It is possible, as illustrated in FIG. 37, for aparent record in a living room to have multiple hitch pins.

The purpose of guest rooms is to make hitch pins possible on the living room records. Every guest room has exactly one guest room midi-cable coming into its head table from a table in the living room. Each guest room record represents a single hitch pin of the living room record to which it is connected. Thus, each guest room record is wired to a single living room record through this midi-cable. Living room records are not required to be wired to any guest room record.

Outgoing maxi-cables and playroom midi-cables may be connected to the guest room instead of the living room in order to connect their wires to specific hitch pins.

Figure 38:
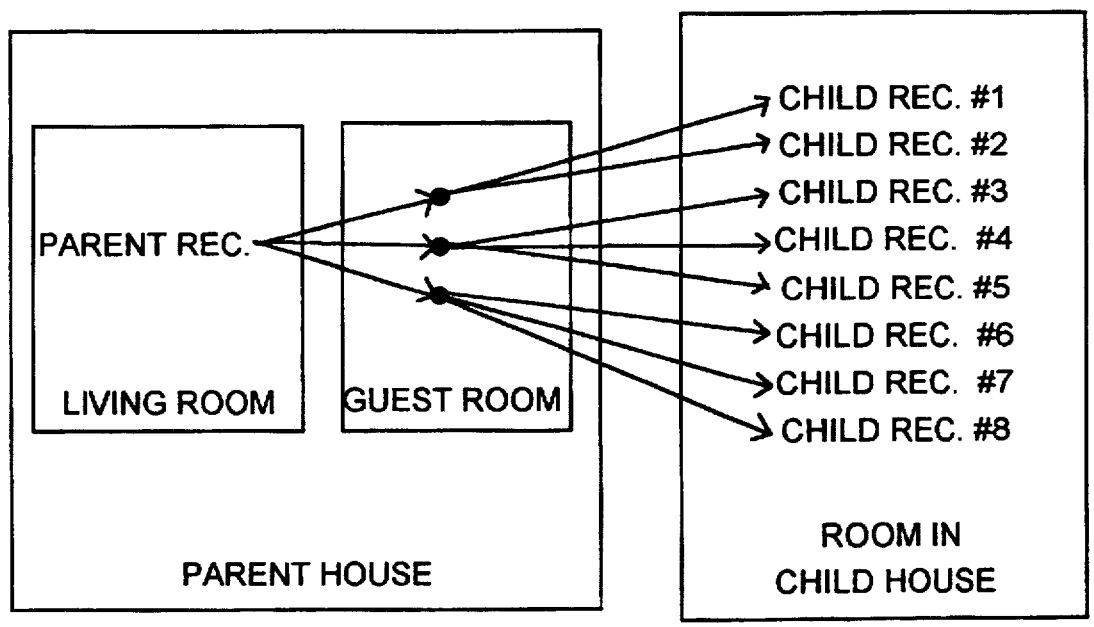
FIG. 38 shows how records in a child-house room are wired to a parent record in a parent-house living room via hitch pins in the parent-house guest room.

Each hitch pin usually has a different name. The names may be stored in the guest room. Each hitch pin in the guest room is wired to a single record in the living room. Each living room record may have multiple hitch pins in the guest room. Living room records may differ in their numbers of hitch pins. Henceforth, hitch pins will be represented as shown in FIG. 38 so as to reflect the living room/guest room relationship. The three arrows on the left are wires in the guest room midi-cable. The eight arrows on the right are the wires in the maxi-cable.

For the purpose of illustrating the use of guest rooms, consider a business having many departments. Each department is assumed to have many employees, but the job types differ from department to department. Each job type is a hitch pin name.

Figures 39, 40:
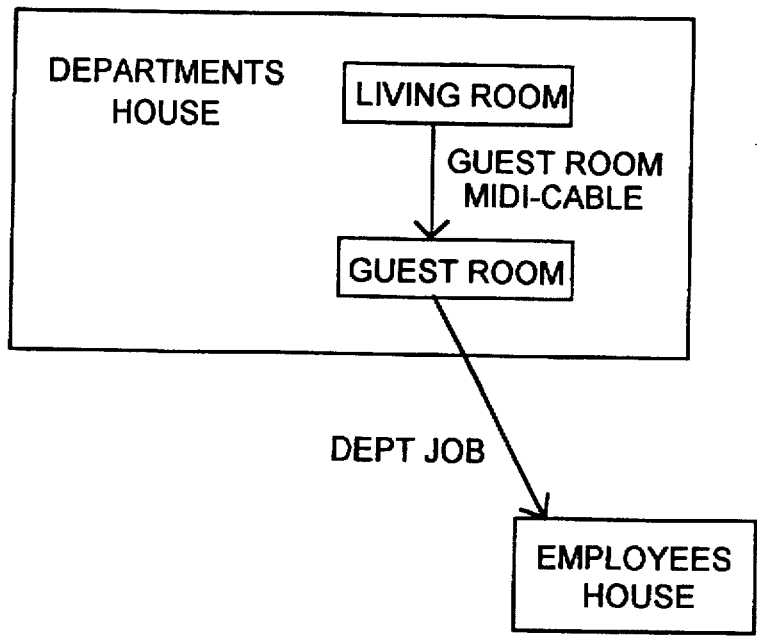
FIG. 39 shows a data village for a business having many departments.
FIG. 40 shows the records in the Departments-House Living Room and Guest Room.

In the example shown in FIG. 39, there are two houses: the Departments House and the Employees House. The Departments House contains a living room and a guest room with a midi-cable connecting the two. The living room contains the actual departments while the guest room contains the individual job types available in the departments. Employee records are wired to the individual job types across the Dept Job maxi-cable; hence, they are wired to the guest room records rather than the living room records. All rooms in the example contain only a head table.

The departments living-room records 93 and guest-room records 95 are shown in FIG. 40. The column titled Living-Room Record shows which living-room record each guest room record is wired to via the guest room midi-cable. Thus, the first three records h1, h2, and h3 are all hitch pins (corresponding to job types) within the Software Development Department (d1).

Figures 41, 42:
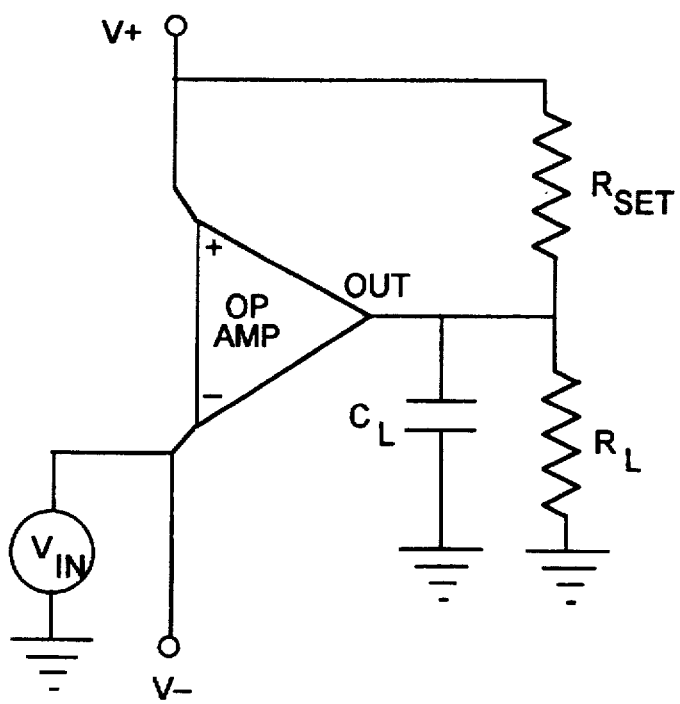
FIG. 41 shows the records in the Employees-House Living Room.
FIG. 42 shows the electrical circuit for an electronics example.

The employees living room records are shown in FIG. 41. By tracing entries in the Dept-Job column, one determines that Kaneko is the manager of the Software Development Department and that Blinn, Moreno, and Sosa are Programmers in the Software Development Department.

The hitch pins in this example could have been implemented by placing a Job-Types House between the Departments House and the Employees House rather than placing the job types in a guest room of the Departments House. This approach is appropriate when a maxi-cable is being used to attach a record from another house to one of the hitch pins. However, it is often necessary to use a playroom midi-cable to link one hitch pin of one living room record to another hitch pin of another living room record. Situations like this call for a living room, playroom, and guest room all under the roof of a single house.

A further illustration of these concepts is provided by the electronic circuit shown in FIG. 42. The circuit consists of electronic parts connected together in a topological graph. Each part has one, two, or three pins to which connection is made.

Figures 43, 44:
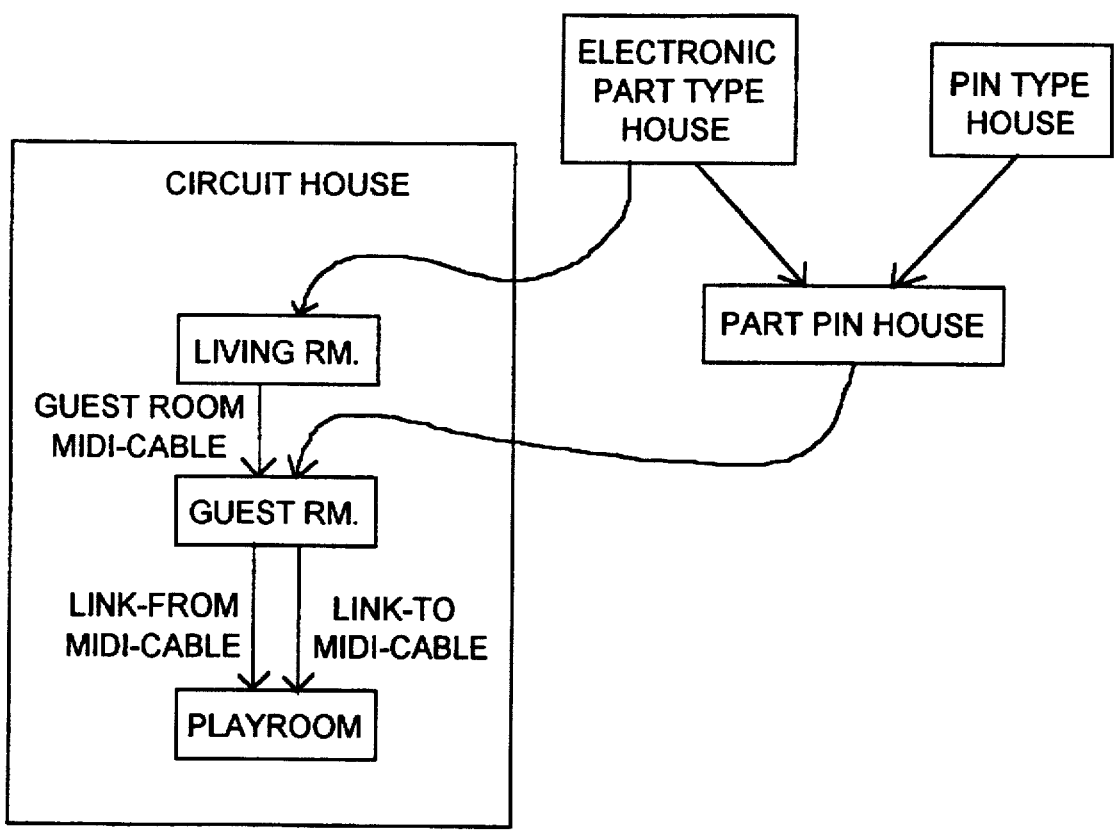
FIG. 43 shows the village map for the electronics example.
FIG. 44 shows the records in the Electronic-Part-Type-House Living Room.

The data village corresponding to this circuit is shown in FIG. 43. Each room in this example contains only a head table. Each record in the living room of the Circuit House contains one electronic part. When connecting the parts together, it is necessary to connect the appropriate pins on the parts.

Hitch pins in the guest room are used to represent the pins on the components. The topological graph is formed by pairing hitch pins in the guest room.

This data village is designed to accommodate a wide variety of electronic parts. The user may input new types of parts and use them in the circuit.

The Electronic-Part-Type Living Room shown in FIG. 44 lists each of the types of electronic parts.

The Pin-Type Living Room shown in FIG. 45 provides a list of names for various types of pins that appear on electronic parts.

The Part-Pin Living Room shown in FIG. 46 has no fields. It is simply a junction between the Electronic-Parts House and the Pin-Types House, signifying that a particular part type has a particular pin type.

The Circuit Living Room shown in FIG. 47 lists each of the electronic parts that appear in the circuit, stating a designation and function for each.

The Circuit Guest Room shown in FIG. 48 contains a record for each pin of each actual electronic part in the circuit. All of the information needed for each record is coming from its two incoming cables (see FIG. 43). The part in the circuit comes in through the guest room midi-cable, and the pin type through the maxi-cable. No additional information is needed. Thus, the table has no fields.

Figures 49, 50, 51:
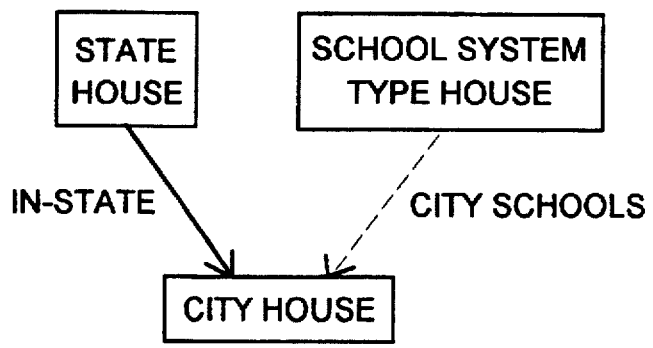
FIG. 49 shows the records in the Circuit-House Playroom.
FIG. 50 shows the village map for a city example.
FIG. 51 shows the records in the State-House Living Room.

The Circuit Playroom shown in FIG. 49 specifies how the hitch pins in the Guest Room are paired. Connections made in accordance with these records result in the circuit shown in FIG. 42. This table also has no fields because there is no information to be specified about the wires in the circuit in addition to their connections.

Sometimes the user specifies which guest room records are to be wired to a particular living room record. At other times the DVS performs this function.

In the case of the Departments House shown in FIG. 39, the user inserts and deletes records in the guest room and makes their association with living room records across the hitch pin channel to the living room.

In the case of the Circuit House shown in FIG. 43, the guest room records table (FIG. 48) are inserted and deleted automatically according to integrity rules for this particular model. The reason for the automatic feature is that whenever a part is placed in the living room, the guest room must automatically have one record inserted corresponding to each pin that the part has. This requires a look in the Electronic-Part-Types House (FIG. 44) and the Part-Pin House (FIG. 46) to locate the appropriate records in the Part-Pin House with which to associate the guest room records. Likewise, when a part is deleted from the living room, its corresponding entries in the guest room will also be deleted automatically.

The concept of a key is used to guarantee the uniqueness of records within their room. There are "key maxi-cables", "key fields", "key sets", "key meta-vectors", and "key vectors".

Each maxi-cable is either a key maxi-cable or a non-key maxi-cable. Key maxi-cables are shown as solid arrows in the figures and non-key maxi-cables are shown as dashed arrows.

Any number of basal fields in the living room or a playroom or a guest room can be designated as key fields. The rest of the basal fields and all of the calculated fields are non-key fields.

Galleries may not have any incoming key maxi-cables and may not contain any key fields. Keys are the tools that the user uses to keep the records in a room unique. Gallery records are kept unique automatically by the system so they do not need keys. The basis set for a gallery cannot contain all of the components of the key set or basis set of the room in which the base table lies. Also, if a gallery's base table is in a gallery, then at least one component of that gallery which is not in its basis set must be included.

Each room has a key set defined as follows. A living-room key set contains all incoming key maxi-cables and all key fields. A playroom key set contains both incoming playroom midi-cables, all incoming key maxi-cables, and all key fields. A guest-room key set contains the incoming guest room midi-cable, all incoming key maxi-cables, and all key fields. Galleries do not have key sets.

The key set of a room is the subset of the components of the tables in that room which comprise the key. The DVS automatically creates a key meta-vector for each room which states the components of the key set in a particular order.

Except as noted later, for a given record in a living room, playroom, or guest room, a value exists for each component of the key set. These values, taken in the order of the key meta-vector, form the key vector of that record. The key vector has the same number of elements as the key set. Each element of a key vector is a value for its corresponding component in the key meta-vector. Vectors are notated with angle brackets. Whereas the key set of a room applies to the entire room, a key vector represents only a single record in the room. Thus, the key vectors are structured as follows:

Living room key vector:
<incoming key maxi-cable #1 wire, incoming key maxi-cable #2 wire . . . , key field #1 value, key field #2 value, . . . >

Playroom key vector:
<playroom link-from midicable wire, playroom link-to midi-cable wire, incoming key maxi-cable #1 wire, incoming key maxi-cable #2 wire, . . . , key field #1 value, key field #2 value, . . . >

Guest room key vector:
<guest-room midi-cable wire, incoming key maxi-cable #1 wire, incoming key maxi-cable #2 wire, . . . . . key field #1 value, key field #2 value, . . . >

Each record in a living room, playroom, or guest room must have a unique key vector. Any two records from a living room, playroom, or guest room must have something different in their key vectors. If a living room has a pair of records with identical key fields, then they must differ in at least one of their key maxi-cable parent records. On the other hand, if the pair of records has the same key maxi-cable parent records, then they must differ in at least one of their key field values.

In the special case of a living room with no incoming key maxi-cables, incoming maxi-cables will make no contribution to the living room record's uniqueness, so uniqueness rests entirely upon the key fields.

In the special case where there is no key field, uniqueness rests entirely upon the incoming key maxi-cables, and there can only be a single record in the living room for each combination of key maxi-cable parent records.

It is acceptable to define a room with an empty key set. However, such a room can only contain a single record.

It is good practice to minimize both the number and the size of the key fields, thereby placing the majority of the key content in the incoming cables.

The use of key sets is illustrated for the data village shown in FIG. 50. All houses in this example contain only a living room which contains only a head table. The State-House Living Room contains the data given in FIG. 51, the School-System-Type-House Living Room contains the data given in FIG. 52, and the City-House Living Room contains the data given in FIG. 53.

It should be noted that each state name in the State Living Room must be unique, because the key set contains only the state name field. Likewise, in the School-System-Type Living Room, each schools code must be unique because the key set contains only the schools code field. However, in the City Living Room, there are three occurrences of "Fairfield" in the city name key field. This is valid because they each have different parent records across the In-State Key Maxi-Cable.

The city of Lincoln, Calif. (s1) is shown with school code of 0 (t3). Since the City-Schools Maxi-Cable is a non-key maxi-cable, an attempt to add another city called Lincoln to the state of California (s1) with different school code of, say, S (t2) would not be permitted since differences in a parent record across a non-key maxi-cable are not counted in determining uniqueness.

Living rooms, playrooms, and guest rooms have multiple tables. Galleries are restricted to a single head table.

In the single-table case, the records in that table were complete. The datums for all of the fields of the record were in the single table.

When there are multiple tables in a room, the tables contain partial records, a record then being a concatenation of the various partial records located in the various tables, as illustrated in FIG. 54.

The example shown in FIG. 54 involves a living room containing data on books. Every book has a title and an author which are stored in the head table. Every book is either fiction or non-fiction, indicated by the Book-Type field in the head table. However, fiction books have information on their period and characters (which non-fiction books lack) which is stored in the fiction table. Non-fiction books have information on their subject matter and whether they have an index (which fiction books lack) which is stored in the non-fiction table. The records in the fiction and non-fiction tables carry the same Record-IDs as their counterparts in the head table.

The Book-Type field in the head table is called a format field because it specifies the format of the records by indicating which other table contains an additional partial record to be added to the partial record in the head table.

In a room containing a plurality of tables, the terms "record" and "partial record" are not interchangeable. A record is a set of partial records from a subset of the tables in a room.

Each partial record in a record must come from a distinct table. The head table must be in the record's table subset. The record's table subset is specified by the room map on the basis of the values in the record's format fields.

It was indicated earlier that each room in a house contains a desk and that a desk is used to store the room map and a dossier for each calculated field.

The room map is a diagram showing each table in the room with each of its fields and showing each of the mini-cables that connect the tables in the room. The mini-cables indicate how the partial records in the various tables may be connected together into a record. No directed loops are allowed in the room map (i.e. one may not traverse any sequence of mini-cables, following the direction of the mini-cables, from table to table and return to the starting point). Tables with no mini-cables coming out of them are called "leaf tables."

A mini-cable connects a table to another table in the same room. The head table may not have any incoming mini-cables. Mini-cables are not allowed in galleries because galleries may only have a single (head) table.

There are two kinds of mini-cables: format field mini-cables and automatic mini-cables. Whenever a format field is defined in a table, there must be one outgoing format field mini-cable associated with each possible value of the format field, and this situation is the only one in which a format-field mini-cable can be used.

An outgoing automatic mini-cable is attached to a table as a whole without regard to any field or field value. The head table is not permitted to have any outgoing (or incoming) automatic mini-cables.

In order to have more than one table in a room, it is necessary to have at least one format field in the head table from which the branching to other tables can take place via mini-cables.

As stated above, the purpose of the room map is to determine the table subset of a given record on the basis of its format fields. This determination is made by starting at the head table, which is always in the table subset, and proceeding downward from table to table along the mini-cables until leaf tables are reached. The tables encountered as a result of this process constitute the record's table subset. Each table in the table subset contributes one partial record to the record. Even though a table is encountered twice, through different branches of the room map, it can only appear once in the subset and can only contribute a single partial record to the given record.

Figure 55:
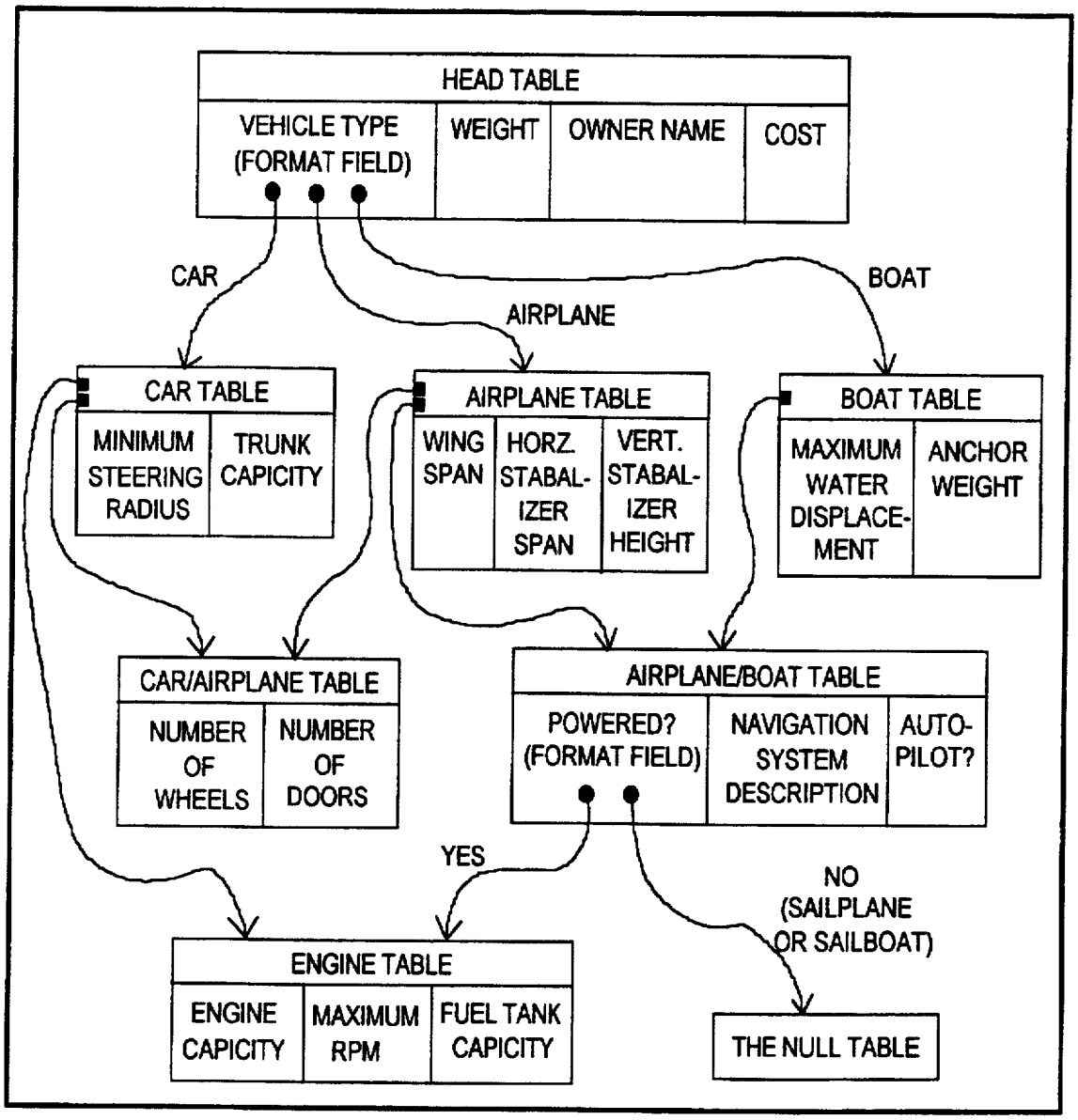
FIG. 55 shows the room map for the Vehicles House.

For example, a room map for the Living Room of a Vehicles House is shown in FIG. 55. The mini-cables are represented by the curving arrows. The solid circles denote format-field mini-cables and the solid squares denote automatic mini-cables.

A powered boat would have the table subset consisting of the head table, the boat table, the airplane-boat table, and the engine table. A sail plane would have the table subset consisting of the head table, the airplane table, the car-airplane table, the airplane-boat table, and the null table.

The null table is a special table that contains no fields and no partial records. The mini-cable leading to the null table contains no wires. It is used for format-field values which require no further fields. Only format-field mini-cables may attach to the null table.

In a format-field mini-cable, every parent partial record having the format-field value associated with the mini-cable is wired to exactly one child partial record (except that mini-cables leading to the null table contain no wires). In an automatic mini-cable, every parent partial record is wired to exactly one child partial record. In any non-head table, every partial record is wired to a parent partial record across at least one incoming mini-cable. If a partial record is wired to more than one incoming minicable, then traversing any upward path along those mini-cables must lead back to the same ancestral partial record in the head table Multiple tables permit the definition of many different types of records, all of which exist in the same room. By using multiple tables in the living room, it is possible to define networks (via playrooms) whose nodes have a great variety of forms. By using multiple tables in a playroom, it is possible to define a network (via that playroom) whose links have a great variety of forms.

The child table of each playroom midicable must be the head table in the midi-cable's playroom to ensure that each playroom record is truly a link. But the playroom midi-cables may connect to any parent table in the living room or a guest room.

As previously stated, galleries are not allowed to have multiple tables. Thus, the parent table of a gallery midi-cable must be the head table of the midi-cable's gallery. However, the child table of a gallery midi-cable may be any table in the living room.

If, in a room with multiple tables, all of the key fields are in the head table and all of the key maxi-cables come into the head table, then the key vectors are the same as they were previously defined. However, if there are key fields or incoming key maxi-cables in a non-head table, then two additional concepts are required, because it is now possible to have keys which vary in structure depending upon the values of the format fields.

Figure 56:
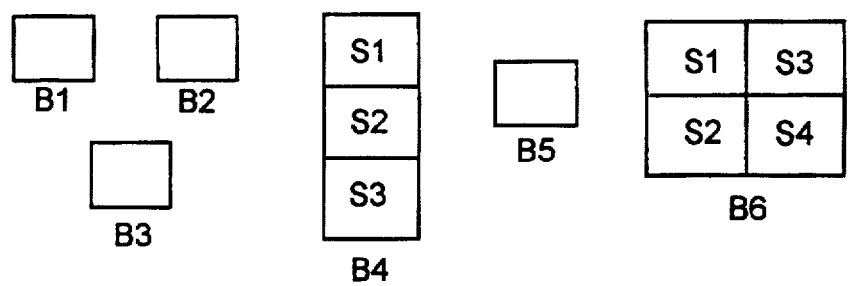
FIG. 56 shows the layout of buildings in a forest lodge.

This situation is illustrated by the forest lodge shown in FIG. 56. The lodge consists of many buildings. Some buildings are single-unit cabins. The other buildings have multiple units in them called suites. The buildings have building numbers B1, B2, B3, B4, B5, and B6. The suites in building B4 have suite numbers S1, S2, and S3, and those in building B6 have suite numbers S1, S2, S3, and S4.

The cabins contain kitchens and fireplaces but the suites do not. Each kitchen has a certain style of dishes. The suites contain television sets which the cabins do not. There are several different types of television sets.

Figure 57:
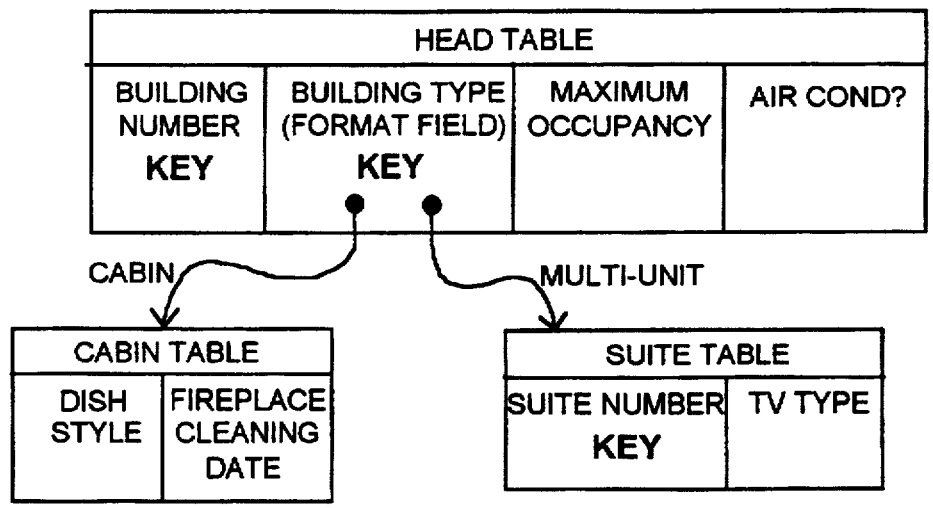
FIG. 57 shows the room map for the Forest-Units-House Living Room.

Data relating to the forest lodge is contained in a single house called Forest Units. One record for each forest unit is kept in the Forest-Units Living Room. The room map for this data is shown in FIG. 57.

The key to a cabin is simply its building number and the fact that its building type is cabin. The key to a suite is its building number, the fact that its building type is suite, and the suite number. Some sample key vectors are <B2,cabin>, <B4, multi-unit,S3>, <B5, cabin>, and <B6,multi-unit,S4>. It should be noted that the structure of the vector depends upon the value of the format field.

Any format field which has an outgoing mini-cable to any descendent table which either contains a key field or has an incoming key maxi-cable, must itself be a key field, as is the case in this example.

The data for the Forest-Units-House Living Room is shown in FIG. 58.

The data in a room can only be accessed by the user via one of its doorways. There is no limit on the number of doorways that a room may have. Each doorway provides a particular access for the user to view and manipulate the data in its room, within the context defined by the data model. Users may open multiple doorways into a room to work on different records within the room simultaneously. Changes made to data via one doorway will automatically appear in other doorways which are viewing the same data.

A doorway allows the user to define a particular view of the data in its room by utilizing the following concepts:

a "painting"—a screen display format appropriate to the data in the room in which it hangs. Each doorway is associated with one of the room's paintings, and that painting determines the general physical appearance of the doorway. The doorway's painting may be changed at any time by the user. A single painting may be used by more than one doorway.

a "catalog"—a particular ordering of the records in the room. Each doorway is associated with one catalog (in the room's bookcase), and that catalog determines the order of the records as they appear in the doorway. The doorway's catalog maybe changed at any time by the user. A single catalog may be used by more than one doorway.

"filters"—a Boolean field in the room's head table. The user may select one of the room's filters or a logical combination of several filters to define a subset of the records in the room. The selected subset of the records (called the selection subset) can either be highlighted in a different color against the background of all of the records, or to be displayed exclusively, without showing the non-selected records. The filter may be turned on or off or changed at any time by the user.

a "context"—a doorway automatically ensures that its data is always displayed in its proper context, as defined by its lineage back to data in ancestral records in other rooms and houses. The context includes certain critical fields in these ancestral records which remind the user of the ancestral records.

an "editor"—the doorway provides sophisticated facilities for editing, which allow authorized users to create, modify, and delete user-data.

"tags"—the user may tag individual records by selecting them with the mouse and thus cause them to be included in or excluded from the selected subset of records discussed above under filters.

Every room has a bookcase containing catalogs. Each catalog represents a particular sequential ordering of the records in the room. Thus, the data, without regard to order, sits in the tables in the room. The various orderings of the data are defined in the catalogs in the bookcase.

Each catalog specifies the method by which its sequential ordering is determined. The order is based upon the values in the datums in the room's table or tables and by the order of records in catalogs in other rooms.

Each catalog covers all of the records in the room, regardless of how many tables there are.

To define its record order, each catalog has a sort sequence which is a list of sort items. There are three types of sort items: field sort items, incoming cable sort items, and basis component sort items (used only in galleries).

Records are ordered first by the first sort item in the sort sequence, then within groups where the first sort item is tied, they are sorted by the second sort item, etc. There is the option with each sort item of producing an ascending order (the default condition) or a descending order.

When a field is used as a sort item, it must be a field in some table of the catalog's room. The records are simply sorted on the basis of the datums that they have in the field. Examples of catalogs based on the Transportation Services Organization (see data village shown in FIG. 9) are given below.

The Station-Code Catalog in the Stations-House Living Room is shown in FIG. 59 (see FIG. 12 for original data). The records are sorted according to the ascending order of the Station-Code field. The fields of the Stations Living Room are shown here for reference purposes. The Station-Code Catalog actually contains only a list of the Record-IDs.

The Bldg-Num Catalog in the Stations-House Living Room is shown in FIG. 60. The records are sorted first by the Bldg-Num field and then by the Station-Code field when Bldg-Num datums are tied.

The Manager Catalog in the Stations-House Living Room is shown in FIG. 61. The records are sorted according to the Manager field.

The Date Catalog in the Days-House Living Room is shown in FIG. 62 (see FIG. 11 for original data). The records are sorted according to the The-Date field.

The Carriers Catalog in the Days-House Living Room is shown in FIG. 63. The records are sorted first according to the Carriers-On-Duty field and then according to the The-Date field when the Carriers-On-Duty datums are tied.

The Weight Catalog in the Shipments-House Living Room is shown in FIG. 64 (see FIG. 13 for original data). The records are sorted first according to the Weight field and then according to the Order-Num field when the Weight datums are tied.

The Count Catalog in the Shipments-House Daily-Destination Gallery is shown in FIG. 65 (see FIG. 20 for original data). The records are sorted first according to the Daily-Dest-Count field and then according to the Daily-Dest-Wt field when the Daily-Dest-Count datums are tied.

The Frequency Catalog in the Shipments-House Path Gallery is shown in FIG. 66 (see FIG. 19 for original data). The records are sorted first according to the Frequency field, second according to the Cumul-Cost field when the Frequency datums are tied, and third according to the Rating field when the Cumul-Cost datums are tied.

An example of a catalog based on baking a cake (see data village shown in FIG. 33) is shown in FIG. 67 (see FIG. 34 for original data). The catalog shown in this figure is the Task-Time Catalog in the Cake-House Living Room. The records are sorted first according to the Task-Time field and then alphabetically according to the first word of the datums in the Task-Name field when the Task-Time datums are tied.

When a room has incoming maxi-cables or midi-cables, the record order can be based upon these cables in addition to being based upon the fields of the room. Mini-cables are not used for this purpose.

When an incoming cable sort item is used, a catalog in the parent room must be specified. The parent room catalog will determine the order of the parent records as they come across the cable to be used in determining the order in the child catalog.

Examples of catalogs based on the Transportation Services Organization (see data village shown in FIG. 9) and involving cable sort items are given below.

The To-Manager-Weight Catalog in the Shipments-House Living Room is shown in FIG. 68 (see FIG. 13 for original data). The records are sorted first according to the To Maxi-Cable connecting to the Stations House and the Manager Catalog in the Stations-House Living Room, second according to the Weight field, and third according to the Order-Num field by descending order of the datums.

The first item in the sort sequence is the To Maxi-Cable. This sorting operation results in the records being grouped together by their To Maxi-Cable Record-IDs as can be seen in FIG. 68. But the records are not in the numerical order of the To Record-IDs. They are instead in the order of the To Record-IDs in the Manager Catalog (shown in FIG. 61). The records are then sorted according to the Weight field when the To Record-IDs are tied and according to descending order of Order-Num datums when both the To Record-IDs and the Weight datums are tied.

The To-Bldg-Date-Carriers Catalog in the Shipments-House Living Room is shown in FIG. 69. The records are sorted first according to the To Maxi-Cable connecting to the Stations House and the Station-Code Catalog (see FIG. 59) in the Stations-House Living Room, second according to the Ship-Date Maxi-Cable connecting to the Days House (see FIG. 9) and the Carriers Catalog (see FIG. 63) in the Days-House Living Room, and third according to the Order-Num field.

As in the previous example, the first item in the sort sequence is the To Maxi-Cable to the Stations House. Once again, as in the previous example, the To records are grouped together, but the groups are in a different order hand before. This result occurs because the Station-Code Catalog (see FIG. 59) was specified this time (instead of the Manager Catalog specified in the previous example). Within these groups of tied To Record-IDs, the sorting is according to the Ship-Date field in the Carriers Catalog (see FIG. 63) in the Days-House Living Room. Within groups of the same Ship-Date Record-IDs, the sorting is according to the Order-Num field.

The Extended-Delay Catalog in the Cake-House Dependencies Playroom is shown in FIG. 70 (see FIG. 35 for original data). The records are sorted first according to the Link-To Midi-Cable (see FIG. 33) connecting to the Cake-House Living Room and the Task-Time Catalog in the Cake-House Living Room (see FIG. 67) and then according to the Max-Delay-Time field.

The Path-Gallery-Frequency Catalog in the Shipments-House Living Room is shown in FIG. 71 (see FIG. 13 for original data). The records are first sorted according to a midi-cable connecting to the Shipments-House Path Gallery and the Frequency Catalog in the Shipments-House Path Gallery (see FIG. 66), second according to the Ship-Date Maxi-Cable connecting to the Days House and the Date Catalog (descending order) in the Days-House Living Room (see FIG. 62), and third according to the Order-Num field.

It should be noted that the records in FIG. 71 are grouped according to the <to,from> vectors. The order of the <to, from> vectors follows the pattern given in FIG. 66.

A basis component sort item is a member of a gallery's basis set and can only be used in a gallery catalog. As mentioned earlier, every gallery has a basis set whose elements are components of its base table. For example, the Source-Description Gallery in the Shipments House (see FIG. 16) has the basis set {from,description}. "From" is not an incoming maxi-cable to this gallery (it is an incoming maxi-cable to the base table), but it is a member of the basis set of the gallery, and consequently, it maybe used as a sort item. "Description" is not a field of this gallery (it is a field of the base table), but it is a member of the basis set of the gallery, and consequently it may be used as a sort item.

The use of basis component sort items in gallery catalogs will be illustrated with several examples.

The Carrier-Weight Catalog in the Shipments-House Daily-Destination Gallery is shown in FIG. 72 (see FIG. 20 for original data). The records are sorted first according to the Ship-Date Maxi-Cable (a Shipments-House Living-Room maxi-cable and a member of the gallery's basis set) connecting the Shipments House to the Days House and the Carriers Catalog in the Days-House Living Room (see FIG. 63) and then according to the Daily-Dest-Wt gallery field.

The Descr-Cost Catalog in the Shipments-House Source-Description Gallery is shown in FIG. 73 (see FIG. 16 for original data). The records are sorted first according to the Description field (a Shipments-House Living-Room field and a member of the gallery's basis set), second according to the SD-Cost field (a Gallery field), and third according to the From Maxi-Cable (a Living-Room maxi-cable and a member of the Gallery basis set) connecting the Shipments House to the Stations House and the Manager Catalog in the Stations-House Living Room (see FIG. 61). Sorting in accordance with the third sort item is illustrated by the ordering of the three medium widgets in FIG. 73.

A filter is a Boolean field which can be used for defining a subset of the records in a room. Once again, the Transportation Services Organization example will be used to illustrate the use of four filters having the arbitrarily-assigned names of Alpha, Beta, Gamma, and Delta.

The Alpha Filter is a field wherein the datums are true if and only if the datums in the Bldg-Num field in the head table 61 of the Shipments House (see FIG. 12) have only a single character, as shown in FIG. 74. When the filter is turned on, only those records for which the filter is true are displayed, as shown in FIG. 75. The user may also request that only those records not meeting the filter condition be displayed, thus showing records s4 and s5 in FIG. 74.

The Beta Filter is defined in the Shipments-House Path Gallery (see FIG. 19) and is true if and only if two conditions are both satisfied. The first condition is that the Cumul-Cost field must exceed 2.00. The second condition is that the child records in the Shipments-House Living Room must have, via the To Maxi-Cable, a parent record in the Stations-House Living Room for which the Alpha Filter is true. Note that all such child records will, as a group, have the same parent record in the Station-House Living Room across the To Maxi-Cable because the To Maxi-Cable is in the basis set of the gallery. The datums of the Beta Filter are as shown in FIG. 76. The filter is false for the first two records due to the first condition of the filter. The filter is false for the two additional records with s4 and s5 in the To-Maxi-Cable field as a result of the second condition (see FIG. 74).

When the Beta Filter is turned on, only those records for which the filter is true are displayed, as shown in FIG. 77.

Another alternative is to display the filtered records in highlighted form against the background of the unfiltered records, as shown in FIG. 78. Highlighting would normally be done with colors, but is done in boldface here.

The Gamma Filter is defined in the Shipments-House Living Room (see FIG. 13). This filter is true if two conditions are both satisfied. The first condition is that either the Beta Filter is true for the parent record in the Path Gallery or the Weight datum equals 21. The second condition is that the Cost datum not be equal to 2.35.

The datums of the Gamma Filter are shown in FIG. 79. The Beta Filter (see FIG. 76) is true for records with <from.to> vectors <s2.s1>, <s4.s2>, <s1.s2>, and <s3.s1> which are found in records o1, o2, o3, o5, o6, o7, o8, o9, o10, o11, o12, o13, o14, and o22. The Weight datum equals 21 in records o16 and o17. All of these records satisfy the first condition. However, the Cost datums in records o5, o10, and o22 are equal to 2.35 and these records do not satisfy the second condition. Thus, the Gamma Filter is true for records o1, o2, o3, o6, o7, o8, o9, o11, o12, o13, o14, o16, and o17.

The Delta Filter is defined in the Days-House Living Room (see FIG. 11). This filter is true if and only if there are at least four child records in the Shipments-House Living Room across the Ship-Date Maxi-Cable with the Gamma Filter true.

The datums of the Delta Filter are shown in FIG. 80. An examination of the records in FIG. 79 shows that the Gamma Filter is true for six of the records containing d1, four of the records containing d2, two of the records containing d3, and none of the records containing d4. Thus, only the Delta Filter datums for d1 and d2 are true.

Turning on the Delta Filter provides an answer to a very complex question:

"What dates have at least four shipments which did not cost $2.35 and which either weighed 21 ounces or were being shipped between a pair of stations whose cumulative cost exceeded $2.00 and whose destination station-code contained only one character?"

The answer to this question are the Record-IDs in FIG. 80 for which the Delta Filter is true—d1 and d2.

Each doorway contains one "marker" which identifies one visible record which is of interest. The record that is identified in this way is called a "marked record." The marker may be moved from one record to another.

Generally, more than one doorway will be open at a time. One doorway is designated as the "focused doorway. The user may change which doorway is the focused doorway by mouse selection. The marker in the focused doorway is called the "focused marker." The record marked by the focused marker is called the "focused record."

The user may move the focused marker by using a mouse, a scroll bar, or a search operation. The user is not permitted to move markers in non-focused doorways.

Every room that has at least one key field must have a set of "critical display fields" which must include all of its key fields and may optionally include others of its fields.

If the user is only allowed to view the critical display fields in a room and not allowed to view any other fields, then the identity of the record must be clear and distinct from the other records in the room that have the same incoming key records. Clearly, the key fields are necessary for this purpose. Sometimes adding another field or two will bring additional clarification.

There is a maximum allowable size for the critical display fields as a group, which is based upon how much screen space is required to display them.

A record R1 is defined to be the parent record of a record R2 across a cable C, where C is a maxi-cable or a midi-cable, if and only if there exists a partial record P1 which is in R1 and there exists a partial record P2 which is in R2, and P1 is the parent partial record of P2 through C. R2 is defined to be a child record of R1 across C if and only if R1 is the parent record of R2 across C.

The "key context" of a record is defined as a set of records comprised of the following:

1. The record itself;
2. All of its parent records across key maxi-cables;
3. All of its parent records across midi-cables;
4. For a gallery record, one of its child records in the room of its base table;
5. For a gallery record, the parent records of the child record cited in item 4 above across key maxi-cables that are included in the gallery's basis set;
6. The key contexts of all the records cited in items 2, 3, and 5 above.

The above definition of key context is recursive as a result of item 6.

As a general rule, data can never be viewed out of context unless such context is consciously masked from view by the user. In order to fit more data onto the screen, the user may optionally mask away the context information with a keystroke, but only after first seeing it (and thus being aware of it). With another keystroke, the context will again return.

A precise statement of the rule is that in any doorway, all records in the key context of the marked record in the focused doorway must have, at a minimum, their critical display fields displayed unless such fields are masked from view by action of the user after their initial display. This rule is enforced automatically by the DVS.

A typical doorway to the Shipments-House Living Room is shown in FIG. 81. Paintings will be discussed in detail below. Suffice it to say for now that, because of its painting, this doorway has two parts: a "header" area at the top and a "multi-record" area at the bottom. The marker is shown as a bold arrow on the left, and indicates one of the records in the multi-record area. Contextual data for the marked record which lies in ancestral houses is shown in the header area, as required. If the user moves the marker up or down to a different record in the Shipments House, then the contextual data in the header area will change accordingly.

Figure 82:
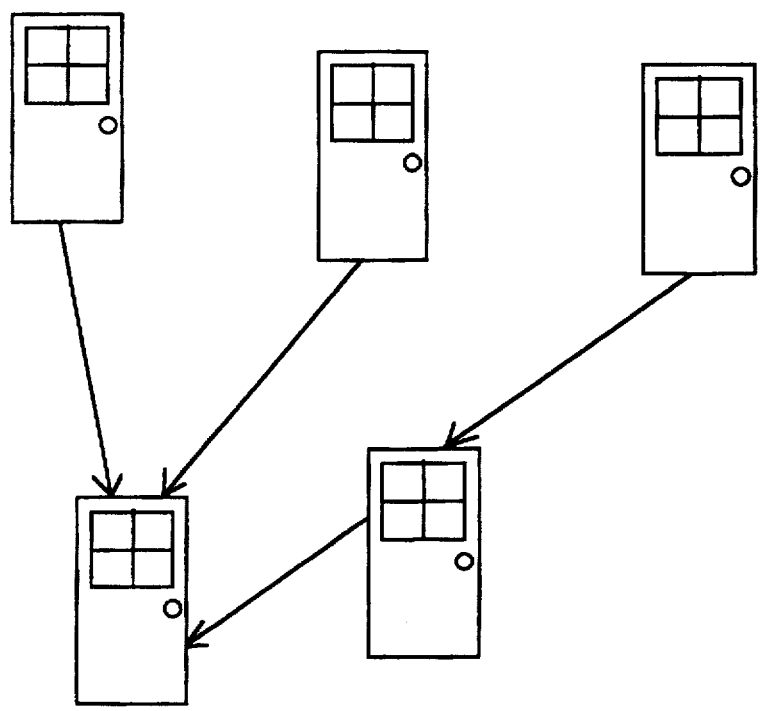
FIG. 82 is an example of a doorway network.

As previously stated, the village map is a topological graph stored in the headquarters building in which the nodes are houses and the links are maxi-cables. Also stored in the headquarters building are one or more "doorway networks", an example of which is shown in FIG. 82.

Many doorways may be in use at the same time. Some may be partially or totally visible while others may be hidden from view. The focused doorway must always be fully in view. The nodes of the doorway network are all of the doorways which are simultaneously in use at a particular time. The links of the doorway network are called "context paths" and represent contextual connections between the doorways.

When multiple doorways are used, then part or all of the context of a descendent doorway can be shown in its ancestral doorways, rather than locally in the descendent doorway. Very powerful visibility into the data results from this approach.

A context path from a parent doorway D1 to a child doorway D2 corresponds to a sequence of one or more cables leading from a table in the room of D1 to a table in the room of D2 through zero or more intermediary tables.

where all cables point in the direction from D1 to D2, and none of the cables is a mini-cable.

No sequence of context paths may exist whereby one may start at one doorway and then move from doorway to doorway, along such sequence (regardless of parent/child direction), never traversing the same context path twice, and return to the doorway at which one started (i.e. no directed or undirected loops).

When the marker in the focused doorway is moved, it will cause the markers in other ancestral doorways in the network to move automatically to retain context. In the Transportation Services Organization example shown in FIG. 83, a doorway to the Days-House Living Room is linked to a doorway to the Shipments-House Living Room. The painting in this doorway is slightly different than the painting shown in FIG. 81 in that the date information is missing from the top of the screen. The reason for the absence is that the date information is being provided by the Days-House doorway. The marker in the Shipments-House doorway is on Order Num 147 whose date is 5-Jun.-1991. The Shipments-House doorway is the focused doorway as indicated by its double border in FIG. 83. The marker in the Days-House doorway will automatically be on the date for Order-Num 147. Moving the marker in the Shipments-House doorway to a new record will result in automatic motion of the marker in the Days-House doorway to the parent record.

If the Days-House doorway becomes the focused doorway as shown in FIG. 84, and its marker is moved, then the marker in the shipments doorway will automatically move to the first record (according to the current catalog of that doorway) which is associated with the newly marked date.

When the selection subset in one doorway in the doorway network is changed, this change may cause the selection subset in other doorways in the network to automatically change. The Shipments-House doorway in FIG. 84 has a Date-Marker Filter defined which is true if and only if the Ship-Date (see FIG. 13 for original data) matches the The-Date for the record in the Days-House doorway that contains the marker. The results of turning on the Date-Marker Filter when the Days-House doorway is the focused doorway causes records with Order-Num datums 274, 313, 144, 147, 234, and 423, all of which have Ship-Dates of 5-Jun.-1991 (see FIG. 13), to be highlighted and causes the marker to move to the first highlighted record. The Days-House doorway is now the focused doorway, as indicated by its double border. If the marker in the Days-House doorway is moved, then the records highlighted in the Shipments-House doorway will be changed automatically to the appropriate subset.

If the Shipments-House doorway is set to exclusively display the selection subset, then it would be candidate for embedding as a scrolling region within the Days-House doorway.

When the user enters the system for a work session, he will begin with a graphical depiction of the village map. The user will select a particular house and a menu will be displayed which offers a choice of rooms in the house. When a room is selected, then a menu of doorways will be displayed. When a doorway is selected, it will appear. The user may flip back and forth between the view of the village and the doorways, opening additional doorways and connecting the doorways contextually together into doorway networks as needed. The user is thereby invited to understand the full structure and meaning of the data.

A painting is a way of laying out the data in a doorway on the screen. There are many options for designing a painting. Various styles of paintings are presented below.

One type of painting is the "Multi-Record Painting with Header Area" illustrated by FIGS. 81, 85, and 86. The lower area of the doorway displays a matrix of multiple records and their fields. The upper "header" area contains single datums for various fields.

In Shipments Doorway #1 in FIG. 81, all contextual datums from ancestral records are shown in the header area and all local fields (in the doorway's room) are shown as columns in the matrix area. However, as shown in Shipments Doorway #2 in FIG. 85, datums in an ancestral field (date) may be displayed in a column. Also, as shown in Shipments Doorway #4 in FIG. 86, a local field (cost) may be shown in the header area, rather than in a column.

The user may vary the ordering of the field columns and may mask certain fields off from view. In the example in FIG. 86, the positions of the description and weight columns have been swapped from what they were in FIGS. 81 and 85. Also in FIG. 86, a filter has been defined whereby records having the same date as the marked record (5-Jun.-1991) are highlighted (shown in boldface). If the marker is moved to a different record with a different date, then the highlighted selection will change.

The user may also vary the width of the columns (resulting in a cropped display of some datums when the column is too narrow) and the height of the rows (which affects word-wrapping and the number of records visible at one time). However, critical display fields may never be cropped. The user may also place literal text in certain places, such as above or below the matrix region.

A second type of painting is the "Single Record Painting", illustrated by FIG. 87. In this type of painting, only a single record is visible at a time. The user may design the painting pretty freely, composing it of field values from the record, field names, and literal text. Ancestral fields which are within the context may also be included. The single record visible automatically holds the marker. The user may move from one record to another within the doorway by paging or by using a scroll bar.

A third type of painting is the "Variant Record Painting with Blank Areas in the Matrix", illustrated by FIG. 88, and used in rooms with multiple tables. This doorway is for the Forest Units example whose data is presented in FIG. 58. All the fields in the living room are included in the matrix. But those fields that don't apply to a particular record are shown grayed out. The gray represents "no datum" for a record in a field.

A fourth type of painting is the "Variant Record Painting with Footer Area", illustrated by FIGS. 89 and 90, and also used in rooms with multiple tables. In this type of painting, only the head table fields are shown in the matrix area and the variant parts of a record are shown in a single datum format in a "footer" area at the bottom of the doorway. The data in the footer area applies only to the marked record. If the marker is moved, then the data in the footer area changes appropriately. When the type of record changes, then the format of the footer area changes. FIG. 89 has the marker on a suite and FIG. 90 shows the same doorway with the marker moved down one record to a cabin. Note that the footer area has automatically changed format in response to the marker motion.

Figures 91, 92:
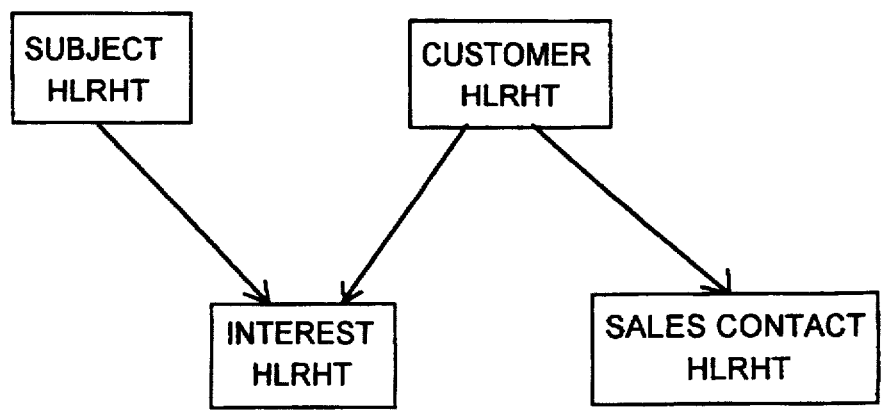
FIG. 91 shows Doorway #1 of the Customer House Living Room.
FIG. 92 shows the Magazine Sales data village.

A fifth type of painting is the "Painting with Embedded Doorways", illustrated by FIG. 91. Sometimes it is useful to embed one doorway inside another, with the embedded doorway having a filter which restricts its displayed records to the context of the doorway in which it is embedded. This is illustrated with a new example involving a magazine subscription sales company. The company contacts customer prospects by phone or mail to determine their interests and to sell magazines to them covering their areas of interest. The data village is shown in FIG. 92.

The Customer House contains a list of names, addresses and phone numbers of prospective customers. The Sales-Contact House logs each contact made to a given customer. The Subject House contains a list of subjects. The Interest House contains no fields—it is a junction between Customer and Subject which means that a record indicates that a particular customer has an interest in a particular subject. Each house has only a living room, each of which has a single table.

A full set of example data is not shown for this data village. The Customer-House Living-Room Doorway #1 is shown in FIG. 91. This doorway shows a single customer record, but contains two embedded doorways, one for Sales Contact and one for Interest. The Interest doorway is forced to display the Subject (its parent) by the context rule. Both the embedded doorways have filters defined to restrict their view to records wired to the displayed Customer record. Each embedded doorway has its own marker and scrolling ability.

The Customer-House Living-Room Doorway #2, shown in FIG. 93, shows a matrix of the customer records, with some of the customer fields in the matrix area, and others (pertaining to the address) in a single record area in the middle of the doorway. The datums in the middle area are for the record marked in the matrix area. As the marker is moved from one person to another, all of the data displayed in each of the two embedded doorways (as well as the address data in the middle area) changes to reflect the marked customer. When moving to a new customer, the markers in both embedded doorways automatically move to their first child record of the new customer, with respect to their active catalog.

Figure 94:
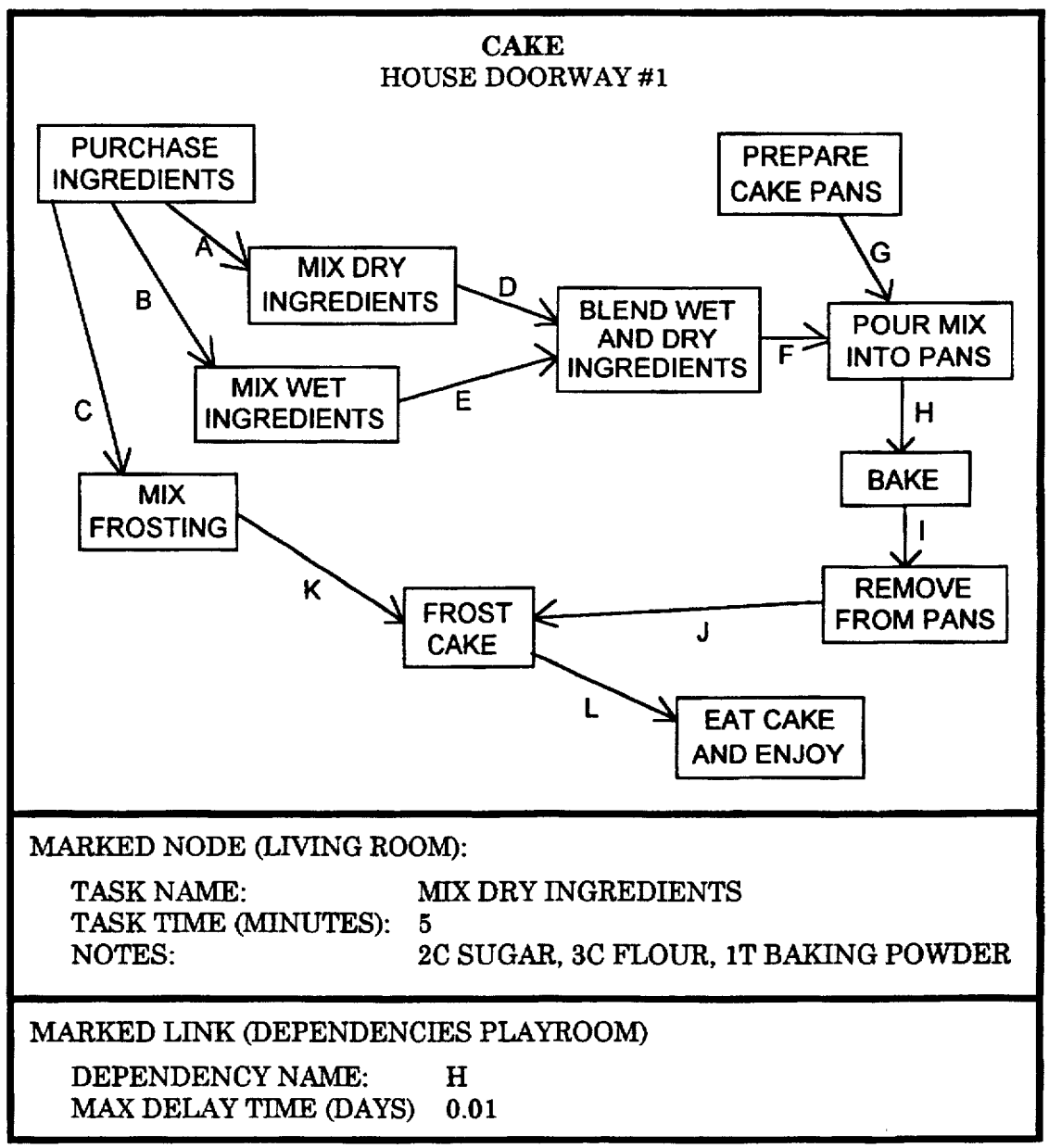
FIG. 94 shows a first view of Doorway #1 of the Cake House.
Figure 96:
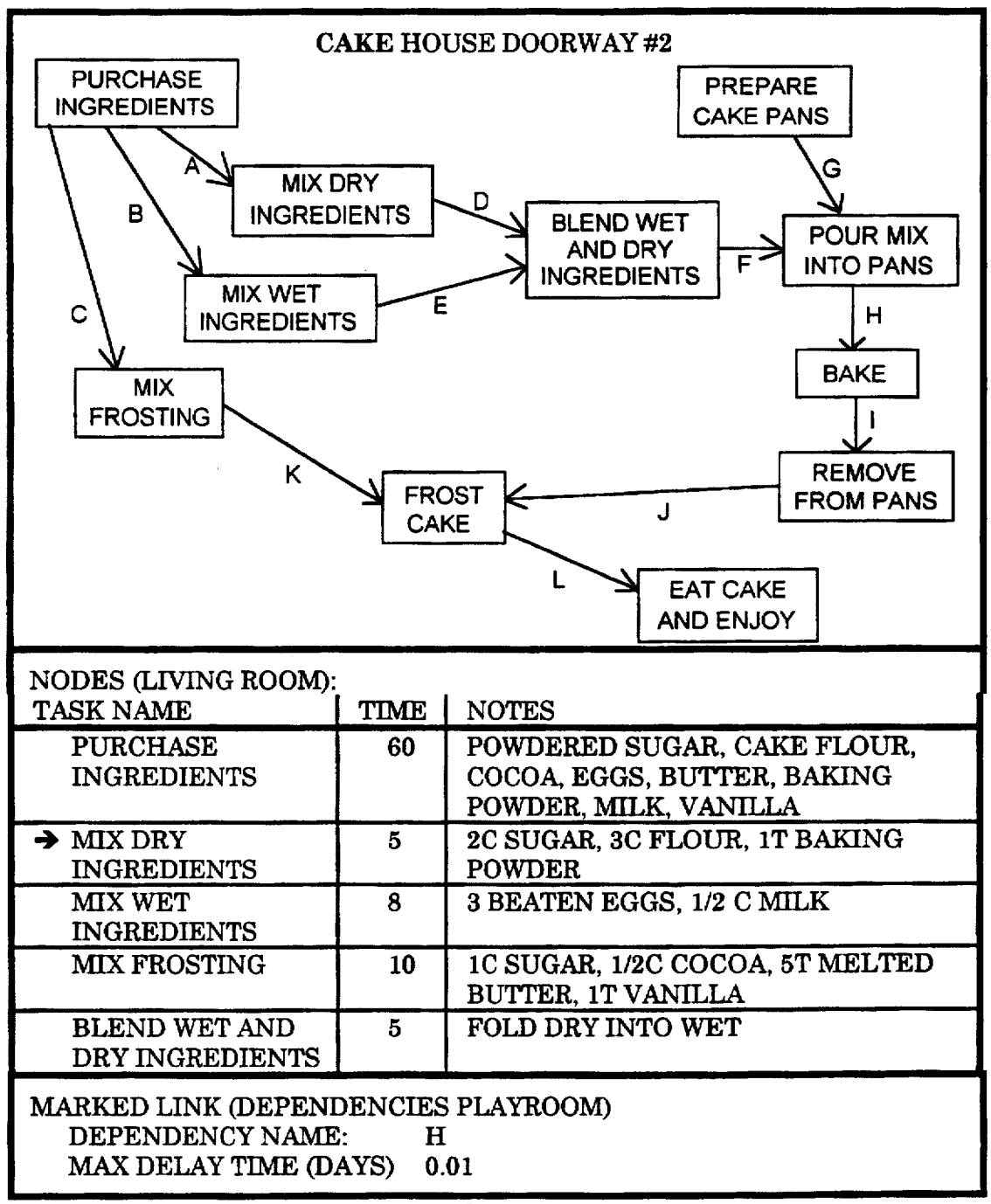
FIG. 96 shows Doorway #2 of the Cake House.

A sixth type of painting is the "Topological Graph Painting", illustrated by FIGS. 94, 95, and 96, all of which pertain to the Cake example previously presented in FIGS. 32, 33, 34, and 35. A special type of doorway, called a "house doorway" (as opposed to a room doorway) is used to view a topological graph, because it involves the combined graphical presentation of living room records (nodes) and playroom records (links). As a result, there are two markers in the doorway: one for the nodes and one for the links.

FIG. 94 shows the Cake-House Doorway #1. The marked node is shown in the graph with a bold rectangle. The marked link is shown with a bold arrow. Either marker can be moved by clicking with the mouse. The marked node and marked link have their fields displayed in the lower portion of the doorway. Thus, clicking on a different node will result not only in the node marker changing in the graph, but also in the datums changing in the "Marked Node" area. Likewise, clicking on a different link will result not only in the link marker changing in the graph, but also in the datums changing in the "Marked Link" area.

The user may use graphical editing techniques to insert and delete nodes, and to make interconnections between nodes. The system automatically untangles the graph and displays it with the following three very desirable characteristics: (1) the number of crossing links is minimized; (2) the length of the links is minimized (relative to the overall graph size); and (3) the arrows all point approximately in the same direction—in this case, to the right. The user may determine that direction (up, down, right, or left). When the display of a topological graph meets these conditions, the following two properties of the graph are easily seen: (a) nodes that are highly interconnected are located close to each other, thus revealing natural divisions of the graph into modules (due to the combination of 1 and 2 above); and (b) the relative ranking of the nodes in the topology is revealed as a result of (3) above.

The user can vary the scale of the display. FIG. 95 shows the same Cake-House Doorway #1 in a very small scale to accommodate a large graph. As the scale is reduced, there is less and less room for text in the graph. In this case, there is no room for any text. But clicking on any node or link causes its record to appear at the bottom.

FIG. 96 shows the Cake-House Doorway #2, which provides a matrix view of the cake tasks (nodes). There are now two node markers: one being the bold box in the diagram, the other being a highlighted row in the matrix. Both node markers are always on the same node record. If either node marker is moved by clicking the mouse, the other will follow in synchronism.

A seventh type of painting is the "Indentured List Painting", illustrated by FIGS. 97 and 98, both of which show the Cake-House Doorway #3. Rather than displaying the topological graph in graphical form, they show it as an indentured list of nodes. The list is organized so that for any node, the nodes which are its immediate successors in the topological graph appear indented one level beneath. Since some nodes must appear as the successor of multiple other nodes, a "home" or "away" designation is used on each node. Each node must appear with a "home" designation somewhere in the list, and its successors (if any exist) are all listed under the "home" designation. Any additional appearances of the node are designated as "away". Successors are not listed under any "away" designation (which would be redundant). Note that in the indentured format, there is no marker for the links. In an indentured list painting, the user may elect to invert the ordering of the indenture, so that predecessor (rather than successor) nodes are indented, as shown in FIG. 98.

Figure 99:
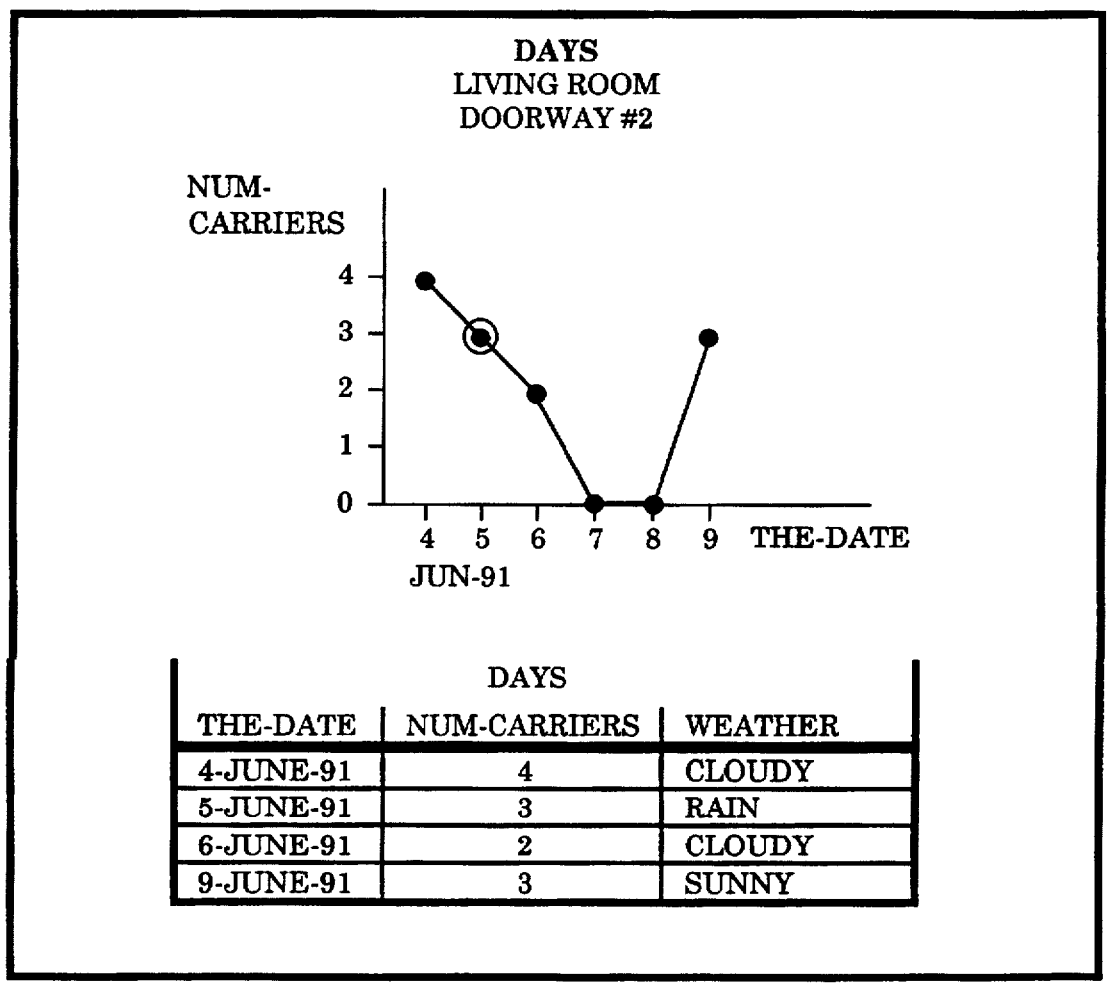
FIG. 99 shows Doorway #2 of the Days House Living Room.
Figure 100:
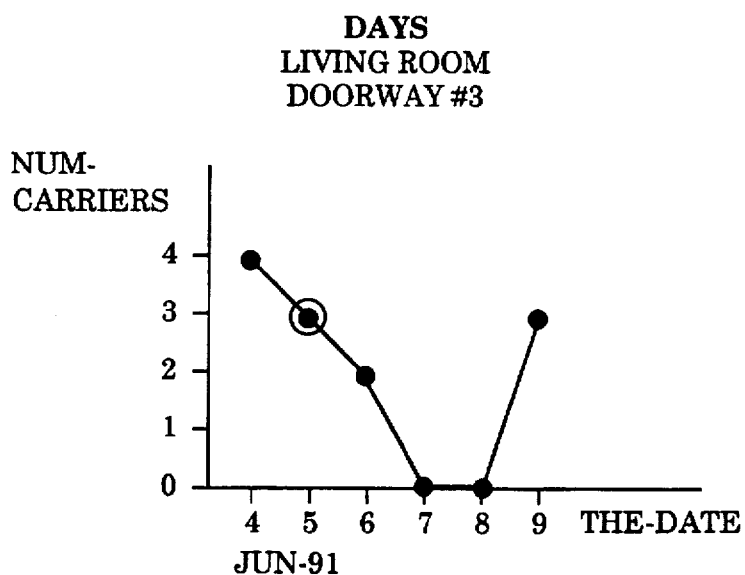
FIG. 100 shows Doorway #3 of the Days House Living Room.
Figure 101:
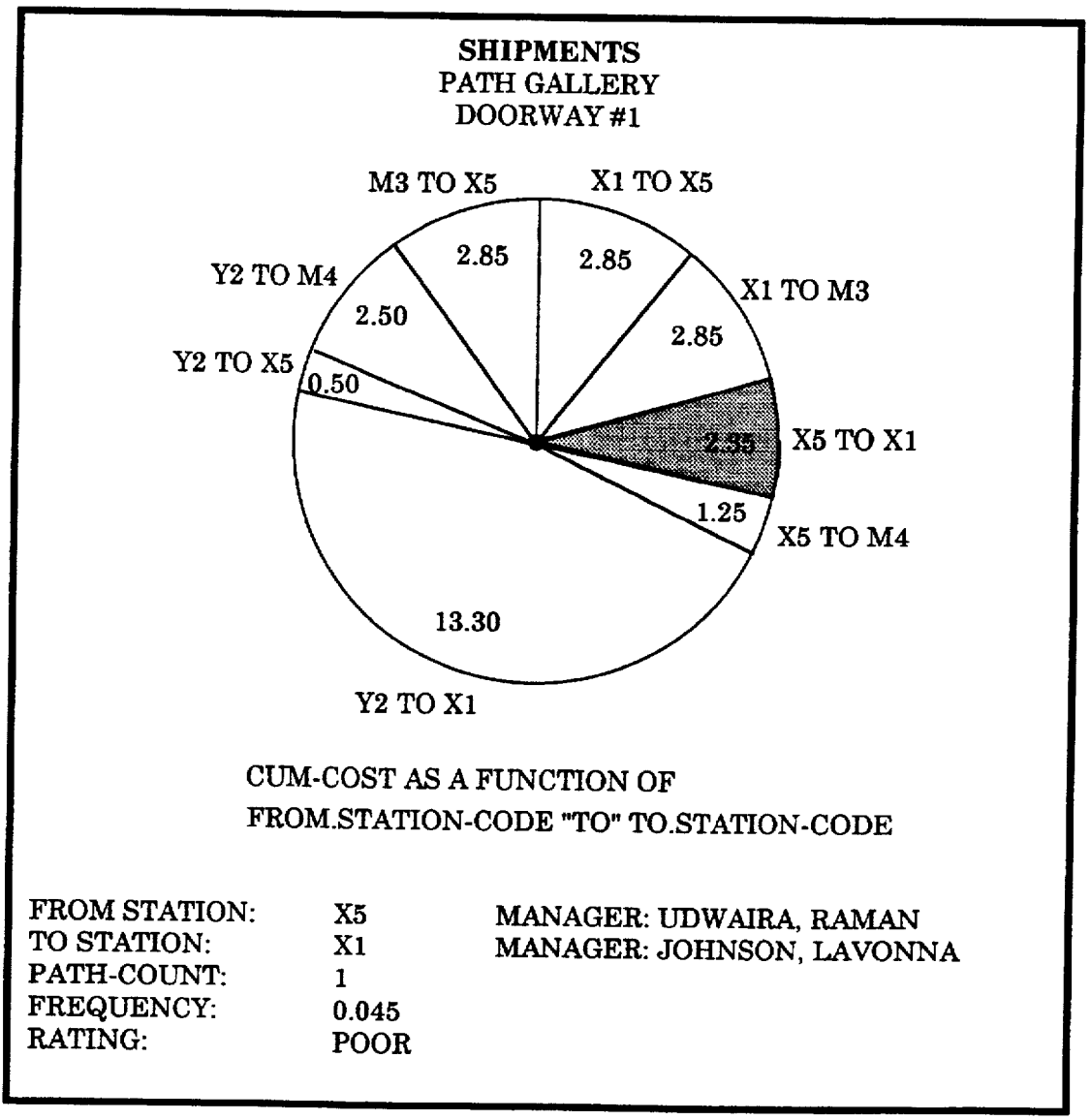
FIG. 101 shows Doorway #1 of the Shipments House Path Gallery.

An eighth type of painting is the "Numerical Graph Painting", illustrated by FIGS. 99, 100, and 101. A numerical graph presents numerical information in a graphical format.

FIG. 99 shows the Days-House Living-Room Doorway #2 from the Transportation Services example. The graph displays the number of carriers as a function of the date. The marker is shown by the circled point. The painting has been defined to display the value zero for missing records (June 7th and 8th). The lower area shows a matrix of the Days-House records. If the user moves the marker in the graph, by clicking another dot with the mouse or by using the arrow keys to move it in either direction along the graph, then the marker in the lower matrix area will also change. Likewise, moving the marker in the matrix area will cause the circled dot to change. The painting contains one marker with double representation. The DVS will not permit the dots for June 7th and 8th to be circled, since they have no records.

FIG. 100 is a variation of the doorway in FIG. 99 where the embedded doorway at the bottom shows the Shipments-House Living Room (instead of the Days-House Living Room) with a filter defined to restrict the view to those shipments that occurred on the marked date. Thus, if the user moves the marker in the graph, by clicking another dot with the mouse or by using the arrow keys to move it in either direction along the graph, then the shipment records displayed in the embedded doorway will change. The weather field in the Days House is not displayed. The marker in the matrix area is a second marker, independent of the circled dot.

FIG. 101 shows the Shipments-House Path-Gallery Doorway #1 from the Transportation Services example, whose data is shown in FIG. 19. A pie chart is shown wherein the angular size of each slice is proportional to the cum-cost. The (from/to) station code pair for each path is shown by the slice. The marked record is the shaded slice and may be changed by clicking on another slice or by using the arrow keys to step the marker around the pie. The area at the bottom details the marked record and the contextual details of the "from" and "to" paths in the Stations House.

The foregoing examples of paintings illustrate only a few of the possibilities for forming paintings. In general, a painting is comprised of a set of "painting elements" which are applied in connection with various fields, tables, context paths, etc. and which are positioned in some manner within the screen area of the doorway. Each of the foregoing painting examples involves one or more of the following painting elements:

"multi-record matrix painting element";
"single-record area painting element";
"embedded doorway painting element";
"topological-graph painting element";
"indentured-list painting element";
"numerical-graph painting element (many kinds)"; and
"literal-text painting element".

The user can create and modify paintings by using graphical editing techniques to place appropriate painting elements into a painting. The DVS automatically ensures that any painting created conforms in a consistent and proper manner with the underlying meta-data. It is therefore impossible to create a painting that is inconsistent with the data which it is to display. The DVS automatically creates one or more "default paintings" for each room which present the room's data in a reasonable manner. The user can utilize these default paintings as they are, modify them, or create new paintings from scratch.

A "report" is one or more doorways which get sent to the printer in their entirety, and consequently, additional formatting and literal text provisions are necessary. Reports are thus WYSIWYG (what you see is what you get), with the additional property that reports can extend beyond the limits of the screen.

The features of a doorway are sufficiently powerful to provide all of the features needed for reporting.

The filters discussed above provide a doorway with one mechanism for defining a "selection subset" of the records in a room. As previously explained, the selection subset can either be highlighted in a different color against the background of all of the records, or can be displayed exclusively, without showing the non-selected records.

A second mechanism for defining a selection subset is the use of tags. In a doorway, the user may tag individual records by selecting them with the mouse and thereby cause them to be included in or excluded from the selection subset.

Tags may be used in conjunction with filters by first applying a filter and then selecting additional records by tagging or by deselecting some records by tagging.

The prior discussion of doorway networks will now be expanded with a series of examples dealing with professional chess.

Figures 102, 103, 104:
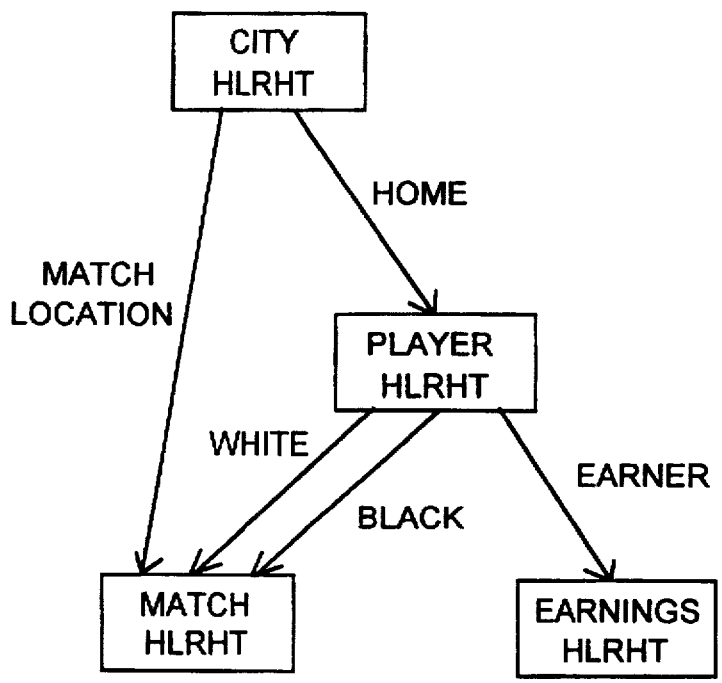
FIG. 102 shows the map of the Chess Village comprising a City House, a Player House, a Match House, and an Earnings House.
FIG. 103 shows the records in the City-House Living-Room Head Table.
FIG. 104 shows the records in the Player-House Living-Room Head Table.

In FIG. 102 is shown the chess data village where, for simplicity, a rectangle represents the house, the living room in the house, and the head table in the living room. The term HLRHT stands for House Living-Room Head Table. Each arrow represents a maxi-cable. All fields in this data village are key fields and all cables are key cables. The partial records in the City House, the Player House, the Earnings House, and the Match House are shown in FIGS. 103, 104, 105, and 106 respectively.

A doorway network is a topological graph in which all of the nodes are interconnected to all the other nodes (i.e. no separate disconnected sections can be isolated from one another). Each node is a distinct doorway and each link is a "context path". Note that there may be multiple doorways to the same room in a doorway network. A context path corresponds to a sequence of cables leading between the rooms of the doorways that it links. Note that two different context paths in the same doorway network may utilize the same cable in their corresponding cable sequence.

In the data village graph (nodes being tables and links being cables), directed loops are not allowed. For example, the following sequence is an undirected loop in the Chess Data Village: City House via Home Cable to Player House via Black Cable to Match House via Match Location Cable to City House. Some cables were traversed in the forward direction and others were traversed in the backward direction. If they had all been traversed in the same direction, the data village graph would not be allowed.

However, in a doorway network (nodes being doorways and links being context paths), no loops of any kind are allowed. Thus, no doorway network can have a structure like that of the Chess Data Village because of the undirected loops.

We will now consider six distinct doorway networks. Each of these doorway networks is independent of the others. Any combination of them, including all of them, could co-exist (perhaps limited by screen space, although overlapping is allowed). Each defines a particular context. Therefore, when several coexist, there are several distinct contexts being viewed. No doorway may appear in more than one doorway network.

Figures 107, 108:
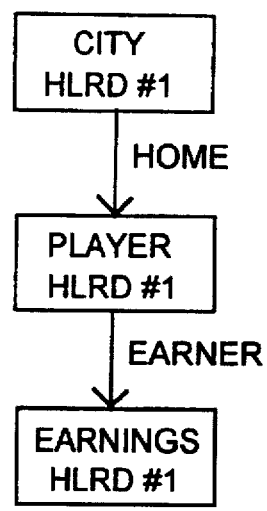
FIG. 107 shows the Chess Doorway Network DN-A consisting of the City-House Living-Room Doorway #1, the Player-House Living-Room Doorway #1, and the Earnings-House Living-Room Doorway #1.
FIG. 108 shows one example of the records on display in each of the doorways of FIG. 107.

The Chess Doorway Network DN-A is shown in FIG. 107. Each rectangle is a doorway to the living room of a house. Each arrow is a context path. The acronym HLRD stands for House Living-Room Doorway.

Two examples of the utilization of the Chess Doorway Network DN-A are shown in FIGS. 108 and 109. The focused doorway is Player HLRD #1, indicated by the bold double lines. In FIG. 108, the focused marker is on Jin and in FIG. 109, it has been moved to Nellis. The bottom doorway, Earnings HLRD #1, has been sorted by earning amount. Also, a filter has been defined in Earnings HLRD #1 which causes all children of the marked record in Player HLRD #1 to be highlighted (see FIG. 105). Note that moving the marker in the Player Doorway has resulted in automatic synchronized motion of the markers in both doorways (compare FIGS. 108 and 109). Note that in the Earnings Doorway the marker is always at the first child record along the context path according to the doorway's ordering.

Figures 110, 111:
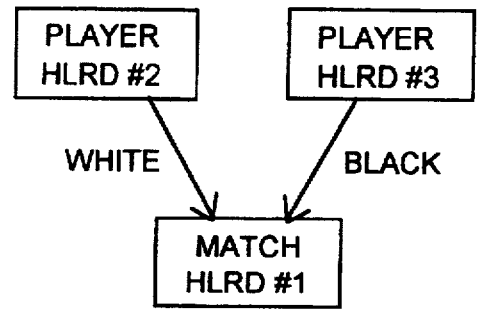
FIG. 110 shows the Chess Doorway Network DN-B consisting of the Player-House Living-Room Doorway #2, the Player-House Living-Room Doorway #3, and the Match-House Living-Room Doorway #1.
FIG. 111 shows one example of the records on display in each of the doorways of FIG. 110.

The Chess Doorway Network DN-B is shown in FIG. 110 and examples of its utilization is shown in FIGS. 111, 112, and 113.

The Match Doorway is the focused doorway in FIG. 111, and the two player doorways hold markers representing the white-chessmen and black-chessmen players for the marked match. Moving the marker in the Match Doorway would result in corresponding changes of both Player markers as appropriate.

Since there is no City Doorway above either Player Doorway, they must have the home city displayed internally (i.e. inside the Player Doorway). In Player Doorway #2, this is done by adding a column for the home city of each player. In Player Doorway #2, this is done by adding the home city of the marked player in the upper area of the doorway. Likewise, the match location city is shown in the header area of the Match Doorway.

In FIG. 112, the focused doorway has been changed to Player HLRD #2 (the white player) and the marker of that doorway has been moved to Nellis. The Match Doorway now has a filter defined so that the children of the white player are highlighted. The marked match is the first match (in the order of the Match Doorway) whose white player is the player marked in Player Doorway #2. Note that the marker in Player HLRD #3 (the black player) must correspond to the black player in the marked match.

In FIG. 113, the effect of moving the focused marker from Nellis (in FIG. 112) to Landy is shown.

Figure 114:
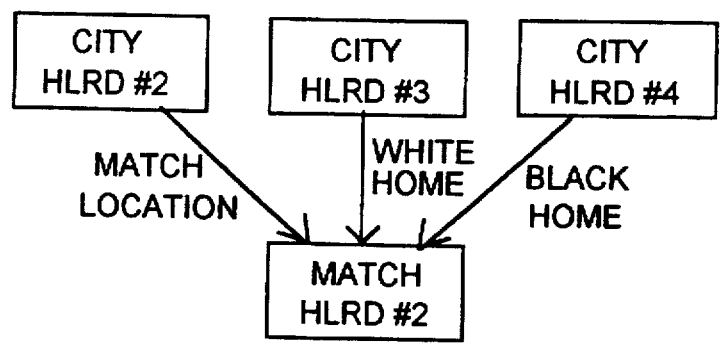
FIG. 114 shows the Chess Doorway Network DN-C consisting of the City-House Living-Room Doorway #2, the City-House Living-Room Doorway #3, the City-House Living-Room Doorway #4, and the Match-House Living-Room Doorway #2.

The Chess Doorway Network DN-C is shown in FIG. 114 and examples of its utilization is shown in FIG. 115.

Two of the context paths skip over the Player House Living Room Table (see FIG. 102). For this reason they have the double names "white home" and "black home". It is therefore necessary (by the context rule) that the critical display fields from the skipped tables be included in the Match Doorway. In this case, they have been incorporated as additional columns for the white and the black players in the Match Doorway. The Match Doorway is the focused doorway, so moving its marker will cause all three city markers to move, #2 to the city of the match, #3 to the home of the white player, and #4 to the home of the black player.

The Chess Doorway Network DN-D is shown in FIG. 116 and examples of its utilization are shown in FIGS. 117 and 118.

In FIG. 117, the Player Doorway must include the home city of the player, which is incorporated into a column. Likewise, the Match Doorway must include the match location city and the white player name (both of which are incorporated into columns) and the home of the white player (which is shown at the top of the doorway). The Match Doorway is focused, which means that the marked player in the Player Doorway is the black player for the marked match. The Earnings Doorway has a filter defined so that child records of the marked black player are highlighted.

The Match Doorway also has a filter. While the motion of markers is confined to the context paths in the doorway network, there is no requirement that filters be restricted to context paths. In this case, the Match Filter is defined to highlight any record which is a child of the marked player (Player HLRD #4) via either the White Cable or the Black Cable. Thus, the highlighted records are all matches played on either side by the marked player (who played black in the marked match). So the Match Doorway has highlighted all matches played by Clark on either side.

In FIG. 118, a focused marker has been moved up one record, causing a new black player to be marked in the Player Doorway (Landy). This causes a complete change in the highlighting in the Match Doorway, the new highlighting representing all the matches played by Landy on either side. Also, since Landy has no earnings at all, the marker in the Earnings Doorway disappears and there is no highlighting.

Figures 119, 120:
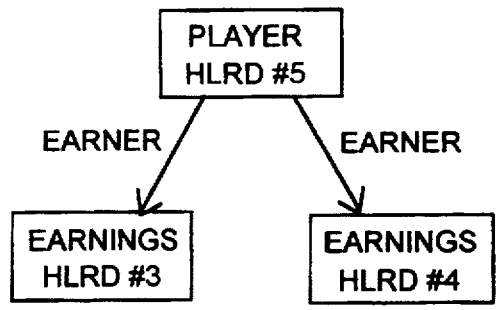
FIG. 119 shows the Chess Doorway Network DN-E consisting of the Player-House Living-Room Doorway #5, the Earnings-House Living-Room Doorway #3, and the Earnings-House Living-Room Doorway #4.

The Chess Doorway Network DN-E is shown in FIG. 119 and an example of its utilization is shown in FIGS. 120.

In this example, there are two Earnings Doorways. Both must necessarily have identical contexts. The only reason for having two Earnings Doorways is to accommodate differences in the way the data is displayed between the two. In this case, Earnings HLRD #3 is sorted in ascending order of earnings and Earnings HLRD #4 is sorted in descending order of earnings. Also, #3 has a filter defined to highlight 1993 earnings records, while #4 has a filter defined to highlight children of the marked record in the Player Doorway. There might have been other distinctions too, such as in the painting. The #3 Earnings Doorway holds the focus.

Note that since the two Earnings Doorways are sorted differently, each has its marker on a different earnings record for Jin (a non-focused child marker always goes to the first applicable record according to the ordering of its doorway).

The Chess Doorway Network DN-F is shown in FIG. 121 and examples of its utilization are shown in FIGS. 122–125.

In the example shown in FIGS. 122 and 123, all of the doorways except City have filters which highlight those records which are children of the marked parent record. All have just a single incoming context path. Also, all three Match Doorways have appropriate additional columns defined to complete their context, each of which is different because each has a different incoming context path.

The Player Doorway is focused with the focused marker on Jin. This results in San Francisco being marked in City, which has two consequences. First, it causes both Jin, Landy, and Watson (all of whom live in San Francisco) to be highlighted. Second, it causes the Match Doorway #4 to highlight all the matches played in San Francisco. Since Jin holds the marker in the Player Doorway, the Match Doorway #5 has highlighted all the matches where Jin played white and Match Doorway #6 has highlighted all the matches where Jin played black.

The example shown in FIGS. 124 and 125 continues the example of FIGS. 122 and 123 but moves the focused marker from Jin down to Landy. Since Landy also lives in San Francisco, this change produces no change in either the City Doorway or the Match Doorway #4. However, the other two Match Doorways must now change in both markers and highlighting to reflect the matches where Landy, rather than Jin, played white and black respectively.

When more than one doorway network is active, only one will be the focused doorway network. The focused doorways in non-focused doorway networks will become dormant (i.e. the user will not be able to move his markers around). A system of colors can be used to distinguish the focused doorway network from the non-focused doorway networks.

The houses in the data village are organized into one or more "neighborhoods". A neighborhood is a set of houses and/or subordinate neighborhoods. A house may only be a member of a single neighborhood. The data village itself is a neighborhood—indeed it is the largest one. In the example shown in FIG. 126, each rectangle is a house, each arrow is a maxi-cable, and each dashed enclosure is a neighborhood including the outermost one which is the data village itself.

Neighborhoods can represent different functional areas of an enterprise such as purchasing, accounting, inventory, sales, etc. Neighborhoods should ideally be designed in such a manner that the number of maxi-cables that cross neighborhood boundaries is minimal thereby minimizing the interactions between neighborhoods.

The user can constrain his or her view of the data village by masking off the contents of one or more neighborhoods as shown in FIG. 127. The contents of N1.1, N1.2, N2 and N3.2 have been masked off, leaving only their outlines in view with their neighborhood names inside. Note that the maxi-cables which cross their neighborhood boundaries remain displayed but pointing to and from the neighborhoods, rather than to and from the houses inside the neighborhoods that have been masked away. Note also that N1.2.1 has disappeared altogether since it is inside of N1.2.

The system can be configured so that when the user first enters the system, only the members of the outermost neighborhood (the data village itself) are displayed with no nested members as shown in FIG. 128. This approach gives the highest level summary view of the system. The user can then click on the neighborhoods that he wishes to dive into to see greater detail. In large systems with hundreds of houses that cannot all be displayed on the screen at once, this procedure would be of great value.

In the examples given previously, maxi-cables and midi-cables were always connected to head tables. However, maxi-cables and midi-cables may actually connect any table of one room to any table of another room. Multiple tables in a room permit records to be created having not only differing field structures but also differing maxi-cable and midi-cable connections.

The chart shown in FIG. 129 shows all of the possibilities for attaching table cables to tables at both ends. It should be remembered that maxi-cables must connect tables in two different houses, midi-cables must connect tables in different rooms of the same house, and mini-cables must connect different tables in the same room.

The connection of maxi-cables to non-head tables can be illustrated by adding a parent house and a child house to the Vehicles House, as indicated in FIG. 130.

The Engine-Types House contains information on various types of engines for use in cars, airplanes, and boats. It is connected to the Engine Table in the Vehicles-House Living Room. As a result, those vehicles which actually have engines will be wired to a parent record in the Engine-Types-House Living Room. Powerless vehicles (like sailboats and sail planes) will have no parent record in the Engine-Types House. The distinction is made on the basis of whether or not a particular vehicle record has a partial record in the Engine Table.

The Harbor-Cruises House contains information on boat cruises done in a harbor. Each living room record represents a single cruise (on a single boat). The boat used is cited as a parent record in the Vehicles House via a maxi-cable connecting to the Boat Table in the Vehicles-House Living Room. As a result, Harbor-Cruise records may only be wired to vehicles that are actually boats, because only boats will have a partial record in the Boat Table.

Every maxi-cable, playroom midi-cable, and guest-room midi-cable has a "cable range" with lower and upper bounds. Mini-cables and gallery midi-cables do not have cable ranges. An example from baseball will illustrate the principle. The data village for a baseball league is shown in FIG. 131.

Each team must have between 9 and 40 players. Thus, each record in the Teams House must have a minimum of 9 and a maximum of 40 child records in the Players House.

For each record in the parent table of a cable, the number of child records to which it is wired across the cable must lie in the range. Special editing rules will accommodate cable ranges with lower bounds greater than zero.

The lower bound may be any positive integer equal to or greater than zero and defaults to zero. The upper bound may be any positive integer equal to or greater than 1 and defaults to infinity.

The upper and lower bounds may alternatively be defined as functions in the context of the parent record. In this case, the bounds would vary according to the individual parent record.

Maxi-cables, playroom midi-cables, and guest-room midi-cables may contain a "cable restriction" which disallows certain parent records from being associated with certain child records. This restriction is stated as a Baleen expression in the combined context of the parent record and the child record. Mini-cables and gallery midi-cables may not have cable restrictions.

The baseball example of FIG. 131 illustrates the principle. The Teams-House Living Room has a Team-Sex field with the values men's team, women's team, and combined team.

The Players-House Living Room has a Sex field with the values male and female.

The Membership Maxi-Cable has a maxi-cable restriction whereby male players may only be wired to men's or combined teams, and female players may only be wired to women's or combined teams.

Each maxi-cable is either a required maxi-cable or an optional maxi-cable. When a table has a required incoming maxi-cable, then each one of its records must be associated with one of the parent records across that maxi-cable. In the case of an optional maxi-cable, the parent record may be nonexistent.

It is convenient to postulate the existence of a special "phantom partial record" in each table. The phantom partial record contains no data and never appears in any view.

With an optional incoming maxi-cable, a child record is allowed to be wired to the parent phantom partial record. With a required incoming maxi-cable, a child record cannot be associated with the parent phantom partial record.

This principle is illustrated by the example of FIG. 132. The Dates House contains a list of dates. The Projects House contains a list of projects, each of which has a start date and a complete date. When a project record is created, a start date must be associated with it, since the Start-Date Maxi-Cable is required. However, the completion date is not known at that time, which is why the Complete-Date Maxi-Cable is optional, as indicated by the circle. The newly-created project will be connected to the phantom parent partial record across the Complete-Date Maxi-Cable. When and if the project is completed, the Complete-Date parent record will be changed to an actual (non-phantom) date.

The phantom partial record counts as a value in the various vectors used by the system, including basis vectors, key vectors, and other vectors to be discussed later. Thus, it is involved in the calculation of gallery values and it influences keys. There is only one phantom partial record per table, so if two partial records each connect (optionally) to the phantom partial record, then they are considered connected to the same nonexistent record.

An optional maxi-cable may define an "optionality function" which discriminates between different child records on the basis of information within their context. An optionality function has the three possible values (1) parent record required, (2) parent record optional, and (3) parent record not allowed.

If no optionality function is defined for an optional maxi-cable, then the middle value (2) is used for all child records. If the optionality function were set to always produce the first value, then the maxi-cable would be equivalent to a required maxi-cable.

For example, a Project-Status field in the Projects-House Living Room (see FIG. 132) has the four possible values (1) in process, complete date unknown, (2) in process, complete date projected, (3) completed, and (4) canceled.

The optionality function defined on the Complete-Date Maxi-Cable is given in FIG. 133.

A further discussion of galleries is appropriate at this point. The first item to be discussed is the use of "band fields", and a house called People whose living room contains the names, ages, and incomes of people will serve as an example. The head table of the People-House Living Room is shown in FIG. 134.

In order to establish a gallery which summarizes the average income by age group, an Age-Band field must be added to the partial records of FIG. 134. The Age-Band field can take on the five values (1) 0 to 15, (2) 16 to 33, (3) 34 to 38, (4) 39 to 55, and (5) 55 up. The Age-Band datums are obtained by determining the band in which each Age datum falls. The table shown in FIG. 134 with the added Age-Band field is shown in FIG. 135.

A "band function" may be defined by any list of bands as long as all possible values are covered by the various bands. Band functions may be defined against any ordered data type.

The head table of the People-House Age-Band Gallery, based on the records in FIG. 135, is shown in FIG. 136.

The chart shown in FIG. 137 brings together four important sets that are defined with respect to any room:

"component set"—all of the components of the data in a room;

"key set"—that subset of the component set which forms the key for the room (does not apply to galleries);

"basis set"—the set upon which a gallery is built (applies only to galleries); and "dependency set"—a new set, also a subset of the component set, excluding all fields—includes only the data upon which the room "depends."

Four types of vectors are used to specify the values of the components of any of the four sets with respect to a particular record: the component vector, the key vector, the basis vector, and the dependency vector. These four vectors may also be defined with respect to a partial record in a particular table.

A gallery table, for which the base table is the Suite Table (a non-head table) in the Forest-Units-House Living Room (see FIG. 58) and the basis set is {TV Type}, is shown in FIG. 138. The table shows, for each TV Type, the number of units with that type of TV and the total occupant capacity of units with that type of TV. This gallery only summarizes the records in the Suite Table. Cabin records are not included in the summary.

The use of galleries will be further illustrated with data relating to an inventory of writing pens. The head table of the Pens-House Living Room is shown in FIG. 139. Pens are distinguished on the basis of style, ink color, and case color. Each record in the table is for an exact type of pen and its inventory level.

The base table of the Pens-House Style-Ink Gallery is the head table in the living room and the basis set is {Style,Ink Color}. The Gallery head table is shown in FIG. 140. The Gallery groups the pens by their style and ink color without regard to the case color. The Style-Ink-Pen-Type-Count field specifies the number of different kinds of pens in inventory for the style-ink-color combination and the Style-Ink-Inventory field specifies how many pens are in inventory for that combination. The Style-Ink Inventory is then processed through the band function having the bands 0–29, 30–59, and 60–100 to give the datums for the Style-Ink-Inventory-Band field.

The Pens-House Style-Ink-Band Gallery is the first example of a gallery which is not based upon the head table in a living room. The base table for the Style-Ink-Band Gallery is the Style-Ink Gallery head table, and the basis set is {Style-Ink Inventory Band}. The head table of The Style-Ink-Band Gallery is shown in FIG. 141.

The Style-Ink-Band Gallery could not have been defined on the basis of the living room directly. There is no way that the living room could have contained the Style-Ink-Inventory-Band field upon which this gallery is based, because that field was derived from summary information about the living room contained in the Style-Ink Gallery.

The base table for the Pens-House Ink Gallery is the living-room head table and the basis set is {Ink Color}. The head table of the Ink Gallery is shown in FIG. 142.

The Ink Gallery groups the pens by their ink color only, without regard to their style or case color. The Ink-Count field specifies the number of different kinds of pens in inventory for each ink color. The Ink-Inventory field specifies the number of pens in inventory for each ink color.

While this gallery summarizes the head table in the living room (which is the base table), it also summarizes the head table in the Style-Ink Gallery. The 1st, 5th, and 7th records in the Style-Ink Gallery have black in their Ink-Color field with Style-Ink-Pen-Type-Count datums of 3, 4, and 2 respectively and Style-Ink-Inventory datums of 82, 67, and 57 respectively. The 3, 4, and 2 sum to the 9 in the Ink-Count field for the black ink color (FIG. 142), and the 82, 67, and 57 sum to the 206 in the Ink-Inventory field (FIG. 142).

This result occurs because the basis set {Ink Color} of the Ink Gallery (FIG. 142) is a subset of the basis set {Style,Ink Color} of the Style-Ink Gallery. Accordingly, the DVS automatically creates a gallery midi-cable running from the head table in the Ink Gallery to the head table in the Style-Ink Gallery. The Ink Gallery summarizes two head tables: that in the living room and that in the Style-Ink Gallery.

The base table for the Pens-House Style-Case Gallery is the head table of the living room and the basis set is {Style,Case-Color}. The head table of the Style-Case Gallery is shown in FIG. 143.

This gallery groups the pens by their style and case color, without regard to the ink color. The Style-Case-Count field specifies the number of different kinds of pens for the style-case color combination while the Style-Case-Inventory specifies the number of pens in inventory for that combination.

As stated above, the Ink Gallery summarizes the head table in the Style-Ink Gallery because {Ink-Color} is a subset of {Style,Ink-Color}. But {Ink-Color} is not a subset of {Style,Case-Color}. Hence, the Ink Gallery does not summarize the head table in the Style-Case Gallery. Examination of the data reveals that there is no way to derive either the 9 in the Ink Gallery's Ink-Count field or the 206 in its Ink-Inventory field (see FIG. 142) from the Style-Case Gallery (see FIG. 143), the reason being that ink color is not reflected in this gallery. The Style-Case Gallery only summarizes the head table in the Pens-House living room and hence has only one outgoing gallery midi-cable.

Every house has a house map which shows all of its rooms and all of the midi-cables between the rooms. The house map is stored in the "hall desk" of the house. The house map for the Pens House is shown in FIG. 144. In this particular example, all of the midi-cables are gallery midi-cables.

A more complex house map is shown in FIG. 145. This house map illustrates architectural alternatives not seen in previous examples such as galleries summarizing playrooms and guest rooms, multiple playrooms (which represent different networks on the living room with different topologies), multiple guest rooms (which represent different kinds of hitch pins), and the connection of playroom midi-cables into playrooms from a variety of places.

When a particular record, partial record, or datum has been identified for some purpose either by a marker or internally by the DVS, the DVS is said to have "currency" on it. The DVS can have currency on any number of different records, partial records, and datums.

"Navigation" is the process by which a new currency is established on the basis of an existing currency or group of currencies. Navigation involves moving around a data village—moving up and down cables and moving from a record to one of its partial records or to a particular datum.

Currency can only be established on single "data fragments." A "data fragment" (or "fragment" for short) is a record, a partial record, or a datum. There are three types of "fragment sets":

"record set" (a set of records, all from the same room);

"partial record set" (a set of partial records, all from the same table); and

"datum set" (a set of datums, all from the same field).

The "cardinality" of a set is the number of elements in the set. Thus the cardinality of the set {Tom, Dick, Harry} is 3. The cardinality of the empty set { } is 0. A "binary set" is defined to be a set whose cardinality is less than or equal to one. The following are binary sets: {Tom}, {0}, { }, and {17}; and the following are not binary sets: {Tom, Dick, Harry}, {5, 8}, {0, 1}, and {9, 10, 11, 12}.

The foregoing example sets are all sets whose elements are known by their expression. On the other hand, a set may be represented by a variable or by an expression containing one or more variables. The variable X, or another symbol or an expression, can be used to represent a set. Now it is unknown what the elements of X are, because it is a variable. X could have any number of elements. X could be any of the foregoing sets. It is likewise unknown whether or not X is a binary set. Nonetheless, it is always true that X is a binary set if and only if the cardinality of the set X is less than or equal to 1. If it is known that a set X is a binary set, then it is known that it either contains a single element or it is empty. If it is unknown whether or not a set X is a binary set, then, although it might have 0 or 1 element, it might also have 2 or more elements. A set that is not known to be a binary set is called a "regular set".

A "binary fragment set" is any fragment set which is a binary set. If a fragment set is not known to be a binary fragment set, then we refer to it as a "regular fragment set". The terms "binary datum set", "regular datum set", "binary partial record set", "regular partial record set", "binary record set", and "regular record set" are similarly defined.

When referring to a fragment (as opposed to a fragment set), the terms "single fragment", "single datum", "single partial record", and "single record", are sometimes used to call attention to the fact that currency is held on that particular fragment.

Currency cannot be established on fragment sets or binary fragment sets, but fragment sets and binary fragment sets can provide the means for establishing currency on a single fragment.

Currency is required for the calculation of calculated fields and for other purposes. Therefore, we can rank the following in order of desirability for the purpose of establishing currency:

1. single fragment (the most desirable because currency can be established on a single fragment);

2. binary fragment set (less desirable than a single fragment, because the set might be empty, but more desirable than a regular fragment set, because if it is non-empty, then currency can be established);

3. regular fragment set (the least desirable because an entire set of fragments must be dealt with in the calculation).

It is extremely important to be able to navigate around a data village. "Cable navigation" is navigation along cables from one fragment or fragment set to another fragment or fragment set. For example, if one begins at a single child record and moves up a required maxi-cable, one arrives at a single parent record. On the other hand, if one begins at a single parent record and moves down the maxi-cable, one will arrive at a set of child records.

An "exclusive mini-cable" is a mini-cable (of either the format-field type or the automatic type) which is the only incoming mini-cable to a table. If there are multiple incoming mini-cables to a table, then none of them is exclusive.

The chart shown in FIG. 146 summarizes the various types of navigational moves along all types of cables. The chart shows the result of the various navigational moves from a single fragment and from a fragment set.

In FIG. 146 there is an asterisk by "down midi". This is because if it is a gallery midi-cable and a component in the gallery's basis set is being sought, then the result coming from a single fragment will be a single fragment (rather than the fragment set as cited in the table). This is because all the child partial records of the gallery midi cable are identical with respect to the components of the basis set.

In the process of navigating, it is often possible to obtain a partial record for a particular record, or a datum set from a record set. These are examples of "lateral navigation". Lateral navigation is navigation within a single room without the use of maxi-cables or midi-cables. Lateral navigation is very specific with respect to the type of fragment. Most such permitted lateral navigations are listed in FIG. 147.

There are many ways to navigate from a single fragment into a fragment set. There is only one way to get from a fragment set back to a single fragment, and that can only be done with datums. A datum set can be made back into a single datum by applying a "summary function" (also known as a "summarizer"). Record sets and partial record sets may be changed to datum sets for the purpose of applying a summary function.

A summary function is a function which, when applied to a set of datums, produces the same answer regardless of the order of the datums. The summary function returns a datum of the same datum type as that of the datums in the datum set. The summary function must have a special "failure value" which is to be returned in the event that the datum set it is applied to is empty.

Some examples of static summary functions are: "sum", "product", "maximum", "minimum", "record count", "mean", "median", "sum of squares", "variance", and "standard deviation".

As an example of the use of summary functions, consider the sum function, defined on integers, whose failure value is zero:

sum({3,0,5,9,1})=18 sum({4,2,−6})=0 sum({ })=0

Moving from a binary datum set back to a single datum can be done either by using a summary function or by using a "binary set function." A binary set function has a failure value (just as a summary function has) which is to be returned in the event that the binary datum set it is applied to is empty. If it is not empty, then it simply returns the single datum in the set. Binary set functions are very simple functions.

For example, a binary set function bsf7, which is applicable to a binary set of datums of type integer and whose failure value is 7, produces the following results:

bsf7({23})=23 bsf7({5})=5 bsf7({ })=7

A "partial record specifier" designates a desired partial record in some table, without naming the actual partial record. Generally, a datum from a specific field of the partial record is needed.

One type of partial record specifier is an "upward path". For example, with respect to any record in the Shipments-House Living Room, the following expression containing an upward path defines a datum in the date field of the Days- House Living Room: "up(ship-date).The-date". The upward path is designated by a symbol for going up (in this case, the word "up") followed by an incoming cable name. If the shipment record is the one with Record-ID o12, then the expression defines the datum "5-Jun.-1991" (see FIGS. 11 and 13). The upward path follows the wire up the designated cable to the parent record, and then the field "The-Date" is selected.

However, sometimes a partial record specifier may fail to produce a partial record. In this case, a failure value must be specified which will be utilized if no partial record is found. This applies to upward paths used on optional cables, since the phantom record may be the parent record.

Another type of partial record specifier is a "vector expression". The following example involves the City example shown in FIGS. 50, 51, 52, and 53. With respect to the City-House Living Room, the following expression defines a datum in the zip-code field of that room: "<up(in-state).state-name='Nebraska' AND city-name='Lincoln'>.zip-code.'nozip'". The vector expression is enclosed in angle brackets and comprises two conjoined sentences, the first defining a condition in the parent house State, and the second defining a local condition on the city-name. Two dots follow the partial record specifier, the first indicating a field, and the second indicating the failure value. Exactly one partial record meets the specification, whose Record-ID is c2, and thus the expression defines the datum "95648". Since the vector expression encompasses all the key components of the City-House Living Room, it is guaranteed that a binary record set will result, and thus no more than one partial record will ever meet the specification. If the partial record, c2, had not been present in the room, then no partial record would have worked, and the expression would have returned the failure value, "nozip".

A "partial record set specifier" designates a desired partial record set in some table, without naming the actual partial records. Generally, a datum based upon a specific field of the partial records is needed. However, the partial record set specifier will produce a datum set, not a binary datum set. Thus, a plurality of datums will generally be produced. The datums in this set must then be summarized by means of a summary function.

One type of partial record set specifier is a "downward path". For example, with respect to any record in the Stations-House Living Room, the following expression containing a downward path defines a datum summarizing datums in the cost field of the Shipments-House Living Room: "sum(down(from).cost.0)". The downward path is designated by a symbol for going down, in this case the word, "down", followed by an outgoing cable name. The summary function is sum, with the failure value 0. If the station record is the one with Record-ID, s3, then the expression defines the datum 16.30, which is the sum of the cost datums in all shipments that came from the Station s3 (see FIGS. 12 and 13). The downward path follows the wire down the designated cable to the child record set, and then the field "cost" is selected. The summary function is applied to all of these cost datums. On the other hand, if the station record is the one with Record-ID s5, then the expression defines the failure value 0, since there are no shipment records from Station s5.

Another type of partial record set specifier is a "vector set expression". The following example involves the Transportation Services example shown in FIGS. 11 and 13. Unlike the foregoing vector expression example involving zip codes, this expression does not specify all of the key components, and hence produces a partial record set rather than a binary partial record set. (Indeed, keys were never defined on the Transportation Services example.) With respect to the Shipments-House Living Room, the following expression defines a datum which is the average of some of the weight field datums in that room: "mean(<up(ship-date).num-carriers=3 AND cost=0.50>.weight.−1)". The dates d2 and d4 have 3 carriers. The partial records o9, o13, o14, o18, o19, o20, and o21 all meet the requirements of having a date of d2 or d4 and having a cost of 0.50. The weights of these shipments are: 3, 2, 3, 4, 1, 1, and 1 respectively. Thus the mean (average) is 2.14 (rounded off). If the cost part of the expression were changed to "cost=7.70", then only a single record o11 would meet the requirement, whose weight is 237, and the mean would simply be 237. If the cost part of the expression were changed to "cost=3.61", then none of the partial records would meet the requirement, and the expression would return the failure value (−1).

A "catalog function" maps a record in a room to a set of records in the same room on the basis of their relative position to the original record in one of the room's catalogs. Some example catalog functions are: "predecessor", "successor", "all-predecessors", "all-successors", etc. A "catalog binary function" is a catalog function which is also a binary function. Predecessor and successor are binary functions because they return at most one record. All-predecessors and all-successors are not binary functions because they could return any number of records. A catalog binary function is a type of partial record specifier. A catalog function is a type of partial record set specifier.

The following example involves the Station-Code-Catalog shown in FIG. 59. With respect to a record in the Station-House Living Room, the following expression defines a datum in the Manager field of that room: "predecessor(Station-Code-Catalog).Manager.'nobody'". Note that the predecessor function must be applied with respect to a catalog which defines the applicable record ordering. If the original station record is the one with Record-ID s1, then the expression defines the datum "Alvarez, D. H.". This is because the predecessor of s5 in that catalog is s5 which is a single record. The dot followed by "Manager" indicates the selection of a field from the record (producing "Alvarez, D. H." which is a single datum). On the other hand, if the original station record is the record with Record-ID s4, then the above expression will produce the failure value "nobody". This is because the predecessor of s4 in that catalog is nonexistent since s4 is the first record.

A topological function maps a node in a topological graph to a set of nodes on the basis of the topological interconnections in some playroom of the house. Some example topological functions are:

"children", "parents", "ancestors", "descendants", "exists-ancestor", "exists-descendent", "ancestors-incl-self" (which includes the original node), "descendants-incl-self", etc. A "topological binary function" is a topological function which is also a binary function. Whether a topological function is binary or not generally depends upon the topology of the playroom. For example, in a lattice a node can have any number of parents, so the parent function could return any number of records and hence, is not a binary function. However, in a hierarchy, a node can have at most one parent, so the parent function could return at most one record and hence is a binary function. A topological binary function is a type of partial record specifier. A topological function is a type of partial record set specifier.

The following example involves the Cake example shown in FIGS. 32, 34 and 35. With respect to the Cake House Living Room, the following expression defines a datum which is the sum of some of the task-time field datums in that room: "sum(ancestors(dependencies-playroom).task-time.0)". Note that the ancestors function must be applied with respect to a playroom, which defines the applicable topological graph. If the Cake record is the one with Record-ID, t8 ("bake"), then the expression defines the datum 86. Record t8 has ancestors t7, t6, t5, t3, t2, and t1, which have task-time datums of 2, 6, 5, 8, 5, and 60 respectively, which total 86. If the Cake record is the one with Record-ID, t1 ("purchase ingredients"), then the expression defines the failure value 0, since that node has no ancestors.

A navigational path is a chain of navigational moves and function calls which begins at an existing currency and ends at either a fragment or a fragment set. A new currency can be established on any type of fragment by declaring a navigational path which yields a single fragment of that type.

It was indicated earlier that each room in a house contains a desk and that a desk is used to store a dossier for each calculated field. A dossier contains the technical details of how the values of the datums in its field are to be calculated. Every calculated field has a dossier which sits in the desk of the room in which the field lies.

The dossier may make reference to datums and datum sets anywhere in the data village and may use functions (including algebraic operations) and programmatic syntax to combine them into a single datum value of the appropriate type for the calculated field. The process of calculating the field is called evaluating the dossier.

The datums and datum sets referred to by the dossier are called parameters to the dossier. Each parameter defines a navigational path to the datum or datum set. Before a dossier can be evaluated, all of its parameters must first be known. Some of the parameters may be datums in basal fields which are always known. Others are datums in calculated fields, which are only known after their dossiers have been evaluated.

A dossier may have its own field as a recursive parameter. A datum may be calculated on the basis of its own previous value or on the basis of another datum in the same field (such as its predecessor in some catalog). However, such recursive parameters must satisfy certain requirements to prevent infinite looping.

A dossier defines an interrelationship between the datums in its field and the datums used as parameters to calculate that field.

Two items that reside in the headquarters building, the village network and doorway network, have already been discussed. A third item in the headquarters building is the parameter network.

The purpose of the parameter network is to lay out, on the basis of parameters, what calculated field dossiers depend on what other calculated field dossiers and on what basal fields. An example is shown in FIG. 148.

The nodes in the parameter network are fields. All calculated fields from each room of each house and some basal fields are nodes in this network. The parameters of a calculated field lie in the fields which are its children in the parameter network. Basal fields may not have any children in this network since they require no calculation, and therefore no parameters. No directed loops are allowed except for loops involving a single node, because that could result in impossible calculations.

The parameter network shows the dependencies of the various calculated fields upon their respective parameters. If all of the calculated fields were to be recalculated, the process would begin with those calculated fields having only basal parameter fields, and then work its way up the network, only calculating a field when all of its calculated parameter fields have been calculated.

However, it will not ever be necessary to recalculate everything. Calculation is done on an incremental basis. Whenever a datum in a basal field is modified, then immediately, the affected datums in the calculated fields which are its ancestors in the parameter network are recalculated. This recalculation will generally only affect a small number of records, and the calculations are generally simple.

Even summary functions can generally be recalculated with only slight effort. For most common summary functions, when a new datum is added to the set of datums that they summarize, the new summary value is a simple function of the old summary value and the new datum. In the case of the most common summary function "sum,"

new sum=old sum+new datum.

And when a datum is deleted:

new sum=old sum−deleted datum

It is unnecessary to add up all the datums in all the records over again when one record is added or deleted.

Some summary functions require more complex approaches to the deletion case. For example, there is a problem with the product function if a datum whose value is zero is deleted. In such situations, the recalculation may entail the inclusion of all non-deleted datums.

As a result of this approach to calculating, all of the calculated fields are always up to date thus eliminating the enormous time that is taken in traditional systems running through records making calculations during a query or report generation.

As previously stated, the data in the DVS is of three kinds: 1) structural meta-data, 2) access meta-data and 3) user-data. It is now possible to categorize the many structures discussed thus far into these three categories. User-data comprises datums, partial records, records and wires (and that is all). Structural meta-data comprises: tables, fields, field-type families, field types, field key/non-key designations, field basal/calculated designations, dossiers (also known as calculated-field formulas), field default values, cables, cable key/non-key designations, cable required/optional designations, cable ranges, cable restrictions, cable optionality functions, rooms, key meta-vectors, playroom topologies, gallery basis sets, basis meta-vectors, houses, neighborhoods, data integrity rules (described below), automatic edits (described below), and any other structures which affect the values of user-data. Access meta-data comprises: catalogs, sort-items, sort-sequences, filters (a special case where a calculated Boolean field is considered access rather than structural meta-data), tags, paintings, painting elements, markers, doorways, focused/non-focused designators for doorways and markers, doorway networks, context paths, warning rules (described below), and any other structures that affect the access and display of user-data without restricting its values.

The DVS contains a system of "data organization rules" which govern the manner in which structural meta-data, access meta-data and user-data can be created, modified and deleted. Data organization rules are of two kinds: (1) "static data organization rules" which are the rules pertaining to the various structures and parts of the DVS and which are predetermined and fixed and thus cannot be altered by any user; and (2) "dynamic data organization rules" which apply exclusively to user-data and which can be created, modified and deleted by authorized users. Since dynamic data organization rules cannot affect meta-data, all the rules governing meta-data are fixed and unchangeable. But the user has considerable power in defining dynamic data organization rules which apply to user-data and which are important in defining application systems.

The static data organization rules include all constraints on meta-data. The DVS automatically ensures that all meta-data conforms to the static data organization rules. Any attempt to change meta-data which is in violation of the static data organization rules is automatically rejected by the DVS and the user is informed of the reason.

Some static data organization rules apply to user-data. But user-data is primarily governed by the meta-data, which includes dynamic data organization rules. Dynamic data organization rules are user-definable and changeable and they apply only to user-data. Thus, by interactively manipulating meta-data, all structures and rules governing user-data can be dynamically defined and changed. The DVS automatically ensures that all user-data conforms to the meta-data and the static data organization rules. Any attempt to change user-data which is in violation of the meta-data and/or the static data organization rules is automatically rejected by the DVS and the user is informed of the reason. Thus data integrity is assured.

Dynamic data organization rules are of three kinds: (1) "data integrity rules", (2) "automatic edits", and (3) "warning rules". Dynamic data organization rules of all three kinds can only be defined with respect to existing meta-data, which is to say that a "meta-data context" must exist within which the dynamic rule is defined.

Data integrity rules express restrictions on the user-data which stand in addition to any restrictions imposed on the user-data by the static data organization rules. For example, in the Transportation Services example (see FIGS. 9, 12, and 13), the following data integrity rule declares that envelopes may not have a cost exceeding 3.00: "If description= 'envelope' then cost<=3.00." Every data integrity rule has an accompanying "error message", which in this case could be, "envelopes may not have a cost exceeding 3.00". When defining a data integrity rule, the user is required also to write the error message for the rule. (The static data organization rules also have error messages that are permanently built into the DVS.) A second data integrity rule declares that the from station and the to station cannot be the same (which would represent a non-existent shipment): "up(from)≠up(to) ." The expression "up(from)" is a partial record specifier that represents the parent partial record of a shipment record, via the from cable. Likewise "up(to)" represents the parent via the to cable. The data integrity rule declares that these two partial records shall not be the same partial record. The accompanying error message might read, "to station must be different than from station." Whenever the user attempts a transaction to change user-data, all relevant data integrity rules are checked (as are all relevant static data organization rules affecting user-data), and if any would be violated, the transaction is rejected and the error message(s) are presented to the user. The DVS will not permit a data integrity rule to be defined by the user which is inconsistent with existing data integrity rules.

Automatic edits cause the DVS to edit user-data automatically on the basis of certain conditions. An automatic edit has two parts: a trigger and a response. The trigger specifies an external condition or an internal user-data condition. The DVS monitors for all trigger conditions, and whenever it detects one, then the associated response is executed. A response specifies one or more editing commands that are to be automatically executed by the DVS. In the Days-House Living Room (FIG. 11), the following automatic edit causes a new record to be automatically added each weekday: "UPON start-of-day(sysclock) AND weekday(sysclock) DO insert(the-date:=date(sysclock), num-carriers:=0, weather:='fair')." The trigger is the portion between the words 'UPON' and 'DO'. Start-of-day is a function of the system clock (sysclock) that is only true at the very beginning of the day. Weekday is a function of the system clock that is true if the day is Monday through Friday, but not Saturday or Sunday. Thus at the beginning of any weekday, the trigger becomes true, and causes the DVS to execute the response, which follows the word 'DO'. In this case the response is to insert a record into the Days House Living Room, whose the-date field is the date of the new date, and whose other two fields are specified. A user will have to go in when convenient and modify the num-carriers and weather datums to accurately reflect the day. But users will not be prevented from entering shipments just because no record yet exists for the date. The DVS will not permit any automatic edit to be defined which has any possibility of violating any data integrity rules or static data organization rules. Consequently, there is no need for any error message to be defined in association with an automatic edit.

A warning rule places a cautionary message before the user if it is violated but has no effect of restricting user. The user is free to either proceed in violation of the warning or to abandon the transaction. For example, in the Shipments-House Living Room (FIG. 13), the following warning rule might be helpful: "Warning-upon weight>1000)." with an associated, user-defined warning message, "WARNING: Do you really have a shipment over 1000 pounds?"

The DVS has a unified syntax for expressing the following user-defined items: (1) calculated field formulas, (2) data integrity rules, (3) automatic edits, (4) warning rules, (5) gallery basis sets, and (6) catalog sort-items. Any such expression consists of a sequence of "syntax elements" which adhere to a particular syntax (also known as "grammar"). In other words, the syntax defines what the syntax elements are and which sequences of them are legal and which are illegal. In describing the syntax, it is sufficient to state the rules by which any legal sequence is constructed.

Syntax elements are of two kinds: "primitive-syntax-elements" and "defined-syntax-elements". All of the primitive-syntax-elements are simply listed in FIG. 149. The defined-syntax-elements require a special language for their definition, which is called the "syntax definition language" (SDL). In SDL, each defined-syntax-element has a "syntax-element-definition" which is expressed recursively in terms of primitive-syntax-elements and defined-syntax-elements (possibly including the element currently being defined). In a syntax-element-definition, the defined-syntax-element is stated as equal to one or more alternative items, each separated by "l", with the definition ending in a period. Items in square brackets may appear zero or one time. Items in curly braces may appear zero or more times. Comments are shown in italics within parentheses. SDL may be used to describe itself in a "meta-syntax", which is shown in FIG. 150.

The purpose of the syntax is to define the valid expressions for the six above-mentioned user-defined items. Each such valid expression ultimately is defined in terms of a single "top-level" syntax-element-definition, where the final syntax element is the entire desired expression itself. The six top-level syntax-element-definitions are shown in FIG. 151. All the subordinate syntax-element-definitions used in the six top-level definitions are shown in FIGS. 152–158.

It must be understood that the primitive-syntax-element names listed in FIG. 149 merely represent symbols and words which will appear in the actual syntax. For example, the primitive-syntax-element "comma" would appear as the comma punctuation mark, and the element "table-name" would appear as the actual name of some table in the data village.

In summary, the syntaxes for expressing the six desired items are defined in FIG. 151, which utilize both the primitive-syntax-elements listed in FIG. 149 and other defined-syntax-elements shown in FIGS. 152–158 which in turn utilize each other as well as the primitive-syntax-elements, and it is all done according to the scheme shown in FIG. 150.

Editing user-data is the process of creating, modifying, and deleting the user-data values in the system in any of the following four ways:

1. inserting and deleting records in rooms (other than galleries);
2. modifying the wiring within any maxi-cable, playroom midi-cable, or guest room midi-cable (gallery midi-cables and all mini-cables are wired automatically by the system);
3. inserting and deleting fields in any room; and
4. modifying the basal datums in any room.

Partial records are not directly inserted or deleted. They are inserted and deleted as an automatic consequence of inserting and deleting records and of changing the table format fields in records.

Editing may only be done by authorized users or by the DVS itself.

Any attempt to edit the database which would result in the violation of any data organization rule is blocked. The user is informed of the exact nature of the error and, if appropriate, given the opportunity to correct it. This rule is automatically enforced by the system.

There are two cases of record insertion which must be distinguished:

1. the desired incoming cable portion of the key vector already exists in another record, so a unique new field portion of the key must be created among those records which share that incoming cable portion of the key;
2. the desired incoming cable portion of the key does not yet exist in any record, so the desired incoming cable portion of the key must be identified (any values may be placed into the field portion of the key since the resulting key vector will be the first one for the new incoming cable portion).

In the first case, where the incoming cable portion of the key already exists, the user may identify the desired incoming cable portion of the key in any of three ways:

1. by marking a record in the present room which has the desired incoming cable portion of the key;
2. by going to a doorway for a gallery whose basis set contains all the incoming cable(s) in the key and marking the desired record; or
3. by going to doorways of the parent rooms which are contextually connected to the present doorway via the incoming cables in the key and then marking the desired records in those parent doorways which, taken together, define the incoming cable portion of the key.

Then, a keystroke will cause a new record to be inserted into the room with the desired incoming cable portion of the key.

Each basal datum in the new record will initially contain the default value which is determined by its field. These default values can then be changed if desired by the user. In fact, unless no other record with that same incoming cable portion of the key has the default values in the key fields, the user must change one or more of the key fields to ensure a unique key field vector.

In the case of playrooms, the link-from and link-to parent records can be identified by utilizing a graphical doorway and using the mouse to "rubber band" a line from one node to the other.

In the second case, where the incoming cable portion of the key does not yet exist in any record, the desired incoming parent records for the new incoming cable portion of the key must be specified. Only the third of the three methods given previously—by going to doorways of the parent rooms which are contextually connected to the present doorway via the incoming cables in the key and then marking the desired records in those parent doorways which, taken together, define the incoming cable portion of the key—will work in this case. Again, a keystroke will then cause a new record to be inserted into the room of the present doorway with the desired incoming cable portion of the key. Again, each basal datum in the new record will initially contain the default value which is determined by its field. Again, these default values can then be changed if desired by the user. However, in this case there will be no requirement to change the key fields, since this record is the first with the new incoming cable portion of the key.

When a new record is inserted, its associations to parent records along non-key maxi-cables must also be established. Various alternatives are provided for this which are similar to those for the key maxi-cables. However, there is no distinction between the two insertion cases with respect to non-key associations.

An authorized user may delete a record from a (non-gallery) room by marking it and performing a keystroke. However, the deletion will be blocked if there are any child records in any subordinate table (via any maxi-cable or midi-cable) which are wired to this record. In such a case the user will be informed of which rooms contain the child records and will then have the opportunity to examine them in appropriate doorways.

If the user still wishes to delete the original record, then he must first delete or change the wiring of all of its child records.

The deletion may also be blocked on the basis of other data organization rules, such as the requirement that a maxi-cable have a non-zero minimum number of child records.

The user may change the wiring that a record in any kind of room has to parent records along any of its incoming maxi-cables, playroom midi-cables, and guest-room midi-cables. This change may be accomplished by going to the doorway which is contextually linked via the appropriate incoming cable, performing a keystroke, then marking the desired new record to which the association is to be made. Special provisions are made for selecting the phantom record in the case of optional maxi-cables.

Wiring changes of this kind may be made simultaneously to groups of records which all have the same parent record across a particular cable by using a gallery with that cable in its basis set. In such case, the wiring change is made from a single record in the gallery, and all records wired to the affected gallery record have their wiring changed accordingly.

The wiring change may be blocked on the basis of data organization rules such as key uniqueness and cable ranges.

When a new basal field is inserted in a table, new data values must be placed in all the datums in the new field.

When the field insertion occurs, all of its datums will initially receive their default values. The user will then have the opportunity to go down the column and modify them.

When a new calculated field is inserted, the dossier must be defined, and an initial calculation of all of the datums in the field must be performed.

Modifying a basal field means changing its datum type. A method is provided for translating the existing datums into the new type, and the translation is performed. This modification may impact the parameter network and require that descendent calculated fields be recalculated.

Modifying a calculated field means changing its dossier. Old datum values are thrown away and replaced with new ones calculated by the modified dossier. As with basal fields, this modification may impact the parameter network, and require that descendent calculated fields be recalculated.

Insofar as deleting either basal or calculated fields, if the field is a key field, the deletion is blocked if it will result in any key violations. The user will then be shown where all such key violations would occur. If the field is used anywhere in the parameter network as a parameter field, then it may not be deleted until it is released from that network by modification of other dossiers as appropriate.

An authorized user may modify any basal datum in any room. However, such modification is blocked if it violates any rules of the datum type. Such rules ensure the correct format and range of the value. The modification is also blocked if other data organization rules are violated such as uniqueness of keys.

Editing facilities are provided in the DVS including:
1. search and replace down a column;
2. copying a field or set of fields from another record;
3. mass changes to a specific value or set of values;
4. text formatting features;
5. spelling check;
6. undelete and undo; and
7. calculator.

In all cases where mass changes are requested by the user, if the changes in a subset of the affected records would cause data organization rule violations, then the user is informed of the exact problem, shown which records present problems, and given the option to abort the entire mass change or to individually rectify the problems.

Gallery records are inserted and deleted automatically. The results of the insertions and deletions must be reviewed, when appropriate, by the user.

The basal fields in a new gallery record will initially be set to their default values. The only incoming cables that a gallery can have are maxi-cables. If such a maxi-cable is optional, then the new gallery record will be wired to the parent phantom record. When the action which resulted in the gallery record insertion completes, the user's attention will automatically be called to the new gallery record, and he will be given the opportunity to change the values in the basal fields and to change the parent records.

If there is an incoming required maxi-cable, then, before the transaction which caused the creation of the new gallery record completes, the user will be forced to choose a parent record across the maxi-cable.

If an action would result in the deletion of a gallery record containing a basal field or a non-phantom parent record, then before the action is completed, the user's attention will be directed to the gallery record and its basal fields and parent records which would be lost, and he will be given the opportunity to abort the action.

A transaction is the smallest possible cycle of activity that results in a change of the data in the data village. During the transaction process, before the transaction completes, many different changes to the data could be input, all pending completion of the transaction before they are committed to the data village. No transaction will be allowed to commit (i.e. complete) unless, taken in its entirety, it will properly satisfy all data organization rules. Pending transactions which fail to meet this requirement will result in detailed error messages, giving the user the option to correct the difficulties or to abandon the transaction.

Extensive support features are included such as:

RECOVERY—Transactions which update the system in any way are committed. Once a commit takes place, then appropriate journal files are posted in the context of appropriate system backup files so that in the event of a system failure, the state of the database can be restored.

NETWORKING—The system supports an unlimited number of users on a network, utilizing a client/server architecture with multiple clients and servers. Data integrity is assured across the entire network.

SECURITY—An extensive system of access rights for authorized users regulate who can see what and who can do what to the DVS or to an application system. Access rights include various types of access (e.g. retrieve, modify, add, delete, grant access to others, etc.) across various functionalities (datum, record, field, room, house, doorway, catalog).

ARCHIVES—To improve system performance on regularly used data, data that is seldom used may be archived. This process leaves seldom-used data logically in the system (all wirings are maintained and enforced), but slows access to it.

A sketch of an application system for general ledger accounting is presented in FIGS. 159 through 185. FIG. 159 shows the data village map containing five houses. FIGS. 160 through 164 show house/room maps for each of the five houses. FIGS. 165 through 177 show the definitions of each room, including the fields in each table, the formula for each calculated field, the sort sequence for each catalog, and the basis set for each gallery. FIGS. 160 through 164 contain encircled designators consisting of a letter followed by a number. These designators represent data integrity rules, automatic edits and warning rules, and are positioned in the house/room maps in their correct meta-data context. For convenience, the letter is the same as the first letter of the house name. The data integrity rules, automatic edits and warning rules represented by the designators are defined in FIGS. 178 through 182. FIGS. 183, 184, and 185 show some example doorway paintings.

The painting in FIG. 185 is a "spreadsheet painting", a type of painting not heretofore mentioned, in which three rooms are simultaneously involved. The first room contains records represented by rows in the spreadsheet, in this case records in the Annual Balance Gallery (which correspond to individual "accounts"). The second room contains records represented by columns in the spreadsheet, in this case records in the Year/Quarter Gallery (which correspond to "quarters"). The third room must be a child of both of the first two rooms (see the unnamed gallery midi-cables in FIG. 164), and contains records represented by cells in the spreadsheet, in this case records in the Quarterly Balance Gallery (which correspond to an account balance for a quarter). The painting contains three markers, one for a row (shown as a right pointing arrow), one for a column (shown as a down pointing arrow), and one for a cell which is at the intersection of the marked row and marked column (shown as a bold rectangle).

The DVS is implemented by the software 97 shown in FIG. 186 which causes the computer system shown in FIG.

1 to perform specified fuctions and any other functions necessitated by the performance of the specified functions when commanded by a user either directly or through other software.

The software 97 consists of the control segment 99, the meta-data-changing segment 101, the user-data-changing segment 103, and the retrieving-and-viewing segment 105.

The control segment 99 is the manager of the software 97. As part of its management responsibilities, the control segment 99 interprets user commands to the computer system made either directly or through other software and assigns tasks to the other segments in keeping with the user's immediate objectives.

As previously stated, user-data consists of datums, partial records, records and wires. The management of user data is the ultimate purpose of the DVS. Meta-data consists of data that defines the structure of the user-data (including the dynamic data organization rules that affect user-data), and data that defines how user-data is accessed. The static data organization rules include all constraints imposed on meta-data and meta-data relationships. The meta-data together with other static data organization rules include all constraints imposed on user-data and user-data relationships.

The meta-data-changing segment 101 provides the means for changing meta-data and includes the introduction of new meta-data into the system, the deletion of existing meta-data, and the modification of existing meta-data. The meta-data-changing segment 101 is used to define a data village, including its houses, rooms, tables, cables, dynamic data organization rules, doorways, and other structures.

The user-data-changing segment 103 provides the means for changing user-data and includes the introduction of new user-data into the system, the deletion of existing user-data, and the modification of existing user-data.

Both the meta-data-changing segment 101 and the user-data-changing segment 103 include routines for producing an automatic response to a user input requesting a change in meta-data or user-data that goes beyond a simple execution of the user's request. The automatic response can be of three types: (1) to request and wait for additional data if such data is necessary to execute the requested change and other changes necessitated by the requested change in order to comply with the meta-data and static data organization rules; (2) to make the requested change together with any changes in other meta-data and user-data necessitated by the requested change; or (3) to reject the requested change if the requested change and the changes necessitated by the requested change cannot be accomplished without violating the data organization rules and to inform the user of the reasons for the rejection.

The retrieving-and-viewing segment 105 provides the means for retrieving and viewing a selected datum together with all associated datums, all related datums, and all connected datums linked to the selected datum by the cables interconnecting the tables.

After accomplishing its assigned task, the meta-data-changing segment 101, the user-data-changing segment 103, or the retrieving-and-viewing segment 105, returns control of the software 97 to the control segment 99.

What is claimed is:

1. A database management system comprising computer system hardware and database management software, the database management software causing the computer system hardware to perform specified functions and any other functions necessitated by the performance of the specified functions when commanded by a user either directly or through other software, the database management system comprising:

a means for adding, changing, deleting, and organizing meta-data and user-data according to predetermined static data organization rules, the data category called user-data comprising datums and compartments, a datum being a single item of information, a compartment being a place for receiving a plurality of associated datums, the data category called meta-data comprising tables, cables, and dynamic data organization rules, a table being a place for receiving a plurality of compartments, the datums in each of the compartments of a table being values of a set of a plurality of attributes, each cable connecting a first table to a second table, a cable being a representation of connections between the compartments in the first table and the compartments in the second table, the datums in connected compartments being called connected datums, a dynamic data organization rule being a user-defined constraint on user-data, a permissible dynamic data organization rule being a formula-defined dynamic data organization rule wherein the values of one or more formula-input datums in one or more tables are required to collectively satisfy a specified formula the formula-input datums having the same or different values, no datum having its value automatically determined on the basis of the formula, the static data organization rules including all constraints imposed on meta-data and meta-data relationships, the static data organization rules and the meta-data collectively including all constraints imposed on user-data and user-data relationships, inconsistent meta-data and user-data being prohibited by the static data organization rules, inconsistent meta-data being meta-data that do not conform with the static data organization rules, inconsistent user-data being user-data that do not conform with the static data organization rules and the meta-data, any attempt to add, change, or delete meta-data or user-data wherein the addition, change, or deletion will result in a violation of any of the static data organization rules or meta-data being automatically rejected bv the database management system;

a means for retrieving and viewing one or more selected datums together with one or more connected datums, the retrieving-and-viewing means automatically identifying the connected datums by tracing the cables connecting the tables, the retrieving-and-viewing means being activated by an external input, an external input being an input originating from without the database management system.

2. The database management system of claim 1 wherein a static data organization rule requires that one of the two tables connected by a cable functions as a parent table and the other functions as a child table with respect to the cable, the direction of a cable being from the parent table to the child table, the cable being referred to as the incoming cable at the child table, a static data organization rule requiring that a compartment in a child table be connected to one compartment in the parent table, the connection of each compartment in a child table to a compartment in the parent table being included in the user data, a static data organization rule permitting a compartment in a parent table to be connected to zero or more compartments in a child table, a static data organization rule prohibiting a directed cable loop, a directed cable loop consisting of N cables interconnecting N tables, N being an integer, the child table of the n'th cable being the parent table of the {(n+1) modulo N}'th cable, the cables being numbered from 0 to N−1.

3. The database management system of claim 1 wherein the retrieving-and-viewing means, upon request by an external input, displays a graphical depiction of the tables and interconnecting cables using the meta-data.

4. The database management system of claim 3 wherein the retrieving-and-viewing means, upon request by an external input and after selection of a table from the graphical depiction, displays one or more compartments in the table and the datums contained therein.

5. The database management system of claim 1 further comprising:

a means for changing the meta-data including inserting and deleting tables, inserting and deleting cables, and inserting, deleting, or changing dynamic data organization rules, the meta-data-changing means being activated by an external input.

6. The database management system of claim 5 wherein a static data organization rule requires that one of the two tables connected by a cable functions as a parent table and the other functions as a child table with respect to the cable, the direction of a cable being from the parent table to the child table, the cable being referred to as the incoming cable at the child table, a static data organization rule requiring that a compartment in a child table be connected to one compartment in the parent table, the connection of each compartment in a child table to a compartment in the parent table being included in the user data, the static data organization rules permitting a compartment in a parent table to be connected to zero or more compartments in a child table.

7. The database management system of claim 6 further comprising:

a means for changing the user data, including (1) inserting a compartment and its datums into a table, and if the table is a child table, inserting a connection from the newly-inserted compartment to a compartment in the parent table, (2) changing datums in an existing compartment, (3) changing the compartment in a parent table to which a compartment in a child table is connected, and (4) deleting a compartment and its datums from a table and deleting the connection from the compartment to a compartment in the parent table, a static data organization rule prohibiting the deletion of a compartment in a parent table which is connected to a compartment in a child table unless the child table compartment is also deleted, the user-data-changing means being activated by either an internal or external input, an internal input being an input originating from within the database management system.

8. The database management system of claim 7 wherein the system can be placed in an initial state, a permissible initial state being one wherein the meta-data and user-data are absent.

9. The database management system of claim 7 wherein the meta-data is subdivided into N classes numbered from 1 to N, N being an integer, a user of the database management system being assigned a user authorization number M, M being an integer between 1 and N, the static data organization rules prohibiting the user from making changes in meta-data in classes with numbers greater than M, the specification of the meta-data classes being included in the meta-data.

10. The database management system of claim 7 further comprising:

a means for producing an automatic response to an occurrence of an internal condition in the user-data which requires a change in the user-data or to an external input requesting a change in meta-data or user-data, the response being either (1) to request and wait for additional data if such data is necessary to perform the requested change and other changes necessitated by the requested change, necessitated changes being those changes that must be made to comply with the meta-data and the static data organization rules, (2) to cause the meta-data-changing means and/or the user-data-hanging means to make the requested change together with any changes in other meta-data and user-data necessitated by the requested change, or (3) to reject the requested change if the requested change and the changes necessitated by the requested change cannot be accomplished without violation of the static and/or dynamic data organization rules and to inform the requestor of the reasons therefor if the response is to a request by an external input.

11. The database management system of claim 10 wherein a trigger specification and a response specification are included in the meta-data, the trigger specification defining a condition for producing a trigger, the condition being either an internal condition in the user-data or a condition external to the database management system identified to the database management system by an external input, the response specification defining a change in the user-data to be made upon the occurrence of a trigger, the automatic-response-producing means executing the change in the user-data when a trigger occurs.

12. The database management system of claim 10 wherein the automatic-response-producing means, in response to an external input requesting a plurality of changes in meta-data and/or user-data, (1) causes the meta-data-changing means and/or the user-data-changing means to make all of the requested changes together with any changes in other meta-data and user-data necessitated by the requested changes, or (2) rejects the requested changes if the requested changes and the changes necessitated by the requested changes cannot be accomplished as a whole without violation of the data organization rules.

13. The database management system of claim 10 wherein a request by an external input to change displayed data is equivalent to a request by an external input to change the corresponding user-data, the automatic-response-producing means reacting to an external request to change displayed data by either (1) causing the retrieving-and-viewing means to make the requested change in the displayed data and then causing the user-data-changing means to make the requested change in the user-data together with any other changes in the user-data necessitated by the requested change or (2) rejecting the requested change if the requested change and the other changes necessitated by the requested change cannot be accomplished without violation of the data organization rules.

14. The database management system of claim 10 wherein the meta-data and user-data organizing means provides the means for defining one or more doorways, a doorway being a specification of a display format for one or more retrieved datums, one or more doorways being included in the meta-data, the retrieving-and-viewing means, upon request and the specification of a doorway, causing one or more datums to be displayed in accordance with the doorway.

15. The database management system of claim 14 wherein one or more doorways includes a compartment-ordering specification for one or more tables, the datums for a doorway being displayed in the order of their compartments as specified by the compartment-ordering specification.

16. The database management system of claim 14 wherein one or more doorways includes a compartment-subset specification for one or more tables, the compartment-subset specification being a listing of the compartments in a subset of the set of compartments in a table, the display of datums in a compartment subset being visually distinct from the other datums in the table.

17. The database management system of claim 14 wherein one or more doorways includes a plurality of slots, a slot being a region for displaying one or more datums, the doorway specification including any restrictions on the datum combinations that may be displayed in the plurality of slots.

18. The database management system of claim 14 wherein the meta-data-changing means includes a means for automatic doorway generation, the automatic-doorway-generation means, upon specification of a table, creating a doorway called a default doorway for the table, the default doorway specifying a display format for a plurality of the datums in the table and all datums in parent tables of the table that are connected to the datums in the table.

19. The database management system of claim 10 wherein each table contains one or more fields and each compartment in a table is a partial record, a static organization rule requiring that each datum in a partial record of a table be in a field of the table and that there be a datum in each partial record of a table in each field of the table, the datums in a particular field sharing an attribute, the fields for each table being included in the meta-data.

20. The database management system of claim 19 wherein the retrieving-and-viewing means, upon request by an external input, displays a graphical depiction of the tables interconnected with cables based on the meta-data.

21. The database management system of claim 20 wherein the retrieving-and-viewing means, upon request and after selection of a table from the graphical depiction, displays the field names, the partial records, and the datums in one or more partial records of the selected table, the field of each datum being indicated.

22. The database management system of claim 21 wherein a request by an external input to change the displayed data is equivalent to a request by an external input to change the corresponding meta-data or user-data, the automatic-response-producing means reacting to an external request to change displayed data by either (1) causing the retrieving-and-viewing means to make the requested change in the displayed data and then causing the meta-data-changing means or the user-data-changing means to make the requested change in the meta-data or user-data together with any other changes in the meta-data or the user-data necessitated by the requested change or (2) rejecting the requested change if the requested change and the other changes necessitated by the requested change cannot be accomplished without violation of the static and/or dynamic data organization rules.

23. The database management system of claim 21 wherein (1) the meta-data includes a textual description of each field and (2) the retrieving-and-viewing means, upon request and after selection of a field from the display of fields, partial records, and datums, displays the textual description associated with the selected field.

24. The database management system of claim 20 wherein (1) the meta-data includes a textual description of each table and cable and (2) the retrieving-and-viewing means, upon request and after selection of a table or cable from the graphical depiction, displays the textual description associated with the selected table or cable.

25. The database management system of claim 19 wherein a field and the field datums are any one of a plurality of types, the meta-data including the type of each field in each table, a static data organization rule requiring that the datums in a field be of the same type as the field, the automatic-response-producing means reacting to an external input requesting the insertion of a datum in a table or the substitution of a new datum for an old datum in a table by either (1) causing the user-data-changing means to make the requested insertion or substitution, or (2) rejecting the request as being incompatible with the data organization rules.

26. The database management system of claim 25 wherein the automatic-response-producing means reacts to an external input requesting a change in the type of a field from a first type to a second type by either (1) causing the meta-data-changing means to change the field type from the first type to the second type and causing the user-data-changing means to convert the datums in the field from the first type to the second type, or (2) rejecting the request as being incompatible with the static and/or dynamic data organization rules.

27. The database management system of claim 19 wherein each field and each datum is any one of a plurality of field types, a field type being an instance of a field-type family, a field-type family being characterized by one or more parameters and zero or more lists, a field type being defined by assigning values to the one or more parameters and defining the zero or more lists that characterize a field-type family, an ordinal type being a field type wherein the datums constitute an ordered domain, field-type-family instances being included in the meta-data, a static data organization rule requiring that the datums in a field be of the same field type as the field.

28. The database management system of claim 27 wherein the datums in a field are integers, the field being an integer type, the family of integer-type fields being characterized by two parameters, the first parameter specifying the number of bits required to represent a datum, the second parameter indicating whether the datums as a whole are signed or unsigned, the meta-datarganizing means, upon request and specification of an integer-type family and the values for the two parameters that characterize the family by an external input, creating an integer-type family instance.

29. The database management system of claim 27 wherein the datums in a field are real numbers, a real number being represented by the product of a real number called the mantissa and a real number raised to the power of an exponent, the exponent being a real number, the field being a real type, the family of real-type fields being characterized by four parameters, the first parameter specifying the number of bits required to represent a mantissa, the second parameter specifying the number of bits required to represent an exponent, the third parameter indicating whether the mantissas as a whole are signed or unsigned, the fourth parameter indicating whether the exponents as a whole are signed or unsigned, the meta-data-organizing means, upon request and specification of a real-type family and the values for the four parameters that characterize the family by an external input, creating a real-type family instance.

30. The database management system of claim 29 wherein the datums in a field are complex numbers, a complex number being represented by a real part and an imaginary part, the field being a complex type, the family of complex-type fields being characterized by two parameters, the first parameter specifying a real-type family instance to be associated with the real parts of complex numbers, the second parameter specifying a real-type family instance to be associated with the imaginary parts of complex numbers, the meta-data-organizing means, upon request and specification of a complex-type family and the values for the two parameters that characterize the family by an external input, creating a complex-type family instance.

31. The database management system of claim 27 wherein the datums in a field are numerical representatives of alphanumeric characters, the field being a character type, the family of character-type fields being characterized by one parameter and a list of characters, the parameter specifying the number of bits required to represent a numerical representative, the list specifying the characters into which the numerical representatives are mapped, the meta-data-organizing means, upon request and specification of a character-type family, a value for the parameter, and a list of characters that characterize the family by an external input, creating a character-type family instance.

32. The database management system of claim 31 wherein the datums in a field are strings of alphanumeric characters of a character type, the field being a string type, the family of string-type fields being characterized by two parameters, the first parameter specifying a character-type family instance corresponding to the alphanumeric characters, the second parameter specifying the maximum number of characters in a string, the meta-data-organizing means, upon request and specification of a string-type family and values for the two parameters that characterize the family by an external input, creating a string-type family instance.

33. The database management system of claim 31 wherein the datums in a field are texts, a text consisting of a sequence of one or more words, each word being a string of alphanumeric characters of a character type, a word being represented in a text by a numerical representative, the field being a text type, the family of text-type fields being characterized by two parameters and a list of words, the first parameter specifying a character-type family instance corresponding to the characters in the text, the second parameter specifying the number of bits required to represent a numerical representative, the list specifying the words into which the nunerical representatives are mapped, the meta-data-organizing means, upon request and specification of a text-type family, values for the two parameters, and a word list that characterize the family by an external input, creating a text-type family instance.

34. The database management system of claim 27 wherein the datums in a field are numerical representatives of phrases, a phrase consisting of a sequence of one or more words, the field being an enumeration type, the family of enumeration-type fields being characterized by one parameter and a list of phrases, the first parameter specifying the number of bits required to represent a numerical representative, the list specifying the phrases into which the numerical representatives are mapped, the data-organizing means, upon request and specification of an enumeration-type family, a value for the parameter, and a list of phrases that characterize the family by an external input, creating an enumeration-type family instance.

35. The database management system of claim 27 wherein the datums in a field are of a specified ordinal type and within a bounded range, the field being a subtype type, the family of subtype-type fields being characterized by three parameters, the first parameter specifying an ordinal-type family instance, the second parameter specifying the low end of the bounded range, the third parameter specifying the high end of the bounded range, the meta-data-organizing means, upon request and specification of a subtype-type family and values for the three parameters that characterize the family by an external input, creating a subtype-type family instance.

36. The database management system of claim 35 wherein the datums in a field are subdivided into element datums of a specified type, each element datum being associated with an index datum of a specified type, the element datums being sequentially ordered according to their associated indices, the field being an array type, the family of array-type fields being characterized by two parameters, the first parameter specifying a subtype-type family instance corresponding to the index datums, the second parameter specifying a field-type family instance corresponding to the element datums, the meta-data-organizing means, upon request and specification of an array-type family and the values for the two parameters that characterize the family by an external input, creating an array-type family instance.

37. The database management system of claim 35 wherein the datums in a field are numerical representatives of sets of values of a specified ordinal-type, the field being a set type, the family of set-type fields being characterized by one parameter, the parameter specifying a subtype-type family instance corresponding to the values in a set, the meta-data-organizing means, upon request and specification of a set-type family and the value for the one parameter that characterizes the family by an external input, creating a set-type family instance.

38. The database management system of claim 27 wherein the datums in a field are numerical representatives of contiguous bands of values of a specified ordinal-type, the ordinal-type being called the underlying type, the field being a band type, the family of band-type fields being characterized by two parameters and a list of bands, the first parameter specifying an ordinal-type family instance, the second parameter specifying the number of bits required to represent a numerical representative, the list specifying the bands into which the numerical representatives are mapped, a datum of the specified ordinal type falling into exactly one band, the meta-data-organizing means, upon request and specification of a band-type family, values for the two parameters, and a list of bands that characterize the family by an external input, creating a band-type family instance.

39. The database management system of claim 38 wherein the automatic-response-producing means, upon request and specification of a first datum in a field whose type is the underlying type of a band-type, creates a second datum in a field whose type is the band-type, the second datum representing the band corresponding to the first datum.

40. The database management system of claim 27 wherein the datums in a field are dates and/or times expressed in date units, the field being a date type, the family of date-type fields being characterized by four parameters, the first parameter specifying a standard unit of time, the second parameter defining the date unit by specifying the number of standard units of time in a date unit, the third parameter specifying the earliest date, the fourth parameter specifying the latest date, the meta-data-organizing means, upon request and specification of a date-type family and values for the four parameters that characterize the family by an external input, creating a date-type family instance.

41. The database management system of claim 19 wherein a field is either a basal field or a calculated field, a basal field being a field whose datums are included in the meta-data or are obtained from an external source, a calculated field being a field whose datums are calculated by means of a formula supplied by an external source, the formula expressing a functional relationship between a datum in a calculated field and one or more other datums.

42. The database management system of claim 41 wherein the meta-data includes a basal/calculated indicator for each field in each table, a default value for each basal field in each table, and the formula for each calculated field in each table.

the basal/calculated indicator indicating whether the associated field is a basal field or a calculated field, the basal-field default value being the value of a basal-field datum whenever the basal-field datum has not been supplied by an external source, the automatic-response-producing means reacting to an external input requesting that a basal field be changed to a calculated field, the request being accompanied by the formula defining the calculated field datums, by (1) causing the meta-data-changing means to change the basal/calculated indicator to indicate a calculated field and adding the formula to the meta-data and (2) causing the user-data-changing means to calculate the datums in the calculated field, the automatic-response-producing means reacting to an external input requesting a change in the formula for a calculated field, the request being accompanied by a new formula, by (1) causing the meta-data-changing means to substitute the new formula for the old formula in the meta-data and (2) causing the user-data-changing means to recalculate the datums in the calculated field, the automatic-response-producing means reacting to an external input requesting a calculated field be changed to a basal field, the request being accompanied by a default value, by (1) causing the meta-data-changing means to change the basal/calculated indicator to indicate a basal field and inserting the default value into the meta-data and (2) causing the user-data-changing means to substitute default values for the calculated datums if new values were not supplied by the external source.

43. The database management system of claim 41 wherein the automatic-response-producing means causes the user-data-changing means to recalculate a calculated datum after a datum to which the calculated datum is functionally related by its associated formula changes.

44. The database management system of claim 19 wherein the retrieving-and-viewing means, upon request and identification of a specification for a datum matrix, displays a plurality of datums for a plurality of fields in a plurality of partial records in a matrix format of rows and columns in accordance with the datum matrix specification, each row being a partial record or a portion thereof and each column being the partial-record datums for a field or a portion thereof, one or more datum matrix specifications being included in the meta-data.

45. The database management system of claim 44 wherein a datum matrix specification specifies a slot size for each field of a table, a slot being a rectangular area reserved for the display of a datum for a field in a partial record of the table.

46. The database management system of 44 wherein the retrieving-and-viewing means, in response to a request and specification of a field composition change in a datum matrix, executes the change, a field composition change consisting of one or more of the group consisting of (1) a change in order of the fields, (2) the deletion of at least one field, or (3) the addition of at least one field.

47. The database management system of 44 wherein a field identifier appears above or below each field column of a datum matrix, the display of a datum matrix without an associated field identifier above or below each column being prohibited by a static data organization rule.

48. The database management system of claim 19 wherein the retrieving-and-viewing means, upon request and identification of a table, a designated partial record in the table, and a specification for a partial record format, displays in accordance with the partial record format specification a view of the datums in the designated partial record from the table, the specification of the partial record format being included in the meta-data.

49. The database management system of claim 48 wherein the retrieving-and-viewing means, upon request and identification of a table, a designated partial record, a specification for a partial record format, and a specification for a graph format, displays in accordance with the specifications a view of the designated partial record from the table and a graph, the graph being a representation of a plurality of points in a two-coordinate system, each point being associated with a partial record in the table, a datum from a first field in the table being one coordinate of a point, a datum from a second field in the table being the other coordinate of the point, the specification for the graph format being included in the meta-data.

50. The database management system of claim 49 wherein the point corresponding to the designated partial record is highlighted in the graph, the automatic-response-producing means reacting to a request from an external input to change the designated partial record by unhighlighting any existing highlighted point and highlighting the point corresponding to the new designated partial record.

51. The database management system of claim 48 wherein the view of the datums includes the field identifiers associated with the datums, a static data organization rule prohibiting the display of datums without the associated field identifiers.

52. The database management system of claim 19 wherein a table includes at least one filter field, a filter field representing a filter, a datum in a filter field being either a "0" or "0", the retrieving-and-viewing means, upon request, identification of the table and a filter, and specification of a display format, displays in the specified display format the datums in the plurality of partial records after filtering by the filter, the display formats comprising a masked format and a colored format, a masked format being a display format where only the partial records for which the filter-field datums are "1's" are displayed, a colored format being a format where the partial records for which the filter-field datums are "1's" are visually distinguishable from the partial records for which the filter-field datums are "0's".

53. The database management system of claim 52 wherein at least one filter field is a basal field, a basal field being a field whose datums are obtained from an external source.

54. The database management system of claim 52 wherein at least one filter field is a calculated field, a calculated field being a field whose datums are calculated by means of a formula supplied by an external source, the formula expressing a functional relationship between the calculated-field datum and one or more basal-field datums and other calculated-field datums, a basal field being a field whose datums are included in the meta-data or are obtained from an external source, the meta-data including the formula for calculating the datums in each calculated field.

55. The database management system of claim 19 wherein each cable contains one or more wires, each of the one or more wires in a cable connecting a partial record in a child table to a partial record in a parent table, the partial record in the child table being called the child partial record, the partial record in the parent table being called the parent partial record, a wire being a representation of a relationship between the datums in the child partial record and the datums in the parent partial record, each wire having the name of the partial-record to which it connects in the parent table, the user-data including the names of the wires connecting to the partial records in each child table, a sequence of N cables wherein the child table of the n'th cable is the parent table of the (n+1)'th cable being a downward path from an ancestral table to a descendent table, N being an integer and n being any integer between 1 and N−1, the ancestral table being the parent table of the first cable in the sequence, the descendent table being the child table of the N'th cable in the sequence, an ancestral-table partial record being wired to a descendent-table partial record via a downward path and a descendent-table partial record being wired to an ancestral-table partial record via a downward path if the ancestral-table partial record is connected via the downward path to the descendent-table partial record by a sequence of wires in the downward path wherein the child partial record of the n'th wire is the parent partial record of the (n+1)'th wire, n being any integer between 1 and N−1.

56. The database management system of claim 10 wherein each dynamic data organization rule has an associated user-defined error message, the error messages being included in the meta-data, the automatic-response-producing means, upon rejecting a request to change user data because of a violation of a dynamic data organization rule, giving its associated error message as the reason therefor.

57. The database management system of claim 55 wherein each field and each cable is either key or non-key, a key meta-vector is associated with each table, and a key vector is associated with each partial record in each table, a plurality of partial records in a table having the same key vector being prohibited by a static data organization rule, a key meta-vector being a list of the key fields and the key incoming cables of a table taken in a predetermined order, a key vector being obtained by substituting datums and wire names associated with a partial record for the key fields and key incoming cables of the key meta-vector.

58. The database management system of claim 57 wherein the meta-data includes a key/non-key indicator for each field in each table and for each cable, the automatic-response-producing means reacting to an external input requesting a change in the value of the key/non-key indicator for a field or cable by either (1) causing the meta-data-changing means to change the value of the key/non-key indicator for the field or cable, or (2) rejecting the requested change as being incompatible with the static data organization rules in that the requested change would result in a plurality of partial records having the same key vector.

59. The database management system of claim 57 wherein the retrieving-and-viewing means causes all of the partial records in the key context of a marked partial record in a table to have their key fields either on display or readily accessible for display, the marked partial record being a partial record selected for marking by external input, the marked partial record being visually distinguishable from the other partial records, the key context of a partial record being the set of partial records comprising the partial record and the key context of all parent partial records to which the partial record is wired through key incoming cables.

60. The database management system of claim 55 wherein each cable is either optional or required, the meta-data including an optional/required indicator for each cable, the parent table of an optional cable having one phantom partial record, each phantom partial record being given a name, the static data organization rules permitting one or more wires of an incoming optional cable and not permitting any wires of an incoming required cable to be connected to the phantom partial record in the parent table, a phantom partial record having no datums and having no function other than to serve as a terminus at a parent table for one or more wires of an optional cable, the automatic-response-producing means reacting to an external input requesting a change in the value of the optional/required indicator for an incoming cable by (1) if the incoming cable is to be optional or if there are no wires connected to the phantom record in the parent table or the request includes a specification for changing phantom-partial-record-connected wires to non-phantom partial records in the parent table, then commanding the meta-data-changing means to change the value of the optional/required indicator for the incoming cable, and, if the incoming cable is to be a required cable, commanding the user-data-changing means to connect each phantom-partial-record-connected wire to a non-phantom partial record as specified by the request, otherwise (2) rejecting the request.

61. The database management system of claim 60 wherein an optionality function is associated with a child partial record, an optionality function being equal to either "0", "1", or "2", the static data organization rules prohibiting the connection of a child partial record to a non-phantom parent partial record when the optionality function equals "0", the static data organization rules requiring the connection of a child partial record to the parent phantom partial record when the optionality function equals "2", the static data organization rules neither prohibiting nor requiring the connection of a child partial record to a parent phantom partial record when the optionality function equals "1".

62. The database management system of claim 61 wherein an optionality function is a function of the datums in one or more fields in the context of the child partial record, the context of a partial record being the partial record and the context of each partial record that is a parent of the partial record.

63. The database management system of claim 55 wherein a cable range is associated with each partial record in the parent table of the cable, the lower bound of a cable range being an integer equal to or greater than zero, the upper bound of a cable range being an integer greater than zero, the upper bound being equal to or greater than the lower bound for every cable range, the static data organization rules requiring that the number of wires connected to a parent partial record be in the cable range of the parent partial record.

64. The database management system of claim 63 wherein the upper bound and the lower bound of the cable range for a parent partial record are functions of the datums in one or more fields in the context of the parent partial record, the context of a partial record being the partial record and the context of each partial record that is a parent of the partial record.

65. The database management system of claim 55 wherein a cable restriction is associated with a cable, a partial record in the parent table, and a partial record in the child table, a cable restriction being equal to either a "0" or a "1", a static data organization rule prohibiting the connection of a child partial record to a parent partial record when the associated cable restriction is a "0".

66. The database management system of claim 65 wherein a cable restriction is a function of the datums in one or more fields in the contexts of the associated parent and child partial records, the context of a partial record being the partial record and the context of each partial record that is a parent of the partial record.

67. The database management system of claim 55 wherein a field is either a basal field or a calculated field, a basal field being a field whose datums are included in the meta-data or are obtained from an external source, a calculated field being a field whose datums are calculated by means of a formula supplied by an external source, the formula expressing a functional relationship between a datum called a formula-output datum for a calculated field and one or more datums called formula-input datums, a formula-output datum being resident in a partial record called a formula-output partial record, a formnula-output partial record being located in a table called a formula-output table, a formula being independent of partial records, the automatic-response-producing means causing the user-data-changing means to recalculate a formula-output datum after an associated formula-input datum changes, the meta-data including a basal/calculated indicator for each field in each table, a default value for each basal field in each table, and the formula for each calculated field in each table, the basal/calculated indicator indicating whether the associated field is a basal field or a calculated field, the basal-field default value being the value of a basal-field datum whenever the basal-field datum has not been supplied by an external source, the automatic-response-producing means reacting to an external input requesting that a basal field be changed to a calculated field, the request being accompanied by the formula defining the calculated field datums, by (1) causing the meta-data-changing means to change the basal/calculated indicator to indicate a calculated field and adding the formula to the meta-data and (2) causing the user-data-changing means to calculate the datums in the calculated field, the automatic-response-producing means reacting to an external input requesting a change in the formula for a calculated field, the request being accompanied by a new formula, by (1) causing the meta-data-changing means to substitute the new formula for the old formula in the meta-data and (2) causing the user-data-changing means to recalculate the datums in the calculated field, the automatic-response-producing means reacting to an external input requesting a calculated field be changed to a basal field, the request being accompanied by a default value, by (1) causing the meta-data-changing means to change the basal/calculated indicator to indicate a basal field and inserting the default value into the meta-data and (2) causing the user-data-changing means to change the datums in the field to values supplied by the user or to the default value.

68. The database management system of claim 67 wherein a calculated-field formula includes a formula-input datum specification for determining a formula-input datum, a formula-input datum specification including the name of a field called the input field and a failure value, the user-data-changing means, in calculating a formula-output datum, either (1) determining a partial record called the formula-input partial record in accordance with the formula-input datum specification and utilizing the datum in the input field of the formula-input partial record as the formula-input datum or (2) utilizing the failure value as the formula-input datum.

69. The database management system of claim 68 wherein the formula-input datum specification includes a downward path to the formula-output table, the user-data-changing means determining the ancestral partial record of the formula-output partial record via the downward path as the formula-input partial record.

70. The database management system of claim 69 wherein each cable is either optional or required, the meta-data including an optional/required indicator for each cable, the parent table of an optional cable having one phantom partial record, the static data organization rules permitting one or more wires of an incoming optional cable and not permitting any wires of an incoming required cable to be connected to the phantom partial record in the parent table, a phantom partial record having no datums and having no function other than to serve as a terminus at a parent table for one or more wires of an optional cable, the user-data-changing means determining the ancestral partial record of a formula-output partial record via a downward path as a formula-input partial record only if no phantom partial record is an ancestral partial record to the formula-output partial record via the downward path.

71. The database management system of claim 68 wherein at least one sequential ordering of the partial records in a formula-output table is included in the meta-data, at least one formula-input datum specification having an input field in the formula-output table and including an offset specification, the user-data-changing means determining a formula-input partial record by its offset in the sequential ordering relative to the formula-output partial record.

72. The database management system of claim 67 wherein a calculated-field formula includes at least one formula-input datum summarizing specification for determining a formula-input datum, a formula-input datum summarizing specification including the name of a field called the input field, a summarizer, and a failure value, the user-data-changing means, in calculating a formula-output datum, either (1) determining one or more partial records called formula-input partial records, utilizing the summarizer to convert the datums in the input field of the formula-input partial records into a single value, and utilizing the single value as the formula-input datum or (2) utilizing the failure value as the formula-input datum.

73. The database management system of claim 72 wherein the formula-input datum. summarizing specification includes a downward path from the formula-output table, the user-data-changing means determining the set of descendent partial records of the formula-output partial record via the downward path as the formula-input partial records.

74. The database management system of claim 72 wherein the formula-input datum summarizing specification includes the name of a filter field in the same table as the input field, the user-data-changing means determining the formula-input partial records as being those partial records for which the datums in the specified filter field are "1's", a filter field being a calculated field, a datum in a filter field being either a "0" or a "1".

75. The database management system of claim 72 wherein at least one pair of tables is a topology table pair consisting of a node table and a link table, the node table and the link table being connected by a first cable and a second cable, the node table being the parent table for both cables, a partial record in the node table representing a node of a topological graph, a partial record in the link table representing a link between two nodes, a link being directed from a first node to a second node, the first node being the node-table partial record connected to the link-table partial record by a wire in the first cable, the second node being the node-table partial record connected to the link-table partial record by a wire in the second cable, the formula-output partial record and the formula-input partial records being in the node table, the formula-input datum summarizing specification including a topological linkage specification, the user-data-changing means determining the fornula-input partial records on the basis of their linkage through the link table and through zero or more partial records in the node table to the formula-output partial record according to the topological linkage specification.

76. The database management system of claim 55 wherein the retrieving-and-viewing means displays an ordered sequence of partial records in a table, the ordered sequence of partial records being selected from a plurality of ordered sequences, each ordered sequence having a name, an ordered sequence being determined by a table sort sequence of one or more sort items, the name of each ordered sequence and its associated sort sequence being included in the meta-data, partial records being ordered by sort item in accordance with the sort sequence, partial records for which the order cannot be established by the (N−1)'th sort item being ordered by the values of the N'th sort item, N being any integer between two and the number of sort items in the sort sequence, a sort item being the name of either a field or an incoming cable, the order of partial records for a field sort item being in accordance with the datums in the named field, the order of partial records for an incoming-cable sort item being in accordance with a specified ordered sequence of the parent partial records in the parent table of the named incoming cable.

77. The database management system of claim 76 wherein the static data organization rules require that the table sort sequence for each ordered sequence of partial records include sufficient sort items for the complete ordering of the partial records in the table.

78. The database management system of claim 76 wherein the retrieving-and-viewing means displays an ordered sequence of partial records in a grouping table, a grouping table being linked to another table called the base table for the grouping table, the linkage between the grouping table and the base table being represented by a cable, the grouping table being the parent table and the base table being the child table, the grouping table being associated with a basis meta-vector in the base table, the basis meta-vector being a list of one or more fields of the base table taken in a predetermined order, the child partial records in the base table of a partial record in the grouping table all having the same basis vector, the basis vector of a partial record in the base table being the list obtained by substituting datums in the partial record for the fields of the basis meta-vector, at least one of the sort items being a basis-field sort item, a basis-field sort item being the name of a field in the basis meta-vector, the order of the partial records in the grouping table for a basis field sort item being in accordance with a specified ordered sequence of the child partial records in the base table, the specified ordered sequence of the child partial records only depending upon the fields in the basis meta-vector.

79. The database management system of claim 55 wherein one or more matrix-view specifications are included in the meta-data, the retrieving-and-viewing means, upon request and identification of a matrix-view specification, displaying a plurality of datums for a plurality of fields in a plurality of partial records from a table called a primary table in a matrix in accordance with the identified matrix-view specification, the matrix being called the primary matrix, each row of the primary matrix being a partial record or a portion thereof and each column of the primary matrix being the partial-record datums for a field or a portion thereof.

80. The database management system of claim 79 wherein the matrix-view specification provides for the display of at least one contextual datum in the proximity of the primary matrix, a contextual datum being a datum in a partial record called a contextual partial record that is in the context of a marked partial record, the marked partial record being a partial record having datums in the primary matrix that is visually distinguishable from the other partial records, the context of a partial record being the set of partial records consisting of the partial record and all parent partial records to which the partial record is connected by wires in incoming cables, the automatic-response-producing means, in response to a request to mark a partial record by an external input, causing (1) the partial record to be marked and causing any other marked partial records to be unmarked and (2) the at least one contextual datum to change in accordance with the change in marking.

81. The database management system of claim 80 wherein a plurality of contextual datums are arranged in one or more contextual columns that are appended to the primary matrix, each of the contextual columns corresponding to a field of an ancestral table, the contextual partial record of each datum in a contextual column and in a partial record row of the primary matrix being in the context of the partial record of the primary matrix.

82. The database management system of claim 80 wherein the matrix-view specification provides for the display of at least one isolated datum in the proximity of the primary matrix, an isolated datum being a datum in the marked partial record which is in a hidden field of the primary table, a hidden field being a field whose datums are not represented by a column in the primary matrix, the automatic-response-producing means, in response to a request to change the marked partial record, causing the at least one isolated datum to change in accordance with the change in the marked partial record.

83. The database management system of claim 79 wherein the matrix-view specification provides for the display of a plurality of datums for a plurality of fields in a plurality of partial records from a table called a secondary table in a matrix, the matrix being called the secondary matrix, the secondary matrix being displayed in the proximity of the primary matrix, the secondary table being a descendent table of the primary table via a downward path, each partial record in the secondary matrix being a descendent partial record of a marked partial record in the primary matrix via the downward path, the marked partial record being a partial record in the primary matrix that is visually distinguishable from the other partial records, the automatic-response-producing means, in response to a request to mark a partial record by an external input, causing (1) the partial record to be marked and causing any other marked partial records to be unmarked and (2) the datums in the secondary matrix to change in accordance with the change in marking.

84. The database management system of claim 55 wherein one or more spread-sheet specifications are included in the meta-data, the retrieving-and viewing means, upon request and identification of a spread-sheet specification, displaying a spread sheet associated with a row table, a column table, and a cell table in accordance with the identified spread-sheet specification, the row and column tables being ancestral tables of the cell table, the spread sheet comprising a matrix of datums at locations denoted by row and column coordinates (r,c), r taking on values between 1 and R, c taking on values between 1 and C, R and C being integers, the datum at coordinates (r'.1) being a datum from a row-table partial record denoted by r', r' taking on values between 2 and R, the datum at coordinates (1,c') being a datum from a column-table partial record denoted by c', c' taking on values between 2 and C, the datum at coordinates (r',c') being a datum from the cell-table partial record which is the descendent of row-table partial record r' and column-table partial record c'.

85. The database management system of claim 55 wherein at least one of the plurality of tables is a grouping table, each grouping table being linked to another table called the base table for the grouping table, the linkage between the grouping table and the base table being represented by a cable, the grouping table being the parent table and the base table being the child table, the grouping table being associated with a basis meta-vector in the base table, the basis meta-vector being either an empty list or a list of at least one component of the base table taken in a predetermined order, a component of a table being a field or incoming cable of the table, the basis vector of a partial record in the base table being the list obtained by substituting datums and wire names associated with the partial record for the fields and incoming cables of the basis meta-vector, a partial record of a grouping table representig a particular basis vector and being a summary of information contained in one or more partial records having the same basis vector in the base table of the grouping table, the basis vectors of all partial records in the base table of a grouping table with an empty-list meta-vector being identical empty list basis vectors, the user-data-changing means, in response to the creation of a new partial record in the base table which has a basis vector that is not represented by any partial record in the grouping table, creating a new partial record in the grouping table that represents the new basis vector and creating a wire connecting the new base-table partial record to the new grouping-table partial record, the user-data-changing means, in response to the creation of a new partial record in the base table having a basis vector that is represented by a partial record in the grouping table, creating a wire connecting the new base-table partial record to the grouping-table partial record that represents the basis vector of the new base-table partial record, the user-data-changing means deleting a partial record in a grouping table and its connecting wire to the base table whenever the basis vector for the grouping-table partial record disappears from the base table, the user-data-changing means determining the datums in a grouping-table partial record from the base-table partial records having the basis vector that is represented by the grouping-table partial record whenever (1) a base-table partial record having the same basis vector is created or deleted or (2) whenever the datums in a base-table partial record having the same basis vector change, the automatic-response-producing means rejecting all requests by external inputs which seek to insert or delete partial records in grouping tables.

86. The database management system of claim 85 wherein a first grouping table is the base table of a second grouping table and at least one component of the basis meta-vector of the second grouping table is a component of the basis meta-vector of the first grouping table.

87. The database management system of claim 55 wherein at least one pair of tables is a topology table pair consisting of a node table and a link table, the node table and the link table being connected by a first cable and a second cable, the node table being the parent table for both cables, a partial record in the node table representing a node of a topological graph, a partial record in the link table representing either a link between a first node and a second node, a link being either directive or non-directive, a directive link being directed from the first node to the second node, the first node being the node-table partial record connected to the link-table partial record by a wire in the first cable, the second node being the node-table partial record connected to the link-table partial record by a wire in the second cable.

88. The database management system of claim 87 wherein there are a plurality of types of topological graphs, each topology type imposing one or more constraints on the linkage of nodes in a topological graph, the topological graph represented by each topology pair and its connecting cables having an associated dynamic data organization rule which specifies the applicable topology type.

89. The database management system of claim 87 wherein the retrieving-and-viewing means, upon request by an external input, displays the topological graph represented by a topology table pair and its connecting cables, the data relating to nodes and links in the partial records of the topology table pair being transformed into graphical symbols to form the topological graph.

90. The database management system of claim 89 wherein a request by an external input to change the display of a topological graph is equivalent to a request by an external input to change the data in the node and/or link tables, the automatic-response-producing means reacting to an external request to change the topological graph by either (1) causing the retrieving-and-viewing means to make the requested change in the display of the topological graph and then causing the user-data-changing means to make the requested change in the node and/or link tables together with any other changes in the user-data necessitated by the requested change or (2) rejecting the requested change if the requested change and the other changes necessitated by the requested change cannot be accomplished without violation of the data organization rules.

91. The database management system of claim 89 wherein the retrieving-and-viewing means, upon request by an external input and after selection of a node or link from the topological graph, displays the datums in the partial record representing the node or link respectively.

92. The database management system of claim 87 wherein one or more indentured-list specifications are included in the meta-data, the retrieving-and-viewing means, upon request and identification of an indentured-list specification, displaying an indentured list representation of the nodes and links of a topology table pair and its connecting cables in accordance with the identified indentured-list specification, an indentured list comprising a plurality of rows with various levels of indentation, a node-table partial record being represented by one or more rows in the indentured list, the links being represented by the indentation.

93. The database management system of claim 55 wherein at least three and no more than four of the plurality of tables are a topology table combination consisting of a node table, a link table, at least one but no more than two hitch-pin tables, a first link cable, a second link cable, and at least one but no more than two hitch-pin cables, the first and second link cables connecting the link table to either (1) the node table and a hitch-pin table, (2) a single hitch-pin table, or (3) two hitch-pin tables, a hitch-pin cable connecting each hitch-pin table to the node table, the node table being a parent table, the link table being a child table, a hitch-pin table being both a parent table for the link cable and a child table for a hitch-pin cable, a partial record in the node table containing data relating to a node of a topological graph, a partial record in the hitch-pin table containing data relating to a hitch pin for a node, hitch pins representing alternative connection points on nodes for the connection of links, a partial record in the link table specifying a link between a first node or a hitch pin of a first node and a second node or a hitch pin of a second node of the topological graph, the link being represented by the first link cable wire connecting the first-node partial record in the node table or a hitch-pin-table partial record associated with the first node to the link-table partial record and the second link cable wire connecting the second-node partial record in the node table or a hitch-pin-table partial record associated with the second node to the link-table partial record, a partial record in the link table representing either a directive or a non-directive link between the first and second nodes, a directive link being directed from the first node to the second node.

94. The database management system of claim 55 wherein a dynamic data organization rule is defined by a formula expressing a functional relationship between a formula-output value and one or more datums called formula-input datums, the formula being included in the meta-data, a formula-output value being either a first value or a second value, the automatic-response-producing means, in response to a request for a change in user-data which would affect one or more formula-input datums associated with one or more formula-defined dynamic data organization rules, calculating the formula-output values for the one or more formula-defined dynamic organization rules using the affected formula-input datums that would exist if the requested changes in user data were made, the automatic-response-producing means rejecting any request that results in a formula-output value equal to the first value, the automatic-response-producing means in response to a request by an external input to add a new formula-defined dynamic data organization rule or to change an existing formula-defined dynamic data organization rule, the request being accompanied by the new or changed formula, by (1) calculating a formula-output value from the new or changed formula for each combination of one or more datums in the user-data which could serve as formula-input datums for the new or changed formula, (2) causing the meta-data changing means to add the new dynamic data organization rule or change the existing dynamic data organization rule as requested if all resulting formula-output values are equal to the second value, and (3) rejecting the request if any of the resulting formula-output values are equal to the first value.

95. The database management system of claim 94 wherein a formula includes at least one formula-input datum specification for determining a formula-input datum, a formula-input datum specification including an input field and a failure value, the automatic-response-producing means, in calculating a formula-output value, either (1) determining a partial record called the formula-input partial record and utilizing the datum in the input field of the formula-input partial record as the formula-input datum, or (2) utilizing the failure datum as the formula-input datum.

96. The database management system of claim 94 wherein a formula contains at least one formula-input datum summarizing specification for determining a formula-input datum, a formula-input datum summarizing specification including an input field, a summarizer, and a failure value, the automatic-response-producing means, in calculating a formula-output value, either (1) determining one or more partial records called the formula-input partial records, utilizing the summarizer to convert the datums in the input field of the formula-input partial records into a single value, and utilizing the single value as the formula-input datum, or (2) utilizing the failure datum as the formula-input datum.

97. The database management system of claim 55 wherein the meta-data and user-data organizing means provide the means for placing a plurality of tables in one or more rooms, a room being a place for receiving a plurality of records, each room having a name, there being a plurality of tables in each room, the tables in a room being interconnected with at least one mini-cable, a mini-cable being a type of cable used exclusively to interconnect tables within a room, the names of the rooms and the names of the tables and mini-cables in each room being included in the meta-data, the tables in a room being interconnected by at least one format-field mini-cable, each table that is the parent table for a format-field mini-cable having at least one field called a format field, a format-field datum having any one of a plurality of values, the meta-data including a listing of the datum values for each format field, there being one format-field mini-cable connecting a parent table to a child table for each of the plurality of datum values for a format field in the parent table, the name of a format-field mini-cable identifying the value of the format field with which it is associated in its parent table, one table in a room being designated as the head table, the head table having no incoming format-field mini-cables, the head table having at least one format-field, every non-head table having an incoming mini-cable, a non-head table being a table in a room that is not a head table, a record being included in the user-data and comprising a set of partial records in a room that are interconnected by mini-cable wires, a datum in a partial record of a record being called a datum in the record, the fields in all the tables in a room being called the room field set, the fields in the one or more tables containing the partial records of a record being called the record field set, the static data organization rules requiring that every record include one partial record in the head table, that a partial record in a table be in exactly one record, and that a record contain no more than one partial record from a table, a room containing zero or more null tables, a null table having an incoming format-field mini-cable, a null table having no fields and no partial records and no other function than to serve as a terminus for a format-field mini-cable that contains no wires.

98. The database management system of claim 97 wherein the user-data-changing means, upon request and specification of the head-table format-field datums for a record, creates the record in a room by (1) creating a partial record in the head table and (2) creating partial records in other tables, the creation of a partial record in a parent table having one or more format fields causing the automatic-response-producing means to (1) create a partial record in the child table of the mini-cable associated with the datum value of each format field of the parent table and connect a wire in the mini-cable between the partial record in the parent table and the partial record in the child table unless the child table is a null table or unless the record already includes a partial record in the child table already exists and (2) request the datum for each format field in the child-table partial record that has not already been specified, the user-data-changing means, upon request by an external input, deleting a record in a room by (1) deleting all mini-cable wires interconnecting the partial records of the record, and (2) deleting all the partial records of the record, a request by an external input to change an old format-field datum in a partial record in a parent table to a new datum causing the automatic-response-producing means to (1) create a partial record in the child table of the mini-cable associated with the new datum and connect a wire in the mini-cable between the partial record in the parent table and the partial record in the child table, unless the child table is a null table or unless the record already includes a partial record in the child table, (2) request the datum for each format field in the child-table partial record that has not already been specified, and (3) first delete the wire in the mini-cable associated with the old datum and connecting to the parent partial record and then delete all dangling partial records, a dangling partial record being a partial record which was before the modification of the format-field datum and is not after the modification of the format-field datum connected to a partial record in the head table either directly or through a series of tables by mini-cable wires, the automatic-response-producing means rejecting requests by an external input to insert or delete a partial record in a non-head table.

99. The database management system of claim 98 wherein a plurality of non-head tables in a room are interconnected by one or more automatic mini-cables, an automatic-mini-cable connection to a head table or a null table being prohibited by the static data organization rules, each partial record in a parent table of an automatic mini-cable being connected by a wire in the automatic mini-cable to exactly one partial record in the child table, the user-data-changing means, in creating a record involving a parent partial record of an automatic mini-cable after creating all necessary format field mini-cable wires, (1) creating a partial record in a child table of the automatic mini-cable unless the child table already contains a partial record in the record, and (2) connecting a wire in the automatic mini-cable between the parent partial record and the child partial record.

100. The database management system of claim 97 wherein the retrieving-and-viewing means, upon request by an external input, displays a graphical depiction of the rooms and room-interconnecting cables, a room-interconnecting cable being a cable that connects a table in one room with a table in another room.

101. The database management system of claim 100 wherein the retrieving-and-viewing means, upon request by an external input and after selection of a room from the graphical depiction, displays a graphical depiction of the tables and the mini-cables interconnecting the tables inside the room using the meta-data.

102. The database management system of claim 100 wherein the retrieving-and-viewing means, upon request by an external input and after selection of a room from the graphical depiction, provides a view of one or more of the records contained in the selected room or portions thereof.

103. The database management system of claim 97 wherein each field and each cable is either key or non-key, a key meta-vector is associated with each table, and a key vector is associated with each partial record in each table, a key meta-vector being a list of the key fields and the key incoming cables of a table taken in a predetermined order, a key vector being obtained by substituting datums and wire names associated with a partial record for the key fields and key incoming cables of the key meta-vector, the meta-data including a key/non-key indicator for each field in each table and for each cable, the static data organization rules prohibiting any two records in a room from having the same key vector, the key vector of a record being a concatenation of the key vectors of its partial records, each format field of a parent table being a key field for the parent table whenever an associated format-field mini-cable wire connects to a child table having a key field or another key incoming cable.

104. The database management system of claim 97 wherein one or more variant-record-view specifications are included in the meta-data, the retrieving-and-viewing means, upon request and identification of a variant-record-view specification, providing a view of a plurality of datums in one or more records of a room in one or more variant-record-view fields in accordance with the identified variant-record-view specification, the one or more variant-record-view fields being fields in the room field set, the absence of a datum in a variant-record-view field that is not in the record field set of a record being denoted by a "no-datum" symbol, the automatic-response-producing means rejecting any attempt to replace a "no-datum" symbol by a datum.

105. The database management system of claim 104 wherein the view specified by at least one variant-record-view specification is a matrix, each row of the matrix being the datums in a record or portion thereof and each column being the datums in a field.

106. The database management system of claim 104 wherein the view specified by at least one variant-record-view specification displays one record in the room at a time, each datum being labeled with a field identifier, the displayed layout of the datums and field identifiers for a record in the room being dependent upon the field set of the record, a first record in the room having a different field set than a second record in the room, the retrieving-and-viewing means, upon request to switch the view from the first record to the second record, automatically changing the layout of the datums and field identifiers in accordance with the variant-record-view specification.

107. The database management system of claim 55 wherein the meta-data and user-data organizing means provide the means for defining one or more doorway networks, a doorway network being a specified display format for viewing a plurality of doorways interconnected by one or more context paths, a doorway being a specified display format for viewing a plurality of partial records from a table, the specifications for at least one doorway network and the doorways which make up each doorway network being included in the meta-data, the doorways connected by a context path being called parent and child doorways, a context path between a parent doorway and a child doorway being indicative of a downward path between an ancestral table associated with the parent doorway and a descendent table associated with the child doorway, one of the doorways in the doorway network being designated as the focused doorway, the focused doorway being visually distinguishable from the other doorways, the focused doorway being identified in the meta-data, one of the partial records in the table of the focused doorway being designated as the marked partial record, each partial record in the tables of the other doorways in the doorway network which is either an ancestral or descendent partial record of the marked partial record in the table of the focused doorway via one or more context paths being designated as a marked partial record, the displayed datums in a marked partial record being visually distinguishable from the datums in other partial records, the marked partial records being identified in the meta-data, the automatic-response-producing means, upon request and designation of a different focused doorway by an external input, causing the meta-data-changing means to change the meta-data identification of the focused doorway and to change the meta-data identification of the marked partial records in other tables to the appropriate ancestral and descendent partial records of the marked partial record in the newly-designated focused doorway, the automatic-response-producing means, upon request and designation of a different marked partial record in the focused doorway, causing the meta-data-changing means to change the meta-data identification of the marked partial record in the focused doorway and the meta-data identification of the marked partial records in other tables to the appropriate ancestral and descendent partial records of the newly-designated marked partial record in the focused doorway.

108. The database management system of claim 107 wherein, upon request by an external input, the retrieving-and-viewing means displays a graphical depiction of the doorway network or a portion thereof.

109. The database management system of claim 108 wherein the retrieving-and-viewing means, upon request and selection of a doorway from the graphical depiction by an external input, provides a view of the partial records in the associated table or a portion thereof in accordance with the doorway.

110. The database management system of claim 55 wherein the meta-data and user-data organizing means provides the means for placing a plurality of tables into a house, one table in the house called the main table being the primary repository of user-data, one or more tables in the house called link tables being the repositories of topological graph linkages, a topological graph being comprised of nodes which are partial records in the main table interconnected by links which are partial records in a link table, a first cable and a second cable connecting the main table to a link table, the link table being a child table of both cables, a partial record in the link table representing a link between the pair of partial records in the main table to which it is wired by the first and second cables, one or more tables in the house called grouping tables being the repositories of summary data which summarize the data in other tables, a grouping table being a parent table connected by a cable to another table in the house called a base table, a partial record in the grouping table being a summary of a plurality of partial records in the base table, the automatic-response-producing means causing partial records in a grouping table to be added, deleted, or changed whenever changes occur in the partial records of the base table to which the grouping table is wired, the specification for the house being included in the meta-data.

111. The database management system of claim 10 wherein a plurality of requests to change meta-data and/or user-data are pending, the automatic-response-producing means, in response to a new request received from an external input to change meta-data and/or user-data, either (1) requesting and waiting for additional data with respect to the new request if such data is necessary to resolve a conflict with one or more of the other pending requests or if such data is necessary to execute the request, (2) executing the new request if there is no conflict between the new request and the other pending requests or (3a) rejecting the new request if there is a conflict between the new request and the other pending requests or if it cannot be executed without violation of the data organization rules and (3b) informing the requestor of the reasons for the rejection, the automatic-response-producing means executing a request by causing the meta-data-changing means and/or user-data-changing means to make the requested change together with any changes necessitated by the requested change, a new pending request being in conflict with the other pending requests when the execution of one or a combination of the other pending requests would make it impossible to execute the new pending request without violation of the data organization rules.

112. The database management system of claim 111 wherein a first request from an external source is to change user-data and a second request from an external source is to change meta-data, the user-data affected by the first request being displayed in a display format, the specification for the display format being included in the meta-data and being affected by the second request, the requests not being in conflict, both requests being pending at time T1, the first request being executed at time T2, the second request being executed at time T3, T2 being either before or after T3, the retrieving-and-viewing means (1) displaying the user-data affected by the first request in its unchanged state during the time interval from T1 to T2, (2) displaying the user data affected by the first request in its changed state after T2, and (3) switching the display format at T3 in accordance with the second request.

113. A method for managing user-data in accordance with a user's requests, the method comprising the steps:

adding changing, deleting and organizing meta-data and user-data according to predetermined static data organization rules, the data category called user-data comprising datums and compartments, a datum being a single item of information, a compartment being a place for receiving a plurality of associated datums, the data category called meta-data comprising tables, cables, and dynamic data organization rules, a table being a place for receiving a plurality of compartments, the datums in each of the compartments of a table being values of a set of a plurality of attributes, each cable connecting a first table to a second table, a cable being a representation of connections between the compartments in the first table and the compartments in the second table, the datums in connected compartments being called connected datums, a dynamic data organization rule being a user-defined constraint on user-data, a permissible dynamic data organization rule being a formula-defined dynamic data organization rule wherein the values of one or more formula-input datums in one or more tables are required to collectively satisfy a specified formula the formula-input datums having the same or different values, no datum having its value automatically determined on the basis of the formula, the static data organization rules including all constraints imposed on meta-data and meta-data relationships, the static data organization rules and the meta-data collectively including all constraints imposed on user-data and user-data relationships, inconsistent meta-data and user-data being prohibited by the static data organization rules, inconsistent meta-data being meta-data that do not conform with the static data organization rules, inconsistent user-data being user-data that do not conform with the static data organization rules and the meta-data, any user request to add, change, or delete meta-data or user-data wherein the change will result in a violation of the static data organization rules or meta-data being automatically rejected;

responding to a user's request to view one or more datums and one or more connected datums by:
identifying the connected datums in different tables by tracing the cables;
retrieving and displaying a selected datum together with one or more connected datums linked to the selected datums by cables.

114. The method of claim 113 wherein a static data organization rule requires that one of the two tables connected by a cable functions as a parent table and the other functions as a child table with respect to the cable, the direction of a cable being from the parent table to the child table, the cable being referred to as the incoming cable at the child table, a static data organization rule requiring that a compartment in a child table be connected to one compartment in the parent table, the connection of each compartment in a child table to a compartment in the parent table being included in the user data, the static data organization rules permitting a compartment in a parent table to be connected to zero or more compartments in a child table.

115. The method of claim 114 further comprising the steps:

responding to a user's request to change the meta-data by:
changing the meta-data including inserting and deleting tables, inserting and deleting cables, and inserting, deleting, or changing dynamic data organization rules;

responding either to a user's request to change the user-data or to a condition resulting from the confluence of the static data organization rules, the meta-data, and the user-data which dictates a change in the user-data by:
changing the user data, including (1) inserting a compartment and its datums into a table, and if the table is a child table, inserting a connection from the newly-inserted compartment to a compartment in the parent table, (2) changing datums in an existing compartment, (3) changing the compartment in a parent table to which a compartment in a child table is connected, and (4) deleting a compartment and its datums from a table and deleting the connection from the compartment to a compartment in the parent table, a static data organization rule prohibiting the deletion of a compartment in a parent table which is connected to a compartment in a child table unless the child table compartment is also deleted.

116. The method of claim 115 further comprising the steps:
responding to an occurrence of an internal condition in the user-data requiring a change in the user-data or to a user's request to change the meta-data or the user-data by either:
requesting and waiting for additional data from the user if such data is necessary to perform the requested change and other changes necessitated by the requested change, necessitated changes being those changes that must be made to comply with the static and dynamic data organization rules; or
making the requested change together with any changes in other meta-data and user-data necessitated by the requested change; or
rejecting the requested change if the requested change and the changes necessitated by the requested change cannot be accomplished without violation of the data organization rules and, if the response is to a request, informing the user of the reasons therefore.

117. The method of claim 116 wherein a plurality of requests to change meta-data and/or user-data are pending, a new pending request being in conflict with the other pending requests when the execution of one or a combination of the other pending requests would make it impossible to execute the new pending request without violation of the data organization rules, the method further comprising the steps:
responding to a new request to change meta-data and/or user-data by either:
(1) requesting and waiting for additional data with respect to the new request if such data is necessary to resolve a conflict with one or more of the other pending requests or if such data is necessary to execute the request, or
(2) executing the new request if there is no conflict between the new request and the other pending requests, or
(3) rejecting the new request if there is a conflict between the new request and the other pending requests or if it cannot be executed without violation of the data organization rules and informing the requestor of the reasons for the rejection.

118. The method of claim 117 wherein a first request from an external source is to change user-data and a second request from an external source is to change meta-data, the user-data affected by the first request being displayed in a display format, the specification for the display format being included in the meta-data and being affected by the second request, the requests not being in conflict, both requests being pending at time T1, the first request being executed at time T2, the second request being executed at time T3, T2 being either before or after T3, the method further comprising the steps:
displaying the user-data affected by the first request in its unchanged state during the time interval from T1 to T2;
displaying the user data affected by the first request in its changed state after T2;
switching the display format at T3 in accordance with the second request.

119. The method of claim 116 wherein a trigger specification and a response specification are included in the meta-data, the trigger specification defining a condition for producing a trigger, the condition being either an internal condition in the user-data or an external condition identified by an external input, the response specification defining a change in the user-data to be made upon the occurrence of a trigger, the method further comprising the step:
executing the change in the user-data when a trigger occurs.

120. The method of claim 116 wherein the meta-data and user-data organizing step includes providing one or more doorways, a doorway being a specification of a display format for one or more retrieved datums, one or more doorways being included in the meta-data, the method further comprising the steps:
responding to a user's request to view one or more datums in a specified doorway by:
displaying the one or more datums in accordance with the specified doorway.

121. The method of claim 116 wherein each table contains one or more fields and each compartment in a table is a partial record, a static organization rule requiring that each datum in a partial record of a table be in a field of the table and that there be a datum in each partial record of a table in each field of the table, the datums in a particular field sharing an attribute, the fields for each table being included in the meta-data.

122. The method of claim 121 further comprising the step:
responding to a user request for a view of the tables and cables by:
displaying a graphical depiction of the tables interconnected with cables based on the meta-data.

123. The method of claim 122 further comprising the step:
responding to a user request for a view of the fields, partial records and datums from a table and the designation by the user of the table in the graphical depiction of the tables interconnected with cables by:
displaying the field names, partial records, and datums of the designated table, the field of each datum being identified.

124. The method of claim 121 wherein each field and each datum is any one of a plurality of types, the meta-data including the type of each field in each table, a static data organization rule requiring that the datums in a field be of the same type as the field, the method further comprising the steps:
responding to a user request to insert a datum in a table or to substitute a new datum for an old datum in a table by either:
making the requested insertion or substitution; or
rejecting the request as being incompatible with the data organization rules.

125. The method of claim 124 further comprising the steps:
responding to a user request to change the type of a field from a first type to a second type by either:
changing the field type from the first type to the second type and converting the datums in the field from the first type to the second type; or
rejecting the request as being incompatible with the static and/or dynamic data organization rules.

126. The method of claim 121 wherein each field and each datum is any one of a plurality of field types, a field type being an instance of a field-type family, a field-type family being characterized by one or more parameters and zero or more lists, a field type being defined by assigning values to the one or more parameters and defining the zero or more lists that characterize a field-type family, an ordinal type being a field type wherein the datums constitute an ordered domain, field-type-family instances being included in the meta-data, a static data organization rule requiring that the datums in a field be of the same field type as the field.

127. The method of claim 121 wherein a field is either a basal field or a calculated field, a basal field being a field whose datums are included in the meta-data or are supplied by an external input, a calculated field being a field whose datums are calculated by means of a formula supplied by an external input, the formula expressing a functional relationship between a datum for a calculated field and one or more other datums, the meta-data including a basal/calculated indicator for each field in each table, a default value for each basal field in each table, and the formula for each calculated field in each table, the basal/calculated indicator indicating whether the associated field is a basal field or a calculated field, the basal-field default value being the value of a basal-field datum whenever the basal-field datum has not been supplied by the external input, the method further comprising the steps:

responding to a request by an external input to change a basal field to a calculated field and the supplying by the external input of a formula defining the calculated-field datums by:

changing the basal/calculated indicator to indicate a calculated field and adding the formula to the meta-data; and calculating the datums in the calculated field;

responding to a request by an external input to change the formula for a calculated field and the supplying by the external input of a new formula defining the calculated-field datums by:

substituting the new formula for the old formula in the meta-data; and recalculating the datums in the calculated field;

responding to a request by an external input to change a calculated field to a basal field, the external input supplying a default value for the field, by:

changing the basal/calculated indicator to indicate a basal field;

inserting the default value into the meta-data; and substituting the default value for the calculated datums if new values were not supplied by the external input.

128. The method of claim 127 further comprising the step: recalculating a calculated datum whenever a datum to which the calculated datum is functionally related by its associated formula changes.

129. The method of claim 121 wherein a table includes at least one filter field, a filter field representing a filter, a datum in a filter field being either a "0" or "1", the method further comprising the steps:

responding to a user request to view datums in a plurality of partial records in a table after filtering by a filter, the table, filter, and display format specification being specified by the user, by:

displaying the datums after filtering by the filter in accordance with the specified display format specification, the display formats comprising a masked format and a colored format, a masked format being a display format where only the partial records for which the filter-field datums are "1's" are displayed, a colored format being a format where the partial records for which the filter-field datums are "1's" are visually distinguishable from the partial records for which the filter-field datums are "0's".

130. The method of claim 121 wherein each cable contains one or more wires, each of the one or more wires in a cable connecting a partial record in a child table to a partial record in a parent table, the partial record in the child table being called the child partial record, the partial record in the parent table being called the parent partial record, a wire being a representation of a relationship between the datums in the child partial record and the datums in the parent partial record, each wire having the name of the partial-record to which it connects in the parent table, the user-data including the names of the wires connecting to the partial records in each child table, a sequence of N cables wherein the child table of the n'th cable is the parent table of the (n+1)'th cable being a downward path from an ancestral table to a descendent table, N being an integer and n being any integer between 1 and N−1, the ancestral table being the parent table of the first cable in the sequence, the descendent table being the child table of the N'th cable in the sequence, an ancestral-table partial record being wired to a descendent-table partial record via a downward path and a descendent-table partial record being wired to an ancestral-table partial record via a downward path if the ancestral-table partial record is connected via the downward path to the descendent-table partial record by a sequence of wires in the downward path wherein the child partial record of the n'th wire is the parent partial record of the (n+1)'th wire, n being any integer between 1 and N−1.

131. The method of claim 130 wherein each field and each cable is either key or non-key, a key meta-vector is associated with each table, and a key vector is associated with each partial record in each table, a plurality of partial records in a table having the same key vector being prohibited by the static data organization rules, a key meta-vector being a list of the key fields and the key incoming cables of a table taken in a predetermined order, a key vector being obtained by substituting datums and wire names associated with a partial record for the key fields and key incoming cables of the key meta-vector.

132. The method of claim 131 wherein the meta-data includes a key/non-key indicator for each field in each table and for each cable, the method further comprising the steps:

responding to a user request to change the value of the key/non-key indicator for a field or cable by either:

changing the value of the key/non-key indicator for the field or cable; or rejecting the requested change as being incompatible with the data organization rules in that the requested change would result in a plurality of partial records having the same key vector.

133. The method of claim 131 further comprising the step: causing all of the partial records in the key context of a marked partial record in a table to have their key fields either on display or readily accessible for display, the marked partial record being a partial record selected for marking by a user, the marked partial record being visually distinguishable from the other partial records, the key context of a partial record being the set of partial records comprising the partial record and the key context of all parent partial records to which the partial record is wired through key incoming cables.

134. The method of claim 130 wherein each cable is either optional or required, the meta-data including an optional/ required indicator for each cable, the parent table of an optional cable having one phantom partial record, each phantom partial record being given a name, the static data organization rules permitting one or more wires of an incoming optional cable and not permitting any wires of an incoming required cable to be connected to the phantom partial record in the parent table, a phantom partial record having no datums and having no function other than to serve as a terminus at a parent table for one or more wires of an optional cable, the method further comprising the steps:

responding to a request for a change in the value of the optional/required indicator for an incoming cable by:
if the incoming cable is to be optional or if there are no wires connected to the phantom record in the parent table or the request includes a specification for changing phantom-partial-record-connected wires to non-phantom partial records in the parent table, then commanding the meta-data-changing means to change the value of the optional/required indicator for the incoming cable, and, if the incoming cable is to be a required cable, commanding the user-data-changing means to connect each phantom-partial-record-connected wire to a non-phantom partial record as specified by the request;
otherwise rejecting the request.

135. The method of claim 134 wherein an optionality function is associated with a child partial record, an optionality function being equal to either "0", "1", or "2", the static data organization rules prohibiting the connection of a child partial record to a non-phantom parent partial record when the optionality function equals "0", the static data organization rules requiring the connection of a child partial record to the parent phantom partial record when the optionality function equals "2", the static data organization rules neither prohibiting nor requiring the connection of a child partial record to a parent phantom partial record when the optionality function equals "1".

136. The method of claim 130 wherein an ordered sequence is determined by a table sort sequence of one or more sort items, the name of each ordered sequence and its associated sort sequence being included in the meta-data, partial records being ordered by sort item in accordance with the sort sequence, partial records for which the order cannot be established by the (N–1)'th sort item being ordered by the values of the N'th sort item, N being any integer between two and the number of sort items in the sort sequence, a sort item being the name of either a field or an incoming cable, the order of partial records for a field sort item being in accordance with the datums in the named field, the order of partial records for an incoming-cable sort item being in accordance with a specified ordered sequence of the parent partial records in the parent table of the named incoming cable, the method further comprising the step:

responding to a user request to view an ordered sequence of partial records in a table by:
displaying the ordered sequence.

137. The method of claim 130 wherein one or more matrix-view specifications are included in the meta-data, the method further comprising the steps:

responding to a user request to display a plurality of datums for a plurality of fields in a plurality of partial records from a table called a primary table in a matrix in accordance with a specified matrix-view specification by:
displaying the plurality of datums as requested, the matrix being called the primary matrix, each row of the primary matrix being a partial record or a portion thereof and each column of the primary matrix being the partial-record datums for a field or a portion thereof.

138. The method of claim 137 wherein the matrix-view specification provides for the display of at least one contextual datum in the proximity of the primary matrix, a contextual datum being a datum in a partial record called a contextual partial record that is in the context of a marked partial record, the marked partial record being a partial record having datums in the primary matrix that is visually distinguishable from the other partial records, the context of a partial record being the set of partial records consisting of the partial record and all parent partial records to which the partial record is connected by wires in incoming cables, the method further comprising the step:

responding to a user request to mark a partial record by:
causing the partial record to be marked and causing any other marked partial records to be unmarked;
causing the at least one contextual datum to change in accordance with the change in marking.

139. The method of claim 137 wherein the matrix-view specification provides for the display of a plurality of datums for a plurality of fields in a plurality of partial records from a table called a secondary table in a matrix, the matrix being called the secondary matrix, the secondary matrix being displayed in the proximity of the primary matrix, the secondary table being a descendent table of the primary table via a downward path, each partial record in the secondary matrix being a descendent partial record of a marked partial record in the primary matrix via the downward path, the marked partial record being a partial record in the primary matrix that is visually distinguishable from the other partial records, the method further comprising the steps:

responding to a user request to mark a partial record by:
marking the partial record and unmarking any other marked partial records;
changing the datums in the secondary matrix in accordance with the change in marking.

140. The method of claim 130 wherein one or more spread-sheet specifications are included in the meta-data, the method further comprising the step:

responding to a user request to view a spread sheet associated with a row table, a column table, and a cell table in accordance with a specified spread-sheet specification, the row and column tables being ancestral tables of the cell table, by:
displaying the spread sheet, the spread sheet comprising a matrix of datums at locations denoted by row and column coordinates (r,c), r taking on values between 1 and R, c taking on values between 1 and C, R and C being integers, the datum at coordinates (r',1) being a datum from a row-table partial record denoted by r', r' taking on values between 2 and R, the datum at coordinates (1,c') being a datum from a column-table partial record denoted by c', c' taking on values between 2 and C, the datum at coordinates (r',c') being a datum from the cell-table partial record which is the descendent of row-table partial record r' and column-table partial record c'.

141. The method of claim 130 wherein at least one of the plurality of tables is a grouping table, each grouping table being linked to another table called the base table for the grouping table, the linkage between the grouping table and the base table being represented by a cable, the grouping table being the parent table and the base table being the child table, the grouping table being associated with a basis meta-vector in the base table, the basis meta-vector being either an empty list or a list of at least one component of the base table taken in a predetermined order, a component of a table being a field or incoming cable of the table, the basis vector of a partial record in the base table being the list obtained by substituting datums and wire names associated with the partial record for the fields and incoming cables of the basis meta-vector, a partial record of a grouping table representing a particular basis vector and being a summary of information contained in one or more partial records having the same basis vector in the base table of the grouping table, the basis vectors of all partial records in the base table of a grouping table with an empty-list meta-vector being identical empty list basis vectors, the method further comprising the steps:

responding to the creation of a new partial record in the base table which has a basis vector that is not represented by any partial record in the grouping table by:
creating a new partial record in the grouping table that represents the new basis vector and creating a wire connecting the new base-table partial record to the new grouping-table partial record;

responding to the creation of a new partial record in the base table having a basis vector that is represented by a partial record in the grouping table by:
creating a wire connecting the new base-table partial record to the grouping-table partial record that represents the basis vector of the new base-table partial record, responding to the disappearance from the base table of the basis vector for a grouping-table partial record by:
deleting the grouping-table partial record and its connecting wire to the base table;

responding to (1) the creation or deletion of a base-table partial record having the same basis vector that is represented by a grouping-table partial record or (2) changes in the datums in a base-table partial record having the same basis vector that is prepresented by a grouping-table partial record by:
determining the datums in the grouping-table partial record from the base-table partial records having the basis vector that is represented by the grouping-table partial record;

responding to a request to change user-data in a grouping table by:
rejecting the request.

142. The method of claim 130 wherein at least one pair of tables is a topology table pair consisting of a node table and a link table, the node table and the link table being connected by a first cable and a second cable, the node table being the parent table for both cables, a partial record in the node table representing a node of a topological graph, a partial record in the link table representing a link between a first node and a second node, a link being either directive or non-directive, a directive link being directed from the first node to the second node, the first node being the node-table partial record connected to the link-table partial record by a wire in the first cable, the second node being the node-table partial record connected to the link-table partial record by a wire in the second cable.

143. The method of claim 142 further comprising the step:
responding to a user request to view a topological graph represented by a topology table pair and its connecting cables by:
displaying the topological graph, the data relating to nodes and links in the partial records of the topology table pair being transformed into graphical symbols to form the topological graph.

144. The method of claim 143 further comprising the step:
responding to a user request to change a topological graph by either:
changing the display of the topological graph and then changing the datums in the node and/or link tables to make the data in the tables consistent with the changes in the topological graph together with making any other changes in the user-data necessitated by the requested change; or
rejecting the requested change if the requested change and the other changes necessitated by the requested change cannot be accomplished without violation of the data organization rules.

145. The method of claim 130 wherein at least three and no more than four of the plurality of tables are a topology table combination consisting of a node table, a link table, at least one but no more than two hitch-pin tables, a first link cable, a second link cable, and at least one but no more than two hitch-pin cables, the first and second link cables connecting the link table to either (1) the node table and a hitch-pin table, (2) a single hitch-pin table, or (3) two hitch-pin tables, a hitch-pin cable connecting each hitch-pin table to the node table, the node table being a parent table, the link table being a child table, a hitch-pin table being both a parent table for the link cable and a child table for the hitch-pin cable, a partial record in the node table containing data relating to a node of a topological graph, a partial record in the hitch-pin table containing data relating to a hitch pin for a node, hitch pins representing alternative connection points on nodes for the connection of links, a partial record in the link table specifying a link between a first node or a hitch pin of a first node and a second node or a hitch pin of a second node of the topological graph, the link being represented by the first link cable wire connecting the first-node partial record in the node table or a hitch-pin-table partial record associated with the first node to the link-table partial record and the second link cable wire connecting the second-node partial record in the node table or a hitch-pin-table partial record associated with the second node to the link-table partial record, a partial record in the link table representing either a directive or a non-directive link between the first and second nodes, a directive link being directed from the first node to the second node.

146. The method of claim 130 wherein a dynamic data organization rule is defined by a formula expressing a functional relationship between a formula-output value and one or more datums called formula-input datums, the formula being included in the meta-data, a formula-output value being either a first value or a second value, the method further comprising the steps:

responding to a request for a change in user-data which would affect one or more formula-input datums associated with one or more formula-defined dynamic data organization rules by:
calculating the formula-output values for the one or more formula-defined dynamic organization rules using the affected formula-input datums that would exist if the requested changes in user data were made;
rejecting any request that results in a formula-output value equal to the first value;

responding to a request to add a new formula-defined dynamic data organization rule or to change an existing formula-defined dynamic data organization rule, the request being accompanied by the new or changed formula, by:
calculating a formula-output value from the new or changed formula for each combination of one or more datums in the user-data which could serve as formula-input datums for the new or changed formula;

adding the new dynamic data organization rule or changing the existing dynamic data organization rule if all resulting formula-output values are equal to the second value;

rejecting the request if any of the resulting formula-output values are equal to the first value.

147. The method of claim 130 wherein the meta-data and user-data organizing step includes placing the plurality of tables in one or more rooms, a room being a place for receiving a plurality of records, each room having a name, there being a plurality of tables in each room, the tables in a room being interconnected with at least one mini-cable, a mini-cable being a type of cable used exclusively to interconnect tables within a room, the names of the rooms and the names of the tables and mini-cables in each room being included in the meta-data, the tables in a room being interconnected by at least one format-field mini-cable, each table that is the parent table for a format-field mini-cable having at least one field called a format field, a format-field datum having any one of a plurality of values, the meta-data including a listing of the datum values for each format field, there being one format-field mini-cable connecting a parent table to a child table for each of the plurality of datum values for a format field in the parent table, the name of a format-field mini-cable identifying the value of the format field with which it is associated in its parent table, one table in a room being designated as the head table, the head table having no incoming format-field mini-cables, the head table having at least one format-field, every non-head table having an incoming mini-cable, a non-head table being a table in a room that is not a head table, a record being included in the user-data and comprising a set of partial records in a room that are interconnected by mini-cable wires, a datum in a partial record of a record being called a datum in the record, the fields in all the tables in a room being called the room field set, the fields in the one or more tables containing the partial records of a record being called the record field set, the static data organization rules requiring that every record include one partial record in the head table, that a partial record in a table be in exactly one record, and that a record contain no more than one partial record from a table, a room containing zero or more null tables, a null table having an incoming format-field mini-cable, a null table having no fields and no partial records and no other function than to serve as a terminus for a format-field mini-cable that contains no wires.

148. The method of claim 147 further comprising the steps:

responding to a request to create a record in a room and specification of the head-table format-field datums for the record by:

creating a partial record in the head table;

creating partial records in other tables;

the creation of a partial record in a parent table having one or more format fields resulting in the further steps:

creating a partial record in the child table of the mini-cable associated with the datum value of each format field of the parent table;

connecting a wire in the mini-cable between the partial record in the parent table and the partial record in the child table unless the child table is a null table or unless the record already includes a partial record in the child table;

requesting the datum for each format field in the child-table partial record that has not already been specified;

responding to a request to delete a record in a room by:

deleting all mini-cable wires interconnecting the partial records of the record;

deleting all the partial records of the record;

responding to a request to change an old format-field datum in a partial record in a parent table to a new datum by:

creating a partial record in the child table of the mini-cable associated with the new datum and connecting a wire in the mini-cable between the partial record in the parent table and the partial record in the child table, unless the child table is a null table or unless the record already includes a partial record in the child table;

requesting the datum for each format field in the child-table partial record that has not already been specified;

first deleting the wire in the mini-cable associated with the old datum and connecting to the parent partial record and then deleting all dangling partial records, a dangling partial record being a partial record which was before the modification of the format-field datum and is not after the modification of the format-field datum connected to a partial record in the head table either directly or through a series of tables by mini-cable wires;

responding to a request to insert or delete a partial record in a non-head table by:

rejecting the request.

149. The method of claim 148 wherein a plurality of non-head tables in a room are interconnected by one or more automatic mini-cables, an automatic-mini-cable connection to a head table or a null table being prohibited by the static data organization rules, each partial record in a parent table of an automatic mini-cable being connected by a wire in the automatic mini-cable to exactly one partial record in the child table, the method further comprising the steps:

responding to a request to create a record involving a parent partial record of an automatic mini-cable after creating all necessary format field mini-cable wires by:

creating a partial record in a child table of the automatic mini-cable unless the child table already contains a partial record in the record;

connecting a wire in the automatic mini-cable between the parent partial record and the child partial record.

150. The method of claim 147 further comprising the step:

responding to a user request to view a graphical depiction of the rooms and room interconnecting cables by:

displaying a graphical depiction of the rooms and room-interconnecting cables, a room-interconnecting cable being a cable that connects a table in one room with a table in another room.

151. The method of claim 150 further comprising the step:

responding to a user request to view a graphical depiction of a room selected by the user from the graphical depiction of the one or more rooms by:

displaying a graphical depiction of the tables and the mini-cables interconnecting the tables inside the room selected by the user using the meta-data.

152. The method of claim 150 further comprising the steps:

responding to a request for a view of one or more of the records contained in the selected room by:

displaying one or more of the records contained in the selected room or portions thereof.

153. The method of claim 147 wherein each field and each cable is either key or non-key, the meta-data and user-data organizing step including associating a key meta-vector with each table and a key vector with each partial record in each table, a key meta-vector being a list of the key fields and the key incoming cables of a table taken in a predetermined order, a key vector being obtained by substituting datums and wire names associated with a partial record for the key fields and key incoming cables of the key meta-vector, the meta-data including a key/non-key indicator for each field in each table and for each cable, the static data organization rules prohibiting any two records in a room from having the same key vector, the key vector of a record being a concatenation of the key vectors of its partial records, each format field of a parent table being a key field for the parent table whenever an associated format-field mini-cable wire connects to a child table having a key field or another key incoming cable.

154. The method of claim 147 wherein one or more variant-record-view specifications are included in the meta-data, the method further comprising the steps:

responding to a request to view datums in accordance with a variant-record-view specification by:
displaying a plurality of datums in one or more records of a room in one or more variant-record-view fields in accordance with the identified variant-record-view specification, the one or more variant-record-view fields being fields in the room field set, the absence of a datum in a variant-record-view field that is not in the record field set of a record being denoted by a "no-datum" symbol;

responding to a request to replace a "no-datum" symbol by a datum by:
rejecting the request.

155. The method of claim 130 wherein the meta-data and user-data organizing step includes defining one or more doorway networks, a doorway network being a specified display format for viewing a plurality of doorways interconnected by one or more context paths, a doorway being a specified display format for viewing a plurality of partial records from a table, the specifications for at least one doorway network and the doorways which make up each doorway network being included in the meta-data, the doorways connected by a context path being called parent and child doorways, a context path between a parent doorway and a child doorway being indicative of a downward path between an ancestral table associated with the parent doorway and a descendent table associated with the child doorway, one of the doorways in the doorway network being designated as the focused doorway, the focused doorway being visually distinguishable from the other doorways, the focused doorway being identified in the meta-data, one of the partial records in the table of the focused doorway being designated as the marked partial record, each partial record in the tables of the other doorways in the doorway network which is either an ancestral or descendent partial record of the marked partial record in the table of the focused doorway via one or more context paths being designated as a marked partial record, the displayed datums in a marked partial record being visually distinguishable from the datums in other partial records, the marked partial records being identified in the meta-data, the method further comprising the steps:

responding to the designation by a user of a different focused doorway by:
changing the meta-data identification of the focused doorway;
changing the meta-data identification of the marked partial records in other tables to the appropriate ancestral and descendent partial records of the marked partial record in the newly-designated focused doorway;

responding to the designation by a user of a different marked partial record in the focused doorway by:
changing the meta-data identification of the marked partial record in the focused doorway and the meta-data identification of the marked partial records in other tables to the appropriate ancestral and descendent partial records of the newly-designated marked partial record in the focused doorway.

156. The method of claim 130 wherein the meta-data and user-data organizing step includes the placing of a plurality of tables into a house, the specification for the house being included in the meta-data, one table in the house called the main table being the primary repository of user-data, one or more tables in the house called link tables being the repositories of topological graph linkages, a topological graph being comprised of nodes which are partial records in the main table interconnected by links which are partial records in a link table, a first cable and a second cable connecting the main table to a link table, the link table being a child table of both cables, a partial record in the link table representing a link between the pair of partial records in the main table to which it is wired by the first and second cables, one or more tables in the house called grouping tables being the repositories of summary data which summarize the data in other tables, a grouping table being a parent table connected by a cable to another table in the house called a base table, a partial record in the grouping table being a summary of a plurality of partial records in the base table, the method further comprising the step:

causing partial records in a grouping table to be added, deleted, or changed whenever changes occur in the partial records of the base table to which the grouping table is wired.

157. Apparatus for practicing the method of claim 113.
158. Apparatus for practicing the method of claim 116.
159. Apparatus for practicing the method of claim 121.
160. Apparatus for practicing the method of claim 130.

* * * * *